US011647765B2

(12) United States Patent
Ulmasov et al.

(10) Patent No.: US 11,647,765 B2
(45) Date of Patent: May 16, 2023

(54) LOW FIBER PENNYCRESS MEAL, SEEDS, AND METHODS OF MAKING

(71) Applicants: COVERCRESS INC., St. Louis, MO (US); BOARD OF TRUSTEES OF ILLINOIS STATE UNIVERSITY, Normal, IL (US); REGENTS OF THE UNIVERSITY OF MINNESOTA, Minneapolis, MN (US)

(72) Inventors: Tim Ulmasov, St. Louis, MO (US); Gary Hartnell, St. Peters, MO (US); John C. Sedbrook, Bloomington, IL (US); Michael David Marks, Roseville, MN (US); Ratan Chopra, St. Louis, MO (US); Maliheh Esfahanian, Stanford, CA (US)

(73) Assignees: COVERCRESS INC., St. Louis, MO (US); BOARD OF TRUSTEES OF ILLINOIS STATE UNIVERSITY, Normal, IL (US); REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 20 days.

(21) Appl. No.: 17/643,730

(22) Filed: Dec. 10, 2021

(65) Prior Publication Data

US 2022/0151259 A1 May 19, 2022

Related U.S. Application Data

(62) Division of application No. 16/893,636, filed on Jun. 5, 2020, now Pat. No. 11,224,237, which is a division of application No. 16/131,633, filed on Sep. 14, 2018, now Pat. No. 10,709,151.

(60) Provisional application No. 62/559,122, filed on Sep. 15, 2017.

(51) Int. Cl.
*A23K 10/30* (2016.01)
*A23K 20/158* (2016.01)

(52) U.S. Cl.
CPC ............ *A23K 10/30* (2016.05); *A23K 20/158* (2016.05)

(58) Field of Classification Search
None
See application file for complete search history.

(56) References Cited

PUBLICATIONS

Alhotan et al, 2017, Poultry Science, 96:2281-2293.*
Badani et al, 2006, Genome, 49:1499-1509.*
Tsogtbaatar et al, 2015, Journal of Experimental Biology, 66:4267-4277.*
Chopra, et al., "Translational genomics using *Arabidopsis* as a model enables the characterization of pennycress genes through forward and reverse genetics", The Plant Journal, vol. 96, pp. 1093-1105, 2018.
European Patent Office, "Extended European Search Report", issued in connection to Application No. 18855603.9, 9 pages, dated May 19, 2021.
Hojilla-Evangelista et al., "Preparation, composition and functional properties of pennycress (*Thlaspi arvense* L.) seed protein isolates", Industrial Crops and Products, vol. 55, pp. 173-179, 2014.
Piotrowska et al., "Characteristic of yellow-seeded lines of winter oilseed rape", pp. 1-3, XP55801867, Dec. 1, 2003.
Alhotan et al., "Nutritive value and the maximum inclusion level of pennycress meal for broiler chickens", Poultry Science Association, Inc., pp. 2281-2293 Jan. 4, 2017.

* cited by examiner

*Primary Examiner* — Jason Deveau Rosen
(74) *Attorney, Agent, or Firm* — McKee, Voorhees & Sease, PLC

(57) ABSTRACT

Pennycress seed, seed lots, and seed meal having reduced fiber content and improved suitability for use in producing animal feed are provided.

21 Claims, 6 Drawing Sheets

Specification includes a Sequence Listing.

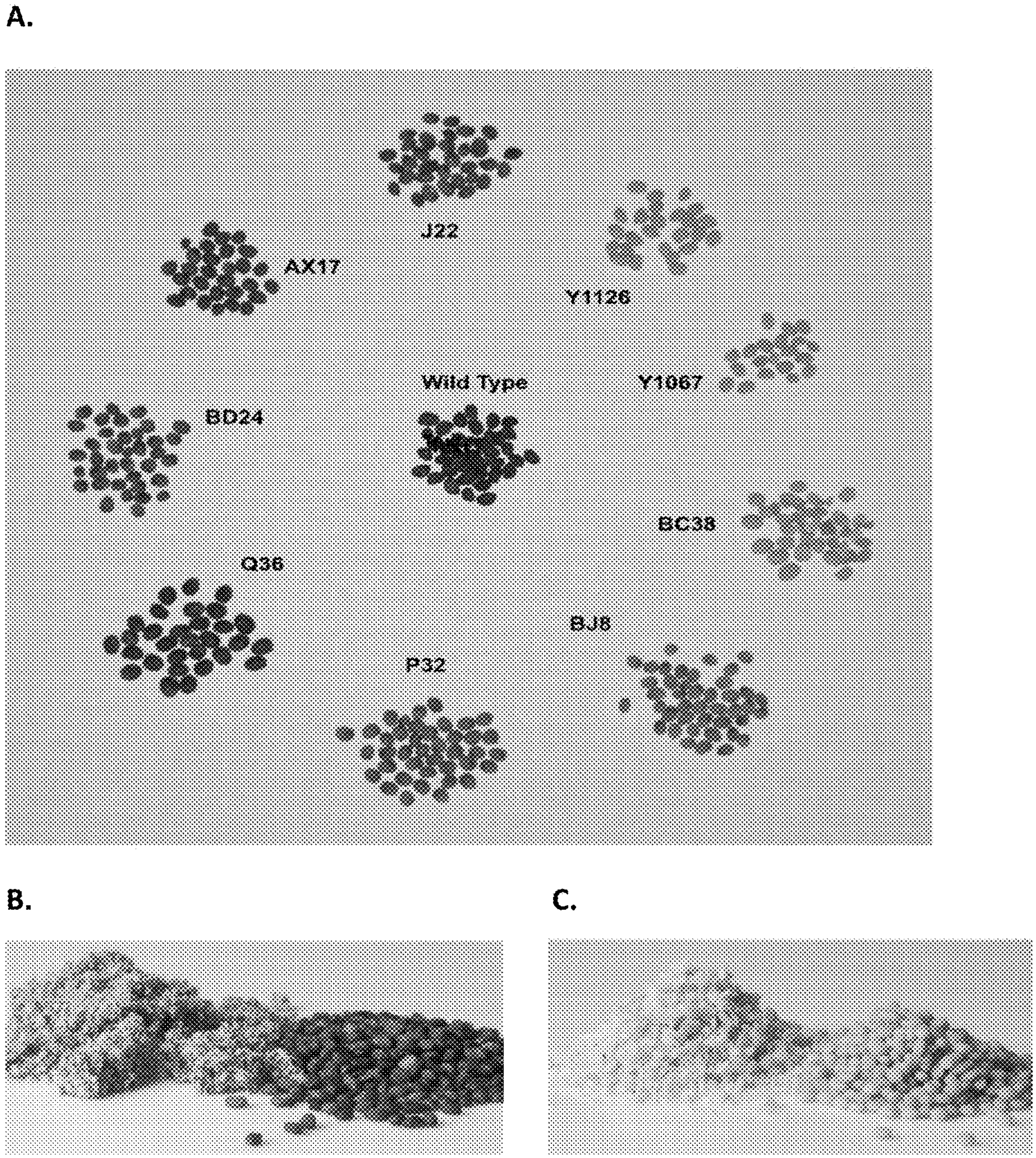
FIGURE 1A, B, C

A.
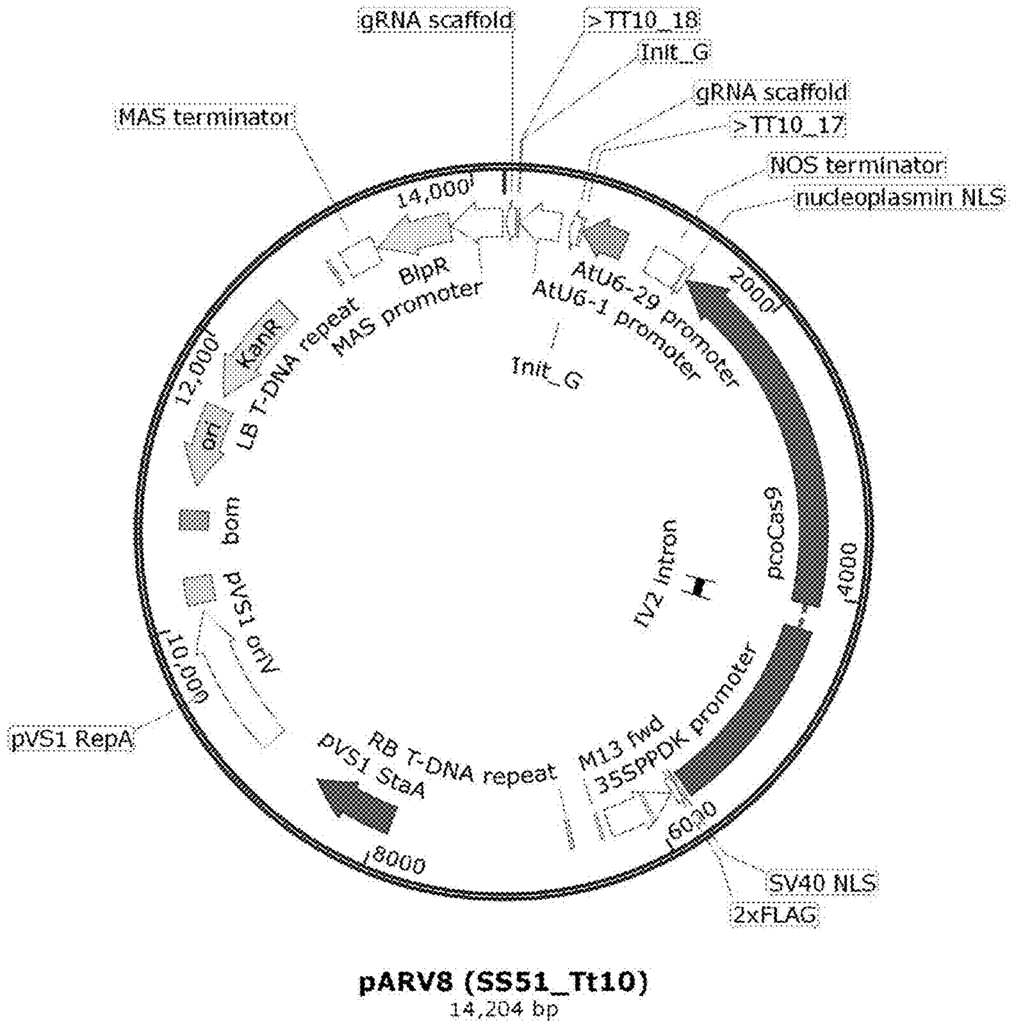
B.
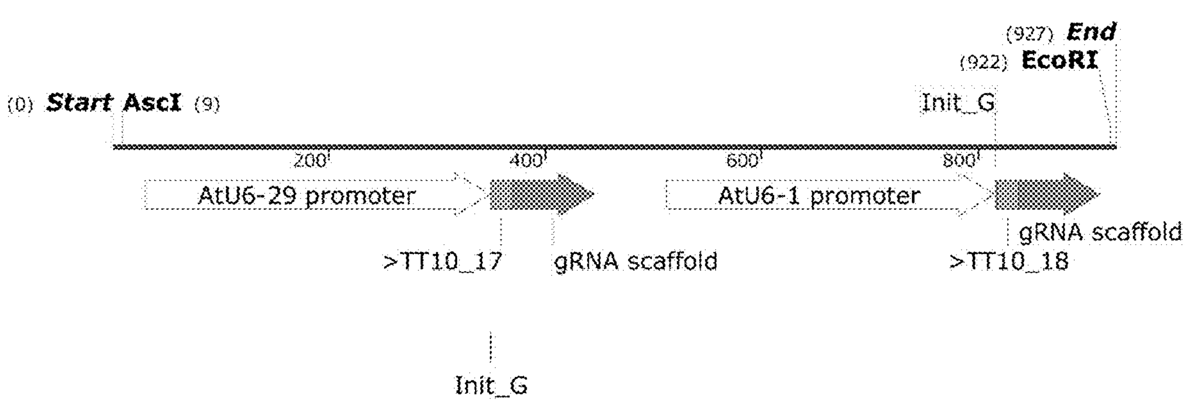
FIGURE 2A, B

FIGURE 5A, B, C, D, E, F, G

SEQUENCE LISTING

```
<160> NUMBER OF SEQ ID NOS: 183

<210> SEQ ID NO 1
<211> LENGTH: 795
<212> TYPE: DNA
<213> ORGANISM: Thlaspi arvense

<400> SEQUENCE: 1

atggggaaga gaacaagtaa cagtttgaag aaagatgagt taaacagagg agcttggact     60

gatcaagaag acaagatcct taaagattat atcatgatcc atggcgaagg caaatggagc    120

actctcccaa accaagccgg tctcaagagg tgtggcaaaa gctgcagact caggtggaag    180

aactacttga gaccggggat aaagcgcgga aacatctcat ctgatgaaga agaactcata    240

atccgcctcc ataatctcct tggaaacaga tggtctctga tagctgggag gcttccgggg    300

cgaacagaca atgaaataaa gaaccattgg aactcaaacc tccgcaaaag acttcccaaa    360

acaaaaacca accaaccaaa acttcgaaaa cattcaacca acatcaagaa caatgtctgt    420

gttatacgca caaaggcgat taggtgctca aaggctctga cttttcagaa ccagagtagt    480

agtggtagta ccaatcttct tcctatgaaa gaacaagtga gctctatgat ggatcatgaa    540

gctggttctt cgttgttgga agatcttgaa attgattttg ataaaatcca atcagagttt    600

ctcttccctg atctgatgga tttggaaggt ttgggttgtg gaaacgtaac atcacttgtt    660

tcatctgagg agattttagg agattatgtt cgtgctgatg aatcttctca gggtaatctt    720

gatctcaata gacctttcac tccttgtctt catcgtggca acgatgaaga ttggctccga    780

gttttcaatt gttag                                                     795

<210> SEQ ID NO 2
<211> LENGTH: 264
<212> TYPE: PRT
<213> ORGANISM: Thlaspi arvense

<400> SEQUENCE: 2

Met Gly Lys Arg Thr Ser Asn Ser Leu Lys Lys Asp Glu Leu Asn Arg
1               5                   10                  15

Gly Ala Trp Thr Asp Gln Glu Asp Lys Ile Leu Lys Asp Tyr Ile Met
            20                  25                  30

Ile His Gly Glu Gly Lys Trp Ser Thr Leu Pro Asn Gln Ala Gly Leu
        35                  40                  45

Lys Arg Cys Gly Lys Ser Cys Arg Leu Arg Trp Lys Asn Tyr Leu Arg
    50                  55                  60

Pro Gly Ile Lys Arg Gly Asn Ile Ser Ser Asp Glu Glu Glu Leu Ile
65                  70                  75                  80

Ile Arg Leu His Asn Leu Leu Gly Asn Arg Trp Ser Leu Ile Ala Gly
                85                  90                  95

Arg Leu Pro Gly Arg Thr Asp Asn Glu Ile Lys Asn His Trp Asn Ser
            100                 105                 110
```

```
Asn Leu Arg Lys Arg Leu Pro Lys Thr Lys Thr Asn Gln Pro Lys Leu
        115                 120                 125

Arg Lys His Ser Thr Asn Ile Lys Asn Asn Val Cys Val Ile Arg Thr
    130                 135                 140

Lys Ala Ile Arg Cys Ser Lys Ala Leu Thr Phe Gln Asn Gln Ser Ser
145                 150                 155                 160

Ser Gly Ser Thr Asn Leu Leu Pro Met Lys Glu Gln Val Ser Ser Met
                165                 170                 175

Met Asp His Glu Ala Gly Ser Ser Leu Leu Glu Asp Leu Glu Ile Asp
            180                 185                 190

Phe Asp Lys Ile Gln Ser Glu Phe Leu Phe Pro Asp Leu Met Asp Leu
        195                 200                 205

Glu Gly Leu Gly Cys Gly Asn Val Thr Ser Leu Val Ser Ser Glu Glu
    210                 215                 220

Ile Leu Gly Asp Tyr Val Arg Ala Asp Glu Ser Ser Gln Gly Asn Leu
225                 230                 235                 240

Asp Leu Asn Arg Pro Phe Thr Pro Cys Leu His Arg Gly Asn Asp Glu
                245                 250                 255

Asp Trp Leu Arg Val Phe Asn Cys
            260
```

<210> SEQ ID NO 3
<211> LENGTH: 3512
<212> TYPE: DNA
<213> ORGANISM: Thlaspi arvense

<400> SEQUENCE: 3

```
tctcagccaa attgacaaat aaaaatcaca tttagaaaac atttcacggt tttgtatgta     60

aactagtaaa aaaaaaaaaa gagaacatgt tatttcaata tataacattg gaaagtatag    120

tatattgatt ctctcactaa tctaaaaatt tatgcatcaa taatttttaa tagattaaaa    180

atctaaagtt aatcttattg gaaattaaat ataattatta agtttcaata tatatagaca    240

tgttatctct ttcattttta accaactagt gatatgggac aaagtacaaa atgttagtta    300

catcagtttt aatctgatat aaaatttgta tcaatttttt taatgttaac aaaattattg    360

attacattga ttatttaaat agtgtaaatt tataatttta tatcagtttt gtttaactga    420

tgtaaactaa tataagtttg tatcaatttt attgaacgga agtcaaataa tcaataaaaa    480

tatcaatttt cagaactgat gttaaatcac atattttata tcatttatta ataagtaatt    540

caccttttttt gtagtgtgat atgagttatt ggcgtttaat aataatttta aaaaattata    600

gtttcatgtt aaatcttaca aaattatata aatcttttaa aatcaaaaat tatttatttg    660

agcatttgca ataatgaaca gttgcgaatg aataattaat aaaatattta aaaattaaaa    720

atgtaaataa caaaatgtat ttaaactctg aatatatgta tataataaca taaattgact    780

taaaaaataa taaatcatat gtacaaagtt gacgccttct taaatactgt ttttataatt    840

tctaatataa taattattca aatggaaaaa ttaaacttga atatgaacct tttaactctt    900

tgattgtcaa aaataaaaag ttttcatgaa atagagttcc gaacttaaaa aagagacatt    960

tgaaacttgg gaccccaaat ttatgtaaca ctgaaagatc ttaaggagtt ttatttttttg   1020

tttgttcatg acgcaggact atgtgtactg tgtaggcatg aagaccatgt gttaccgtct   1080

taactgtatc aaatgatgat tgcttacata ctagaatgtg gctagcaatg actattttca   1140

ctctgtatac atacttatac cccatatgca atacaataat gatcaaggtc gttttaggac   1200
```

```
ctatatgatt ggagtctaag gcacgagaga ctagactagc gatcatcgtg tgaagtgagt   1260
tcaaaggatt tcagatcctt agtaataagt acaaaagtat attcttgatg acaaaattcg   1320
gtagagttaa atctcaccaa aactgataca ctattattac caggtgagaa aaggattgat   1380
atttcaaagt gtgtgtgtgt gacagaagtt ttggaaagcg acatgtgtac ggacattgca   1440
acaactccat ataaagttac tttgttaaca caaaaagaat ctattctcta ctcaacacta   1500
aagacaattg taccaaccaa acaaccacaa gagagagaaa gagagtatgg ggaagagaac   1560
aagtaacagt ttgaagaaag atgagttaaa cagaggagct tggactgatc aagaagacaa   1620
gatccttaaa gattatatca tgatccatgg cgaaggcaaa tggagcactc tcccaaacca   1680
agccggtaca tatccatcta tctattgatc tatccgtctt taaatgcaaa tcttcatcta   1740
cttacaataa ttgcacataa aggtctcaag aggtgtggca aaagctgcag actcaggtgg   1800
aagaactact tgagaccggg gataaagcgc ggaaacatct catctgatga agaagaactc   1860
ataatccgcc tccataatct ccttggaaac aggttaatta acttcctctt tcaccgaaac   1920
acagattgtt ttcttttcaa gttaagtttt tccataattt ttgcggcgta atgcagatgg   1980
tctctgatag ctgggaggct tccggggcga acagacaatg aaataaagaa ccattggaac   2040
tcaaacctcc gcaaaagact tcccaaaaca aaaaccaacc aaccaaaact tcgaaaacat   2100
tcaaccaaca tcaagaacaa tgtctgtgtt atacgcacaa aggcgattag gtgctcaaag   2160
gctctgactt ttcagaacca gagtagtagt ggtagtacca atcttcttcc tatgaaagaa   2220
caagtgagct ctatgatgga tcatgaagct ggttcttcgt tgttggaaga tcttgaaatt   2280
gattttgata aaatccaatc agagtttctc ttccctgatc tgatggattt ggaaggtttg   2340
ggttgtggaa acgtaacatc acttgtttca tctgaggaga ttttaggaga ttatgttcgt   2400
gctgatgaat cttctcaggg taatcttgat ctcaatagac ctttcactcc ttgtcttcat   2460
cgtggcaacg atgaagattg gctccgagtt ttcaattgtt agagcgtatc actagtctac   2520
ataattacat acatatatat ctgtacgaac aaaattatat ttgtattttg tttgaaagct   2580
tctaatttct aattactaat tttgttgtgt tttctaatcc atagattatc aattttgcac   2640
tctttttcaa ttaaagactt atggaaatgg cttttgtctt tagaataaaa tacaaattgc   2700
aaaatatcgc aaatacgcaa tgaagattat ttattttcga tagattttat tcaattatta   2760
tgtgcatgca taaatgatag agcttttatt atagcctaac taccgcttaa ctaccctacc   2820
aataaattat acgagggtca ttgttcttgg taatacgaaa aaaatctttg caatattgtc   2880
ttaacgaaat tgaattttaa tatacacaca tatccattta taggcagaca cggtcataca   2940
tctaaggatt tattgttttt tgtttcttat cattcttcgg aatcattgta taaatggtta   3000
ttgttgtaac aagagaaagg acatcgggtt ataattttat agaggaaacc taaatttgtg   3060
attgtcgact gtggccgctg acggcggttc agtgtcacta gtttatggtc ttttatctat   3120
gctattgtgg gtgcgaatat gtccttttgt taaccttctt aaatattgaa ataaggttgt   3180
tttcggattg tcaatgttat taaacaaatc cattctcaat agtttgacaa aaaaaaaaaa   3240
aaaatccatt ctcaataaat agctgatgca ggaaagacta ttggtttttc tgtattttaa   3300
gttatcggat cttttatatg atataatcca ttacaaatag acactaatta gacaagtgtt   3360
aaaaatagtt cttattatca atttggcagt gatacataaa taaacctatt acacctacct   3420
attaggtgat tatctgcgta tacatacata cacacggatt tacattttat tatagatttt   3480
aaaatgtata aataatatac catattttat tt                                 3512
```

<210> SEQ ID NO 4
<211> LENGTH: 795
<212> TYPE: DNA
<213> ORGANISM: Thlaspi arvense

<400> SEQUENCE: 4
atggggaaga gaacaagtaa cagtttgaag aaagatgagt taaacagagg agcttggact 60
gatcaagaag acaagatcct taaagattat atcatgatcc atggcgaagg caaatggagc 120
actctcccaa accaagccgg tctcaagagg tgtggcaaaa gctgcagact caggtggaag 180
aactacttga gaccggggat aaagcgcgga aacatctcat ctgatgaaga agaactcata 240
atccgcctcc ataatctcct tggaaacaga tggtctctga tagctgggag gcttccgggg 300
cgaacagaca atgaaataaa gaaccattga aactcaaacc tccgcaaaag acttcccaaa 360
acaaaaacca accaaccaaa acttcgaaaa cattcaacca acatcaagaa caatgtctgt 420
gttatacgca caaaggcgat taggtgctca aaggctctga cttttcagaa ccagagtagt 480
agtggtagta ccaatcttct tcctatgaaa gaacaagtga gctctatgat ggatcatgaa 540
gctggttctt cgttgttgga agatcttgaa attgattttg ataaaatcca atcagagttt 600
ctcttccctg atctgatgga tttggaaggt ttgggttgtg gaaacgtaac atcacttgtt 660
tcatctgagg agattttagg agattatgtt cgtgctgatg aatcttctca gggtaatctt 720
gatctcaata gacctttcac tccttgtctt catcgtggca acgatgaaga ttggctccga 780
gttttcaatt gttag 795

<210> SEQ ID NO 5
<211> LENGTH: 109
<212> TYPE: PRT
<213> ORGANISM: Thlaspi arvense

<400> SEQUENCE: 5

Met Gly Lys Arg Thr Ser Asn Ser Leu Lys Lys Asp Glu Leu Asn Arg
1               5                   10                  15

Gly Ala Trp Thr Asp Gln Glu Asp Lys Ile Leu Lys Asp Tyr Ile Met
            20                  25                  30

Ile His Gly Glu Gly Lys Trp Ser Thr Leu Pro Asn Gln Ala Gly Leu
        35                  40                  45

Lys Arg Cys Gly Lys Ser Cys Arg Leu Arg Trp Lys Asn Tyr Leu Arg
    50                  55                  60

Pro Gly Ile Lys Arg Gly Asn Ile Ser Ser Asp Glu Glu Glu Leu Ile
65                  70                  75                  80

Ile Arg Leu His Asn Leu Leu Gly Asn Arg Trp Ser Leu Ile Ala Gly
                85                  90                  95

Arg Leu Pro Gly Arg Thr Asp Asn Glu Ile Lys Asn His
            100                 105

<210> SEQ ID NO 6
<211> LENGTH: 813
<212> TYPE: DNA
<213> ORGANISM: Thlaspi arvense

<400> SEQUENCE: 6
atgagagatt caaactcaat ccttgatctg tctcttcaga tcagccttcc taactctcac 60
gccggagaac ttcttcacgg cggtgaccga agctccacca caagtagtga ttctggaagc 120
agtctcagtg agttgggcca tgagaacaac ttcttcaaca aacctctcct aagcttaggt 180
tttgatcatc attatcgtta tcaaaggcac tcaaacatga tccaaccaca aatctacggt 240

```
cgagatttca agagaagctc atcatcaatg gtttgtctta aacgaagcat tcgagctcca    300

agaatgagat ggacttctac tctccatgcg cactttgtcc atgctgttca gcttcttggc    360

ggccatgaaa gagctacgcc taaatcagtg ttggagttga tgaatgtgaa ggatctaacc    420

ctagctcatg tcaagagtca cttgcagatg tatagaacag tgaaatgcac tgataaagga    480

tcatcaggag aaggaaaggt agagaaagat acagagctga tgacagagga caataataat    540

aatgaagaag ctgacgaagg aactgacaca aattcgccaa actcatcatc tgtgcaaaag    600

acccaaaggg cttcttgttc atccaaaaag agagtgtgta tgaacatatc tacacaagca    660

gaacctcact tgggatcaac tcgtcacact aatgatgatg ggaagaaaga ggcgatcaac    720

gctcatctca atttggaatt cacattaggc cggcaaagtt gggggatgga ctattcggaa    780

cccttaagag atctaactct tctcaagtgc taa                                 813
```

<210> SEQ ID NO 7
<211> LENGTH: 270
<212> TYPE: PRT
<213> ORGANISM: Thlaspi arvense

<400> SEQUENCE: 7

```
Met Arg Asp Ser Asn Ser Ile Leu Asp Leu Ser Leu Gln Ile Ser Leu
1               5                   10                  15

Pro Asn Ser His Ala Gly Glu Leu Leu His Gly Gly Asp Arg Ser Ser
            20                  25                  30

Thr Thr Ser Ser Asp Ser Gly Ser Ser Leu Ser Glu Leu Gly His Glu
        35                  40                  45

Asn Asn Phe Phe Asn Lys Pro Leu Leu Ser Leu Gly Phe Asp His His
    50                  55                  60

Tyr Arg Tyr Gln Arg His Ser Asn Met Ile Gln Pro Gln Ile Tyr Gly
65                  70                  75                  80

Arg Asp Phe Lys Arg Ser Ser Ser Ser Met Val Cys Leu Lys Arg Ser
                85                  90                  95

Ile Arg Ala Pro Arg Met Arg Trp Thr Ser Thr Leu His Ala His Phe
            100                 105                 110

Val His Ala Val Gln Leu Leu Gly Gly His Glu Arg Ala Thr Pro Lys
        115                 120                 125

Ser Val Leu Glu Leu Met Asn Val Lys Asp Leu Thr Leu Ala His Val
    130                 135                 140

Lys Ser His Leu Gln Met Tyr Arg Thr Val Lys Cys Thr Asp Lys Gly
145                 150                 155                 160

Ser Ser Gly Glu Gly Lys Val Glu Lys Asp Thr Glu Leu Met Thr Glu
                165                 170                 175

Asp Asn Asn Asn Asn Glu Glu Ala Asp Glu Gly Thr Asp Thr Asn Ser
            180                 185                 190

Pro Asn Ser Ser Ser Val Gln Lys Thr Gln Arg Ala Ser Cys Ser Ser
        195                 200                 205

Lys Lys Arg Val Cys Met Asn Ile Ser Thr Gln Ala Glu Pro His Leu
    210                 215                 220

Gly Ser Thr Arg His Thr Asn Asp Asp Gly Lys Lys Glu Ala Ile Asn
225                 230                 235                 240

Ala His Leu Asn Leu Glu Phe Thr Leu Gly Arg Gln Ser Trp Gly Met
                245                 250                 255

Asp Tyr Ser Glu Pro Leu Arg Asp Leu Thr Leu Leu Lys Cys
            260                 265                 270
```

<210> SEQ ID NO 8
<211> LENGTH: 4752
<212> TYPE: DNA
<213> ORGANISM: Thlaspi arvense

<400> SEQUENCE: 8

```
gaggtcggtc gattcaaact tcttttccct ttttgtcttt tgtgtatatt tccatatcta     60
tcctttattc tccgagtaat aaggaaattc ttctttatct tttgaattag tccgatgttt    120
ccggtcttca aaggttatcc ttaagagatt tccttaaatc cgaactaggt cggcacggtc    180
ttcctagtct tgatgggctt aagttattgc gagggaaaac cttttaggaa atgtattcat    240
tttccctcta acaatgtttt aagtatgtat taacaaaata aaaattaata tatgaaaaca    300
attaataaaa ataagtaaga tgcttatgtg aagcagaata ttcccgaccg tgtgtctact    360
taccgtggcc aaagacatcg catgaaaaaa caaaccaaag agtaaggtaa attaaataga    420
atgtatttaa ctagattgaa cttggagtaa ttagttgtct ttctcttttt gcacttttga    480
aaagataaac aaaatttcct tttggagcta ctttgtggtt caaacaagaa tccccatggc    540
aaaacggcag ttactttgtc agtcaacttt tgaaatctga ggctttcaag gattgtaaga    600
aatattaaat acaaaactct gttgtatttt ccatcgaccc taagagacag gccttttcaa    660
gcctatcttt ttagcattgg aaattttaaa gtgttttatt ttatttattt aaaatagtaa    720
aaacatgcaa atcatagggt actcattatc taattatcac actcactctc tttcctcggc    780
ttggtttaac ctttttaacc actgatcaaa taatacgtag ccaatttgtc caaaatcttc    840
caacttcttt tcctcctttc ttacttcttt aaattatttt agtattcgtc ataaatcaaa    900
agatacgttg tcttgaacat gtacacaggt tgtagtattt gtgtgaaaca caaaagtgta    960
tactagtatt ttagttagga aatctacacc atatatttac ttttcttata aattaagtat   1020
atgactttga cattatttta atgatacata atcttttgat tactttcatc agttattttt   1080
tttgctaaaa attaatttaa atgttgtttt taacctacta aagatttcat gcgtacgtca   1140
gagactattt tttgtttctc atatcatgat atgtaatcag aaaagtgaaa acaggttgcc   1200
atgtacattc atttatgata cacaattgat tttttttttc tttttaccaa ataacaggtt   1260
attcatcagt tgccacattg gcgaaagatg aaaatactat tttcattgat ccgcataaat   1320
aaaaaatcct ttgattttac cactttgtta tggtagtcat ttacgtagtt ttaattcggt   1380
tatctacccg aattacgttt tttttgctta aaagttgaaa atgttattct acgtagggac   1440
taacatctgg taatacagta ctacgataag agtgaataat taagagtttt ataaataggt   1500
tatatattta aatcatttgt acacgtagaa aataaaacat attattctta aaaaaagacg   1560
atagactatg tttattgaga taaagacaat agttacgtcg ttgcttttct tgctctctct   1620
ctctccattt ctttctctct ccgctattta aatagacaaa ggattaatga aaaagtagag   1680
agatgatgat gttagactcc agaagcagta tgagagattc aaactcaatc cttgatctgt   1740
ctcttcagat cagccttcct aactctcacg ccggagaact tcttcacggc ggtgaccgaa   1800
gctccaccac aagtagtgat tctggaagca gtctcagtga gttgggccat gagaacaact   1860
tcttcaacaa acctctccta agcttaggtt ttgatcatca ttatcgttat caaaggcact   1920
caaacatgat ccaaccacaa atctacggtc gagatttcaa gagaagctca tcatcaatgg   1980
tttgtcttaa acgaagcatt cgagctccaa gaatgagatg gacttctact ctccatgcgc   2040
actttgtcca tgctgttcag cttcttggcg gccatgaaag tattttgctt tcacattttc   2100
```

-continued

```
ctttttaaaa gaaataatca agatttatgt caagtaaaat gttttgaaac caaagtacta   2160
agatttgttg cttatttgct ggtctcagga gctacgccta aatcagtgtt ggagttgatg   2220
aatgtgaagg atctaaccct agctcatgtc aagagtcact tgcaggtcca tctctatttt   2280
aatttatttt tcttatatat tttattataa aaatagtaat ggaatctcat aagaatgcaa   2340
taggtttaag taaacattta tgaaagtgta tctatttggt ccactagcta acacatgatt   2400
gcgtagttga aataaacttg tattagctat acttttttta tttttattt ggttttgatt   2460
tttaaaggat gtgtgtttgt tgatgcagat gtatagaaca gtgaaatgca ctgataaagg   2520
atcatcaggt atgcattcaa accggattgg ctgatttttg aattcctact ggatgtaaat   2580
gtaactatct catttttttt tttttgtttt aatttgtatt tgtttcttct tgggaataac   2640
aggagaagga aaggtagaga aagatacaga gctgatgaca gaggacaata ataataatga   2700
agaagctgac gaaggaactg acacaaattc gccaaactca tcatctgtgc aaaagaccca   2760
aaggttactc ttttatctat tctattttgt aaaaactttg catttaatct ctttgccttt   2820
gttatgcgcg aattttgatg aatccctctt ctagtcgtat gtgaccctgc ttgtccattt   2880
ttataaatag aaaaaatttc tatgatctca gttaaattgt gtgtattcac tgttgatagt   2940
aaataagtag gttcaaataa aacaatatat gaatatgaat gtccaacaat atgaattatt   3000
attagtagat ttctcaaatg tgttttttat catttaaatt tgaacagggc ttcttgttca   3060
tccaaaaaga gagtgtgtat gaacatatct acacaagcag aacctcactt gggatcaact   3120
cgtcacacta atgtacattc tttaacaaat tgttacaatg ttattataga tgtgcactct   3180
cacatatacg tacatatacc cttctgtata ctgtttctaa aatgtgaaat ctttggaaat   3240
aggatgatgg gaagaaagag gcgatcaacg ctcatctcaa tttggaattc acattaggcc   3300
ggcaaagttg gggatggac tattcggaac ccttaagaga tctaactctt ctcaagtgct   3360
aatcgtttag cttggagaac tacaacaaat aagtcagctt aggttatcaa tttaacataa   3420
ttaacttgtt tgatcgtaat agacattgga agaatcatta tcatcatata tgaatttctt   3480
acaaaaaatg ttctcatttt tttttttggg atgtaaacaa gagattcgga ttaagtagta   3540
gctatgttat ggttgtagtg gatgagaagg gagtgcaagt tcaagtagag atgaacttat   3600
gattggttgc caccaaatat gcatggtgga tttgttggta gttttttttt atgttttcat   3660
tgactgctat tcatattgtc gcagtgaata tatatttaaa tgattttgtt ttgattcttt   3720
gtcttgattt ggattagaaa gtagaattcg gcaaaactag aggttttttt actgatattc   3780
tgcatgacaa taaaactctc agttctattt aaatttttcg ctttgttatt gatacatata   3840
ccgtttaaaa ggatacatta aacaatactg aatagtactc tcaaattctg tttttcgaag   3900
gatatgagtt ggtagatatt tcacaacatc aaaaaacgaa ggtgaaaata ccttcttcag   3960
attgcaaaga attacagaaa ttttgtgcca ggtttcgcag accgcctgtt gtaagagatc   4020
gcaacatata tcttgaacca atccctcgaa agcataaata aacaaagtag acactaagaa   4080
atgattatat aaataatata atatgtttaa tttattaatt atatgtagct gcaattgctt   4140
catgaatatt atgtggtaga gactgacaaa aataaatgga aagagacact tcatcacaac   4200
atggtaatca taactcttca tccagaaaac ttccatacct cttcatttat atgagaattt   4260
aatgttatag gcaatctaat aaatactctc cctttgaagg tgcatccaac tgaaaagcag   4320
ggaccgatgc cttccctttc taggaaactt gtcgcgcctt accagaacag tactctgcca   4380
agtccaatct agacttcata ttgtcctttg tcttcctttg acattgagaa cggtgttgat   4440
tatgttgtct ataaaattct tcgtattgtg cataacatct agattatgcc ttatcaaatg   4500
```

```
gtccttccaa aaagacaatt cccaaaatat actcatctta tacaaactat gttggtcacc   4560

acaagcgttc acatgataat gataaccttc catgcattgg ccatcagaat aacatgccat   4620

atgctggaaa aaggctaata gtccacatta atactgaccc catgacaata ttctgctgac   4680

aagaaacatg aaatgcctga acactatgct cctataatat ttgcagctca taaaacaatg   4740

attggagaaa tt                                                      4752


<210> SEQ ID NO 9
<211> LENGTH: 1041
<212> TYPE: DNA
<213> ORGANISM: Thlaspi arvense

<400> SEQUENCE: 9

atgacaatct tggatcagac cgttgtaaca accggatcga agaaggcttg tgtcatcggt     60

ggcacaggaa acttagcttc tactctcatc aagcatttgc ttcaaagtgg ctacaaagtt    120

aacactacag ttagagatcc agagaatgag aagaaaatgg ctcacttaag ggtacttcaa    180

gaacttgggg acctcaagat cttcaaggcg gaatttactg atgaagagag tttcgattca    240

ccagtttcgg gctgtgatta cgttttccat gtcgcaacgc ctatcaactt tacatctgaa    300

gatcccgaga aagacatgat caagccaggg atacaaggag tgaccaatgt gttgaaatct    360

tgcttaaaat cgaaatcagt caagcgtgtg atctacactt cttcagctgc tgcggtttcc    420

atcaacaatc tttctggacc tggacttgtg atgaacgaag aaaactggac tgaccttgat    480

tatctcacaa aggagaagcc gtttaactgg ggctacccag tgtcaaagat actagcagaa    540

aaggcagctt gtaaatttgc ggaagagaac aagatcgatc tagttaccgt gattccggca    600

ctcatatccg gaaaatctct cctctcggat cctcctccga gcagctcatt tctctctatg    660

tctttaatca ccgggaatga aatgtatctg aaaggtctca aggaaatgca gaagcaatct    720

ggctccatct cgttcagcca cgtgaaggat ttggctcgtg cccatttgtt tcttgcggag    780

aaagaaactg cgtctggtcg ttacatttgc tgtacttaca acacaagtgt tccggagatt    840

gcagattttc tcaggcagag atatcctaag tacaatgtgc tgtctgaatt cgaagagtgc    900

ttatcaagtg cgaagctgac gctatcttcg gaaaaactca tcaatgaagg ctttcgattc    960

gaatatggga ttaatgagat ctatgatgag atgatagagc acttcgagtc caaaggatta   1020

atcaaagcta aagaatcttg a                                             1041


<210> SEQ ID NO 10
<211> LENGTH: 346
<212> TYPE: PRT
<213> ORGANISM: Thlaspi arvense

<400> SEQUENCE: 10

Met Thr Ile Leu Asp Gln Thr Val Val Thr Thr Gly Ser Lys Lys Ala
1               5                   10                  15

Cys Val Ile Gly Gly Thr Gly Asn Leu Ala Ser Thr Leu Ile Lys His
            20                  25                  30

Leu Leu Gln Ser Gly Tyr Lys Val Asn Thr Thr Val Arg Asp Pro Glu
        35                  40                  45

Asn Glu Lys Lys Met Ala His Leu Arg Val Leu Gln Glu Leu Gly Asp
    50                  55                  60

Leu Lys Ile Phe Lys Ala Glu Phe Thr Asp Glu Glu Ser Phe Asp Ser
65                  70                  75                  80

Pro Val Ser Gly Cys Asp Tyr Val Phe His Val Ala Thr Pro Ile Asn
```

```
                85                  90                  95

Phe Thr Ser Glu Asp Pro Glu Lys Asp Met Ile Lys Pro Gly Ile Gln
            100                 105                 110

Gly Val Thr Asn Val Leu Lys Ser Cys Leu Lys Ser Lys Ser Val Lys
        115                 120                 125

Arg Val Ile Tyr Thr Ser Ser Ala Ala Ala Val Ser Ile Asn Asn Leu
    130                 135                 140

Ser Gly Pro Gly Leu Val Met Asn Glu Glu Asn Trp Thr Asp Leu Asp
145                 150                 155                 160

Tyr Leu Thr Lys Glu Lys Pro Phe Asn Trp Gly Tyr Pro Val Ser Lys
                165                 170                 175

Ile Leu Ala Glu Lys Ala Ala Cys Lys Phe Ala Glu Glu Asn Lys Ile
            180                 185                 190

Asp Leu Val Thr Val Ile Pro Ala Leu Ile Ser Gly Lys Ser Leu Leu
        195                 200                 205

Ser Asp Pro Pro Pro Ser Ser Ser Phe Leu Ser Met Ser Leu Ile Thr
    210                 215                 220

Gly Asn Glu Met Tyr Leu Lys Gly Leu Lys Glu Met Gln Lys Gln Ser
225                 230                 235                 240

Gly Ser Ile Ser Phe Ser His Val Lys Asp Leu Ala Arg Ala His Leu
                245                 250                 255

Phe Leu Ala Glu Lys Glu Thr Ala Ser Gly Arg Tyr Ile Cys Cys Thr
            260                 265                 270

Tyr Asn Thr Ser Val Pro Glu Ile Ala Asp Phe Leu Arg Gln Arg Tyr
        275                 280                 285

Pro Lys Tyr Asn Val Leu Ser Glu Phe Glu Glu Cys Leu Ser Ser Ala
    290                 295                 300

Lys Leu Thr Leu Ser Ser Glu Lys Leu Ile Asn Glu Gly Phe Arg Phe
305                 310                 315                 320

Glu Tyr Gly Ile Asn Glu Ile Tyr Asp Glu Met Ile Glu His Phe Glu
                325                 330                 335

Ser Lys Gly Leu Ile Lys Ala Lys Glu Ser
            340                 345
```

<210> SEQ ID NO 11
<211> LENGTH: 4124
<212> TYPE: DNA
<213> ORGANISM: Thlaspi arvense

<400> SEQUENCE: 11

```
gccgccgccg ccgcgaaggc caagaagaag gatgtggagg ctccgctgac aattgcttta     60

ggcttacagg cgccgaaatc gggaacgaag cggccgagtg aagggacttc aagggaggct    120

aattcaaagc gagctaagaa ggttacttca ggggacgacg agaagaagat cggcgaagac    180

tcaaagaaac ctgcttttca gagactgtgg tctgaggaag acgaaatcac tgtgcttcaa    240

ggtatgatcg atttcaatgc tgatacaggc aagtctcctt acgaagacac gaatgtgtat    300

tacgatttca tcaagaaaaa gattagcttt gaggttagca agaaccagtt catggataag    360

attaggagct tgaagaagaa gtatataggc aaaggaaaga ctgccttcac gaaacctcac    420

gatcagagat ctttcaagct gtgccaacac atatggggac ctgaaggaat ggctctcgag    480

tcagcggtta agtccaatgg cgtatcgaga aagagccaga agaagaagaa gcttgactct    540

gtgaagcaag agctgtcttt tgcttcttcc cctaatggca aaacggttga tgatgataaa    600

aaagtgttga tccatggagg agatgtggag tcttcggttg ctgcgaagaa gcatgattgg    660
```

```
ttcgagagct cgtttcttgt tcgcgccatt gccggtttgg gagttgatga gtatactgtg    720
aaacagaggt ggagcttggt gcctgttgag acgaagaaga aggttgaaga gaagatgaag    780
atgttgcagg ccaaggagat tgattttgtg ttggagaaga cacagttttt gcatgaggtt    840
acatcgatga tcgctgaagc atctaagaag aagacattag atatatagat ttgatccgaa    900
aatgccaatg ccaatgcctc tctcttttgt tttttgaatc ttaggaatta tctcttttac    960
ttccctttta tgatctatca atctatgtaa tttttctggt tttctggtg gtttttaata    1020
tggaactctc tctcttttgg atttgttgct tatacataaa agcaccatgg aagtaaattc   1080
tacatggtga aatatgaaga agatccaaac aaactgtttt tttttttttt atgaaatggg   1140
tttattcagg atgaattttg ttgaattgag gctaaaaaat tttggtgttc tctaaaacaa   1200
aaagttaaat gaaactttca gctcaaagat caaattggtt gaagaaagca aaactctttt   1260
cacaagtaga tgatatcaaa tcagcaagtc aattaaaagt ttgactcttt ttttgattct   1320
taggtgagag agttagttat taaagaagag gaaggtaaca caaaattagt tgcttcaaaa   1380
ctcacgtgct taccttctaa aaagactttt tgatcaatgg ttgtaccaaa tgtgcaagac   1440
cataagcttt gccactataa aaacgagtgc taaggccata aactcataac agtcagatct   1500
aaatatctgt gtttaagaac tagtatcaga tgacaatctt ggatcagacc gttgtaacaa   1560
ccggatcgaa gaaggcttgt gtcatcggtg gcacaggaaa cttagcttct actctcatca   1620
agcatttgct tcaaagtggc tacaaagtta acactacagt tagagatcca ggttcttcat   1680
ttcttctttc tttcttctct tgaggttctt tgagtgttta gtgactcttt tattctgaat   1740
ttgcagagaa tgagaagaaa atggctcact taagggtact tcaagaactt ggggacctca   1800
agatcttcaa ggcggaattt actgatgaag agagtttcga ttcaccagtt tcgggctgtg   1860
attacgtttt ccatgtcgca acgcctatca actttacatc tgaagatccc gaggtctgat   1920
tttcaacaga ttgtgtatgt tttttttctt ctgactctta agagaaacgt tttcagctat   1980
cctttgtttg tgtttccatg tacagaaaga catgatcaag ccagggatac aaggagtgac   2040
caatgtgttg aaatcttgct taaaatcgaa atcagtcaag cgtgtgatct acacttcttc   2100
agctgctgcg gtttccatca acaatctttc tggacctgga cttgtgatga acgaagaaaa   2160
ctggactgac cttgattatc tcacaaagga gaagccgttt aactgggtaa tttacaattt   2220
cttgcgagcc aagatagggt ttacttggac cagtttactt actacatctc tgttcttttc   2280
tagggctacc cagtgtcaaa gatactagca gaaaaggcag cttgtaaatt tgcggaagag   2340
aacaagatcg atctagttac cgtgattccg gcactcatat ccggaaaatc tctcctctcg   2400
gatcctcctc cgagcagctc atttctctct atgtctttaa tcaccggtaa acaccaattt   2460
tactgtttga ctccttctgt taaagtttca caataagaaa gtcaaagatg aatggttttt   2520
ttttgttagg gaatgaaatg tatctgaaag gtctcaagga aatgcagaag caatctggct   2580
ccatctcgtt cagccacgtg aaggatttgg ctcgtgccca tttgtttctt gcggagaaag   2640
aaactgcgtc tggtcgttac atttgctgta cttacaacac aagtgttccg gagattgcag   2700
attttctcag gcagagatat cctaagtaca atgtgctgtc tgagtaagca tttatatcca   2760
cagaaactga aaatcttaat ggaaaattct gaattttctc gttaattttc gctgtgaaat   2820
ttggcagatt cgaagagtgc ttatcaagtg cgaagctgac gctatcttcg gaaaaactca   2880
tcaatgaagg ctttcgattc gaatatggga ttaatgagat ctatgatgag atgatagagc   2940
acttcgagtc caaaggatta atcaaagcta aagaatcttg aaatttataa tgtgaagata   3000
```

```
tggatttatg agtatatgag tctttgttct cattctcatt ctataaatgg cattaaataa   3060
taagttggtt gatttgatat gtattttgat atacacacct agaaaatgaa aaacaagatt   3120
tttcaagctt tatattactc tacgaagctg attagtaatt ttacttctaa gtttctcaca   3180
tttcacaact accttttttc tttcccatgt tataaatata taactttttt ttcagcataa   3240
aaagaagttg tggaaagaat gcgacgaact attttaccaa aaaaaaaggt gacaatctac   3300
atggaaaaaa gtaaataaaa tgtgttaata aactttcgat ttaaacaagt tgtgtattta   3360
catacaattg atatatatat atataatact ttataatact gtattctttt atcaaaagga   3420
tatatactgt aatatttagc aaattataca taaaactatc aaattaaaga gtatgatgta   3480
ttccactgaa aacataaaaa atgatatatg tagaaaccaa cctgagtgta tgcgcgtgga   3540
tattcgttta gtaataatga taatgatatg agtagactat attacctaaa gccaatcaac   3600
atatgaccaa tctacaagct cgagctttat tagatcaaaa cataaaaatt ggtatatgta   3660
gaaatgttgt ctaaattaaa ccaagatgaa aaacatgaga aaacattaaa acatcacttt   3720
ttattcttgg tgatttgtta ttagaactcc gagcaaagaa cgaatctgtg aggacatcat   3780
gcatgtatgt cttactcagc gtaataggga cattgtgcaa gtcactgcaa gagatctcca   3840
atgatgatct aacggatcca agaaagtaaa ggaaaagaag aaggaagagc agattggtga   3900
gactcggatc caagaattag aggaagatct gaaggatctg aagcggatgt gcactgttct   3960
agaaaccttt ctagggaaag aaaaggcaaa tgtgtttgaa gccagagccc ctgctatgac   4020
gttagatgag ttgtataatg acttaggttc tgcatgatgc gttgtggtat tgtatgttca   4080
gggccggctc taagattatg ggagtttgaa acaaaataaa aaat                     4124
```

<210> SEQ ID NO 12
<211> LENGTH: 1461
<212> TYPE: DNA
<213> ORGANISM: Thlaspi arvense

<400> SEQUENCE: 12

```
atggatccga cgacgccgtt tctcggtggc gaggtcgaag aggattatgc tccggcgagg     60
acatggagcg acgtcaagcg agtttttgct acggagtcgg ccaaaatgtg gatgatcgcc    120
gctcccattg gtttcaacat catctgtcag tacggagtta cctccatcac caatattttc    180
gtcggccata tcggcgaggt cgagctctcc gccgtcgcca tctccctctc cgtcatcggc    240
accttttcct tcggcttcct gcttggcatg ggaagtgcac ttgaaacact ctgtggacaa    300
gcatttggag ctggtcaagt ccatatgtta ggcgtttaca tgcagagatc ttggattatc    360
ttattcgtct cctgcatctt tctccttcct atttacatat tcgccacgcc gattctgaga    420
ctcctcggcc aagcagagga gatcgccgtt ccagctggag aattcactct tttaaccatc    480
cctcagctat tctcactcgc catcaacttc ccaacctcca agttccttca agcgcagagc    540
aaagtcatcg cgattgcttg gatcgggttc atcgctttcg tcctacacgt cggtatgctc    600
tggctgttta taatcgtgtt tggttgggga acaaacggtg ctgccttggc gtttaatctc    660
accaactggg gaacagcgat ctctcaagtc gtttatgtga ttggttggtg taatgaaggc    720
tggtctggtt tgtcttggtt ggcatttaaa gagatttggg ctttcgttag actctccata    780
gcatctgctg ttatgctttg tcttgagatc tggtacatga tgagtatcat cgtccttact    840
ggtcgccttg acaacgctgt tatcgctgtt gattcccttt ccatatgcat gaatctcaat    900
ggtctggagg ccatgttgtt catcggaata aacgctgcta taagtgtccg tgtctccaat    960
gagcttggct taggccgtcc acgagcagcg aaatactctg tctatgtcac ggtgttcgag   1020
```

```
tctctcctca tcggtcttgt ctttatggtg gctatcatca taggcagaga ccattttgcg   1080

atcatcttca cgagcagcaa agtacttcaa cgcgcagtgt ctaagctagc ttatcttctt   1140

ggtataacca tggttctcaa cagcgtgcag ccagtcattt ccggtgtggc tgttggagga   1200

ggttggcaaa gtttggtggc ttatataaac ttgggttgtt actacatttt cggccttccc   1260

tttggatatc ttcttggtta caaagcaaac ttaggagtga tgggactttg gtcgggaatg   1320

atagccggga cagcgcttca aacgttgcta ctgatgtttg tcttgtacaa gacaaactgg   1380

aataaagagg ttgaagagac gatggaacgt atgaagaaat ggggagggag cgagacgaca   1440

tcgaatgatg taactgcgtg a                                             1461


<210> SEQ ID NO 13
<211> LENGTH: 486
<212> TYPE: PRT
<213> ORGANISM: Thlaspi arvense

<400> SEQUENCE: 13

Met Asp Pro Thr Thr Pro Phe Leu Gly Gly Glu Val Glu Glu Asp Tyr
1               5                   10                  15

Ala Pro Ala Arg Thr Trp Ser Asp Val Lys Arg Val Phe Ala Thr Glu
            20                  25                  30

Ser Ala Lys Met Trp Met Ile Ala Ala Pro Ile Gly Phe Asn Ile Ile
        35                  40                  45

Cys Gln Tyr Gly Val Thr Ser Ile Thr Asn Ile Phe Val Gly His Ile
    50                  55                  60

Gly Glu Val Glu Leu Ser Ala Val Ala Ile Ser Leu Ser Val Ile Gly
65                  70                  75                  80

Thr Phe Ser Phe Gly Phe Leu Leu Gly Met Gly Ser Ala Leu Glu Thr
                85                  90                  95

Leu Cys Gly Gln Ala Phe Gly Ala Gly Gln Val His Met Leu Gly Val
            100                 105                 110

Tyr Met Gln Arg Ser Trp Ile Ile Leu Phe Val Ser Cys Ile Phe Leu
        115                 120                 125

Leu Pro Ile Tyr Ile Phe Ala Thr Pro Ile Leu Arg Leu Leu Gly Gln
    130                 135                 140

Ala Glu Glu Ile Ala Val Pro Ala Gly Glu Phe Thr Leu Leu Thr Ile
145                 150                 155                 160

Pro Gln Leu Phe Ser Leu Ala Ile Asn Phe Pro Thr Ser Lys Phe Leu
                165                 170                 175

Gln Ala Gln Ser Lys Val Ile Ala Ile Ala Trp Ile Gly Phe Ile Ala
            180                 185                 190

Phe Val Leu His Val Gly Met Leu Trp Leu Phe Ile Ile Val Phe Gly
        195                 200                 205

Trp Gly Thr Asn Gly Ala Ala Leu Ala Phe Asn Leu Thr Asn Trp Gly
    210                 215                 220

Thr Ala Ile Ser Gln Val Val Tyr Val Ile Gly Trp Cys Asn Glu Gly
225                 230                 235                 240

Trp Ser Gly Leu Ser Trp Leu Ala Phe Lys Glu Ile Trp Ala Phe Val
                245                 250                 255

Arg Leu Ser Ile Ala Ser Ala Val Met Leu Cys Leu Glu Ile Trp Tyr
            260                 265                 270

Met Met Ser Ile Ile Val Leu Thr Gly Arg Leu Asp Asn Ala Val Ile
        275                 280                 285
```

```
Ala Val Asp Ser Leu Ser Ile Cys Met Asn Leu Asn Gly Leu Glu Ala
    290                 295                 300

Met Leu Phe Ile Gly Ile Asn Ala Ala Ile Ser Val Arg Val Ser Asn
305                 310                 315                 320

Glu Leu Gly Leu Gly Arg Pro Arg Ala Ala Lys Tyr Ser Val Tyr Val
                325                 330                 335

Thr Val Phe Glu Ser Leu Leu Ile Gly Leu Val Phe Met Val Ala Ile
            340                 345                 350

Ile Ile Gly Arg Asp His Phe Ala Ile Ile Phe Thr Ser Ser Lys Val
        355                 360                 365

Leu Gln Arg Ala Val Ser Lys Leu Ala Tyr Leu Leu Gly Ile Thr Met
    370                 375                 380

Val Leu Asn Ser Val Gln Pro Val Ile Ser Gly Val Ala Val Gly Gly
385                 390                 395                 400

Gly Trp Gln Ser Leu Val Ala Tyr Ile Asn Leu Gly Cys Tyr Tyr Ile
                405                 410                 415

Phe Gly Leu Pro Phe Gly Tyr Leu Leu Gly Tyr Lys Ala Asn Leu Gly
            420                 425                 430

Val Met Gly Leu Trp Ser Gly Met Ile Ala Gly Thr Ala Leu Gln Thr
        435                 440                 445

Leu Leu Leu Met Phe Val Leu Tyr Lys Thr Asn Trp Asn Lys Glu Val
    450                 455                 460

Glu Glu Thr Met Glu Arg Met Lys Lys Trp Gly Gly Ser Glu Thr Thr
465                 470                 475                 480

Ser Asn Asp Val Thr Ala
                485


<210> SEQ ID NO 14
<211> LENGTH: 4540
<212> TYPE: DNA
<213> ORGANISM: Thlaspi arvense

<400> SEQUENCE: 14

gcagttcaca tttaaatagt ccaatatgtt attattggca agcaacccga attgaaatga      60

gacagtggaa acattagcaa tccaaaacat catacgaacc tacttctact tataccttag     120

agaagaataa tcagattacg agtaacaaga atgaagaacc tgagtcgctt agccttaatg     180

ttctaaatca aataactaat ctgagctcat ttgcaaaaca ttggcccatt ttaaaattct     240

tggcactgat acgcagcaca aaaggaggtt actgtaaaag cccaatgtgc gtacattcat     300

tattcacaaa aaaaaatctt gtttgactta aaattgtggc ccccttttttg ggtttgtctt     360

ttaatttcat gtatttttta attaattgtt ttctattttg gcattaatat ggctctatta     420

attataattt atgatacaaa atcagaatgg accgggctgg gcctttggtg aagttggtgg     480

gctcggttta agaattttat ttttttcatt attttgactt gcattaaata aaacaagtca     540

atgggaaatg tcatcattta tctgactggt ttaatgacaa aggtttaatg atgaaacagg     600

gaaataaata caaacgatga cgtaaactga aaggggacca caggaccctg tcgtttccga     660

tgaaaaagaa gaagaaaatt ccctctccga ttcttcttcc tgttcatatt cattttacaa     720

acggtacgta actcactttt taatacttca cttaaggaca tcaacctatt ttcggaaacg     780

acaacttttc cactcttggt tcgagcttag attgattcaa cattttttttc ctaattaact     840

tacatatact gtattcattt tactgtctaa cagtaaactc gagctatcct ggcaagttta     900

atcttctcga caacttacta tatagttgat actatatcac taggatcaat tttataaaaa     960
```

-continued

```
aaaaaacaaa ttaatcacgt gaaaataatt ctcacacatg ataaataaac taggagtaac   1020
aagtttgatg tgacattaca ctaacaaact ttcacaacac taccctatca atattaaatg   1080
tcaaatgatg gaaaagagaa aagcagtttt atgcttttga ataatcttgt atgcatattt   1140
ctgatatgtc aaagtacgtg gtgtctcatg caccacccgt tagcctcacc tacctaatct   1200
acttctcaat tccatgccga attcggtaat aaatttctcg tacgttttgt ttttcctttc   1260
cgctaattac ccaaaaacta aaataggcta ataactcctt caatttttat tattgttatt   1320
atttgattag tatggcaaaa caaggggaga gagaagtgcg tgattcaacg gttttgttat   1380
ataaaccaaa accccataat tccgcaacaa acattgactc agagtgagag agagagagag   1440
agagagagag aagtctgtct gtgtgagctt tgggtttaac attttgagac tcgcacggag   1500
atggatccga cgacgccgtt tctcggtggc gaggtcgaag aggattatgc tccggcgagg   1560
acatggagcg acgtcaagcg agtttttgct acggagtcgg ccaaaatgtg gatgatcgcc   1620
gctcccattg gtttcaacat catctgtcag tacggagtta cctccatcac caatattttc   1680
gtcggccata tcggcgaggt cgagctctcc gccgtcgcca tctccctctc cgtcatcggc   1740
accttttcct tcggcttcct ggtatgcttt tctcttcttc taactgatat ctttcatgta   1800
actctgctat gtatcaatca agagcatctt cttgtgacaa atcgacaaga aacagagtct   1860
aatttaggtt tgaaaactgc agcttggcat gggaagtgca cttgaaacac tctgtggaca   1920
agcatttgga gctggtcaag tccatatgtt aggcgtttac atgcagagat cttggattat   1980
cttattcgtc tcctgcatct ttctccttcc tatttacata ttcgccacgc cgattctgag   2040
actcctcggc caagcagagg agatcgccgt tccagctgga gaattcactc ttttaaccat   2100
ccctcagcta ttctcactcg ccatcaactt cccaacctcc aagttccttc aagcgcagag   2160
caaagtcatc gcgattgctt ggatcgggtt catcgctttc gtcctacacg tcggtatgct   2220
ctggctgttt ataatcgtgt ttggttgggg aacaaacggt gctgccttgg cgtttaatct   2280
caccaactgg ggaacagcga tctctcaagt cgtttatgtg attggttggt gtaatgaagg   2340
ctggtctggt ttgtcttggt tggcatttaa agagatttgg gctttcgtta gactctccat   2400
agcatctgct gttatgcttt gtcttgagat ctggtacatg atgagtatca tcgtccttac   2460
tggtcgcctt gacaacgctg ttatcgctgt tgattccctt tccatatggt gagttttgat   2520
caacatttta caatgcttct tgtatcatca acatctttcc cactcttttt ttttgcattt   2580
catttcagca tgaatctcaa tggtctggag gccatgttgt tcatcggaat aaacgctgct   2640
ataaggtagt actatcatta tctgacacaa cttttgttta acccattgtt cagcttgtaa   2700
actgatcatg tgtctaccta cttgtgtact atatattagt gtccgtgtct ccaatgagct   2760
tggcttaggc cgtccacgag cagcgaaata ctctgtctat gtcacggtgt tcgagtctct   2820
cctcatcggt cttgtcttta tggtggctat catcataggc agagaccatt ttgcgatcat   2880
cttcacgagc agcaaagtac ttcaacgcgc agtgtctaag ctagcttatc ttcttggtat   2940
aaccatggtt ctcaacagcg tgcagccagt catttccggt aacaaaaatc taaaattctc   3000
atgttccatc aaaacaaaaa ccagaggtct cataagacca taaccgtccc ggtttgttca   3060
tcttgtttta ggtgtggctg ttggaggagg ttggcaaagt ttggtggctt atataaactt   3120
gggttgttac tacattttcg gccttccctt tggatatctt cttggttaca aagcaaactt   3180
aggagtgatg gtaagcgaat acaaagaatg acatgaataa tgtagatctt tcggacatgc   3240
atgtttcata aactgatacg tgagagatta taacgttttc agggactttg gtcgggaatg   3300
atagccggga cagcgcttca aacgttgcta ctgatgtttg tcttgtacaa gacaaactgg   3360
```

```
aataaagagg taaagaacac ctgagacaca aaaccgtagt atatacactg gttcattgag   3420

atcgattgac ttatggaaat ataaaattgt aaaaactgtg atgaacaggt tgaagagacg   3480

atggaacgta tgaagaaatg gggagggagc gagacgacat cgaatgatgt aactgcgtga   3540

ctatttcttt tgttaatatt aattaattaa ttattgttta gctttatata tatgaacatg   3600

taggtctcag ctttttgtt tgttttccat tggtttggca gcaccagtaa ctctctattt   3660

actatttacg ctgtaggaaa cttttcattc agtgatgtaa cgatgcatgc ttttgtcact   3720

ttgtttctct tggagtaaac taaatgttag gtacattttc tcgtgtaaca caaattttat   3780

tagacggctt ttagtcttca atgcaaattc aagtgacttg tacatagatt cctgtcttct   3840

acttccattt ccttcagaag tcaattgtat gtttccattt tattcttcta ccggtggaaa   3900

ataatatagt atcagtacgt aatttttagc gtgcttgtaa cacaggatgg ccgagcggtc   3960

taagccacga gactcaagtt cttgtcctcc tataggagga tatggattca aatccctctt   4020

gtgacataat aatttcttta aaaaaaaaat cattttgcta tactttgcat atttttcttt   4080

ttctttttaa gaatgcatgc atgtcttact ttctcgtttc tgcttgatag gtcgtagtgt   4140

cctaataagc tcttctgaga aatctcttat ttttcttctt gaacgttgga ttcagcattt   4200

cttcattgtg atttttgact tgcgaagata cgcacactta tacattgatt agggtcatcc   4260

tcgtctcaag tgttattgca atgtctaggt ttggacatag cacactagtc tttgctattt   4320

catcacccaa aatccattaa atcatggtga tgatttgatt taaagctaat ggttttgcta   4380

atttgatttt ttttatgtgt attttttgtt ctgtaatagg tggcgtgagt ggaacaacag   4440

aagggtggaa cacaaacact tattaggtct ccctgttttc aacatgatgc atttgatttt   4500

gttggttata tctcctcaaa tgcttgttgc attgcctaaa                         4540
```

<210> SEQ ID NO 15
<211> LENGTH: 2322
<212> TYPE: DNA
<213> ORGANISM: Thlaspi arvense

<400> SEQUENCE: 15

```
atgtcaatgg ccgtcgaaat gtcatcgaaa caacccacca aagatttctt ctcctctcca     60

gccctctccc tctctctcgc tggtatattc cggaatgcat cctccggcag caggaaccct    120

gaggaggact tttggggag aagggtagtt gacgatgagg atcggacggt ggagatgagc    180

agcgagaact cgggacccac gagatccaga tcagaggaag acttggagga tcaagaggag    240

gaggaggagg atgaggagga agacggagca ggaaacaagg gcaacaagag gaagaggaag    300

aagtatcacc gccacaccac cgatcagatt agacacatgg aagcgctgtt caaagagacg    360

ccccatccag acgagaagca aagacagcag ctgagcaagc aattagggct ggctcctcgc    420

caggtcaaat tctggttcca aaaccgccgc acccagatca aggctattca agaacggcac    480

gagaactcgc tgctgaaagc ggaactagag aagctgaggg aggaaaacaa aggcatgaga    540

gagtcttttg ccaaggctaa ttcttgctgc ccaaactgcg gaggaggcac cgatgatgtc    600

cacatcgaga actccaaact gaaggcggag ctggataagc ttcgtgcggc tctcggacgc    660

actccctacc cactccaggc ctcatgctcc gatgatcaac cacaccgtct cgacttctac    720

acgggcgtct ttgccctcga caagtcccgc atcgtggaga ttgccagccg agccaccctt    780

gagctccaga agatggcctc ctccggccaa cctctttggc tccgcagcct tgagactggc    840

cgtgacattc tcaactacga cgagtatctc aaggacttcc ctcaagctca ggcctctccc    900
```

```
ctccatgcaa ggagatccat cgaagcatcc agggatgtgg ggatcgtgtt tatggacgca    960

cacaaacttg ctcagagttt tatggacgtg gggcaatgga aagagatgtt tgcgtgcttg   1020

atctcaaagg cggcgacggt tgatgtaatc cggcagggtg aagggccttc aaggatcgac   1080

ggtgcgattc agttgatgtt tggggagatg caactgctca ctccggttgt ccccacaaga   1140

gaagtgtact tcgtgagaag ctgccggcag cttagccctg agaaatgggc catcgtggac   1200

gtatcagtct ctctggagga agacgacaac aacaacaaca cggaggacaa ggaggcttcg   1260

ctgcttaaat gccggaaacg cccctcaggt tgcatcatcg aggacacctc caacggccac   1320

tccaaggtca cctgggtgga gcacctcgac ttgtctgcct ccaccgttca gcctctcttc   1380

cgctcctttg tcaacaccgg tttggccttt ggggctcgac actgggtcgc caccctccag   1440

ctccactgcg aacgcctcgt cttcttcatg gctaccaacg tccctaccaa ggactctctc   1500

ggtccgtcca ttatttacac tctctctctc cctctctctc tttctccctc tcaccttttc   1560

ttaaccccaa tcctcctctc aggagttaca acgcttgccg ggagaaagag cgtgctcaag   1620

atggcccaga ggatgacaca aagcttctac cgcgccattg ctgcttccag ctaccaccaa   1680

tggaccaaaa tcaccaccaa aactggacaa gacatgaggg tttcttccag gaagaacctc   1740

catgatcctg gtgagcccac cggagtcatc gtctgcgctt cttcctccct ctggttacct   1800

gtttctccca ctctcctctt cgatttcttt agagatgaag ctcgtcgcca tgagtgggat   1860

gctttgtcaa acggagctca tgttcagtct atcgcaagct tatccaaggg acaagacaga   1920

ggcaactcag tgtctatcca gacagtgaaa tcgagagaaa agagcatatg ggtgctgcag   1980

gacagcagca caaactcata tgagtcggtg gtcgtatacg ctcccgtaga tataaacacg   2040

acacagctgg tgattgcagg acatgatcca agcaacatcc aaatcctgcc ttgtggattc   2100

tcaatcatac ccgatggagt agaatcaaga ccactggtaa tcacgtctgc acaagaggac   2160

agaaacagcc aaggagggtc tctgctcaca ctggccctcc aaacgctcat caacacttct   2220

cctgcagcaa agctgaatat ggagtccgtg gaatccgtca caaacctcgt ctctctcacc   2280

ctccacaaca ttaagagaag cctccaaatc gaagattgtt ga                      2322
```

<210> SEQ ID NO 16
<211> LENGTH: 773
<212> TYPE: PRT
<213> ORGANISM: Thlaspi arvense

<400> SEQUENCE: 16

```
Met Ser Met Ala Val Glu Met Ser Ser Lys Gln Pro Thr Lys Asp Phe
1               5                   10                  15

Phe Ser Ser Pro Ala Leu Ser Leu Ser Leu Ala Gly Ile Phe Arg Asn
            20                  25                  30

Ala Ser Ser Gly Ser Arg Asn Pro Glu Glu Asp Phe Leu Gly Arg Arg
        35                  40                  45

Val Val Asp Asp Glu Asp Arg Thr Val Glu Met Ser Ser Glu Asn Ser
    50                  55                  60

Gly Pro Thr Arg Ser Arg Ser Glu Glu Asp Leu Glu Asp Gln Glu Glu
65                  70                  75                  80

Glu Glu Glu Asp Glu Glu Glu Asp Gly Ala Gly Asn Lys Gly Asn Lys
                85                  90                  95

Arg Lys Arg Lys Lys Tyr His Arg His Thr Thr Asp Gln Ile Arg His
            100                 105                 110

Met Glu Ala Leu Phe Lys Glu Thr Pro His Pro Asp Glu Lys Gln Arg
        115                 120                 125
```

```
Gln Gln Leu Ser Lys Gln Leu Gly Leu Ala Pro Arg Gln Val Lys Phe
    130                 135                 140

Trp Phe Gln Asn Arg Arg Thr Gln Ile Lys Ala Ile Gln Glu Arg His
145                 150                 155                 160

Glu Asn Ser Leu Leu Lys Ala Glu Leu Glu Lys Leu Arg Glu Glu Asn
                165                 170                 175

Lys Gly Met Arg Glu Ser Phe Ala Lys Ala Asn Ser Cys Cys Pro Asn
            180                 185                 190

Cys Gly Gly Gly Thr Asp Asp Val His Ile Glu Asn Ser Lys Leu Lys
        195                 200                 205

Ala Glu Leu Asp Lys Leu Arg Ala Ala Leu Gly Arg Thr Pro Tyr Pro
    210                 215                 220

Leu Gln Ala Ser Cys Ser Asp Asp Gln Pro His Arg Leu Asp Phe Tyr
225                 230                 235                 240

Thr Gly Val Phe Ala Leu Asp Lys Ser Arg Ile Val Glu Ile Ala Ser
                245                 250                 255

Arg Ala Thr Leu Glu Leu Gln Lys Met Ala Ser Ser Gly Gln Pro Leu
            260                 265                 270

Trp Leu Arg Ser Leu Glu Thr Gly Arg Asp Ile Leu Asn Tyr Asp Glu
        275                 280                 285

Tyr Leu Lys Asp Phe Pro Gln Ala Gln Ala Ser Pro Leu His Ala Arg
    290                 295                 300

Arg Ser Ile Glu Ala Ser Arg Asp Val Gly Ile Val Phe Met Asp Ala
305                 310                 315                 320

His Lys Leu Ala Gln Ser Phe Met Asp Val Gly Gln Trp Lys Glu Met
                325                 330                 335

Phe Ala Cys Leu Ile Ser Lys Ala Ala Thr Val Asp Val Ile Arg Gln
            340                 345                 350

Gly Glu Gly Pro Ser Arg Ile Asp Gly Ala Ile Gln Leu Met Phe Gly
        355                 360                 365

Glu Met Gln Leu Leu Thr Pro Val Val Pro Thr Arg Glu Val Tyr Phe
    370                 375                 380

Val Arg Ser Cys Arg Gln Leu Ser Pro Glu Lys Trp Ala Ile Val Asp
385                 390                 395                 400

Val Ser Val Ser Leu Glu Glu Asp Asp Asn Asn Asn Asn Thr Glu Asp
                405                 410                 415

Lys Glu Ala Ser Leu Leu Lys Cys Arg Lys Arg Pro Ser Gly Cys Ile
            420                 425                 430

Ile Glu Asp Thr Ser Asn Gly His Ser Lys Val Thr Trp Val Glu His
        435                 440                 445

Leu Asp Leu Ser Ala Ser Thr Val Gln Pro Leu Phe Arg Ser Phe Val
    450                 455                 460

Asn Thr Gly Leu Ala Phe Gly Ala Arg His Trp Val Ala Thr Leu Gln
465                 470                 475                 480

Leu His Cys Glu Arg Leu Val Phe Phe Met Ala Thr Asn Val Pro Thr
                485                 490                 495

Lys Asp Ser Leu Gly Pro Ser Ile Ile Tyr Thr Leu Ser Leu Pro Leu
            500                 505                 510

Ser Leu Ser Pro Ser His Leu Phe Leu Thr Pro Ile Leu Leu Ser Gly
        515                 520                 525

Val Thr Thr Leu Ala Gly Arg Lys Ser Val Leu Lys Met Ala Gln Arg
    530                 535                 540
```

-continued

Met Thr Gln Ser Phe Tyr Arg Ala Ile Ala Ala Ser Ser Tyr His Gln
545 550 555 560

Trp Thr Lys Ile Thr Thr Lys Thr Gly Gln Asp Met Arg Val Ser Ser
565 570 575

Arg Lys Asn Leu His Asp Pro Gly Glu Pro Thr Gly Val Ile Val Cys
580 585 590

Ala Ser Ser Ser Leu Trp Leu Pro Val Ser Pro Thr Leu Leu Phe Asp
595 600 605

Phe Phe Arg Asp Glu Ala Arg Arg His Glu Trp Asp Ala Leu Ser Asn
610 615 620

Gly Ala His Val Gln Ser Ile Ala Ser Leu Ser Lys Gly Gln Asp Arg
625 630 635 640

Gly Asn Ser Val Ser Ile Gln Thr Val Lys Ser Arg Glu Lys Ser Ile
645 650 655

Trp Val Leu Gln Asp Ser Ser Thr Asn Ser Tyr Glu Ser Val Val Val
660 665 670

Tyr Ala Pro Val Asp Ile Asn Thr Thr Gln Leu Val Ile Ala Gly His
675 680 685

Asp Pro Ser Asn Ile Gln Ile Leu Pro Cys Gly Phe Ser Ile Ile Pro
690 695 700

Asp Gly Val Glu Ser Arg Pro Leu Val Ile Thr Ser Ala Gln Glu Asp
705 710 715 720

Arg Asn Ser Gln Gly Gly Ser Leu Leu Thr Leu Ala Leu Gln Thr Leu
725 730 735

Ile Asn Thr Ser Pro Ala Ala Lys Leu Asn Met Glu Ser Val Glu Ser
740 745 750

Val Thr Asn Leu Val Ser Leu Thr Leu His Asn Ile Lys Arg Ser Leu
755 760 765

Gln Ile Glu Asp Cys
770

<210> SEQ ID NO 17
<211> LENGTH: 5982
<212> TYPE: DNA
<213> ORGANISM: Thlaspi arvense

<400> SEQUENCE: 17
aacccataaa gagcattcat ttccttttaa ggtcgctgaa attaatgagt aacgatcagt 60
caatgcgtct cgttgacctt ccaaaacatc cgacgtctct ttccgttgca tatccctcgg 120
ctctgtccct gcagctccca cgtcatccat atttcccctc tatccaattt ttaactttct 180
aacttattca acaactcttc ctccatgcat ttacctcatt atctaatcgt attgtttact 240
agtagtaata tagcatacta gagtagtaga ttcggattcc cggaataata tatattagca 300
taagttattg gagcacaagg catttcaggt ttccatgtag ctccaataat atcctcttca 360
ctctctctta ccaatgcttt tccactttcc tatgtcacgc aattactagc ttgcttgctt 420
tacaaccaag ttttattaac caacataaaa tatagagatt taatgttgca ttttgtaatc 480
ataagttact aattgcttga agaaagagat cacaataaca gacaatacgt acacattaca 540
tcataaccag gtaagtatat agtatataat aaataaataa atagaagtca taataagaga 600
aatgatgatg ataatcaagg aggaaagaag aaagcagaaa atgcggttgg agaattaggt 660
gcttaaagtt agttgagtcc atcccagtat ctaacggtca actctctcct ctttcgtcct 720
tatttgtatt ttattttgtt tttgaaacaa taaactgaca tacaatatgt ctttctctca 780

-continued

```
ctactctctc tctctctctc tctatacaca aattcaatta aagaagagac agagaagttc    840
gccttttgtc tgtataccct taaatcatgc aaccccctta ttctcattcc ttctctctgc    900
ctacagtaaa ctctaggaac gacattatgt ggtttaaacc gattcaattc atgattagtg    960
gcaaaattct atatgatttt caaccacatg atatatgatt ttcaacagta atattgtgcg   1020
gaaaaataat gcacagcatt ttattctata tacaaaaggt aaattggaaa ggagaatttt   1080
ccagatgcaa tagcgaattt gctcgaatat ttttataaaa aaaaacgaag tcgatatcga   1140
cgcctgcaaa taatgtagct ggccatgttt gcaaagtaat caagtgtgaa taaaattgta   1200
aaactaatgg agtatatata gatattaaaa agaagaaggg gttggttaaa tataattaaa   1260
tgaagcacct aaaagtcaag caatagagaa atatctgaaa aacgaccgtt tgtatgtata   1320
attagaattg aagggctagc ttagctatat agccatatac agtatatgtg aaagagtaca   1380
ttttggtaca cacacacaca aaaaaaaaga aataaggaaa atatatagag atatataaat   1440
agcacaagga agaaggagga gagggaagat aaagcaaata aaaaaattgg gagcgttcgt   1500
atgtcaatgg ccgtcgaaat gtcatcgaaa caacccacca aagatttctt ctcctctcca   1560
gccctctccc tctctctcgt acgcgtactc tctgttctac tactctcgta aactcatcta   1620
aataaaaatt tactgtattg tatatatgta tctatttgtg aatggtactg atataaatac   1680
aggctggtat attccggaat gcatcctccg gcagcaggaa ccctgaggag gactttttgg   1740
ggagaagggt agttgacgat gaggatcgga cggtggagat gagcagcgag aactcgggac   1800
ccacgagatc cagatcagag gaagacttgg aggatcaaga ggaggaggag gaggatgagg   1860
aggaagacgg agcaggaaac aagggcaaca agaggaagag gaagaagtat caccgccaca   1920
ccaccgatca gattagacac atggaagcgt acgttcttcc ttccttaatt attattcttt   1980
atatttcatc tgtagctcta atggattacc atttaatcaa attagggttt caaaacatgg   2040
aacatttcga ttaattggtc ttgatgatat atgaatttga tgacctcaac tcctccatat   2100
atacttcaat tatgactagt catcatcatc atgccctaca catagggatt agagtatata   2160
gtagtcagtc tgtgctgaac agtaggcctc ttcatttcta ctgccatata aaaaggaaga   2220
atgcatattt catgtattta ttagtagtga tgaacaaatt aatatatatt gcagatcgat   2280
gatccagcaa tagttaatta tttgaatgcg tttaattaca tatcttgctc tttaattttc   2340
tctcgtactc cctagtatat acatgtgttt atactataac ataggacggg acaagtgttt   2400
ccattcaatc accctatgat taaactaaaa ccaagttctt tcaaaacaaa aaactaaaac   2460
caagagcact aatgtgtata gctagttagg gctcatataa ttaagagttt aattcatact   2520
atgttttcga ataggaggat aaaaaaaaga tatgaaagaa ttaattaaat atgaagaatg   2580
atcatggagc tatgaatgag aaaactgagg gttgcattgc aggctgttca aagagacgcc   2640
ccatccagac gagaagcaaa gacagcagct gagcaagcaa ttagggctgg ctcctcgcca   2700
ggtcaaattc tggttccaaa accgccgcac ccagatcaag gtatgtatat cgacgtacgt   2760
gatgatgatg atatatatgg atttcttaag acaaaaagac tattcgcttg gagctacata   2820
tgtatatagt tatagtgaaa tactgaaatg taactgaaca ggctattcaa gaacggcacg   2880
agaactcgct gctgaaagcg gaactagaga agctgaggga ggaaaacaaa ggcatgagag   2940
agtcttttgc caaggctaat tcttgctgcc caaactgcgg aggaggcacc gatgatgtcc   3000
acatcgagaa ctccaaactg aaggcggagc tggataagct tcgtgcggct ctcggacgca   3060
ctccctaccc actccaggcc tcatgctccg atgatcaacc acaccgtctc gacttctaca   3120
cgggcgtctt tgccctcgac aagtcccgca tcgtggagat tgccagccga gccaccccttg   3180
```

agctccagaa gatggcctcc tccggccaac ctctttggct ccgcagcctt gagactggcc 3240
gtgacattct caactacgac gagtatctca aggacttccc tcaagctcag gcctctcccc 3300
tccatgcaag gagatccatc gaagcatcca gggatgtggg gatcgtgttt atggacgcac 3360
acaaacttgc tcagagtttt atggacgtgg tactcttttt ctttcatttc ctccaaatat 3420
ttacgaatat acttttgtgt atcacatgta ggcaatataa agatatatat acaacgtgca 3480
ggggcaatgg aaagagatgt ttgcgtgctt gatctcaaag gcggcgacgg ttgatgtaat 3540
ccggcagggt gaagggcctt caaggatcga cggtgcgatt cagttggtta gtgaatcacc 3600
ttttgataga tagtgatgac acgcgagaga tgagagctaa tataatacat tgatggacat 3660
attggcagat gtttggggag atgcaactgc tcactccggt tgtccccaca agagaagtgt 3720
acttcgtgag aagctgccgg cagcttagcc ctgagaaatg ggccatcgtg gacgtatcag 3780
tctctctgga ggaagacgac aacaacaaca acacggagga caaggaggct tcgctgctta 3840
aatgccggaa acgcccctca ggttgcatca tcgaggacac ctccaacggc cactccaagg 3900
tcacctgggt ggagcacctc gacttgtctg cctccaccgt tcagcctctc ttccgctcct 3960
ttgtcaacac cggtttggcc tttggggctc gacactgggt cgccaccctc cagctccact 4020
gcgaacgcct cgtcttcttc atggctacca acgtccctac caaggactct ctcggtccgt 4080
ccattattta cactctctct ctccctctct ctctttctcc ctctcacctt ttcttaaccc 4140
caatcctcct ctcaggagtt acaacgcttg ccgggagaaa gagcgtgctc aagatggccc 4200
agaggatgac acaaagcttc taccgcgcca ttgctgcttc cagctaccac caatggacca 4260
aaatcaccac caaaactgga caagacatga gggtttcttc caggaagaac ctccatgatc 4320
ctggtgagcc caccggagtc atcgtctgcg cttcttcctc cctctggtta cctgtttctc 4380
ccactctcct cttcgatttc tttagagatg aagctcgtcg ccatgaggta ccttgtggca 4440
tacacttcct tcgcacacac agaaccaata aaaccgtttt aaatctaact atacatacgt 4500
attattatca tcagtgggat gctttgtcaa acggagctca tgttcagtct atcgcaagct 4560
tatccaaggg acaagacaga ggcaactcag tgtctatcca gacagtgaaa tcgagagaaa 4620
agagcatatg ggtgctgcag gacagcagca caaactcata tgagtcggtg gtcgtatacg 4680
ctcccgtaga tataaacacg acacagctgg tgattgcagg acatgatcca agcaacatcc 4740
aaatcctgcc ttgtggattc tcaatcatac ccgatggagt agaatcaaga ccactggtaa 4800
tcacgtctgc acaagaggac agaaacagcc aaggagggtc tctgctcaca ctggccctcc 4860
aaacgctcat caacacttct cctgcagcaa agctgaatat ggagtccgtg gaatccgtca 4920
caaacctcgt ctctctcacc ctccacaaca ttaagagaag cctccaaatc gaagattgtt 4980
gatgacaact cacagcaggt gtgatgattg ttgttacata tataagtata tcataatgta 5040
tagcagtgca ttaagttttg tacaaaaaca accctctctc tctctcccgc aatcatactg 5100
ttatccaaca ctttttgcag cattaagaga gcatcatact cgactaagaa cccaatacac 5160
aaaactttac cgaaacaaaa gtgggatcag atgaaccaaa tgcataaccc tgatttagat 5220
acacagtaat tggatcagaa acgaaggcct gatcaaattc cacaacttaa acaatacgca 5280
attcgagcag gaaaacaaaa tgcattccat aaacagagag aattacactt gattgcaata 5340
cacaacaaac agaaacgaaa aacagtaaaa aagacagctt ttttttttta ccaaaacaaa 5400
caaacactca gtgagtcgca ttctcctcta cgccggctgc tgagattcca agggaatgcc 5460
gaggtcgttc ccagcttctc ctccgccttc cgctttcctg ctgctccttg agacgacagc 5520

```
aagcgccacg aatgacttag tcttactgat gggtctgctc ttctccagcc tcaccacatc   5580

gcccaccttg aactgattat ccgggtcatg cgcctggtac ttcttcttct tcctcacgcg   5640

cctcttgtac ttgggatgcg gagccagcct caccacctcc accgccacgg tcttgtcgtt   5700

ggttgcgcac accacgcgcc cctgcatcgt tttcatggct ctgatgaccg gaaccaatgc   5760

cggccttcga gggttcggga ataaattggg cttagagaga gatgagagtg gagtcgagcc   5820

atgggcgaat ggagacgaaa gcttcagagc ttgcagagat gaggttatta gcgacgtcat   5880

cgttatcccc ctcctctatg ggatcgattt ggaagacgat gaagaagata aggcgataga   5940

tcatgttatt ataatattgg cttttgctaa atgggttaac aa                       5982
```

<210> SEQ ID NO 18
<211> LENGTH: 2007
<212> TYPE: DNA
<213> ORGANISM: Thlaspi arvense

<400> SEQUENCE: 18

```
atggctacta cgtataagcc taagaacatt ctcatcactg gagctgctgg attcattgcc     60

tctcatgttg ccaacagatt aatccgtagc tatccagatt acaagatcgt tgtgttggac    120

aagcttgatt actgttcaga tctgaagaat ctcgatcctt cgttttcttc tccaaatttc    180

aagtttgtga aaggagatat cgcgagtgat gacctcgtta actacctcct catcactgaa    240

aacatcgaca ccatcatgca ctttgctgct caaacccatg ttgataactc ctttggtaat    300

agctttgagt tcaccaagaa caacatttat ggtactcatg tcctcttgga agcctgtaaa    360

gtaacaggac agatcaggag gtttattcat gtgagcaccg atgaagtcta tggagaaacc    420

gatgaggatg ctgctgtagg aaaccatgag gcgtctcagc ttttacccac aaacccatac    480

tcagccacta aggctggtgc tgagatgctt gtgatggctt acggtagatc atacggactg    540

ccggttatta caactcgtgg gaacaatgtt tacggtccta accagtttcc cgaaaaaactg    600

attcctaagt tcatcttgtt ggctatgagt gggaagccgc ttccgatcca cggagatgga    660

tctaacgtaa ggagttactt atactgtgaa gacgttgctg aagcgtttga ggttgttctt    720

cacaaaggag aagtcggtca cgtctacaac atcgggacaa agagagaaag aagagtgatc    780

gatgtggcga cagacatctg caaacttttc gggaaagatc ctgagtcgag catcgagttc    840

gtggagaatc gaccgtttaa cgatcaaagg tacttccttg atgatcagaa gctgaagaat    900

ctgggttggt cagagcgaac cgcgtgggaa gatggactga agaagacaat ggaatggtac    960

attcagaatc ctgagtggtg gggtgatgtt tctggagctt tgcttcctca tccgagaatg   1020

cttatgatgc ccggaggaag agttcctgac ggctccgatg agaagaatga ctcgtcaagc   1080

aacgcggtcc agacattcac ggttgtaaca ccgaacaaca agactggtgg ttctagtgac   1140

aaagctttct tgaagttttt gatctacggt aagactggtt ggatcggtgg tctcttaggg   1200

aaactatgtg agaagcaagg gattacttat gagtatggga aaggacgttt agaagataga   1260

gcctctctcg tcgcggatat tcgcagtatc aaaccgaccc atgtgtttaa cgctgctggt   1320

ttaactggca gaccaaacgt tgactggtgt gaatctcaca aaccagagac cattcgtgtc   1380

aatgtcgctg gtactttgac tctcgctgat gtttgcagag agaatgatct cttgatgatg   1440

aacttcgcca ccggttgcat attcgagtac gatgctgcac atccagagcg ttcgggtatt   1500

ggtttcaagg aagaagacaa gccgaatttc actggctctt tctactcaaa aaccaaagcc   1560

atggtcgagg agcttctgag agaatttgac aatgtgtgta ccttgagagt gcggatgccg   1620

atctcatcag acctaaacaa cccgagaaac ttcatcacga agatctcgcg gtacaacaaa   1680
```

```
gtggtgaaca tcccgaacag catgaccata ctggacgagc ttctgccgat ctccatcgag   1740

atggcgaaga gaaacctaag agggatatgg aacttcacca acccaggggt ggtgagccac   1800

aacgagatac tggagatgta caagagttac atcgagccag ggtttaaatg gtccaacttc   1860

acagtggaag aacaagcaaa ggtcattgtt gctcctcgaa gcaacaatga aatggatggg   1920

actaaactaa gcaaggagtt cccagagatg ctaccaatta aagaggcgct gatcaaatac   1980

gtcttcgaac ctaacaagag aacctga                                       2007


<210> SEQ ID NO 19
<211> LENGTH: 668
<212> TYPE: PRT
<213> ORGANISM: Thlaspi arvense

<400> SEQUENCE: 19

Met Ala Thr Thr Tyr Lys Pro Lys Asn Ile Leu Ile Thr Gly Ala Ala
1               5                   10                  15

Gly Phe Ile Ala Ser His Val Ala Asn Arg Leu Ile Arg Ser Tyr Pro
            20                  25                  30

Asp Tyr Lys Ile Val Val Leu Asp Lys Leu Asp Tyr Cys Ser Asp Leu
        35                  40                  45

Lys Asn Leu Asp Pro Ser Phe Ser Ser Pro Asn Phe Lys Phe Val Lys
    50                  55                  60

Gly Asp Ile Ala Ser Asp Asp Leu Val Asn Tyr Leu Leu Ile Thr Glu
65                  70                  75                  80

Asn Ile Asp Thr Ile Met His Phe Ala Ala Gln Thr His Val Asp Asn
                85                  90                  95

Ser Phe Gly Asn Ser Phe Glu Phe Thr Lys Asn Asn Ile Tyr Gly Thr
            100                 105                 110

His Val Leu Leu Glu Ala Cys Lys Val Thr Gly Gln Ile Arg Arg Phe
        115                 120                 125

Ile His Val Ser Thr Asp Glu Val Tyr Gly Glu Thr Asp Glu Asp Ala
    130                 135                 140

Ala Val Gly Asn His Glu Ala Ser Gln Leu Leu Pro Thr Asn Pro Tyr
145                 150                 155                 160

Ser Ala Thr Lys Ala Gly Ala Glu Met Leu Val Met Ala Tyr Gly Arg
                165                 170                 175

Ser Tyr Gly Leu Pro Val Ile Thr Thr Arg Gly Asn Asn Val Tyr Gly
            180                 185                 190

Pro Asn Gln Phe Pro Glu Lys Leu Ile Pro Lys Phe Ile Leu Leu Ala
        195                 200                 205

Met Ser Gly Lys Pro Leu Pro Ile His Gly Asp Gly Ser Asn Val Arg
    210                 215                 220

Ser Tyr Leu Tyr Cys Glu Asp Val Ala Glu Ala Phe Glu Val Val Leu
225                 230                 235                 240

His Lys Gly Glu Val Gly His Val Tyr Asn Ile Gly Thr Lys Arg Glu
                245                 250                 255

Arg Arg Val Ile Asp Val Ala Thr Asp Ile Cys Lys Leu Phe Gly Lys
            260                 265                 270

Asp Pro Glu Ser Ser Ile Glu Phe Val Glu Asn Arg Pro Phe Asn Asp
        275                 280                 285

Gln Arg Tyr Phe Leu Asp Asp Gln Lys Leu Lys Asn Leu Gly Trp Ser
    290                 295                 300

Glu Arg Thr Ala Trp Glu Asp Gly Leu Lys Lys Thr Met Glu Trp Tyr
```

305 310 315 320

Ile Gln Asn Pro Glu Trp Trp Gly Asp Val Ser Gly Ala Leu Leu Pro
325 330 335

His Pro Arg Met Leu Met Met Pro Gly Gly Arg Val Pro Asp Gly Ser
340 345 350

Asp Glu Lys Asn Asp Ser Ser Ser Asn Ala Val Gln Thr Phe Thr Val
355 360 365

Val Thr Pro Asn Asn Lys Thr Gly Gly Ser Ser Asp Lys Ala Phe Leu
370 375 380

Lys Phe Leu Ile Tyr Gly Lys Thr Gly Trp Ile Gly Gly Leu Leu Gly
385 390 395 400

Lys Leu Cys Glu Lys Gln Gly Ile Thr Tyr Glu Tyr Gly Lys Gly Arg
405 410 415

Leu Glu Asp Arg Ala Ser Leu Val Ala Asp Ile Arg Ser Ile Lys Pro
420 425 430

Thr His Val Phe Asn Ala Ala Gly Leu Thr Gly Arg Pro Asn Val Asp
435 440 445

Trp Cys Glu Ser His Lys Pro Glu Thr Ile Arg Val Asn Val Ala Gly
450 455 460

Thr Leu Thr Leu Ala Asp Val Cys Arg Glu Asn Asp Leu Leu Met Met
465 470 475 480

Asn Phe Ala Thr Gly Cys Ile Phe Glu Tyr Asp Ala Ala His Pro Glu
485 490 495

Arg Ser Gly Ile Gly Phe Lys Glu Glu Asp Lys Pro Asn Phe Thr Gly
500 505 510

Ser Phe Tyr Ser Lys Thr Lys Ala Met Val Glu Glu Leu Leu Arg Glu
515 520 525

Phe Asp Asn Val Cys Thr Leu Arg Val Arg Met Pro Ile Ser Ser Asp
530 535 540

Leu Asn Asn Pro Arg Asn Phe Ile Thr Lys Ile Ser Arg Tyr Asn Lys
545 550 555 560

Val Val Asn Ile Pro Asn Ser Met Thr Ile Leu Asp Glu Leu Leu Pro
565 570 575

Ile Ser Ile Glu Met Ala Lys Arg Asn Leu Arg Gly Ile Trp Asn Phe
580 585 590

Thr Asn Pro Gly Val Val Ser His Asn Glu Ile Leu Glu Met Tyr Lys
595 600 605

Ser Tyr Ile Glu Pro Gly Phe Lys Trp Ser Asn Phe Thr Val Glu Glu
610 615 620

Gln Ala Lys Val Ile Val Ala Pro Arg Ser Asn Asn Glu Met Asp Gly
625 630 635 640

Thr Lys Leu Ser Lys Glu Phe Pro Glu Met Leu Pro Ile Lys Glu Ala
645 650 655

Leu Ile Lys Tyr Val Phe Glu Pro Asn Lys Arg Thr
660 665

<210> SEQ ID NO 20
<211> LENGTH: 5240
<212> TYPE: DNA
<213> ORGANISM: Thlaspi arvense

<400> SEQUENCE: 20
acccttattt tcaatcacag ctccccaaga tagatcagtt aagcaacagc aacacacata 60
tggccattga tgctaagctg ttgcaggcgc aatcacagtt cggtccagcg ggagcagcag 120

```
cggttgcggt agcggcacac cggaacattg gcacaattag ttacggcgca gcatcgtaga    180
ctcatcaaac aaacagcatt ttcagacaca tctttaactt acatcaccct ccaaatccag    240
gcaacgcgaa accaggtgat tccggtctcg gtctctttat gtaagtatta ttcagccagg    300
ctctgattta aacaactttg cagtgatatt aataaaagac tttcagttgt aactcaccag    360
aacaagatcg cttagatcag tctgatcccg ggttatcacc ggtgattgtt tcggttatct    420
tgtttgctcc atagtctttg aatttgttat aagcgtagtt catcgaagag aagaaaaccg    480
tcgtgattat atacttctta aacttcaaga tcggtcccat tactccttaa ttgttcttca    540
acaatgatga atctctttgt ctatcagaaa attgattgat ctatttggct atatagagag    600
aatcattagg ccgaaaattg tggaagtcaa caaaagtcat tggtccgtag atctttctca    660
tccgtaaatc aatcttttgc acattataat tagccatttt attcaatggt taccagtaaa    720
aaagatatgt aaaagataat ttcgaattct tgacgccatt aaagtgtcta tataatttac    780
ccgccaattt aagataaccg gttttatggg cctgaactca gcacattaaa ggttaacatt    840
tactataata attcaatgaa cttaactcct tttcttcaat tacatgaaaa agtgcatttt    900
tgtctacttg atttttaat tgatgaaaaa ggaagtaaat taattattcc gttacgtgac    960
cttaagcatc agcattgaat catctgttat gtttaatttc aggtcttttc ttgttgaact   1020
gatgattgat atcaggttga catgtgatat ttctattcag tctagaatta tttgtttttc   1080
taactgaaca tatgtacgtt ttatcataaa caaatcaggg attttattaa atcccaagtt   1140
taaccttcca ataaaagaaa tcatattttt attcagttta aatcatttta agaaatatat   1200
atcagacaaa aatgcaaaat attttgttta cttcttccac aattaattaa tctccttaat   1260
tatacaaatt ttattctctt tttattttt ggaattttct tctattagta tagattttgt   1320
gtgaaaaaat aaacaaaaaa aagacatcaa atttttatgt cggacgctaa gctcacgtaa   1380
aatccgtaat atctaagaca agtaagggta aatttgtcaa ttgaccccta cggttctccg   1440
taactgtctc aggatatatg aggcgcactg ttcagagacg ctccgtagac cgtagattcc   1500
ctcttcttcc tcctctctct ctctctctct ctctctctct ctcttctcat agaagtgtct   1560
ctctctctct cttaggattc ttctctgatt ctaacctgaa ttgtgtcggt acgtgatatg   1620
ttgctctctt tttgttgctg ctgaaatttc cataatgctt taagttaatt ttgcgaaatg   1680
ctatacgtga gtaacggaca agtgtacaac atcagacaac tgatcttgtt tttgttcttt   1740
tttttagatt tctgtgttgt cggtttatga tcccatatga aaagttcatt atttttgttc   1800
gtataagatc tggctactga atttattcgg ttttggcgat tggatctgga tctgccttta   1860
ttctgatttc ctttcatatg atccgttctg aattttcgaa tgatactgtg acgttattgt   1920
tgttgttgtt gcagatactt gatttcaaat ggctactacg tataagccta agaacattct   1980
catcactgga gctgctggat tcattgcctc tcatgttgcc aacagattaa tccgtagcta   2040
tccagattac aagatcgttg tgttggacaa gcttgattac tgttcagatc tgaagaatct   2100
cgatccttcg ttttcttctc caaatttcaa gtttgtgaaa ggagatatcg cgagtgatga   2160
cctcgttaac tacctcctca tcactgaaaa catcgacacc atcatgcact ttgctgctca   2220
aacccatgtt gataactcct ttggtaatag ctttgagttc accaagaaca acatttatgg   2280
tactcatgtc ctcttggaag cctgtaaagt aacaggacag atcaggaggt ttattcatgt   2340
gagcaccgat gaagtctatg gagaaaccga tgaggatgct gctgtaggaa accatgaggc   2400
gtctcagctt ttacccacaa acccatactc agccactaag gctggtgctg agatgcttgt   2460
```

```
gatggcttac ggtagatcat acggactgcc ggttattaca actcgtggga acaatgttta   2520
cggtcctaac cagtttcccg aaaaactgat tcctaagttc atcttgttgg ctatgagtgg   2580
gaagccgctt ccgatccacg gagatggatc taacgtaagg agttacttat actgtgaaga   2640
cgttgctgaa gcgtttgagg ttgttcttca caaaggagaa gtcggtcacg tctacaacat   2700
cgggacaaag agagaaagaa gagtgatcga tgtggcgaca gacatctgca aacttttcgg   2760
gaaagatcct gagtcgagca tcgagttcgt ggagaatcga ccgtttaacg atcaaaggta   2820
cttccttgat gatcagaagc tgaagaatct gggttggtca gagcgaaccg cgtgggaaga   2880
tggactgaag aagacaatgg aatggtacat tcagaatcct gagtggtggg gtgatgtttc   2940
tggagctttg cttcctcatc cgagaatgct tatgatgccc ggaggaagag ttcctgacgg   3000
ctccgatgag aagaatgact cgtcaagcaa cgcggtccag acattcacgg ttgtaacacc   3060
gaacaacaag actggtggtt ctagtgacaa agctttcttg aagtttttga tctacggtaa   3120
gactggttgg atcggtggtc tcttagggaa actatgtgag aagcaaggga ttacttatga   3180
gtatgggaaa ggacgtttag aagatagagc ctctctcgtc gcggatattc gcagtatcaa   3240
accgacccat gtgtttaacg ctgctggttt aactggcaga ccaaacgttg actggtgtga   3300
atctcacaaa ccagagacca ttcgtgtcaa tgtcgctggt actttgactc tcgctgatgt   3360
ttgcagagag aatgatctct tgatgatgaa cttcgccacc ggttgcatat tcgagtacga   3420
tgctgcacat ccagagcgtt cgggtattgg tttcaaggaa gaagacaagc cgaatttcac   3480
tggctctttc tactcaaaaa ccaaagccat ggtaaaatac taatatctat aactcatgac   3540
agtctcgaaa caaagaagag tgtctttgtt tataatctgg ttctgctttt ttctcttctt   3600
ctttgttcac caggtcgagg agcttctgag agaatttgac aatgtgtgta ccttgagagt   3660
gcggatgccg atctcatcag acctaaacaa cccgagaaac ttcatcacga agatctcgcg   3720
gtacaacaaa gtggtgaaca tcccgaacag catgaccata ctggacgagc ttctgccgat   3780
ctccatcgag atggcgaaga gaaacctaag agggatatgg aacttcacca acccaggggt   3840
ggtgagccac aacgagatac tggagatgta caagagttac atcgagccag ggtttaaatg   3900
gtccaacttc acagtggaag aacaagcaaa ggtcattgtt gctcctcgaa gcaacaatga   3960
aatggatggg actaaactaa gcaaggagtt cccagagatg ctaccaatta aagaggcgct   4020
gatcaaatac gtcttcgaac ctaacaagag aacctgagac ctgaacagca ctcttcgcca   4080
caagtgctta cctataactg tttccttttc tttctttctc tttcaacaga aatgtctttt   4140
tatgtttact catcgtctta tgatccttgt aggtagtttc actatattga ttctactaaa   4200
atatgattta tcattattat ttatagagac taaagttttt tttttctttc tcaaattcta   4260
catttcccct cggattttac ttactaagag acagtagtac acttataaaa atgaagagcc   4320
acttactggt tgtgatcatt agggattcca ccaaggcagg ttcaaaacac ttgaacttga   4380
ttattaagct atagcctgag aagagaagca aacaacaagt gttgatttga aataaaccga   4440
agtatatgat gtgaatttgg tcaatattca gggttatagt tttcttacgt gaacagttga   4500
gggcgggaac gagagagctg agagcgttta ataggggaga gaataaggtt tcgtagagtt   4560
gactggggat tagcagcgcc accaccaccg ccaaatacag gatgtcctcc tcctcctgct   4620
cttctgtttc caaggtctgt tggaattgcg ggtgagtcgt tggagatgtc gaatggacct   4680
gagtttgaac tgttctgtct tgctggccaa atctcatctt taggtcctgg tgttgcagga   4740
gagtaaaacg accggtctgc gccaaataag tcaacttgat ttggagatat taaccaacaa   4800
tagacttgga atcaaaagaa gcactaggct caaggtagtt cattaacctt tgcgaggggg   4860
```

ctctctgttc tccatcatgt taactggtgg gtttgagaaa aagtcaggtt cgtggtgtcg 4920
tgggtagaaa ttgtttgctg gttggatggc tgtacgttta catgactcgt attcacttct 4980
tagctggtca tacatctcat cgagcttcct cttctgtctg gtgtttgaaa caataattac 5040
agctgagtta gagataagga acagaaccag gcaaacaaag cgtgtgttaa atcactgacc 5100
ttgatttctc ggagaacttc tcttggagct cttgtttatc cttggtcaag ttttctacct 5160
cttgctccat catctgacac ctcttgccca tcttctggta tgctgtatgc acctgctcca 5220
ttttctcgct aaactttgct 5240

<210> SEQ ID NO 21
<211> LENGTH: 1995
<212> TYPE: DNA
<213> ORGANISM: Thlaspi arvense

<400> SEQUENCE: 21
atggctacat ataagcccaa gaacatcctc atcactgggg ctgctggatt catagcgtcc 60
catgtcgcca acaggcttgt tcgaagctac cctgactaca aaatcgttgt gcttgacaag 120
cttgattact gctcaaacct gaaaaacctc aatccttcga aatcctctcc aaacttcaag 180
tttgtcaagg gagacatcgc cagtgctgac ctcgtcaact accttctcat cactgaaaac 240
atcgacacga ttatgcactt tgctgctcag acccatgtcg acaattcctt cggtaacagc 300
ttcgagttta ccaagaacaa tatttacggc acccatgtcc ttctggaagc ttgcaaagtc 360
actgggcaga tcaggaggtt catccatgtg agtaccgatg aggtctatgg agagactgat 420
gaggatgctt cagtgggaaa ccatgaggct tctcagttgc tccctacaaa cccttactct 480
gccactaaag ctggagctga gatgcttgtg atggcatacg gtagatcata cgggttgcca 540
gttataacga ctcgcgggaa caatgtctat ggtccgaatc agtttcctga aaagttgatc 600
cctaagttca ttctgttggc tatgagtggg aagccactgc cgatccacgg agatggatct 660
aacgtgagga gttacctcta ctgcgaagat gttgctgagg cgtttgaggt tgttctacac 720
aaaggggaag tcaaccatgt ctacaatata gggacaacga gagaaaggag agtgattgat 780
gttgccaacg acatctcaaa actctttgga atagaccctg actccaccat tcagtttgtt 840
gagaaccggc cttttaatga ccagaggtac ttcctcgatg accagaagct gaagaagttg 900
ggatggtctg aacgaaccac ttgggaagaa ggactgaaaa agacaatgga ttggtacact 960
gcgaaccctg agtggtgggg agatgtctcc ggagctctgc tgcctcatcc acggatgttg 1020
atgatgcctg gtgatagact ctctgatggc tctgacgagc gcaaggatgc agacggtaat 1080
cagacattca cggtggttac tcccaccaag gccggtggtt ccgcagacaa aacatcctta 1140
aagttcctca tctatggcaa aactgggtgg ctcggtggtc tcctaggaaa gatatgtgag 1200
aagcaaggga ttccgtacga gtatggaaaa gggagactag aagacagagc ttcaatcatg 1260
gcggatattc gcagcgtcaa acctacccat gtcttcaatg ccgcgggctt aacaggcagg 1320
cctaatgttg actggtgtga gtctcacaaa accgagacta tccgagtcaa cgtcgctggt 1380
actttgactc tggcagatgt ttgcagagag aatgatctgt tgatgatgaa ctttgccacc 1440
ggttgtatat ttgagtatga cgctgcacat ccagaaggtt cagggattgg cttcaaggaa 1500
gaagacaaac cgaatttcac cggttccttc tactcaaaga caaaggcaat ggtcgaagag 1560
cttctaagag agtttgacaa cgtatgcacc ttgagagtga ggatgccaat ctcatccgac 1620
ttgaacaacc cgcgaaactt catcacaaag atctcgcgtt acaacaaagt ggtgaacatc 1680
ccaaacagca tgaccatact cgacgagctc ttaccaatct caatcgagat ggcgaagagg 1740
aacctacggg ggatttggaa tttcaccaac ccaggagtgg tgagtcacaa cgagatacta 1800
gagatgtaca agagctacat cgagccaggt ttcaaatggt ccaacttcac tttagaggaa 1860
caggctaagg tcattgtcgc accacggagc aacaacgaga tggatggttt taagctcagc 1920
aaggagtttc cagagatgct ttccatcaaa gattcgttga tcaaatacgt cttcgaaccc 1980
aacaagagaa cgtaa 1995

<210> SEQ ID NO 22
<211> LENGTH: 664
<212> TYPE: PRT
<213> ORGANISM: Thlaspi arvense

<400> SEQUENCE: 22

Met Ala Thr Tyr Lys Pro Lys Asn Ile Leu Ile Thr Gly Ala Ala Gly
1 5 10 15

Phe Ile Ala Ser His Val Ala Asn Arg Leu Val Arg Ser Tyr Pro Asp
20 25 30

Tyr Lys Ile Val Val Leu Asp Lys Leu Asp Tyr Cys Ser Asn Leu Lys
35 40 45

Asn Leu Asn Pro Ser Lys Ser Ser Pro Asn Phe Lys Phe Val Lys Gly
50 55 60

Asp Ile Ala Ser Ala Asp Leu Val Asn Tyr Leu Leu Ile Thr Glu Asn
65 70 75 80

Ile Asp Thr Ile Met His Phe Ala Ala Gln Thr His Val Asp Asn Ser
85 90 95

Phe Gly Asn Ser Phe Glu Phe Thr Lys Asn Asn Ile Tyr Gly Thr His
100 105 110

Val Leu Leu Glu Ala Cys Lys Val Thr Gly Gln Ile Arg Arg Phe Ile
115 120 125

His Val Ser Thr Asp Glu Val Tyr Gly Glu Thr Asp Glu Asp Ala Ser
130 135 140

Val Gly Asn His Glu Ala Ser Gln Leu Leu Pro Thr Asn Pro Tyr Ser
145 150 155 160

Ala Thr Lys Ala Gly Ala Glu Met Leu Val Met Ala Tyr Gly Arg Ser
165 170 175

Tyr Gly Leu Pro Val Ile Thr Thr Arg Gly Asn Asn Val Tyr Gly Pro
180 185 190

Asn Gln Phe Pro Glu Lys Leu Ile Pro Lys Phe Ile Leu Leu Ala Met
195 200 205

Ser Gly Lys Pro Leu Pro Ile His Gly Asp Gly Ser Asn Val Arg Ser
210 215 220

Tyr Leu Tyr Cys Glu Asp Val Ala Glu Ala Phe Glu Val Val Leu His
225 230 235 240

Lys Gly Glu Val Asn His Val Tyr Asn Ile Gly Thr Thr Arg Glu Arg
245 250 255

Arg Val Ile Asp Val Ala Asn Asp Ile Ser Lys Leu Phe Gly Ile Asp
260 265 270

Pro Asp Ser Thr Ile Gln Phe Val Glu Asn Arg Pro Phe Asn Asp Gln
275 280 285

Arg Tyr Phe Leu Asp Asp Gln Lys Leu Lys Lys Leu Gly Trp Ser Glu
290 295 300

Arg Thr Thr Trp Glu Glu Gly Leu Lys Lys Thr Met Asp Trp Tyr Thr
305 310 315 320

```
Ala Asn Pro Glu Trp Trp Gly Asp Val Ser Gly Ala Leu Leu Pro His
                325                 330                 335

Pro Arg Met Leu Met Met Pro Gly Asp Arg Leu Ser Asp Gly Ser Asp
            340                 345                 350

Glu Arg Lys Asp Ala Asp Gly Asn Gln Thr Phe Thr Val Val Thr Pro
        355                 360                 365

Thr Lys Ala Gly Gly Ser Ala Asp Lys Thr Ser Leu Lys Phe Leu Ile
    370                 375                 380

Tyr Gly Lys Thr Gly Trp Leu Gly Gly Leu Leu Gly Lys Ile Cys Glu
385                 390                 395                 400

Lys Gln Gly Ile Pro Tyr Glu Tyr Gly Lys Gly Arg Leu Glu Asp Arg
                405                 410                 415

Ala Ser Ile Met Ala Asp Ile Arg Ser Val Lys Pro Thr His Val Phe
            420                 425                 430

Asn Ala Ala Gly Leu Thr Gly Arg Pro Asn Val Asp Trp Cys Glu Ser
        435                 440                 445

His Lys Thr Glu Thr Ile Arg Val Asn Val Ala Gly Thr Leu Thr Leu
    450                 455                 460

Ala Asp Val Cys Arg Glu Asn Asp Leu Leu Met Met Asn Phe Ala Thr
465                 470                 475                 480

Gly Cys Ile Phe Glu Tyr Asp Ala Ala His Pro Glu Gly Ser Gly Ile
                485                 490                 495

Gly Phe Lys Glu Glu Asp Lys Pro Asn Phe Thr Gly Ser Phe Tyr Ser
            500                 505                 510

Lys Thr Lys Ala Met Val Glu Glu Leu Leu Arg Glu Phe Asp Asn Val
        515                 520                 525

Cys Thr Leu Arg Val Arg Met Pro Ile Ser Ser Asp Leu Asn Asn Pro
    530                 535                 540

Arg Asn Phe Ile Thr Lys Ile Ser Arg Tyr Asn Lys Val Val Asn Ile
545                 550                 555                 560

Pro Asn Ser Met Thr Ile Leu Asp Glu Leu Leu Pro Ile Ser Ile Glu
                565                 570                 575

Met Ala Lys Arg Asn Leu Arg Gly Ile Trp Asn Phe Thr Asn Pro Gly
            580                 585                 590

Val Val Ser His Asn Glu Ile Leu Glu Met Tyr Lys Ser Tyr Ile Glu
        595                 600                 605

Pro Gly Phe Lys Trp Ser Asn Phe Thr Leu Glu Glu Gln Ala Lys Val
    610                 615                 620

Ile Val Ala Pro Arg Ser Asn Asn Glu Met Asp Gly Phe Lys Leu Ser
625                 630                 635                 640

Lys Glu Phe Pro Glu Met Leu Ser Ile Lys Asp Ser Leu Ile Lys Tyr
                645                 650                 655

Val Phe Glu Pro Asn Lys Arg Thr
            660
```

<210> SEQ ID NO 23
<211> LENGTH: 5650
<212> TYPE: DNA
<213> ORGANISM: Thlaspi arvense

<400> SEQUENCE: 23

```
cctttcgttt gcatttttgt gttacggtgt gatatctggt gaggatgtac atatgtggta     60

aagtggcaat aatagtagct atttataaaa ttttatcata aatattattt tttacatgaa    120
```

```
actatatata atacaaaatt tttaggcaaa caaaaattat tagtcaaaaa gtataattca    180
aaactcactt gattcaaata tcggaatcag cgcgctagat ggggtgataa gatttaccat    240
ctcaactaaa tgaccatata tatgactcca tataaatata atcaaatagt tttgatttaa    300
taaaacgttt actattatat acgtttaata aaaaagtact ttaccagctt ttacgtgagt    360
tatggaaaaa ttatgaaatc caagatgtaa tcaagggttg ctgtccaaaa aaataaaaaa    420
aaaacattag ttaagggttg ataagacgta gaaataaata gatcgttacg taaaacatct    480
gcaggaagtg tattgatttg taaacgttaa aatacttctc tctgaccatt tattatatgt    540
cagtcgttat aagagaaaac aaaacgcaca tgttatattg acatgtggac gataatgtat    600
attgacatgt gaagaagcca actccgtacg taaagcgcca tttgcgctgc aaatactgat    660
cctcaactac agtggattct tttctcacaa aaacatagac cgtttcaaat atatgttccc    720
aaacacttgt gagacattct atacaaagtt tatcatgcac ccttcctttt tttttaacgt    780
caaaatgatc atgtacttct gtcacattat ttttgtacat tatgaatata tagacatttg    840
tattctctct ttcgccgaat acacacatct atatatttgt aaatgtagca ggtttaaatt    900
ttggagtaaa agaatagttg attttgacca catagagaac taatggatca attctcacta    960
atacaaatat ttggtgaaag ccttagaggt gagaaagtcc aaggcccata aaggcctatt   1020
acggccaccc ccggtcacgt aaaaccaagc ctcgttctcg ttgatgaggc cgaatataaa   1080
aggcatcatc aaatcaaaca tgtgcgtaac gtgatattta atttagcatt tgcaagtaat   1140
gatcacttct gttttttctt ttagtattta gttcttcact taagttttcc acgttattta   1200
ttaatataca ggaactgctt tttcttattt tattggaaaa atcatgtttt atgtttgttc   1260
aattaaaatt tcagcacaat ttctttttca tttttttata tgaaaacttt aaggtagaaa   1320
tgggaaattg cgaaaccgaa tcatgcggac aaaacgaaat ttctgcgttg cctatatttt   1380
ttgttggtaa tttttaaaac aataaacaat taatttgacg tgataaaaac aaagggacat   1440
gaaaaaactc taaaagcgta gtaatggtaa tttggtaatt tcaaagtccg ctggttctcc   1500
gtaactgtct caaattaaaa agagggctta ctgttttctg acgctcgtta gattccctct   1560
ctttcttctt cattttctcc tcttcgtctt cactgctaat tcccttgatc tctctccctg   1620
tcctccaatt ttccctctct acaaatatcg actccttctt caatattaga ttgatcctga   1680
tccgattcga gccggtacgt acctgaactg tttctgtttc tctgagctaa ttcgtgaatg   1740
tacgaggttc tgctgcgttt tatttttttt gatggtatag ttgacatgtt ttcaggattt   1800
tttgttgtat actctgatct ttgatgcttg tttatcgttt tgccattgga tctgctgctc   1860
gatctgggca atttctcgca tttgattgct acatttgtca taacttcggg atctggatct   1920
acctttttt tctgatcatt tagaatttcg ctaacagctt tagattttcg tacttatcgc   1980
gtggatttgg cttcccgcta cttgttcagc tgtatctgtt aaaatctcac aaatttttat   2040
tgaactgaat catggggttt tcaataggat agatctggtt gagttgttct cctcagtagc   2100
tgtttccttc cacatttgag cttaatcgat ttcatggagt aatacgggtg atcgtgattt   2160
cgttaatcac atctgatccg atgacgttca tgatatatat actagccatt atttacctgt   2220
ttgctggatc ttttgtcctt cgattaaatc tggctgtttc gtcattgacg agtgtactga   2280
aagcttttcc gaatgcaaat ataatgtttt gtgttgttgc agattatata tttatcatca   2340
catggctaca tataagccca agaacatcct catcactggg gctgctggat tcatagcgtc   2400
ccatgtcgcc aacaggcttg ttcgaagcta ccctgactac aaaatcgttg tgcttgacaa   2460
gcttgattac tgctcaaacc tgaaaaacct caatccttcg aaatcctctc caaacttcaa   2520
```

gtttgtcaag ggagacatcg ccagtgctga cctcgtcaac taccttctca tcactgaaaa 2580
catcgacacg attatgcact ttgctgctca gacccatgtc gacaattcct tcggtaacag 2640
cttcgagttt accaagaaca atatttacgg cacccatgtc cttctggaag cttgcaaagt 2700
cactgggcag atcaggaggt tcatccatgt gagtaccgat gaggtctatg gagagactga 2760
tgaggatgct tcagtgggaa accatgaggc ttctcagttg ctccctacaa acccttactc 2820
tgccactaaa gctggagctg agatgcttgt gatggcatac ggtagatcat acgggttgcc 2880
agttataacg actcgcggga acaatgtcta tggtccgaat cagtttcctg aaaagttgat 2940
ccctaagttc attctgttgg ctatgagtgg gaagccactg ccgatccacg gagatggatc 3000
taacgtgagg agttacctct actgcgaaga tgttgctgag gcgtttgagg ttgttctaca 3060
caaaggggaa gtcaaccatg tctacaatat agggacaacg agagaaagga gagtgattga 3120
tgttgccaac gacatctcaa aactctttgg aatagaccct gactccacca ttcagtttgt 3180
tgagaaccgg cctttttaatg accagaggta cttcctcgat gaccagaagc tgaagaagtt 3240
gggatggtct gaacgaacca cttgggaaga aggactgaaa aagacaatgg attggtacac 3300
tgcgaaccct gagtggtggg gagatgtctc cggagctctg ctgcctcatc cacggatgtt 3360
gatgatgcct ggtgatagac tctctgatgg ctctgacgag cgcaaggatg cagacggtaa 3420
tcagacattc acggtggtta ctcccaccaa ggccggtggt tccgcagaca aaacatcctt 3480
aaagttcctc atctatggca aaactgggtg gctcggtggt ctcctaggaa agatatgtga 3540
gaagcaaggg attccgtacg agtatggaaa agggagacta gaagacagag cttcaatcat 3600
ggcggatatt cgcagcgtca aacctaccca tgtcttcaat gccgcgggct taacaggcag 3660
gcctaatgtt gactggtgtg agtctcacaa aaccgagact atccgagtca acgtcgctgg 3720
tactttgact ctggcagatg tttgcagaga gaatgatctg ttgatgatga actttgccac 3780
cggttgtata tttgagtatg acgctgcaca tccagaaggt tcagggattg gcttcaagga 3840
agaagacaaa ccgaatttca ccggttcctt ctactcaaag acaaaggcaa tggtaatata 3900
ctactacatc acataaccaa atcacatgtg atcctcaaac tgtgcaactc tgttcataaa 3960
tcctctgttt ctattttcgc caggtcgaag agcttctaag agagtttgac aacgtatgca 4020
ccttgagagt gaggatgcca atctcatccg acttgaacaa cccgcgaaac ttcatcacaa 4080
agatctcgcg ttacaacaaa gtggtgaaca tcccaaacag catgaccata ctcgacgagc 4140
tcttaccaat ctcaatcgag atggcgaaga ggaacctacg gggatttgg aatttcacca 4200
acccaggagt ggtgagtcac aacgagatac tagagatgta caagagctac atcgagccag 4260
gtttcaaatg gtccaacttc actttagagg aacaggctaa ggtcattgtc gcaccacgga 4320
gcaacaacga gatggatggt tttaagctca gcaaggagtt tccagagatg ctttccatca 4380
aagattcgtt gatcaaatac gtcttcgaac ccaacaagag aacgtaatac cctcagtaac 4440
acatacacac acacacactt cctctttatc tgttcattgt tatattatta tcttgcaggt 4500
agtttcacca ctataatgat tctactataa ttttattttg tcatatgatt catttactct 4560
ttttttggct ttctacgtcg aacatgtagc tctcttgacg cattctacgt cacaacacat 4620
tttgttttca ttaatattat ttattaaacg ataaaattgc ttgaagttta ttactttcac 4680
tattgattcc tccttttagt tttcatctca aaagagcaga ggacagagat taagaacgaa 4740
acagcattga ctgataactt atttccctat gcttttaaac ttgaggtttc tatttgttac 4800
aaaacaatgt ctttcataaa gttaaatctt tctattgcat aaatcgaaac tgcaaactca 4860

```
aaatgtaata taaattaaac cttctgtact tcctgtcccc aaatcttcac catacgacca   4920

tctaaaagca gaatttttca cactacgaac aacattccat aatctgatca tccttgcaac   4980

aaagcatacc gattcgtaag ccttcaattt gaatgaagac gtaaaatgat gaataaaagg   5040

taagagagag gaacagaaaa agctcagcac cttgaaattt gttgttctct tcacatagct   5100

tgagcgtatt gttgtctaga caatggtgga atttcttgtc ccgtcataaa atttaaagtc   5160

aaaagtcagt agtagttggt gattgattgg ctcctgagtt cttacaaagg aggagaacac   5220

ttaaaaaaca gagtatgaga atataccttc tgcctctgta gacaaccaat catgtgcaca   5280

gaacagagcc tgtctaatat cagggctcaa ggaactctgg ctatcatcga tcaccggtct   5340

cccggagttg aacgttgaat caggcgcaag gatcgacatc ggcgtcccca agatatcgcg   5400

tgccatcata gagaggatag ggtatctcgg cgtatggacc ttccagtaat tcagaatgtt   5460

gaactcgcca ctacgaggaa agattggttc agacaagtac ttgtccaagt ccgatgttgt   5520

gttctggctc tgagatgtct cgtggagaaa cttgtcgaat cctttcaacc tgtctctagt   5580

gtccatacct gctctaccta agccagagcc agagtaggaa gagtcgtccc caacaatggc   5640

tgagcatatc                                                          5650
```

<210> SEQ ID NO 24
<211> LENGTH: 1092
<212> TYPE: DNA
<213> ORGANISM: Thlaspi arvense

<400> SEQUENCE: 24

```
atgggtagac attcttgctg ttacaaacaa aagctgagga aagggctttg gtctcctgaa     60

gaagacgaga agcttctcaa tcacatcaca aatcacggcc atggctgctg gagctctgtc    120

cctaaactcg ctggtttgca gagatgcgga aagagttgca gactgagatg gatcaattac    180

ttgagacctg atttaaagag aggagctttc tctccagagg aagaaaatct catcgtcgag    240

cttcacgctg tcctcggaaa cagatggtca cagattgcag caaggcttcc gggaagaacc    300

gataacgaga tcaagaatct gtggaattca agtatcaaga agaaactgaa acaaagaggc    360

attgatccaa acacacacaa acccatctct gaagttgagg gctttagcga caaagacaaa    420

ccagcaacaa gcgacaataa aagaagcagc aacgatcata agtctccgag ttcctcctct    480

gcaaccaacc aagacttctt cctagaaagg ccatctgatt tctccgacta cttcggtttt    540

cagaagctta acttcaactc caacctcgga ctctctgctg caactgattc ttcactctgc    600

tccatcattc cggcgcagtt tagccccgga aacatgtctg gttctgtctt ccagactccg    660

gtatgcgtaa agccttcaat tagtcttcct ccggacaaca gttcgagcac cgtctccgga    720

ggagatcatg tgaaactggc tgcacctaat tgggaatttc agacaaacaa cgcctccagt    780

ttcttcgaca atggcggatt ctcatggtca atcccaaatt cttcttcttc actagtcaaa    840

cccaatcata acttcgaaga aatgaaatgg tcagagtatt tgaacacacc gttcttcaat    900

gggagcactg tacagagtca aagctcacaa ccgatctaca tcaaatcaga ggcagattac    960

ttagccaatg tttcgaacat gacagatcct tggagccaaa cccagaacga gaatttgggc   1020

acaaatgaag ctactgacgt gttctccaag gatcttcaga gaatggccgt ctcctttggt   1080

cagtcccttt ag                                                        1092
```

<210> SEQ ID NO 25
<211> LENGTH: 363
<212> TYPE: PRT
<213> ORGANISM: Thlaspi arvense

<400> SEQUENCE: 25

Met Gly Arg His Ser Cys Cys Tyr Lys Gln Lys Leu Arg Lys Gly Leu
1               5                   10                  15

Trp Ser Pro Glu Glu Asp Glu Lys Leu Leu Asn His Ile Thr Asn His
            20                  25                  30

Gly His Gly Cys Trp Ser Ser Val Pro Lys Leu Ala Gly Leu Gln Arg
        35                  40                  45

Cys Gly Lys Ser Cys Arg Leu Arg Trp Ile Asn Tyr Leu Arg Pro Asp
    50                  55                  60

Leu Lys Arg Gly Ala Phe Ser Pro Glu Glu Glu Asn Leu Ile Val Glu
65                  70                  75                  80

Leu His Ala Val Leu Gly Asn Arg Trp Ser Gln Ile Ala Ala Arg Leu
                85                  90                  95

Pro Gly Arg Thr Asp Asn Glu Ile Lys Asn Leu Trp Asn Ser Ser Ile
            100                 105                 110

Lys Lys Lys Leu Lys Gln Arg Gly Ile Asp Pro Asn Thr His Lys Pro
        115                 120                 125

Ile Ser Glu Val Glu Gly Phe Ser Asp Lys Asp Lys Pro Ala Thr Ser
    130                 135                 140

Asp Asn Lys Arg Ser Ser Asn Asp His Lys Ser Pro Ser Ser Ser Ser
145                 150                 155                 160

Ala Thr Asn Gln Asp Phe Phe Leu Glu Arg Pro Ser Asp Phe Ser Asp
                165                 170                 175

Tyr Phe Gly Phe Gln Lys Leu Asn Phe Asn Ser Asn Leu Gly Leu Ser
            180                 185                 190

Ala Ala Thr Asp Ser Ser Leu Cys Ser Ile Ile Pro Ala Gln Phe Ser
        195                 200                 205

Pro Gly Asn Met Ser Gly Ser Val Phe Gln Thr Pro Val Cys Val Lys
    210                 215                 220

Pro Ser Ile Ser Leu Pro Pro Asp Asn Ser Ser Ser Thr Val Ser Gly
225                 230                 235                 240

Gly Asp His Val Lys Leu Ala Ala Pro Asn Trp Glu Phe Gln Thr Asn
                245                 250                 255

Asn Ala Ser Ser Phe Phe Asp Asn Gly Gly Phe Ser Trp Ser Ile Pro
            260                 265                 270

Asn Ser Ser Ser Ser Leu Val Lys Pro Asn His Asn Phe Glu Glu Met
        275                 280                 285

Lys Trp Ser Glu Tyr Leu Asn Thr Pro Phe Phe Asn Gly Ser Thr Val
    290                 295                 300

Gln Ser Gln Ser Ser Gln Pro Ile Tyr Ile Lys Ser Glu Ala Asp Tyr
305                 310                 315                 320

Leu Ala Asn Val Ser Asn Met Thr Asp Pro Trp Ser Gln Thr Gln Asn
                325                 330                 335

Glu Asn Leu Gly Thr Asn Glu Ala Thr Asp Val Phe Ser Lys Asp Leu
            340                 345                 350

Gln Arg Met Ala Val Ser Phe Gly Gln Ser Leu
        355                 360

<210> SEQ ID NO 26
<211> LENGTH: 4198
<212> TYPE: DNA
<213> ORGANISM: Thlaspi arvense

<400> SEQUENCE: 26

```
aaaataatta attctaactt atgacttaaa aaccttgtat acgtctagct aaatcttatt     60
ttcgacgatc tttttagga ttgggtccca ataaacaaat ggataaacgg taagagtcta    120
attacgagag gccatgtcca gataacgtaa gaaaactaca aaaattcaac atgtgaatat    180
ttgagggaaa gtttgggtaa atggacaaag aatataccct ctctattatg actggcttaa    240
aggcaaaaaa agggagaaaa ttgccaaaga gaagtgagtc catttaaatt taaaaatgta    300
taaagcaaac aaaagagaga cttaattatt ctcattcatc tgcaaaagaa accatgtatt    360
taaagcaaaa tttctaaatt ccgttatgta gacatttaat tccatttaat catttctgga    420
aacattaacc aatgatgaca atttcttgct ggttataaac ctttcccatt atttccttta    480
attgatgcgt tcatcttcac aaagatttag tccacattta gcatttgctt ttaattcatt    540
gcagaagtct ttcatgacga caacaatcaa ctcttctttg tccacattct tatctagcta    600
tacgatctac ctcgtgtgtt attttaattc ttccgttctc actgtaaatc atttttgtat    660
agcgcttcca ccgctaacta ttgaatatca cttttcaata cattaatcgt tacaataagt    720
ttgtagctgc aagaaaaaat ttagactcgg atgcatttgg taacatagat atcatataaa    780
acttttaaac tttttctcgt catgcatcac tcaaagagtg ctatatcctt gtcacatacc    840
aaaaacgttt taggagcacg cattgcttca aactctcgtc tatgtgcgat ttcgatacat    900
ttttctaatt actctcaagt ctcaactaag cacacttaat tatggatttc tttttaaaa    960
atagcctatt tctcgattta caccactgta aatatatttc cataaattct atatcgaacc   1020
atatactaca tgagtatttt taagtgaaaa ctaattattt tgtgacataa aaaacctgat   1080
atacgtctac caaaaaaggt tttttttgta aaccatgact tacgtgaatc tccgaaataa   1140
aaatctttag aaaagttgtt gaggtcacgc tggcttttgg ctgcgtacgt atagagtggt   1200
ccgtaacatc ttcgaggaca aactgaacat aaatgagcat gtctccacta cttagaacca   1260
cacttactat taattttaaa agaagttttt tttttttttt atcaattgtt gcatttgtat   1320
gtatgatcat aatgggtcca tttggagatg acgaatgtat gatgattaga gtgatgtaaa   1380
ggtcaaaact acatgaactc catctcttaa ccctgattat tttaccattg gtgtgaacca   1440
atctgatgtg gaccaatcat attgttttta caaaagctaa aaaagatgta catacttttt   1500
gctatttaat ctttaaagag agtatagaat ttcaacaaac ccttccgaag aaagtgactt   1560
ttcttagtcc tattaatact ctctctctct ctggagatct gttatttcgt tttctccacc   1620
tttctcttca gattccatta accttcaaaa gttttaaata catgctctct gctcaaagcg   1680
tttttctttc gttacttgta aagtaaaaca cagagctctc ttctctttca tcgttccttt   1740
gctcagcatt gcagctttaa taaaccaaaa tgggtagaca ttcttgctgt tacaaacaaa   1800
agctgaggaa agggctttgg tctcctgaag aagacgagaa gcttctcaat cacatcacaa   1860
atcacggcca tggctgctgg agctctgtcc ctaaactcgc tggtaacatt ttcttcctta   1920
attcatggga tacaaaacat gaacttaaaa aggctacctt ttttgtaata acaattcaca   1980
aatctgagtc tactacaggt ttgcagagat gcggaaagag ttgcagactg agatggatca   2040
attacttgag acctgattta aagagaggag ctttctctcc agaggaagaa aatctcatcg   2100
tcgagcttca cgctgtcctc ggaaacaggt aataattcat agaaaacaga ggatcatgtt   2160
tgtgtcttaa gcttcctctg tttttaacag aggatcatgt atatctttta accttcctct   2220
gttttttat cagatggtca cagattgcag caaggcttcc gggaagaacc gataacgaga   2280
tcaagaatct gtggaattca agtatcaaga agaaactgaa acaaagaggc attgatccaa   2340
```

```
acacacacaa acccatctct gaagttgagg gctttagcga caaagacaaa ccagcaacaa   2400
gcgacaataa aagaagcagc aacgatcata agtctccgag ttcctcctct gcaaccaacc   2460
aagacttctt cctagaaagg ccatctgatt tctccgacta cttcggtttt cagaagctta   2520
acttcaactc caacctcgga ctctctgctg caactgattc ttcactctgc tccatcattc   2580
cggcgcagtt tagccccgga aacatgtctg gttctgtctt ccagactccg gtatgcgtaa   2640
agccttcaat tagtcttcct ccggacaaca gttcgagcac cgtctccgga ggagatcatg   2700
tgaaactggc tgcacctaat tgggaatttc agacaaacaa cgcctccagt ttcttcgaca   2760
atggcggatt ctcatggtca atcccaaatt cttcttcttc actagtcaaa cccaatcata   2820
acttcgaaga aatgaaatgg tcagagtatt tgaacacacc gttcttcaat gggagcactg   2880
tacagagtca aagctcacaa ccgatctaca tcaaatcaga ggcagattac ttagccaatg   2940
tttcgaacat gacagatcct tggagccaaa cccagaacga gaatttgggc acaaatgaag   3000
ctactgacgt gttctccaag gatcttcaga gaatggccgt ctcctttggt cagtcccttt   3060
agcttttttt ttttcttctt ttctttattc taacagatgt agagaacaaa aaaatataca   3120
atacatacat acgtacagtg gatttaagtc tgtatattcc atgagctgtc tttattttta   3180
catttttaa gtgtgtttta tacgtcaaat attcttctat tttttgcaaa cctttcagtc   3240
tcatactata tatacacttt tatttctttt gttttgttat aaagattatg atgcatagaa   3300
ttctcgatga tttcagaggc ctgtgtttgc aattaatctg ttgaagaaca atgatgaaag   3360
taataaatca gtttctgtct gtttccgtga acgagttgta atccagagtc acatccttca   3420
ccatttttca gacctgtaat gaattaaaag acaaaaaagg acaaaaacat aaaactaaag   3480
caaatcataa taaataaact aaagtgggaa ttagctcaac taataagaag ggacactttt   3540
ttcgaaagga cccgagtttt aatacgatgt aaatttttta aaaaaaaaga tttctctttt   3600
ctgaaatcaa tgactgatca catatttgag agattagaaa tcgaataccc ctaatttctt   3660
cgggctatta taaactttga aaaaggtacg tatgtcgttt ttgcttagtc ttatcagaga   3720
actggaattg tccccattga cggcgtcgga atattcttta gcggtagaaa attcggaaca   3780
gttcgagaat tttctatttt tttgtctgtt aaataaaata gttatatgat ttgaccttaa   3840
taaacatgaa ggaggtgatg actgatgaga aggtgacttc atttttaatc ctaaaaagtc   3900
aattgattta ttttataacc catatttttt tttttagatt ctaatccaaa acaattactt   3960
attacttttt tagaaataac ctaacgcaat aactcgactg ataggtaaaa ctaaggtact   4020
ataatatgtt tgttttgact ttaaatttaa agacgatgct atattttttt gaaaatgaaa   4080
agaaattgat ctatcaaaca cataagtcta gattcaacag taattataaa aatagaataa   4140
agagagaaaa gttaatattt tcttggcatt atgagaaatc aaatatattt aacctata     4198
```

<210> SEQ ID NO 27
<211> LENGTH: 939
<212> TYPE: DNA
<213> ORGANISM: Thlaspi arvense

<400> SEQUENCE: 27

```
atgttctcat cactctccaa ccacaattca ccacaatcaa tggagtcacc acaatacgag     60
atctcttcaa gctcttcttc tgaaaaacct agatactact ttcaatcatc tgatatattc    120
cccaacctca ctcaaaaccc tagtaacagc aatacccaaa tcgagtcgtt accgcttatc    180
gatgggataa atttaaactc aaaccttaac ctaaacctta agccaccgta tgttgaaaaa    240
gaagaggaag agaaagaaga ggaggaagat cacgttgatc tgagcttata catcggcctt    300
```

```
cctagctctg ataattcgag aaacggtgtt aaactgccga agaagaaaaa tgggaaggac    360

atcatcactc atgacgctgg aaaacagatg gagaatgaac tttccggcaa agcatactgg    420

attccggcgg tggagcaaat tataataggc ttcactcatt tttcttgcca tgtatgcttc    480

aagacattca atcgctacaa caatcttcag atgcacatgt ggggccacgg ttcacaatac    540

aggaaaggac cagagtcact taaagggacg cagccacgag caatgctagg gatcccttgt    600

tactgctgcg tcgaagggtg taggaaccac attgaccatc ctcgatccaa gccgcttaaa    660

gacttccgaa cgctccaaac acactacaaa cgcaaacacg gccaaaagcc ctatgcgtgt    720

cgcatctgcg gtaagctgtt ggctgtcaaa ggcgattggc gcacacacga gaagaattgt    780

gggaaacgct gggtttgcgt ttgcggttct gactttaaac acaaacgctc ccttaaggac    840

catgttaagg cttttgggcc tggtcatggg tcttatctaa ccggtttgct tgacgagcag    900

gcctctcatt cttctctctc tgagaatttg ttcttttaa                           939
```

<210> SEQ ID NO 28
<211> LENGTH: 312
<212> TYPE: PRT
<213> ORGANISM: Thlaspi arvense

<400> SEQUENCE: 28

```
Met Phe Ser Ser Leu Ser Asn His Asn Ser Pro Gln Ser Met Glu Ser
1               5                   10                  15

Pro Gln Tyr Glu Ile Ser Ser Ser Ser Ser Ser Glu Lys Pro Arg Tyr
            20                  25                  30

Tyr Phe Gln Ser Ser Asp Ile Phe Pro Asn Leu Thr Gln Asn Pro Ser
        35                  40                  45

Asn Ser Asn Thr Gln Ile Glu Ser Leu Pro Leu Ile Asp Gly Ile Asn
    50                  55                  60

Leu Asn Ser Asn Leu Asn Leu Asn Leu Lys Pro Pro Tyr Val Glu Lys
65                  70                  75                  80

Glu Glu Glu Glu Lys Glu Glu Glu Glu Asp His Val Asp Leu Ser Leu
                85                  90                  95

Tyr Ile Gly Leu Pro Ser Ser Asp Asn Ser Arg Asn Gly Val Lys Leu
            100                 105                 110

Pro Lys Lys Lys Asn Gly Lys Asp Ile Ile Thr His Asp Ala Gly Lys
        115                 120                 125

Gln Met Glu Asn Glu Leu Ser Gly Lys Ala Tyr Trp Ile Pro Ala Val
    130                 135                 140

Glu Gln Ile Ile Ile Gly Phe Thr His Phe Ser Cys His Val Cys Phe
145                 150                 155                 160

Lys Thr Phe Asn Arg Tyr Asn Asn Leu Gln Met His Met Trp Gly His
                165                 170                 175

Gly Ser Gln Tyr Arg Lys Gly Pro Glu Ser Leu Lys Gly Thr Gln Pro
            180                 185                 190

Arg Ala Met Leu Gly Ile Pro Cys Tyr Cys Cys Val Glu Gly Cys Arg
        195                 200                 205

Asn His Ile Asp His Pro Arg Ser Lys Pro Leu Lys Asp Phe Arg Thr
    210                 215                 220

Leu Gln Thr His Tyr Lys Arg Lys His Gly Gln Lys Pro Tyr Ala Cys
225                 230                 235                 240

Arg Ile Cys Gly Lys Leu Leu Ala Val Lys Gly Asp Trp Arg Thr His
                245                 250                 255
```

```
Glu Lys Asn Cys Gly Lys Arg Trp Val Cys Val Cys Gly Ser Asp Phe
            260                 265                 270

Lys His Lys Arg Ser Leu Lys Asp His Val Lys Ala Phe Gly Pro Gly
        275                 280                 285

His Gly Ser Tyr Leu Thr Gly Leu Leu Asp Glu Gln Ala Ser His Ser
    290                 295                 300

Ser Leu Ser Glu Asn Leu Phe Phe
305                 310


<210> SEQ ID NO 29
<211> LENGTH: 4025
<212> TYPE: DNA
<213> ORGANISM: Thlaspi arvense

<400> SEQUENCE: 29

ttattgttta tcaccagttt ggttgtcatt aattaataag taagatttgt gtttagtgac     60

ggctgattcc gtttctagtg agtcagatgc gagatgattg aaaaccgaga agacgatgac    120

tccacaaaat aagattttgt ttaagtttta taattgagtt ttagcgaaat tcgttttcaa    180

ttttttttt tagctttatt ttttttattg agaatttaag aattataaaa gtttttttagg    240

taaaatttga agaaattttg attaataaat tatttaatga aatagcttta aattattggt    300

tgtagaagat gacataacag ttttgaactc tactattgat taattatttt tgctgatgtg    360

gcatattgtt ttattcttat tagttagttt tttcataatt taatgatgtg gtaatttgtt    420

atattcttat taactgatta ttttgatgat tatttttgct tatgtgacac cttttagaga    480

gcaggaaatc tatcctttta tataaaggag attagatttt accgatcatg tattatttag    540

tagccaattc catacgtaaa aaaaaagatt tttacaattt ggttataaat agcctgcatg    600

ttttatcggt cctatcttga ttgtatatcg taaaaaaaga tgctgactct aagaaaacga    660

atttcatatg gaccgtagta acagggccca cgagtaatta gggtttttaac ggctgacatt    720

ttgatctctc atacatctaa gtatctaact agaagtgttg accgttagag aagaattaaa    780

taacttacat acatacaaaa acataagtcg aagaataatc ataacagtgc atcttctaca    840

ataatgataa caaaaaaagt aaattagaaa ttagcattta ttccaattaa tacccatatt    900

cgaaaatgca catggtagaa aagcaaaaaa agcttacgta aattccaaat attgtcaaac    960

ccctgcaatg acaaagttgc caaaaattga agaggttggt ccacacaatt taaggttctt   1020

tgcttcacac tctatttata ggcaaagaga tgaaacagag gagattaaat tgcttcttaa   1080

caaaggttgt tttcactcaa ccacatgcct tctcaagtgt ctgctgctca cattccccga   1140

gattctcatt tactttttcc tctatttggt acgtacttta tattacaatt ctatttgttt   1200

ctttgattat tcgttttgtt catacttagt tatcataaac atacatagtt gatcttatat   1260

tatacagtaa atttgataaa tgtttctctt aattaattta ctcacgcaat ttaaaggaga   1320

cgattgatac gcgggcctac ttacgcacct gcatgattat tagttataaa agttattgca   1380

aacattaaat tactttgata gctagagagc aattattata taaagctaat ttttaattgt   1440

agatatacat ttagtcgaaa gttaaaaaga aaaatgaaat ccctaaacaa acgttcccaa   1500

atgttctcat cactctccaa ccacaattca ccacaatcaa tggagtcacc acaatacgag   1560

atctcttcaa gctcttcttc tgaaaaacct agatactact ttcaatcatc tgatatattc   1620

cccaacctca ctcaaaaccc tagtaacagc aatacccaaa tcgagtcgtt accgcttatc   1680

gatgggataa atttaaactc aaaccttaac ctaaacctta agccaccgta tgttgaaaaa   1740

gaagaggaag agaaagaaga ggaggaagat cacgttgatc tgagcttata catcggcctt   1800
```

```
cctagctctg ataattcgag aaacggtgtt aaactgccga agaagaaaaa tgggaaggac   1860
atcatcactc atgacgctgg aaaacagatg gagaatgaac tttccggcaa agcatactgg   1920
attccggcgg tggagcaaat tataataggc ttcactcatt tttcttgcca tgtatgcttc   1980
aagacattca atcgctacaa caatcttcag gtacaaacca atgttatctc atgcgcatta   2040
cgtgcatgca taaccaaata aaatcttaat tcatatttga atttgtttgt tagagaacaa   2100
acggagaaaa tcctattcga tttatatgtt tataaccccc ttatctaatg ttatgagtta   2160
gaatgaattt atacatacat aatcaaaccc taagttgact aactatatat tattttgtag   2220
aataattgtt aatatagatc tgtttggatg catggttgag atttaattaa aatatactgt   2280
taaataaacc caaatttaaa atgaatttaa tagtttttct ccatataatt aattaacgtt   2340
tcctttaaaa tttcatccaa attaataatt aatagattac ttcagtgaaa caatatgatc   2400
gatcaacaat aagattgtaa tgattaatga accattttat tagttgttaa acttatattt   2460
gattaaaaaa aggtgggggg tatttgttat gaaaatttat cttgaaatcg tcagtctaac   2520
cattgttatc catttcattt tttgttatta catatactga tatacaaatc tttgttgaca   2580
ccaaatatga attcagatgc acatgtgggg ccacggttca caatacagga aaggaccaga   2640
gtcacttaaa gggacgcagc cacgagcaat gctagggatc ccttgttact gctgcgtcga   2700
agggtgtagg aaccacattg accatcctcg atccaagccg cttaaagact tccgaacgct   2760
ccaaacacac tacaaacgca aacacggcca aaagccctat gcgtgtcgca tctgcggtaa   2820
gctgttggct gtcaaaggcg attggcgcac acacgagaag aattgtggga aacgctgggt   2880
ttgcgtttgc ggttctgact ttaaacacaa acgctccctt aaggaccatg ttaaggcttt   2940
tgggcctggt catgggtctt atctaaccgg tttgcttgac gagcaggcct ctcattcttc   3000
tctctctgag aatttgttct tttaaaactt tgtgcatcta tcagtctttt gacgtgtgtt   3060
gtccgtttat ttagtctaga ataatgtggt atctaataat tctcgtagtg aataatatca   3120
taatctactt gatatgagag gtcaacatat ttagtcccgc agttaataat atcataattt   3180
ggtgcaccaa ctaagggaaa tgactatcag ccacacttag ggattactca ttaatcgtag   3240
actcataaaa gctatatgtt taaaaatgct agtttgtata catatcatta gccacactta   3300
gggattacgc ataaaccgta gactcataaa atctatatgt ttaaaaatgt tagtttgtat   3360
aaaaggagat atatatgaaa tgagtaagga agtcacattc aagagcaagt gtagtgtgct   3420
ttccgagaaa tttcctccac atgtccagac ggtacgaaat gccagttaat tccaattcta   3480
tcattattga tctgaatgtg atcgcaaaac atgatttgat tagtttcctc tctttataat   3540
ttactaaaat aaaatgacga ccatataaca tcatttttca gaaggaaatt aaaacatatc   3600
aagaatattc atgtaaaata gttaaaatat cagttaaaaa tgttaccatt ctatacatat   3660
tatattttat atacatggac tgaattcgac aatattggta aatatcaata aatccaaaat   3720
cctgattatt tgtaaatcaa taaaatagta ttatgataca aaccaattca tatacggtga   3780
ttcgaaattt cagtacatca tgaacatgga acaatggatt ttatgaactg atgagttgtc   3840
caacgttcgt tacgtgcatg cattcaatgc ctcggtgcca cattactcac cttttatgta   3900
tcctctctcc attgtttttt ttttttatc taacttattg ggtatccaaa ttcatttttg   3960
atccttattt tagtgaaacc atgcatgtcc tacgtactat cgctcgtcat atttaaagga   4020
acagg                                                                4025
```

<210> SEQ ID NO 30

<211> LENGTH: 966
<212> TYPE: DNA
<213> ORGANISM: Thlaspi arvense

<400> SEQUENCE: 30

```
atgttctcat cactctccaa ccacgattca ccacattcaa tggagtcacc agactcacca     60

caatatgaga tctcttcatg ctcttcttct gaaaaaccta gatactactt tcaatccctt    120

gatctcttcc ccaacctcac tcaaaacgct tgtaacaaca ataacctaat cgagccttta    180

ccacttatcg atcggataga ctcaagctca aaccttaacc ttaaccgtaa gccaaaggca    240

ttgtatgttg aggaaggaga ggaagaggaa gaacaggagg aagaggacgt ggatgtgagc    300

ttacgcatcg gccttcctgg ctctgataat ttgagcaacg gtgctaaatt ttcgaagaaa    360

aatgggaagg agatcatcac tcacgatgcc ggaaaacaat cagagaatga actttccggc    420

aaggcatact ggattccagc agtggagcaa attataatag gcttcactca tttttcttgt    480

cacgtctgtt tcaagacatt caaccgctac aacaatcttc agatgcacat gtggggccac    540

ggttcacagt acaggaaagg accagattca cttaaaggga cgcagccacg agccatgcta    600

gggatccctt gttactgctg cgtcgaaggc tgtaagaacc acattgacca tcctcgctcc    660

aagccgctca aagactttcg aacgctccaa acgcactaca aacgcaaaca cggccaaaag    720

ccctatgcgt gtcgcatctg cggtaagctt ttggctgtca aaggtgattg gcgtacgcat    780

gagaagaatt gcgggaaacg gtgggtttgc gtttgcggtt ccgattttaa acacaaacgc    840

tccctgaagg atcacgttaa agcttttggg cctggtcatg ggtcttatcc gaccggtttg    900

tttgatgagc aggcctctaa ttcttctgtc tttgaaagtt tgttctgtgt gatcggtgag    960

tattag                                                               966
```

<210> SEQ ID NO 31
<211> LENGTH: 321
<212> TYPE: PRT
<213> ORGANISM: Thlaspi arvense

<400> SEQUENCE: 31

```
Met Phe Ser Ser Leu Ser Asn His Asp Ser Pro His Ser Met Glu Ser
1               5                   10                  15

Pro Asp Ser Pro Gln Tyr Glu Ile Ser Ser Cys Ser Ser Ser Glu Lys
            20                  25                  30

Pro Arg Tyr Tyr Phe Gln Ser Leu Asp Leu Phe Pro Asn Leu Thr Gln
        35                  40                  45

Asn Ala Cys Asn Asn Asn Asn Leu Ile Glu Pro Leu Pro Leu Ile Asp
    50                  55                  60

Arg Ile Asp Ser Ser Ser Asn Leu Asn Leu Asn Arg Lys Pro Lys Ala
65                  70                  75                  80

Leu Tyr Val Glu Glu Gly Glu Glu Glu Glu Glu Gln Glu Glu Glu Asp
                85                  90                  95

Val Asp Val Ser Leu Arg Ile Gly Leu Pro Gly Ser Asp Asn Leu Ser
            100                 105                 110

Asn Gly Ala Lys Phe Ser Lys Lys Asn Gly Lys Glu Ile Ile Thr His
        115                 120                 125

Asp Ala Gly Lys Gln Ser Glu Asn Glu Leu Ser Gly Lys Ala Tyr Trp
    130                 135                 140

Ile Pro Ala Val Glu Gln Ile Ile Ile Gly Phe Thr His Phe Ser Cys
145                 150                 155                 160

His Val Cys Phe Lys Thr Phe Asn Arg Tyr Asn Asn Leu Gln Met His
```

```
                165                 170                 175

Met Trp Gly His Gly Ser Gln Tyr Arg Lys Gly Pro Asp Ser Leu Lys
            180                 185                 190

Gly Thr Gln Pro Arg Ala Met Leu Gly Ile Pro Cys Tyr Cys Cys Val
        195                 200                 205

Glu Gly Cys Lys Asn His Ile Asp His Pro Arg Ser Lys Pro Leu Lys
    210                 215                 220

Asp Phe Arg Thr Leu Gln Thr His Tyr Lys Arg Lys His Gly Gln Lys
225                 230                 235                 240

Pro Tyr Ala Cys Arg Ile Cys Gly Lys Leu Leu Ala Val Lys Gly Asp
                245                 250                 255

Trp Arg Thr His Glu Lys Asn Cys Gly Lys Arg Trp Val Cys Val Cys
            260                 265                 270

Gly Ser Asp Phe Lys His Lys Arg Ser Leu Lys Asp His Val Lys Ala
        275                 280                 285

Phe Gly Pro Gly His Gly Ser Tyr Pro Thr Gly Leu Phe Asp Glu Gln
    290                 295                 300

Ala Ser Asn Ser Ser Val Phe Glu Ser Leu Phe Cys Val Ile Gly Glu
305                 310                 315                 320

Tyr
```

<210> SEQ ID NO 32
<211> LENGTH: 3923
<212> TYPE: DNA
<213> ORGANISM: Thlaspi arvense

<400> SEQUENCE: 32

```
cacgaaacaa gttcaattaa atttaacgga aataaatggt aattaatgaa agtttgaatt      60

gtattaatta ctgcttccac gaaacaacca aaaaaatcat ttgacaaagt aatttgtgta     120

cggtattagc cacatggggc caatcctcta tgtatatcgg agttgttttg ccaaatgccc     180

aattcttact ctagtaaata ttaaaccatt ttgtagatcc taatcttgag tcaactcaaa     240

gtcctatgtt tggaaactaa aaataagttt aaatcctcta gactacgact aagttgtaaa     300

aagaaatgtt caaaattcct tagacattga aattgaatac ttcaattaaa gaaaatttta     360

ccagcatgtt catagtagta gaccaccaca gaacaaaatt aatagttttt acattgcatt     420

cttatataat aattttggag tataattgta attataaaca aaataactaa aagaaaagga     480

aagtattctt gacatattta taggtactaa tttgctagta cgactattaa ttatggagat     540

taaatctagt atttgactaa ccagaaacat tttaaaggta agtgataagt tgataacctc     600

gcaattattt ttgaaagcta ttaatcactt tagcagaatg tatacaagtt ctatattaac     660

aagtttatct caaaatcttg agatcctact aataaatcat aactttctc ttattggtat      720

gtcgaatcta gtgtttacca aactagaggt gttgaccgtt agagacaatt aaacaactta     780

catacataca aaagtacaag ccgaagaata atagtaataa cagtgcattt tctacaataa     840

ttaaaacaaa aaagtatatt aaaaattagc atttattcca attaatacca atattcgaaa     900

attaatatgg tagaaaagca aaaagcttac gtaaattcca cagattgtca aaaccctgca     960

atgaaaaagt tgccaaaaat tgacgaggtt ggtccacaaa atttaaggtt ctttgcttca    1020

cactctattt ataggcgaag agatgaaaca gaggaaatta attactcctt aacaaaggtt    1080

gttttcactc aaccacatgc cttctcaagt gtctgctgct cacattcccc gagattctca    1140

tttacttact cctctatttg gtacgtcctt tatattacaa ttctagtatt tttttttca     1200
```

```
ttattcgttt tgttcatact tcgtttcata aacatatata gttaatctta tattatacag   1260
taactttgat aaatatgtat cttaatttac tcacgcagtt tagagagacg attgatacgt   1320
ggggactact tacgtacctg catgattata taagttataa aagttattgc agaacattaa   1380
attactttga tagctcgaga gcaatcatta tataaagcta tatttttaat cacaaatata   1440
catctactcg aaagtttttt ttttaaaaaa aagatgaaat ccctaaacaa acgttcccaa   1500
atgttctcat cactctccaa ccacgattca ccacattcaa tggagtcacc agactcacca   1560
caatatgaga tctcttcatg ctcttcttct gaaaaaccta gatactactt tcaatcccct   1620
gatctcttcc ccaacctcac tcaaaacgct tgtaacaaca ataacctaat cgagccttta   1680
ccacttatcg atcggataga ctcaagctca aaccttaacc ttaaccgtaa gccaaaggca   1740
ttgtatgttg aggaaggaga ggaagaggaa gaacaggagg aagaggacgt ggatgtgagc   1800
ttacgcatcg gccttcctgg ctctgataat ttgagcaacg gtgctaaatt ttcgaagaaa   1860
aatgggaagg agatcatcac tcacgatgcc ggaaaacaat cagagaatga actttccggc   1920
aaggcatact ggattccagc agtggagcaa attataatag gcttcactca tttttcttgt   1980
cacgtctgtt tcaagacatt caaccgctac aacaatcttc aggtaccaat gttatctcaa   2040
ccaaattaaa accagaattc aaattcgttt ttttgtttct ttatttaata aaaatagact   2100
ttaatatata tatgtttgga tgcatggtaa agaaaatatt tattgaatag accatggttt   2160
aaattcaaat tacaagtttg attggctatc gttttaatag tttttcctct tataattaac   2220
tcttccttta atagttattc aaagagattt caaccaaatt aatacacaga tttcttcaat   2280
gaaacagtat gatcgatctc taacaagatt gtaatgattg atgaaccatg ttattattag   2340
ttaaaataaa attggagtca aagatatgtg tatttgctgt gaacatttat cttgaatacg   2400
gcagtcaaac catttttat caatttcatt ttttgttttt acgtatgcaa atctttgttg   2460
actccaaata tgaatgcaga tgcacatgtg gggccacggt tcacagtaca ggaaaggacc   2520
agattcactt aaagggacgc agccacgagc catgctaggg atcccttgtt actgctgcgt   2580
cgaaggctgt aagaaccaca ttgaccatcc tcgctccaag ccgctcaaag actttcgaac   2640
gctccaaacg cactacaaac gcaaacacgg ccaaaagccc tatgcgtgtc gcatctgcgg   2700
taagcttttg gctgtcaaag gtgattggcg tacgcatgag aagaattgcg ggaaacggtg   2760
ggtttgcgtt tgcggttccg attttaaaca caaacgctcc ctgaaggatc acgttaaagc   2820
ttttgggcct ggtcatgggt cttatccgac cggtttgttt gatgagcagg cctctaattc   2880
ttctgtcttt gaaagtttgt tctgtgtgat cggtgagtat tagagtaact gagaggaatg   2940
taactgagag aaaaaagaaa agtaataatt aaaataattg aaaataataa gtaagagcat   3000
ctagatagtc cttaccaaaa aaaagatcat ctagatagtc tttccatagt atctgattta   3060
tataatacta atataatgta tttatataat taaattataa attaataaag agatgaacca   3120
attcttaaca gacatttgcc tagagacata tctttattct taacaaacat ttggctagaa   3180
acatatctaa tagtttcttg tttcaaaaat gtcttcgctt tttttctgtt tttctccctt   3240
ccttttttcct tattttttttt atttttctta ttcactaaat atactcccat aatatctgct   3300
atataatatt aatataatat atttatataa ttaaattaaa aattcataaa gagatgaacc   3360
aattcttaat agatatttgg ctaaatacat atttaatatt tttttgtttg aaagatatct   3420
ttgctatttt tttctgtttc cttctcttct tttcttctta tatttcttat ttttttttatt   3480
caataaatat attttaaaaa acaccaattt tcttataaga atatctgaaa ataattgaga   3540
ataattaaat taaatatttt cttttagtaa aacttataat tatatatatg ctaaaaagat   3600
```

atgtgatatt tattattcta tctttaaaga tttttttatc gtgaatcact attttcagtt 3660
atccaaccta aaatgaatac tcagagagca accacatcga aagtgttaga gattgaatga 3720
atacagttct taaaaggttt atttcacatt aatgaagtct atcaaaacaa aatttatcta 3780
attacatctc tataacaaaa atgataattc taaagttaaa tgaaaaaaaa aaacaaaaaa 3840
atagagagaa tttttcttta aaaaaaagat aagaaagatc aataaaaccg acttcctcac 3900
attataaata gaaaagtctt cat 3923

<210> SEQ ID NO 33
<211> LENGTH: 1707
<212> TYPE: DNA
<213> ORGANISM: Thlaspi arvense

<400> SEQUENCE: 33
atgtcacaat attccttctt ctatttcttc ctaatctctc ttttcctcta cgaaaattgc 60
attgcgtatc gctacacatt cacggttatt gaagctccat atagcaaact gtgtagcacg 120
aagaagattt tgaccgttaa tggtcagttt cctggaccag tgttaagggc ttacaaaggt 180
gacaccattt acgttaacgt tcgtaaccaa gctagtgaaa atatcacatt gcattggcat 240
ggtgtagagc agccgagaaa cccgtggtca gatggacccg aatacatcac acaatgcccg 300
attcaacccg ggtcagattt tacgtacaaa attttacttt ccatcgaaga cgcgactgtt 360
tggtggcatg cgcatagctc gtggacacgt gccaccgtac acggtctgat tttcgtgtat 420
cctcggcctc ctgataccct gccttttcca gaaccggact acgaagtccc cttagttttt 480
ggagagtggt ggaagaggga tgtgagagaa gtagtggagg atttcatgag gaacggaggt 540
gaacctaatg tgtccgatgc tttgactatc aatgggcatc ctggtttctt gtatccttgc 600
tctcaatcag atacattcaa gctcgtggta gagaagggca aaacctaccg cattcggatg 660
gtaaacgccg cgatgaacct aattctcttc ttcgccatcg cgaaccacaa actcaccgtg 720
gtcgccgccg atggccacta caccaaacct ctaaccgcta gttatatcac catatctcct 780
ggccaaacgc tagacctgtt actatacgcc gaccaaagtc cagagagcac ttataacatg 840
gcggccagag cttaccatag caaccccaac gttgggttca acaactctac caccgtcggg 900
atcttacgtt actactcttc aaacgacgcc ggaacgtctt catcagaacg ttacccgtac 960
cttcctggct acaatgacac ctcagcagct ttcgatttct tcacaaaaat caaaggctta 1020
tactccagag tagctcccgc caaagtttca cgtaggataa tcacgacggt ttcgataaat 1080
ctcctcaagt gtcccaacga ctcgtgtgca ggcccaaacg ggtcgaggtt agcggcgagt 1140
atgaacaaca tatcgttcgt cacaccgagc cacgtggaca tactaagagc ttattacctt 1200
cacattaacg gcgtttacgg aacgcggttt ccggagttcc caccgcggat attcaatttc 1260
acagcggacg accaaccgct gtttttgcag actccgaggc tggcgacgga ggtaaagaag 1320
tttcagtacg gggagacggt tgagattgtt atacaaggga cgagtttggt aggtggtgga 1380
atcgatcatc ctatgcatct ccatggtttt agcttctacg tggttggttt agggtttggg 1440
aattttaacg cacgtaaaga tccctccaac tataatctag acgatcctcc ttacagaaac 1500
acggcgactg tgcccaggaa cggttggatc gctatcagat tcgtagctga caatccaggg 1560
gtttggttca tgcactgtca ctttgataga catcaaacgt ggggtatgaa tgttgtcttc 1620
attgttaaga atggaataaa accaaatcag aagattctac ctccaccgcc tggcttacca 1680
ccttgtgacc aatttgagaa tctataa 1707

<210> SEQ ID NO 34
<211> LENGTH: 568
<212> TYPE: PRT
<213> ORGANISM: Thlaspi arvense

<400> SEQUENCE: 34

Met Ser Gln Tyr Ser Phe Phe Tyr Phe Phe Leu Ile Ser Leu Phe Leu
1 5 10 15

Tyr Glu Asn Cys Ile Ala Tyr Arg Tyr Thr Phe Thr Val Ile Glu Ala
20 25 30

Pro Tyr Ser Lys Leu Cys Ser Thr Lys Lys Ile Leu Thr Val Asn Gly
35 40 45

Gln Phe Pro Gly Pro Val Leu Arg Ala Tyr Lys Gly Asp Thr Ile Tyr
50 55 60

Val Asn Val Arg Asn Gln Ala Ser Glu Asn Ile Thr Leu His Trp His
65 70 75 80

Gly Val Glu Gln Pro Arg Asn Pro Trp Ser Asp Gly Pro Glu Tyr Ile
85 90 95

Thr Gln Cys Pro Ile Gln Pro Gly Ser Asp Phe Thr Tyr Lys Ile Leu
100 105 110

Leu Ser Ile Glu Asp Ala Thr Val Trp Trp His Ala His Ser Ser Trp
115 120 125

Thr Arg Ala Thr Val His Gly Leu Ile Phe Val Tyr Pro Arg Pro Pro
130 135 140

Asp Thr Leu Pro Phe Pro Glu Pro Asp Tyr Glu Val Pro Leu Val Phe
145 150 155 160

Gly Glu Trp Trp Lys Arg Asp Val Arg Glu Val Val Glu Asp Phe Met
165 170 175

Arg Asn Gly Gly Glu Pro Asn Val Ser Asp Ala Leu Thr Ile Asn Gly
180 185 190

His Pro Gly Phe Leu Tyr Pro Cys Ser Gln Ser Asp Thr Phe Lys Leu
195 200 205

Val Val Glu Lys Gly Lys Thr Tyr Arg Ile Arg Met Val Asn Ala Ala
210 215 220

Met Asn Leu Ile Leu Phe Phe Ala Ile Ala Asn His Lys Leu Thr Val
225 230 235 240

Val Ala Ala Asp Gly His Tyr Thr Lys Pro Leu Thr Ala Ser Tyr Ile
245 250 255

Thr Ile Ser Pro Gly Gln Thr Leu Asp Leu Leu Leu Tyr Ala Asp Gln
260 265 270

Ser Pro Glu Ser Thr Tyr Asn Met Ala Ala Arg Ala Tyr His Ser Asn
275 280 285

Pro Asn Val Gly Phe Asn Asn Ser Thr Thr Val Gly Ile Leu Arg Tyr
290 295 300

Tyr Ser Ser Asn Asp Ala Gly Thr Ser Ser Ser Glu Arg Tyr Pro Tyr
305 310 315 320

Leu Pro Gly Tyr Asn Asp Thr Ser Ala Ala Phe Asp Phe Phe Thr Lys
325 330 335

Ile Lys Gly Leu Tyr Ser Arg Val Ala Pro Ala Lys Val Ser Arg Arg
340 345 350

Ile Ile Thr Thr Val Ser Ile Asn Leu Leu Lys Cys Pro Asn Asp Ser
355 360 365

Cys Ala Gly Pro Asn Gly Ser Arg Leu Ala Ala Ser Met Asn Asn Ile
370 375 380

Ser Phe Val Thr Pro Ser His Val Asp Ile Leu Arg Ala Tyr Tyr Leu
385 390 395 400

His Ile Asn Gly Val Tyr Gly Thr Arg Phe Pro Glu Phe Pro Pro Arg
405 410 415

Ile Phe Asn Phe Thr Ala Asp Asp Gln Pro Leu Phe Leu Gln Thr Pro
420 425 430

Arg Leu Ala Thr Glu Val Lys Lys Phe Gln Tyr Gly Glu Thr Val Glu
435 440 445

Ile Val Ile Gln Gly Thr Ser Leu Val Gly Gly Gly Ile Asp His Pro
450 455 460

Met His Leu His Gly Phe Ser Phe Tyr Val Val Gly Leu Gly Phe Gly
465 470 475 480

Asn Phe Asn Ala Arg Lys Asp Pro Ser Asn Tyr Asn Leu Asp Asp Pro
485 490 495

Pro Tyr Arg Asn Thr Ala Thr Val Pro Arg Asn Gly Trp Ile Ala Ile
500 505 510

Arg Phe Val Ala Asp Asn Pro Gly Val Trp Phe Met His Cys His Phe
515 520 525

Asp Arg His Gln Thr Trp Gly Met Asn Val Val Phe Ile Val Lys Asn
530 535 540

Gly Ile Lys Pro Asn Gln Lys Ile Leu Pro Pro Pro Pro Gly Leu Pro
545 550 555 560

Pro Cys Asp Gln Phe Glu Asn Leu
565

<210> SEQ ID NO 35
<211> LENGTH: 5054
<212> TYPE: DNA
<213> ORGANISM: Thlaspi arvense

<400> SEQUENCE: 35
catgcacgta agaaactaaa tcaacacata aggtaacgag gctcggaata gttgggtttc 60
ggatttttat ttttaaaaag aaagcatcac ctaaccaaaa ctcataaggg catctccata 120
ttaaaaaata caaattaata gaatggaaaa agaaagatag agacgtatct cgtttgaact 180
ttgaaatatg tttagcaacg tatctaatta agtgtcatat tctgattagt ttatattatt 240
tttagatact ctatttaaga tatgcaccgt taaaggtgtt ctaaagcatc ttcatttact 300
ctgatagtat atccaaaact tattataata atataattta tttgtgtaat aaaatattaa 360
attattaaaa gtgtgatgca tatattaaaa atgacagata ttgagaaaca tatctcatgt 420
catgctcttt tctttgaaaa acagttcgta atttctctca ttctctctct ttctttctaa 480
ttaatttttt tattatccag atattctctg aaataccgtt gttgcaaata cttttagaac 540
acctttaaca gtgtataatc tcaaatagaa tatctaagat tttttttat taatataaaa 600 aaattaaact aactaatact tgacacttgg tcagatacat ttctagatag gattctctat 660
ctctctccat cctttccatt attttgtaca ttttaattat tataaattgg tcatatatga 720
ctttcagata ttattctcga attttccatc acttaccaac atttgttaaa ataattttcc 780
gtttaaaata gtttaatagt atatattaac aggttacagg tatgaaaatg actttagtat 840
gagataggga gtcgagagtt tttaaaatat tcgaatactt tagacttctc aaattaccca 900
tttaaaaata ttcaataact tagacttctc gcattaccca aaataccaaa tttgtctgaa 960
accaagctat atctgaattc ttttgtcctg tattttaatt actatacttc gaacagtata 1020

```
ttcagatatc tgaacaattc gttctcacct cttaccttct attactggtt tcaatactcg   1080
aaataaatgc tattgctaaa aagtctgttt gttactttta cactataaat ttagaatgtt   1140
atttccctta agttgaaagt tacgtttgac cgagagatgt caagtatttt caagagtatt   1200
acgattcttt tcagacatag atattctaat taacttttaa agcttacgat acgaagacag   1260
gatttgtgta tgaacatcga tggcataaca acatatcttg aatcttgtcc accagagtta   1320
tctgggggc agttttgaaa atataaaaga tctgtaaggt taataaaaaa aacattatct   1380
tgtaattccg tagttcttat atcgaaactg ttactaattt gagaaagacg tggagagcta   1440
gaggcgtcta taaatatata ttcctctctc agaaatcata atatacctaa tttattaaaa   1500
aagtctctca aaatgtcaca atattccttc ttctatttct tcctaatctc tcttttcctc   1560
tacgaaaatt gcattgcgta tcgctacaca ttcacggtga gttcaaaatt aattaatcaa   1620
tttagtcagg cgtgagtaaa ctaacttaaa actgatggta tataggttat tgaagctcca   1680
tatagcaaac tgtgtagcac gaagaagatt ttgaccgtta atggtcagtt tcctggacca   1740
gtgttaaggg cttacaaagg tgacaccatt tacgttaacg ttcgtaacca agctagtgaa   1800
aatatcacat tgcattggta tttcatccaa aacccttttt ttcgtcttct taattatgta   1860
accattttaa atacaagaac ataaacgaaa tttcgatggt tgaataaaaa caggcatggt   1920
gtagagcagc cgagaaaccc gtggtcagat ggacccgaat acatcacaca atgcccgatt   1980
caacccgggt cagattttac gtacaaaatt ttactttcca tcgaagacgc gactgtttgg   2040
tggcatgcgc atagctcgtg gacacgtgcc accgtacacg gtctgatttt cgtgtatcct   2100
cggcctcctg ataccctgcc ttttccagaa ccggactacg aagtcccctt agtttttggt   2160
acaaaccagg acatataaca aaagatcagt gaagttgctt tttttttttt tttttttttt   2220
atctctctta aattaaaatt aatttcataa aaacttgaca ggagagtggt ggaagaggga   2280
tgtgagagaa gtagtggagg atttcatgag gaacggaggt gaacctaatg tgtccgatgc   2340
tttgactatc aatgggcatc ctggtttctt gtatccttgc tctcaatcag gtttctttta   2400
ctttttccct ttctcctatt aatttcttat tttgttttta atatacagtt gtgggataaa   2460
aactaattgt ggagatgaaa taaaatttag ggatattgat cattgaaaca aattgtgaaa   2520
tgattcaaac gagcattttt tttttcaagt caactgtttt taatttgttt ttcctcgttt   2580
tttcaaaagt ttcttactaa tttagttagt taaacataat taatgtttga tcaaattgtc   2640
caaaaattag ttaagaactt acgagtggtt gataaaaaaa aaatcacgag gcatattaat   2700
tcaaaccaaa atagttgtgt ttgtatttat tagttcttaa aaattgtgct cataaatttg   2760
aaactagcat ttgcatgcat atttatgttt aaaacctagt tagtaaagtc cgttattgac   2820
atgcatacgt tacgtatacg tatgtttaac agatacattc aagctcgtgg tagagaaggg   2880
caaaacctac cgcattcgga tggtaaacgc cgcgatgaac ctaattctct tcttcgccat   2940
cgcgaaccac aaactcaccg tggtcgccgc cgatggccac tacaccaaac ctctaaccgc   3000
tagttatatc accatatctc ctggccaaac gctagacctg ttactatacg ccgaccaaag   3060
tccagagagc acttataaca tggcggccag agcttaccat agcaacccca acgttgggtt   3120
caacaactct accaccgtcg ggatcttacg ttactactct tcaaacgacg ccggaacgtc   3180
ttcatcagaa cgttacccgt accttcctgg ctacaatgac acctcagcag ctttcgattt   3240
cttcacaaaa atcaaaggct tatactccag agtagctccc gccaaagttt cacgtaggat   3300
aatcacgacg gtttcgataa atctcctcaa gtgtcccaac gactcgtgtg caggcccaaa   3360
cgggtcgagg ttagcggcga gtatgaacaa catatcgttc gtcacaccga gccacgtgga   3420
```

catactaaga gcttattacc ttcacattaa cggcgtttac ggaacgcggt ttccggagtt 3480
cccaccgcgg atattcaatt tcacagcgga cgaccaaccg ctgtttttgc agactccgag 3540
gctggcgacg gaggtaaaga agtttcagta cggggagacg gttgagattg ttatacaagg 3600
gacgagtttg gtaggtggtg gaatcgatca tcctatgcat ctccatggtt ttagcttcta 3660
cgtggttggt ttagggtttg ggaattttaa cgcacgtaaa gatccctcca actataatct 3720
agacgatcct ccttacagaa acacggcgac tgtgcccagg aacggttgga tcgctatcag 3780
attcgtagct gacaatccag gtacgtacac ttacataaac ctctaacttt gatttggttc 3840
aaatctcttt ttaatatttt gtgtttttgt aggggtttgg ttcatgcact gtcactttga 3900
tagacatcaa acgtggggta tgaatgttgt cttcattgtt aagaatggaa taaaaccaaa 3960
tcagaagatt ctacctccac cgcctggctt accaccttgt gaccaatttg agaatctata 4020
aatgatttta tagcatgttg cagtattgtg tttgatgtaa taaactactg catatttaca 4080
aaaaaaaata taatcttaaa ttttgttttt atttaattaa ttttcacaag tttttctatc 4140
gtagcagtca taataaggaa agatactccc aagacaaaac agtgtctgaa gtcattattt 4200
taaccctgag cctttctttc tcataatatc ttcaaaagct atagatgtgg tgaagtttac 4260
ctcgctcaca ctgataagtc catgtcttgt accatatcat cataatcttg agggacctct 4320
gcgtgatgga aacgccctgt gcaagtggag tgatgcatct gtgtaatgtg actctgttga 4380
agtgctatag ccttgtggct tctactccag tctcttcggc tccaaaggta taacggtggc 4440
ggcatattgt tccactgctc tatcgtttga tcatttacat ctatcgatcc aggcaagtag 4500
aacgactaca gagcaaaaaa acaaaggaat gtgattgaaa tgtattggtt atactaaacg 4560
agagtttgat tcattagtga acgtacttac catgccagaa agtaatctcg tgtcttccca 4620
aatcaagtca tactcagcta tctcgtcgac cctgtgattg tagaggaaaa caaaggttat 4680
gaaaagtttg taactgacac tctatatttg ctatttacct ttttgtttca cttggtacga 4740
tgaggattag aatcttgggt ctaaactcga gggccttcct gatgaaaatg ttagcaagac 4800
tggatttgta accgaaaggc gggtttaatc ccattatctg tttttactca cgaccaagta 4860
atatctcagt tagtgaattc aaaaagtgta tttcaccttt aggatgttgg ttgcgttttt 4920
taccagtcga gagccatcgg gtaactcttg tttcttcaca ctcaaccaat ctctcttctc 4980
aaagttgaag ttatactgcc atggaaacat agtgtttcag aaacatcttc aaacacaaca 5040
ataaaagagt agtg 5054

<210> SEQ ID NO 36
<211> LENGTH: 1524
<212> TYPE: DNA
<213> ORGANISM: Thlaspi arvense

<400> SEQUENCE: 36
atgagctcca cggagacata tgagcctcta ttgagacggc tccactcaga ttctcagtta 60
accgtaggtt cttcaccgga gatagaggag tttctcggcc gtcgtagatc cacggtgacg 120
ccacggtggt ggctaaggct ggccgtatgg gaatcaaagc ttctttggac gctctctgga 180
gcctccatag tggtctctgt gctgaattac atgctcagct tcgtcaccgt tatgttcatc 240
ggccatcttg gctctcttca gctcgccggc gcatccatcg ccaccgtcgg tatccaaggc 300
ctcgcttacg gtatcatgtt gggaatggcg agcgcggtcc agacagtgtg tggtcaagcg 360
tacggcgcga ggcagtactc atcaatggga ataatttgcc aacgagccat ggtcttgcac 420

```
ctcgcagctg cggtcctcct cacgttcctc tactggtact cgggtccgat cctaaaggcg    480

atgggccaat ccgcagccat cgcacgcgag ggtcaggtct ttgcacgtgg gattattccg    540

cagatttatg cttttgccct cgcttgccct atgcagaggt tcctccaggc tcaaaaaatt    600

gtaaaccctt tggcttacat gtcactagga gttttcgtgc tacacacgct actaacctgg    660

ctggtaacca acgtcctgca tttcggcttg ctcggtgcag ctctggtgct gagtttttcg    720

tggtggcttc tcgcggctgt gaatggtctg tatatcgtga tgagcccgag ttgcaaggaa    780

acttggaccg ggttctcagc tagggcttta agagggattt ggccttactt caagctcacg    840

atagcttcag cagtcatgct atgtttggag atatggtacg tccaagggct agtgattatt    900

tccggtttac tcaccaatcc cacaattgcc ctagacgcaa tttcgatttg catgtattac    960

tggaattggg atatgcagtt catgcttggt ctaagtgcgg caatcactgt ccgagtgagc   1020

aacgagctag gagcgggaaa cccacgagtg gctaagttat cagtggtagt ggttaacatc   1080

acgacggttg tcatcagctt attcctctgt gtcgttgtgc tcgtgttccg cattggcctt   1140

agtaaagcct tcaccagcga cgcagaggtt atagctgcag tctctgatct ctttcccctg   1200

ctcgccgttt ccattttctt aaacggaatc caaccaattc tctctggtgt tgccattgga   1260

agtgggtggc aagcagtggt ggcttatgtg aatcttgtta cttactatgt cattggtctt   1320

cctattggct gtgttcttgg cttcaaaacc agtcttggag ttgcggggat ctggtggggg   1380

atgattgcag gagttatact tcaaacccta actttgattg ttcttacact cagaactaac   1440

tggaattccg aggtggagaa tgcagctcat aggttaaaag cttcagcaaa tgagagtcaa   1500

gaaatggcta ccgaaggaat ctaa                                          1524
```

```
<210> SEQ ID NO 37
<211> LENGTH: 507
<212> TYPE: PRT
<213> ORGANISM: Thlaspi arvense

<400> SEQUENCE: 37

Met Ser Ser Thr Glu Thr Tyr Glu Pro Leu Leu Arg Arg Leu His Ser
1               5                   10                  15

Asp Ser Gln Leu Thr Val Gly Ser Ser Pro Glu Ile Glu Glu Phe Leu
            20                  25                  30

Gly Arg Arg Arg Ser Thr Val Thr Pro Arg Trp Trp Leu Arg Leu Ala
        35                  40                  45

Val Trp Glu Ser Lys Leu Leu Trp Thr Leu Ser Gly Ala Ser Ile Val
    50                  55                  60

Val Ser Val Leu Asn Tyr Met Leu Ser Phe Val Thr Val Met Phe Ile
65                  70                  75                  80

Gly His Leu Gly Ser Leu Gln Leu Ala Gly Ala Ser Ile Ala Thr Val
                85                  90                  95

Gly Ile Gln Gly Leu Ala Tyr Gly Ile Met Leu Gly Met Ala Ser Ala
            100                 105                 110

Val Gln Thr Val Cys Gly Gln Ala Tyr Gly Ala Arg Gln Tyr Ser Ser
        115                 120                 125

Met Gly Ile Ile Cys Gln Arg Ala Met Val Leu His Leu Ala Ala Ala
    130                 135                 140

Val Leu Leu Thr Phe Leu Tyr Trp Tyr Ser Gly Pro Ile Leu Lys Ala
145                 150                 155                 160

Met Gly Gln Ser Ala Ala Ile Ala Arg Glu Gly Gln Val Phe Ala Arg
                165                 170                 175
```

```
Gly Ile Ile Pro Gln Ile Tyr Ala Phe Ala Leu Ala Cys Pro Met Gln
            180                 185                 190

Arg Phe Leu Gln Ala Gln Lys Ile Val Asn Pro Leu Ala Tyr Met Ser
        195                 200                 205

Leu Gly Val Phe Val Leu His Thr Leu Leu Thr Trp Leu Val Thr Asn
    210                 215                 220

Val Leu His Phe Gly Leu Leu Gly Ala Ala Leu Val Leu Ser Phe Ser
225                 230                 235                 240

Trp Trp Leu Leu Ala Ala Val Asn Gly Leu Tyr Ile Val Met Ser Pro
                245                 250                 255

Ser Cys Lys Glu Thr Trp Thr Gly Phe Ser Ala Arg Ala Leu Arg Gly
            260                 265                 270

Ile Trp Pro Tyr Phe Lys Leu Thr Ile Ala Ser Ala Val Met Leu Cys
        275                 280                 285

Leu Glu Ile Trp Tyr Val Gln Gly Leu Val Ile Ile Ser Gly Leu Leu
    290                 295                 300

Thr Asn Pro Thr Ile Ala Leu Asp Ala Ile Ser Ile Cys Met Tyr Tyr
305                 310                 315                 320

Trp Asn Trp Asp Met Gln Phe Met Leu Gly Leu Ser Ala Ala Ile Thr
                325                 330                 335

Val Arg Val Ser Asn Glu Leu Gly Ala Gly Asn Pro Arg Val Ala Lys
            340                 345                 350

Leu Ser Val Val Val Val Asn Ile Thr Thr Val Val Ile Ser Leu Phe
        355                 360                 365

Leu Cys Val Val Val Leu Val Phe Arg Ile Gly Leu Ser Lys Ala Phe
    370                 375                 380

Thr Ser Asp Ala Glu Val Ile Ala Ala Val Ser Asp Leu Phe Pro Leu
385                 390                 395                 400

Leu Ala Val Ser Ile Phe Leu Asn Gly Ile Gln Pro Ile Leu Ser Gly
                405                 410                 415

Val Ala Ile Gly Ser Gly Trp Gln Ala Val Val Ala Tyr Val Asn Leu
            420                 425                 430

Val Thr Tyr Tyr Val Ile Gly Leu Pro Ile Gly Cys Val Leu Gly Phe
        435                 440                 445

Lys Thr Ser Leu Gly Val Ala Gly Ile Trp Trp Gly Met Ile Ala Gly
    450                 455                 460

Val Ile Leu Gln Thr Leu Thr Leu Ile Val Leu Thr Leu Arg Thr Asn
465                 470                 475                 480

Trp Asn Ser Glu Val Glu Asn Ala Ala His Arg Leu Lys Ala Ser Ala
                485                 490                 495

Asn Glu Ser Gln Glu Met Ala Thr Glu Gly Ile
            500                 505
```

<210> SEQ ID NO 38
<211> LENGTH: 4858
<212> TYPE: DNA
<213> ORGANISM: Thlaspi arvense

<400> SEQUENCE: 38

```
accgtttctt tttgttgcgt gtcgagaata atagtcatct atgtgtttta tatatagaga      60

gtcatagact atagaaaaaa tgttataaga ggacaaaatt tcaataaatt gaattagttt     120

aaatttgatc aacaattttt ttatcatctt atttaattct tagatgatta tagtaaacaa     180

ctaagatatc ccagtatcaa tatattcatg cataaataga atgaaattgt attggggggg     240
```

-continued

```
gggggggaata tacattattt aattatatag attgtcatca agtaattaaa taaaatacca    300
aaatgacatt aaccataaca aagtgaatat gctgctgcat atttgtaaga aatcaaaaga    360
aactttgcag catataatta ctcgatgact aatacaagta tattgtgttg aaatttgatg    420
tagtgtggaa tagttaagat tatttagaaa ataaaaccac ttttaataat tacctgaaaa    480
tgagtaataa tcttctaatt tggtggggcc atccgaccta atagacaact cattgatttc    540
atcttacgtc agggacagtt cataaaatgc aaataattgt cttttttttt ggtaatgatt    600
gtctttaatc tttattttgt agattaacag attatattat tcctttttct ttcttactgt    660
tcttcagatt atttggatgg tttcagttgg gcctcaggag cagaccggta aatgggttgg    720
aggactattg gtgggccaca tttctgaaaa gcatttcttc ctctcaaaag ctcattatta    780
tgagtatctt tttatacggt agaaaggagt acataagtgg taacataaaa tatattctgc    840
caaaaaagtt agttgattct tcttaatcac tactcctttt cttgataatt atctacgtgg    900
gaaacactat ttgtcctccc cccatttaat ttggttgaaa gtcttgagac tagaggttgg    960
ctcaatccaa aatcgttgac gaacgttagg tatcgttatc aactacaact cttttttttca  1020
ctgaggtacc gttatattta tatacctacc tagttttact cttgtgcaca aggatatttc   1080
ggttcggttt gatatctttc tcgatcttga agaaatatta ccaatttgga gcttatacat   1140
tcctcggtct ggtatcattc aacaaagttt ttggtttggt ttgtttaaca aataaatatga  1200
atgtgtgttt agtcgtccct taggtatttc tcaatctctt tcttttaagc ttcactttct   1260
taataagcca ttaagtaacg taactagaga atggttgtta cactatacac taacaaaaat   1320
cagaccaaac agtcatgaaa gatcttaacc atcaattccg tttcggtcaa cgactcgaac   1380
cctcagcata accaaaacaa acagtcgtaa tataaacacg cccggtctat aactataaca   1440
aaataacggc aaaagaaaga aaatacgaga aaaagaagaa gacgaacaaa caaacggacc   1500
atgagctcca cggagacata tgagcctcta ttgagacggc tccactcaga ttctcagtta   1560
accgtaggtt cttcaccgga gatagaggag tttctcggcc gtcgtagatc cacggtgacg   1620
ccacggtggt ggctaaggct ggccgtatgg gaatcaaagc ttctttggac gctctctgga   1680
gcctccatag tggtctctgt gctgaattac atgctcagct tcgtcaccgt tatgttcatc   1740
ggccatcttg gctctcttca gctcgccggc gcatccatcg ccaccgtcgg tatccaaggc   1800
ctcgcttacg gtatcatggt atgtgcttta gagagtaaac gacgttgacg tcgttcgatg   1860
ttatagcttc acattcattt gcttatcatt ttgtaatata gtaaatccgg gttttgaatt   1920
aggtttctca atattttgac cattttatga ataccagcaa ccataataaa aatacaaact   1980
gtcggatcag ttttgttctc catttgagat ccgattttgg tctttcagat gcaaaccata   2040
ttaggataca gttcggtttt catgtcggct attttggtcc ggtttatcat ttttgatcaa   2100
tcttagcctt aggcatctcc caactgtttt tatgtatcaa atgtactagt tgggaatggc   2160
gagcgcggtc cagacagtgt gtggtcaagc gtacggcgcg aggcagtact catcaatggg   2220
aataatttgc caacgagcca tggtcttgca cctcgcagct gcggtcctcc tcacgttcct   2280
ctactggtac tcgggtccga tcctaaaggc gatgggccaa tccgcagcca tcgcacgcga   2340
gggtcaggtc tttgcacgtg ggattattcc gcagatttat gcttttgccc tcgcttgccc   2400
tatgcagagg ttcctccagg ctcaaaaaat tgtaaaccct ttggcttaca tgtcactagg   2460
agttttcgtg ctacacacgc tactaacctg gctggtaacc aacgtcctgc atttcggctt   2520
gctcggtgca gctctggtgc tgagtttttc gtggtggctt ctcgcggctg tgaatggtct   2580
gtatatcgtg atgagcccga gttgcaagga aacttggacc gggttctcag ctagggcttt   2640
```

aagagggatt tggccttact tcaagctcac gatagcttca gcagtcatgc tatggtaaat 2700
gtctttaatc taaacacaaa tctgtatgat ttgaccggtt aaaatttatg gtttgaagaa 2760
agctgatata taccaattta aaatgaaata tctgcagttt ggagatatgg tacgtccaag 2820
ggctagtgat tatttccggt ttactcacca atcccacaat tgccctagac gcaatttcga 2880
tttggtactc ctttcacccg agatttatca tatgccgacg aacctcaacg gttacgtctt 2940
aacccggtta agtgattttg cagcatgtat tactggaatt gggatatgca gttcatgctt 3000
ggtctaagtg cggcaatcac gtaacaaaac aaaattaaaa atggcatgta gtttttaatt 3060
taaatgatcc atttgcaaaa accgtgccgt ttttgtgtgt tttgtgttag tgtccgagtg 3120
agcaacgagc taggagcggg aaacccacga gtggctaagt tatcagtggt agtggttaac 3180
atcacgacgg ttgtcatcag cttattcctc tgtgtcgttg tgctcgtgtt ccgcattggc 3240
cttagtaaag ccttcaccag cgacgcagag gttatagctg cagtctctga tctctttccc 3300
ctgctcgccg tttccatttt cttaaacgga atccaaccaa ttctctctgg taaaaacaca 3360
cacaagaaaa agaggctctt ttgtgaattt tggtttgttg attgatcttt gctctatgga 3420
ttcaaaggtg ttgccattgg aagtgggtgg caagcagtgg tggcttatgt gaatcttgtt 3480
acttactatg tcattggtct tcctattggc tgtgttcttg gcttcaaaac cagtcttgga 3540
gttgcggtat aatctctttt actctttctt tgtgtttata tgtattgtat gcatcataag 3600
agatgggagg tatttcatta caggggatct ggtgggggat gattgcagga gttatacttc 3660
aaaccctaac tttgattgtt cttacactca gaactaactg gaattccgag gtaaaacaat 3720
caccaaatct ctcttttttt ctctaaatac tccaaagtcc ttacctttac tctgcatctc 3780
ttacaggtgg agaatgcagc tcataggtta aaagcttcag caaatgagag tcaagaaatg 3840
gctaccgaag gaatctaaca gcaactctgt tcttttctcc tctcttttgt tggcaagaga 3900
tatgaaataa ataccttctg tttattagga ttcagtaaca tatttcattt cgttaaacta 3960
cagacaaaaa ataatggaca aactacttaa tcctcttctg caaaatcttt cttctgcctt 4020
tagatgatta caaaaatcaa aactttctcg ttgttttcat aaccccacaa gtttttccgt 4080
ctgtgagcta acataagcca aagacttttc ttgtgtttta tcatacaaca cagtttctct 4140
tgcatcatca tcaccatctc cttcatagtc ctcctcatcc tcatcctcat cctcatcatc 4200
actactcaca tcgacatcat catcatcatc atcatcatca tcagatctgt agactccagc 4260
aatgatggtt gtagtctcat ctctgagacc agtaagttct ttagcttcct ctagctcatc 4320
ttgagttgaa gccaatgaca aaagcacatt cttcgctttc tgatcaggtg gtaccccaca 4380
actctccatc tccttgtacc aactaagagc gctcccgaaa tccttgcacc tcccagacgc 4440
atccatgata gtcgttatga tggtttgatt cgctttgatg ccacttaacc tcattttctc 4500
atatacctcc ataattttat caagatcgtt tgctttcgca tagcctttta tcattgtccc 4560
ataggtgact atattcggct caaaaccatc tacctttatc ctcttgaaga atttctcagc 4620
accctccatg tccgaagcat tcacatacgc tgataacata gttgtgtaag accagagatc 4680
cgggaaaaat ctgcaaaggg aattatgttt tgttaccaat ctaaaacaga gaagcaacac 4740
agttcacatg atagaattat tctttacctg tcacgtcgca tgctttgaaa aacggtcttt 4800
gcttgatcca ccattccaga aatagcgaat gcatcaagca aaatgttata agctttat 4858

<210> SEQ ID NO 39
<211> LENGTH: 2214
<212> TYPE: DNA

<213> ORGANISM: Thlaspi arvense

<400> SEQUENCE: 39

```
atgcttccat taatggcgat accacttgcg acttgcagga gcatcaactg gtcagccacg      60
gaaaggattc ctgtttcgct tctgttccgg agtattcttc tccaagacga cgaagtttgt     120
agcgctgtgc cactataccg gatcctcgat cagaatgacg ggcaacttgg tcctataagt     180
atggccgagg aatcagacaa accattgctg gatcctgata ctctcaacag agaaggaatt     240
gacttgggtc tgttgccatt ggaggaggtt tttgaatacc taagaacatc tccacggggg     300
cttttatctg gagatgctga agaaagattg acgatatttg gtcctaacag ccttgaagag     360
aaacgggaga acaagtttct gaagttccta ggttttatgt ggaatccttt gtcatgggtt     420
atggaagctg cagcattgat ggccatcgcc ctagcagata gtgaagtaga gactatcagt     480
cttttgctat accatttctg ctcagtgctg accggagaat cgctacctgt gaccaagaag     540
aagggtgagc aagtcttctc tggctctact tgtaagcaag gtgagataga agctgttgtg     600
atagccaccg gttcgagcac tttctttggt aaaacagcat ctttggtgga cagcacagat     660
gcaactggac attttcagca ggttctaagc ttgtgccagc agaaaaatga gattgcgcaa     720
agagtttatg ccatcataaa tagatttgca gaaaaaggtt tgaggtctct tgctgttgct     780
tatcaggaaa ttccagagag aagcagcaac agtcctggag gaccatggtt gttctgtggt     840
ctgttgccac tgtttgatcc tccaaggcat gacagtgctg aaaccatact gagagctctt     900
aaccttggag tttgtgttaa gatgatcacc ggtgatcagt tggcgattgc aaaggagaca     960
ggaaggcgac ttgggatggg aaccaatatg tatccttctt cctctttgtt aggccacaac    1020
aacgatgatc acgaagccat tccattggat gagcttattg aaatggcaga tggatttgct    1080
ggagtgttcc ctgaacacaa gtatgagatt gtaaagatat tacaagaaaa gaagcatgtg    1140
gttggaatga ccggagatgg tgtgaatgat gctcctgctc tgaaaaaggc tgacattgga    1200
atagctgtcg ctgatgcaac agatgccgca agaagttctg ctgacattgt actaactgag    1260
cctggcttaa gtgtaattat cagtgctgtc ttgaccagca gagccatttt ccagcgtatg    1320
aagaactata cagtatatgc agtctcgatc accatacgaa tagtgctcgg ttttacactt    1380
ttagcgttga tatgggaata cgactttcca cctttcatgg ttttgataat cgcaatactc    1440
aatgacggga ccatcatgac tatctctaaa gatcgagtaa ggccatctcc tacacccgag    1500
agttggaagc tcaaccagat atttgcgact ggaattgtca ttggaacata ccttgcattg    1560
gtcactgtcc tattctactg gatcattgtc tctaccacct tcttcgagaa acacttccat    1620
gtaaaatcaa tcggcaacaa cagtgaacaa gtctcatccg ctctgtatct ccaagtaagc    1680
atcatcagtc aagcactcat atttgtaaca cgtagtcgaa gctggtcttt tcttgaacgt    1740
cccgggactc tcctgatttt cgccttcctt gttgcccaac ttgccgctac attgattgct    1800
gtctatgcca acatcagctt tgctaacatc accggcattg gatggggatg ggcaggtgtt    1860
atatggttat acagtttgat tttttacata cctcttgata ttataaagtt cttcttccac    1920
tacgcattga gtggagatgc ttggaacctt gtatttgacc gtaagacagc atttactaat    1980
aagaaagatt atagaaaaga tgacggagcg tccaatgtaa ccatctctca gagaagtcac    2040
tctgcagaag aactcagtgg aagtcgttct cgcgcatctt ggatcgctga gcagaccaga    2100
aggcgtgcag aaaccgccag gctcttggag ggacactcgg tgtcaaggca tttggaatca    2160
gtaatgaagc tcaaacaaat tgaccccaag atgattcgtg cagacactgt ctaa          2214
```

<210> SEQ ID NO 40
<211> LENGTH: 737
<212> TYPE: PRT
<213> ORGANISM: Thlaspi arvense

<400> SEQUENCE: 40

```
Met Leu Pro Leu Met Ala Ile Pro Leu Ala Thr Cys Arg Ser Ile Asn
1               5                   10                  15

Trp Ser Ala Thr Glu Arg Ile Pro Val Ser Leu Leu Phe Arg Ser Ile
            20                  25                  30

Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125

Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160

Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Leu Gly Val
    290                 295                 300

Cys Val Lys Met Ile Thr Gly Asp Gln Leu Ala Ile Ala Lys Glu Thr
305                 310                 315                 320

Gly Arg Arg Leu Gly Met Gly Thr Asn Met Tyr Pro Ser Ser Ser Leu
                325                 330                 335

Leu Gly His Asn Asn Asp Asp His Glu Ala Ile Pro Leu Asp Glu Leu
            340                 345                 350

Ile Glu Met Ala Asp Gly Phe Ala Gly Val Phe Pro Glu His Lys Tyr
        355                 360                 365

Glu Ile Val Lys Ile Leu Gln Glu Lys Lys His Val Val Gly Met Thr
    370                 375                 380
```

Gly Asp Gly Val Asn Asp Ala Pro Ala Leu Lys Lys Ala Asp Ile Gly
385 390 395 400

Ile Ala Val Ala Asp Ala Thr Asp Ala Ala Arg Ser Ser Ala Asp Ile
405 410 415

Val Leu Thr Glu Pro Gly Leu Ser Val Ile Ile Ser Ala Val Leu Thr
420 425 430

Ser Arg Ala Ile Phe Gln Arg Met Lys Asn Tyr Thr Val Tyr Ala Val
435 440 445

Ser Ile Thr Ile Arg Ile Val Leu Gly Phe Thr Leu Leu Ala Leu Ile
450 455 460

Trp Glu Tyr Asp Phe Pro Pro Phe Met Val Leu Ile Ile Ala Ile Leu
465 470 475 480

Asn Asp Gly Thr Ile Met Thr Ile Ser Lys Asp Arg Val Arg Pro Ser
485 490 495

Pro Thr Pro Glu Ser Trp Lys Leu Asn Gln Ile Phe Ala Thr Gly Ile
500 505 510

Val Ile Gly Thr Tyr Leu Ala Leu Val Thr Val Leu Phe Tyr Trp Ile
515 520 525

Ile Val Ser Thr Thr Phe Phe Glu Lys His Phe His Val Lys Ser Ile
530 535 540

Gly Asn Asn Ser Glu Gln Val Ser Ser Ala Leu Tyr Leu Gln Val Ser
545 550 555 560

Ile Ile Ser Gln Ala Leu Ile Phe Val Thr Arg Ser Arg Ser Trp Ser
565 570 575

Phe Leu Glu Arg Pro Gly Thr Leu Leu Ile Phe Ala Phe Leu Val Ala
580 585 590

Gln Leu Ala Ala Thr Leu Ile Ala Val Tyr Ala Asn Ile Ser Phe Ala
595 600 605

Asn Ile Thr Gly Ile Gly Trp Gly Trp Ala Gly Val Ile Trp Leu Tyr
610 615 620

Ser Leu Ile Phe Tyr Ile Pro Leu Asp Ile Ile Lys Phe Phe Phe His
625 630 635 640

Tyr Ala Leu Ser Gly Asp Ala Trp Asn Leu Val Phe Asp Arg Lys Thr
645 650 655

Ala Phe Thr Asn Lys Lys Asp Tyr Arg Lys Asp Asp Gly Ala Ser Asn
660 665 670

Val Thr Ile Ser Gln Arg Ser His Ser Ala Glu Glu Leu Ser Gly Ser
675 680 685

Arg Ser Arg Ala Ser Trp Ile Ala Glu Gln Thr Arg Arg Arg Ala Glu
690 695 700

Thr Ala Arg Leu Leu Glu Gly His Ser Val Ser Arg His Leu Glu Ser
705 710 715 720

Val Met Lys Leu Lys Gln Ile Asp Pro Lys Met Ile Arg Ala Asp Thr
725 730 735

Val

<210> SEQ ID NO 41
<211> LENGTH: 5382
<212> TYPE: DNA
<213> ORGANISM: Thlaspi arvense

<400> SEQUENCE: 41
atgcttccat taatggcgat accacttgcg acttgcagga gcatcaactg gtcagccacg 60
gaaaggtggt ttcaattttc attcgtggac cctttttaag gattcctgtt tcgcttctgt 120

```
tccggagtat tcttctccaa gacgacgaag tttgtagcgc tgtgccacta taccggatcc    180
tcgatcagaa tgacgggcaa cttggtcgta acatagtggt ttaagttcgt gtgtagctcg    240
tactatgttt tgatggtttg ctattacctt agaattttaa ataattatct tatgtacatc    300
gacgaagtta cggtttttgc tattgttcac tagttccaag gtgtggatcg aatctaggaa    360
tgtgggcttt gaagtggtac ttgtaccgtg gattttgaag ctataagtat ggccgaggaa    420
tcagacaaac cattgctgga tcctgatact ctcaacagag aaggaattga cttggtaaat    480
gatgtgtggt tcctttactt ttattaaaat tcttggattc tttagtggca aaaatggttt    540
tgacgcttga gctggacagg gtctgttgcc attggaggag gtttttgaat acctaagaac    600
atctccacgg gggcttttat ctggagatgc tgaagaaaga ttgacgatat ttggtcctaa    660
cagccttgaa gagaaacggg taataaaaag cttatcgtca aagtttttcc atagtgttcc    720
tgcctaagac aggagagaag cttactagtt ctgagatctt attcattatg aacactcttc    780
atttcttttt cacatattat ccttaggcca cacactgatt tttctgccaa gttgtggttc    840
tttacattag ctcttgtata atatgttagt gttgtcctaa tgacactgaa aacgaaacga    900
tacaggagaa caagtttctg aagttcctag gttttatgtg gaatcctttg tcatgggtta    960
tggaagctgc agcattgatg gccatcgccc tagcagatag tgaagtagag actatcagtc   1020
ttttgctata ccatttctgc gtacatgaga gtttatgaaa tcgtttctgc tcttgaaact   1080
catggtgaaa aatgtttatt acagagctta ggtcctgact gggaagactt tgttggaatc   1140
gtttgccttt tactgatcaa cgcaacaatc agcttctttg aagaaaacaa tgctgggaat   1200
gctgctggag ctcttatggc tcgcctggct ccaaaaacaa gagtctgctt cttcacctta   1260
tgcattttca ctcttattac cttaaatctg atcaagatcc actcttgata ggttcttaga   1320
gatggacagt ggcaagagca agacgcgtct atcttggtac ctggtgatat tattagcata   1380
aagcttgggg atatcattcc tgcagatgct cgccttcttg aaggagaccc cttgaaaatt   1440
gatcaggcac gcacagatta tatttagcgc taagtcacat ttcttctctc ttagtacatt   1500
atgtaaagac tgtatctgac agaatattcc tgcagtcagt gctgaccgga gaatcgctac   1560
ctgtgaccaa gaagaagggt gagcaagtct tctctggctc tacttgtaag caaggtgaga   1620
tagaagctgt tgtgatagcc accggttcga gcactttctt tggtaaaaca gcatctttgg   1680
tggacagcac agatgcaact ggacattttc agcaggttct ttattgttcc ttaactccct   1740
tttctggttg aaacagtctg actggtaaaa gaccaaacct tgtaaagctg tgaatacctt   1800
tgcaagaaca tgacatgttt ctgtgacatg ttttccttat aggttcttac gtcaattggg   1860
aacttctgca tttgctcaat tgctgttgga atggttcttg aaatcattgt catgttccct   1920
atacaacatc gctcatacag aattgggatc aataaccttc ttgtactact gattggaggg   1980
atacccattg ccatgcccac tgtactatct gtcacgcttg ccattggatc tcatcgactc   2040
tcacaacagg tgtcgtttct cttgactgat taactgtaac agagtgaacc aagaagaatc   2100
caacttttaa gcttctgtag aactttttgt tagcaatata atatgtgttt cttgttgttt   2160
taaaagggtg ccatcacgaa aaggatgacg gcgatagagg aaatggctgg gatggatgtc   2220
ctctgctgtg ataaaactgg aacccttacc ttgaacagtc tcaccgttga tagaaatctt   2280
attgaggtac caaccaatac ttcccatgtg acttgcattt caaagtccaa agagtacagt   2340
taacaacagt tgcctccatc tttacaggtt ttcgatgact acatggacaa ggacacaatt   2400
ttgctgcttg caggcagagc ttcacggtta gaaaaccagg atgccataga tgcagcaatt   2460
```

-continued

```
gttagcatgc ttgctgatcc gaaagaggtg gagatgtttc ttttacataa actctgtttt   2520
atgaaaatat tgtcatcttc tttagaagtt ttacttatta gaaaaggttg tttatcttta   2580
ggcacgtgca aacattaaag aaattcattt cttgccattc aatcctgtgg acaaacgtac   2640
agcaataaca tatattgact ccgatggaaa atggtatcgc gctagcaaag gagctcccga   2700
acaggtaaca aagaatcacc ctatactact tggcactttc aaaactgact ctagatgtaa   2760
aaaaatgaaa gttcttttat atataggtcc ataaaagata tatcatcact gattcaattc   2820
caactgtact gtatacatag gttctaagct tgtgccagca gaaaaatgag attgcgcaaa   2880
gagtttatgc catcataaat agatttgcag aaaaaggttt gaggtctctt gctgttgctt   2940
atcaggtaaa atatttctgt tatccctttt ctctcttgat atggttttta ttgtaagtgt   3000
actatttggg gaagaagctt ataatgacat tagttatact cattcaatca ttttaatcat   3060
tgtttctagg aaattccaga gagaagcagc aacagtcctg gaggaccatg gttgttctgt   3120
ggtctgttgc cactgtttga tcctccaagg catgacagtg ctgaaaccat actgagagct   3180
cttaaccttg gagtttgtgt taagatgatc accggtaatt ctgaacccta gagcaggctt   3240
gcttgggacc acagaggaac agacacgctc tcatggtgaa aatctgataa gtttggataa   3300
aaaaaatgta ggtgatcagt tggcgattgc aaaggagaca ggaaggcgac ttgggatggg   3360
aaccaatatg tatccttctt cctctttgtt aggccacaac aacgatgatc acgaagccat   3420
tccattggat gagcttattg aaatggcaga tggatttgct ggagtgttcc ctggtcatac   3480
tcacaacaca gcgcttatat cttaccgagt ttcagatttt ctctctttta ctgatcccag   3540
tttcttttga tggctctcat gtttcagaac acaagtatga gattgtaaag atattacaag   3600
aaaagaagca tgtggttgga atgaccggag atggtgtgaa tgatgctcct gctctgaaaa   3660
aggctgacat tggaatagct gtcgctgatg caacagatgc cgcaagaagt tctgctgaca   3720
ttgtactaac tgagcctggc ttaagtgtaa ttatcagtgc tgtcttgacc agcagagcca   3780
ttttccagcg tatgaagaac tatacagtaa gtactaaaga caactatcat ctgattccac   3840
attgctaaag ataagcaaat ccatgtaata taggatatga atttcaagta gtttaatgaa   3900
attctgaagt ttcttttggt ttcctctgca ggtatatgca gtctcgatca ccatacgaat   3960
agtggtaagg agcttcaaga tacacgatct aacttgctaa gttacatcta cttgagcctt   4020
ctcttcttat cattgtttca tgcagctcgg ttttacactt ttagcgttga tatgggaata   4080
cgactttcca cctttcatgg ttttgataat cgcaatactc aatgacggta atcttttaat   4140
cctctcaata gcttcatgtt tgaattgttg atgttaaaaa ctctaaattc ttaacacttt   4200
caagtgctct tgtttatctc ctacgcaaca gggaccatca tgactatctc taaagatcga   4260
gtaaggccat ctcctacacc cgagagttgg aagctcaacc agatatttgc gactggaatt   4320
gtcattggaa cataccttgc attggtcact gtcctattct actggatcat tgtctctacc   4380
accttcttcg aggtatcttc ccgtcgctcg aaagtaatca aattcgattt gcttaccgag   4440
aaaaacgcat aaccatgacc atccctgaat cttaaatggc tgcagaaaca cttccatgta   4500
aaatcaatcg gcaacaacag tgaacaagtc tcatccgctc tgtatctcca agtaagcatc   4560
atcagtcaag cactcatatt tgtaacacgt agtcgaagct ggtcttttct tgaacgtccc   4620
gggactctcc tgattttcgc cttccttgtt gcccaacttg taagaactct tcatgtttaa   4680
cctttttcca tcacagaata ctacatacag catacatagg tcttggtttt gatttgtccg   4740
ttttcatgta cacaggccgc tacattgatt gctgtctatg ccaacatcag ctttgctaac   4800
atcaccggca ttggatgggg atgggcaggt gttatatggt tatacagttt gatttttttac   4860
```

atacctcttg atattataaa gttcttcttc cactacgcat tgagtggaga tgcttggaac 4920
cttgtatttg accgtaaggt tagtgcatgt cttgtcctct gtctcagact ttaactctgt 4980
ttttttctta aaagacaaag agtgttggtt ttgtcttgca gacagcattt actaataaga 5040
aagattatag aaaagatgac ggagcgtcca atgtaaccat ctctcagaga agtcactctg 5100
cagaagaact cagtggaagt cgttctcgcg catcttggat cgctgagcag accagaaggc 5160
gtgcagaaac cgccaggttc tcttttgtct atacgacttt ttttgggttt ctctttcatt 5220
tcacatacta ccagaaccat ctctggtcca cagaaaatag aaacttagtt tttttgttca 5280
tttgataggc tcttggaggg acactcggtg tcaaggcatt tggaatcagt aatgaagctc 5340
aaacaaattg accccaagat gattcgtgca gacactgtct aa 5382

<210> SEQ ID NO 42
<211> LENGTH: 1857
<212> TYPE: DNA
<213> ORGANISM: Thlaspi arvense

<400> SEQUENCE: 42
atggagagta gtgtagttaa tcatccattg caagaagatg agaagggttt ttctgatgaa 60
gataatgctg taaataatga gaaagagagt ttattgcaaa catctggctc tgtagagaat 120
gctcctgaag gttctggtcg ttcttcggat tggcgtaggg gactagacca ctgcataact 180
gcacctgttg gtctctatgg agatatggta atcgatgaca atgaggttaa gtactctcgg 240
tccataacag agagattgtc ccctgcgagt cataattcaa aattagatcg attatcggag 300
cgggaaaagc aaaaactcat tgttgagcta gtcagaatac aaaatgacgg gaccgtggaa 360
gttgatatag ataacggtac accggtatcg gagttattgg agtttcagcc aaccaaaggg 420
cagccaacaa tcacatatga aaagtcattt gctgattcct ttagatcaat tccaagatta 480
aaaattgtga tacttgtggt tggaactcgc ggtgatgtgc agcctttctt ggccatggca 540
aagcgcctcc aggagtttgg tcatcgtgtt aggttggcaa ctcatgcaaa tttctgctct 600
tttgtacgat ctgctggagt agagttctat cccttgggtg gtgatcctcg agaactagct 660
ggatatatgg ctagaaataa aggtctgatt ccttctgggc ctggagaaat agcaaaacag 720
agaaaacagt tgagggcaat tatagagtct cttcttccgg cttgcacaga gcctgatatg 780
caaactgctg cctctttcag agctcaagca ataattgcaa accctcctgc gtatggacat 840
gtgcatgttg ctgaagctct aggagtacca attcacattt ttttcacaat gccttggacg 900
ccaactcatg aatttcccca ccctttggcc cgagttcctc aaagtcctgc gtattggcta 960
tcatatatag ttgttgatct gatggtatgg tggagcataa ggacatacat aaatgatttt 1020
aggaagagga agctaaacct tgcacctttc gcatatttca gcacatacca tggctcaatt 1080
tctcacttgc ctactgctta catgtggagt ccccatgttg tgccaaaacc aagtgattgg 1140
ggtcctttag ttgatgttgt tgggtattgt ttcttgagcc ttggatcgaa gtaccaacct 1200
cgtgaagatt ttatccactg gatagaaaga ggatcaccgc ccgtatatat tggtttcgga 1260
agcatgcctc ttgacaatcc gaaaaaaaca atggatatta tactggaaac actgagagat 1320
acagaacaca gagggatagt tgatcgaggt tggggtggcc ttggaaacct tgctgaagtt 1380
cctgaaaatg tattcctctt ggaggactgt cctcatgatt ggttgtttcc tcaatgttca 1440
gctgtgattc atcatggagg tgctggaacc acagcgactg gactaaaagc tgggtgtcca 1500
acaacaatcg tgccgttctt tggggatcag ttcttctggg gtgacaggat ctatgagaaa 1560

```
ggacttgggc ctgcgccaat accaatagct cagctcaatg ttgagaacct ctgcaattcc   1620

ataagattca tgcttcaacc agaggtgaaa tcacgagtga tggaactagc gaaagtactg   1680

gagaacgagg acggtgtagc tgcagctgtt gatgcattcc acaggcattt gccactggct   1740

ctgccactcc cggagtcctc gccggagaaa agacacgaag atgatcgacc agacctgtta   1800

cagtggttct tcatccagat tggtaaaaag tgttgccttc catgtggtgg tgtgtga      1857
```

<210> SEQ ID NO 43
<211> LENGTH: 618
<212> TYPE: PRT
<213> ORGANISM: Thlaspi arvense

<400> SEQUENCE: 43

```
Met Glu Ser Ser Val Val Asn His Pro Leu Gln Glu Asp Glu Lys Gly
1               5                   10                  15

Phe Ser Asp Glu Asp Asn Ala Val Asn Asn Glu Lys Glu Ser Leu Leu
            20                  25                  30

Gln Thr Ser Gly Ser Val Glu Asn Ala Pro Glu Gly Ser Gly Arg Ser
        35                  40                  45

Ser Asp Trp Arg Arg Gly Leu Asp His Cys Ile Thr Ala Pro Val Gly
    50                  55                  60

Leu Tyr Gly Asp Met Val Ile Asp Asp Asn Glu Val Lys Tyr Ser Arg
65                  70                  75                  80

Ser Ile Thr Glu Arg Leu Ser Pro Ala Ser His Asn Ser Lys Leu Asp
                85                  90                  95

Arg Leu Ser Glu Arg Glu Lys Gln Lys Leu Ile Val Glu Leu Val Arg
            100                 105                 110

Ile Gln Asn Asp Gly Thr Val Glu Val Asp Ile Asp Asn Gly Thr Pro
        115                 120                 125

Val Ser Glu Leu Leu Glu Phe Gln Pro Thr Lys Gly Gln Pro Thr Ile
    130                 135                 140

Thr Tyr Glu Lys Ser Phe Ala Asp Ser Phe Arg Ser Ile Pro Arg Leu
145                 150                 155                 160

Lys Ile Val Ile Leu Val Val Gly Thr Arg Gly Asp Val Gln Pro Phe
                165                 170                 175

Leu Ala Met Ala Lys Arg Leu Gln Glu Phe Gly His Arg Val Arg Leu
            180                 185                 190

Ala Thr His Ala Asn Phe Cys Ser Phe Val Arg Ser Ala Gly Val Glu
        195                 200                 205

Phe Tyr Pro Leu Gly Gly Asp Pro Arg Glu Leu Ala Gly Tyr Met Ala
    210                 215                 220

Arg Asn Lys Gly Leu Ile Pro Ser Gly Pro Gly Glu Ile Ala Lys Gln
225                 230                 235                 240

Arg Lys Gln Leu Arg Ala Ile Ile Glu Ser Leu Leu Pro Ala Cys Thr
                245                 250                 255

Glu Pro Asp Met Gln Thr Ala Ala Ser Phe Arg Ala Gln Ala Ile Ile
            260                 265                 270

Ala Asn Pro Pro Ala Tyr Gly His Val His Val Ala Glu Ala Leu Gly
        275                 280                 285

Val Pro Ile His Ile Phe Phe Thr Met Pro Trp Thr Pro Thr His Glu
    290                 295                 300

Phe Pro His Pro Leu Ala Arg Val Pro Gln Ser Pro Ala Tyr Trp Leu
305                 310                 315                 320

Ser Tyr Ile Val Val Asp Leu Met Val Trp Trp Ser Ile Arg Thr Tyr
```

```
                325                 330                 335

Ile Asn Asp Phe Arg Lys Arg Lys Leu Asn Leu Ala Pro Phe Ala Tyr
            340                 345                 350

Phe Ser Thr Tyr His Gly Ser Ile Ser His Leu Pro Thr Ala Tyr Met
        355                 360                 365

Trp Ser Pro His Val Val Pro Lys Pro Ser Asp Trp Gly Pro Leu Val
    370                 375                 380

Asp Val Val Gly Tyr Cys Phe Leu Ser Leu Gly Ser Lys Tyr Gln Pro
385                 390                 395                 400

Arg Glu Asp Phe Ile His Trp Ile Glu Arg Gly Ser Pro Pro Val Tyr
                405                 410                 415

Ile Gly Phe Gly Ser Met Pro Leu Asp Asn Pro Lys Lys Thr Met Asp
            420                 425                 430

Ile Ile Leu Glu Thr Leu Arg Asp Thr Glu His Arg Gly Ile Val Asp
        435                 440                 445

Arg Gly Trp Gly Gly Leu Gly Asn Leu Ala Glu Val Pro Glu Asn Val
    450                 455                 460

Phe Leu Leu Glu Asp Cys Pro His Asp Trp Leu Phe Pro Gln Cys Ser
465                 470                 475                 480

Ala Val Ile His His Gly Gly Ala Gly Thr Thr Ala Thr Gly Leu Lys
                485                 490                 495

Ala Gly Cys Pro Thr Thr Ile Val Pro Phe Phe Gly Asp Gln Phe Phe
            500                 505                 510

Trp Gly Asp Arg Ile Tyr Glu Lys Gly Leu Gly Pro Ala Pro Ile Pro
        515                 520                 525

Ile Ala Gln Leu Asn Val Glu Asn Leu Cys Asn Ser Ile Arg Phe Met
    530                 535                 540

Leu Gln Pro Glu Val Lys Ser Arg Val Met Glu Leu Ala Lys Val Leu
545                 550                 555                 560

Glu Asn Glu Asp Gly Val Ala Ala Ala Val Asp Ala Phe His Arg His
                565                 570                 575

Leu Pro Leu Ala Leu Pro Leu Pro Glu Ser Ser Pro Glu Lys Arg His
            580                 585                 590

Glu Asp Asp Arg Pro Asp Leu Leu Gln Trp Phe Phe Ile Gln Ile Gly
        595                 600                 605

Lys Lys Cys Cys Leu Pro Cys Gly Gly Val
    610                 615
```

<210> SEQ ID NO 44
<211> LENGTH: 7708
<212> TYPE: DNA
<213> ORGANISM: Thlaspi arvense

<400> SEQUENCE: 44

```
ctaaaagagc atgagcagca ccgcgatcat catcggaata gtccgccacc aacgcaattg     60

aactaagaaa ggctacaaaa ctgctttaaa tccatcctgc tgcttattcc ttttgcgtgt    120

ggccgccaga agaagatgag aaaacttact ttcaccatta gaaattagaa taaagagtca    180

ccgaaagtga aagtgaatag gatattcacc agaccgcctt tgagaagcgc cagttctgca    240

gatcctgcat ctcaatcact caagataact cccaaatctc aaatcaactc cgctaaagaa    300

acttcctctt cgcaatcacg acgatttatt aacagaaaag agaaggaatt gctctttcgg    360

gagaagatcc agcataacta acggaaagag tttcatcaaa ttcgtctgga ataaagatga    420

aaacaagcaa aaggaaaacc gaacgttgtc ggagaactta gaatcctata aacggaaaat    480
```

```
aaaatccgat caacggaaaa gaagatccga ttgacggaac tataagacag ccaaaaagcc    540
gatcaaatcg gatcaaagaa agaactctct cgctctgaaa gattttaaag agagaagaga    600
gagagagccc ttcaccttgt gccacccgta cttttaagag catctccaac catattctat    660
tttcaactcc aaatgctatt ttgaagtaaa atcctctcca accctagtct attttcaact    720
ttaaaataga gtaaacctaa atttactctt atatttggag taaatctaaa ctttactcca    780
tcttggaatt agactttttt atttgcaaat taatccttga gatttattat aattatattt    840
tatactattt aatatttata acaaatatta taaaactgat aattatgaat atttaaatac    900
tgcaattatt cctacaaaat taaaaaatat aataaacttt aaaatacaaa ataagggcta    960
aaattaagat aaacaacata aataaattta agacaacaaa tactaaaaat attaatgata   1020
attttttttt attatagtaa tgtttaaata aaaattgcat atgctttttt gtgatgttat   1080
gtaattttta ttatttgata aatatttaag ttatagtttt tcaaagaaat tgtaaataat   1140
aaaataagtg ggatttattt ataaatttta aaactaaaaa atatttataa taaaatcaaa   1200
taagattcta tttagaatat ttctttttag agtaaaaaat aaagaaatac attagagtaa   1260
aacacaactc tattttagag ttactctatt tttctatttt ggagtagaaa atgaagaaat   1320
aattgaagat ggtataacaa acgaaaagtc gcattatctt actgttaaat tactataatt   1380
cataatcaat tggttttgtt tcggtggcat ccggcatccc ctaatatgat tgatttttat   1440
cgctgcattt attaaaatat atatatcttc atcctcgatc accacaattc attgattcaa   1500
aagtctccaa acccccttgga agctcaacat tacaatctcg ccaaattcct caaaaccaga   1560
attttccaca gacccagaaa catttctcat caaagttctc tcctttcctg tctcttgaac   1620
tttctctcct actcactcag ttcaagaaca atctttcgat cattgatcag tgatggtaga   1680
ttcaattgtt gggtttcatt tacttgggca atggcttttc ttttcttttc tcttctcttt   1740
tcgattgatt gattggttaa ttctgtgtct ctgtacagtt tcgaattgtg tctttcaagt   1800
taaagctgga tcatttttct agttgatctc atcctcgcgc ttaacgtgag agactctctg   1860
ctctgtaatc tttccctgcg ttttcttgtt ttatctgaaa cggttaatat agagataaaa   1920
aaacccaatt tctctgactt ttttttcttt ctttaatata tcatttcttc tccctttttgc   1980
tttttgtata aagtgcagct aactttcctt aaggattcac tggttggttc aagcactgat   2040
tcgccgcgta cagcttttgg caggagccat ttgcatctct gatcgacatg gattagaata   2100
gtgtgcagtt gtgttgtgta caactcgctg catagatgtt actttgtgga gttcaattca   2160
tatgtagtat gtttgttgtt taagaagctg atctttgtgg gggcattggg tagtgagatc   2220
tgttaaattg aagtcggtga tggagagtag tgtagttaat catccattgc aagaagatga   2280
gaagggtttt tctgatgaag ataatgctgt aaataatgag aaagagagtt tattgcaaac   2340
atctggctct gtagagaatg ctcctgaagg ttctggtcgt tcttcggatt ggcgtagggg   2400
ttagtcctct attggaacac gtgtatttat cttattccaa gctttgccat caaaaccata   2460
acttagagca taacaactta tcaagattgt atgttcttga aggactagac cactgcataa   2520
ctgcacctgt tggtctctat ggagatatgg taatcgatga caatgaggtt aagtactctc   2580
ggtccataac agagagattg tcccctgcga gtcataattc aaaattagat cgattatcgg   2640
agcgggaaaa ggtaggaatc tgaaccttca ttgcaatgga tatgttcttc atttgattac   2700
aaattttttt ggtaacttga aaacttcttg ttattccagc aaaaactcat tgttgagcta   2760
gtcagaatac aaaatgacgg gaccgtggaa gttgatatag ataacggtac accggtatcg   2820
```

-continued

```
gagttattgg agtttcagcc aaccaaaggg cagccaacaa tcacatatga aaagtcattt   2880
gctgattcct ttagatcaat tccaagatta aaaattgtga tacttgtggt tggaactcgc   2940
ggtgatgtgc agcctttctt ggccatggca aagcgcctcc aggtagtttc gaaattgctt   3000
tctcattctt tgtatccttt tgcgaaatta agattcacag agggaatcat tgtgacttta   3060
catatgtata ttttgtggat gcatgcatat agtacactgc aattgaacag gctcgtatca   3120
aagtgttggc atgtgcctat atcatgtgtt ctcgtcattt taaatttgtt tcatttcttc   3180
atcctatcgt catatgtgtt cttgacgctt ttcttagcat ttggtgagag atttggaact   3240
gattggcatt gagagaggtt aaagttagat attgtttttc tctgttgcag gagtttggtc   3300
atcgtgttag gttggcaact catgcaaatt tctgctcttt tgtacgatct gctggagtag   3360
agttctatcc cttgggtggt gatcctcgag aactagctgg atgtaagaag tcctccttga   3420
aaagattcgt ttatatttta gtttctcgag tttttttgt ttgatgatga aagctgtcat    3480
aaattctctc tttagcttca tgtgggtatt tttgaatgta gatatggcta gaaataaagg   3540
tctgattcct tctgggcctg gagaaatagc aaaacagaga aaacagttga gggcaattat   3600
agagtctctt cttccggctt gcacagagcc tgatatgcaa actgctgcct ctttcagagc   3660
tcaagcaata attgcaaacc ctcctgcgta tggtatatcc ttcgttaact ttaaaactct   3720
ttgatccatc agaacctcat tgtttgtaaa cctttcttaa gcactttttc tatgaaactg   3780
atggtatggt ttttggttct aattatagga catgtgcatg ttgctgaagc tctaggagta   3840
ccaattcaca tttttttcac aatgccttgg acgtgagttg acttctctgc ttttaaactt   3900
gccttaacgt gttatttggt ttcctgttct cttacatcat cttcatgtag gcaggccaac   3960
tcatgaattt ccccaccctt tggcccgagt tcctcaaagt cctgcgtatt gggtaatgtt   4020
attctttctt atgaccatat actctctcga agataatgag gcttattgtt tcacaacatt   4080
tttttgtctc agctatcata tatagttgtt gatctgatgg tatggtggag cataaggaca   4140
tacataaatg attttaggaa gaggaagcta aaccttgcac ctttcgcata tttcagcaca   4200
taccatggct caatttctca cttgcctact gcttacatgt ggagtcccca tgttgtgcca   4260
aaaccaagtg gtgagattcc cgctgcatcc ccagtacata tattccgctg aggtttatca   4320
tatgtattgt agcttcattc tggcttctag attaatgttg ttcttctggc tttgtcaatt   4380
ggcaagacca taatgggttg tcaattttag gctgagctct ttatctttcc ttcggtagat   4440
atctgaaaga ttttgctttt tgtttgacta atttgcagat tggggtcctt tagttgatgt   4500
tgttgggtat tgtttcttga gccttggatc gaagtaccaa cctcgtgaag attttatcca   4560
ctggatagaa agaggatcac cgcccgtata tattggtttc ggaagcatgg taaactgatg   4620
atccttagaa aatatgctct tccttgcttt ggtgatattc agttataatg catagtactg   4680
atattgttgt ttcttctctt ttacacaacc aagcctcttg acaatccgaa aaaaacaatg   4740
gatattatac tggaaacact gagagataca gaacacagag ggatagttga tcgaggttgg   4800
ggtggccttg gaaaccgtaa gcagcttctg taccttctct tttgatgctc tgtgtcctga   4860
ttcctgaact acttttcttc tttgcttata cataattttt tttatcttca aacatcttgc   4920
agttgctgaa gttcctgaaa atgtattcct cttggaggac tgtcctcatg attggttgtt   4980
tcctcaatgt tcagctgtgg taaccccttt ttagattaac tacatcatgt ctccaaagac   5040
attatcttct aatccaggct atttcttgtg ttgtggatat gaagattcat catggaggtg   5100
ctggaaccac agcgactgga ctaaaagctg ggtaaaaaca ttttgctttc acagaaatgt   5160
cctgtagtga aatcagtttt cttgaccata tgaaacctaa tggttcctat attcttttga   5220
```

attctatgat atgtctccag tgtccaacaa caatcgtgcc gttctttggg gatcagttct 5280
tctggggtga caggatctat gagaaaggac ttgggcctgc gccaatacca atagctcagc 5340
tcaatgttga gaacctctgc aattccataa gattcatgct tcaaccagag gtaaacaaac 5400
ttaaattttc cttctttttt tccatgtatc tcatgcccat gtaggatgtt tgagtaaaga 5460
accacagtag aagttaaaca caaacactct ttcttgcaaa attaaacaaa ctaaacaaaa 5520
cccaaaacct aaagctgtcc ttttgagttc aaaaaagtag aaagatgtaa tcttgtatat 5580
acacttaaat attgcttata cagttcatac aaatagaaaa tgtcatcttt atagttcata 5640
gaagtagaaa gatgtaatct ttatatatac acttagaaat tgcttatata gttcatacaa 5700
atagaaaaat gtcatcttta tagttcatac aaatagaaag atttaatctt tatagttcat 5760
acaaatagaa agatgtaact tttatgtata tgcgtggata tcgctttatc agttttttaa 5820
tatgtgaagg ccctcgcaca aaaaaaaaaa tattatgtga aagaaagctc ggtgcttaat 5880
atttgaacta tgaagcaact ttctatatat atacacaaaa ctgacattgc tttatagttc 5940
atacaaaaaa aaagatgtaa tcgttatagt tagttcatac aaaagaaaga tgtgatcttt 6000
ctattttcgt tcagtgatgt tatgtgaaga aaaattcggt gtttagattt gaactatgaa 6060
gcatctttct atttatatac acaaaactga tattgtttta tactcataca aatagaaaga 6120
tgtatgaact ataaaaatag aaagcatcat acaaatacaa atagttcata caaacatcac 6180
acacaatgca cactagctca aagctttttc ctctgtttaa aactcataaa acttccaaag 6240
gtctctctct agctttgttg tatctcacaa acggaactgg aatcggtaga atatgtaaaa 6300
ccaatcatgg cctatccagg tgaaatcacg agtgatggaa ctagcgaaag tactggagaa 6360
cgaggacggt gtagctgcag ctgttgatgc attccacagg catttgccac tggctctgcc 6420
actcccggag tcctcgccgg agaaaagaca cgaagatgat cgaccagacc tgttacagtg 6480
gttcttcatc cagattggta aaaagtgttg ccttccatgt ggtggtgtgt gataacaaac 6540
tcccttagat attttgatct tgtctctgca actcgtttca tttcattcag ttgtcaagaa 6600
tatgattaga tttttaacac agctgcaaaa gatgggtttg gggcatcttt ataagtttgt 6660
tgttcagtga gaataagatg atatttgtgt gagtttgtct taagaacaaa gtaccgatct 6720
cctttattgt atacttaaaa cccattcgaa acagaatctc ccacgtcaaa ctacatttct 6780
cagcttgtag gcattggatt tcatcagctc ctgagcatgt gccagatgac ccttcatatg 6840
atctgttaag tttcagtggc tcaaaacggc acctttaaga gaagcttgaa gtatcaaaac 6900
gtgagattaa aacggaagtt gcagaaactt gcagaaagca gagtatgaga gattgagaga 6960
agaagaaggg agaagggaac acatacaaat atttaacgag ttcacgccca taacacgcta 7020
tatctcacca agactaagct ggaaatccac tagatatcag agagaataca tatttagaga 7080
cgaacaagtg accgttttaa tatctttcac tagcacttaa aattcactat gttaaatcaa 7140
ttaaaaccag aaaaaaaaca atagctaaac ttatgctaag atgtgttttt ctctccactc 7200
tcactagcga ctacattgtg tctatctcgt tctcttcctc atgtgtacta caatctctct 7260
cacgtcttca gcttcacttt atagtgacaa caacattaga cctaaagcac cttgccaaac 7320
gccaaaacag cttcctatag atgcgtttgc ttttttatca tatcttagag gcaaatactc 7380
cttagctttt aaattcacaa caagacaaaa gcaagaggct ctccttgtgg tcccaaaagt 7440
aactcaatcc aatatgaact caccaaagta atcatagtta tgccttgagt tacttgactt 7500
gaatttgctt gagcgacaag ttctcgtctt cacaaatctc cacctgagaa catgatgttc 7560
aagccaaacg acatacactc ttgagaaaga tatagaacgc cttcttctag cttatggatt 7620
ctaatcttgg tttctgagta tgattaccca gtcttgatac taagcagatt taaataccat 7680
aaaactgata gatccttgct ggatttaa 7708

<210> SEQ ID NO 45
<211> LENGTH: 732
<212> TYPE: DNA
<213> ORGANISM: Thlaspi arvense

<400> SEQUENCE: 45
atgggaagag ggaagataga gataaagaag atagagaatc agacagcgag gcaagtgacc 60
ttctgcaaga ggagaactgg tcttatcaag aagactaatg agctctctgt tctctgcgat 120
gctcacattg gtctcatcgt cttctcctcc accggaaagc tctcgcagta ctgttccgaa 180
cccctcagga tgcctcagct cattgaccga tacttgaaga ccagtggaat gcgacttcct 240
gatcctaatg acggccggga ggaattgtac caagagatgg aagtactaaa aagagagaca 300
tgtaagcttg agcttcgtct gcgtccatac catggacatg acttaacctc ccttcctcca 360
cacgagctcg atggtctcga gcaacagctc gaacattctg tccttaaagt ccgcgagcgt 420
aagaatgagt tgatgcagca acagttggag aatctaagca gaaagaggcg gatgctagaa 480
gaagataaca acaatatgta ccgtttgctt catgagcatc gtaacgcggt tgaatttcag 540
caagctggga tagagacgaa accaggggag tatcaacagt ttctagagca gcttcagtac 600
tataatgatc atcagcaaca accaaacagt gttcttcagc ttgctacgct tccttctgag 660
attgatccta attaccatct ccagcttgct cagcctaatc ttcaaaacga tccaacggcc 720
aagattgatt ag 732

<210> SEQ ID NO 46
<211> LENGTH: 243
<212> TYPE: PRT
<213> ORGANISM: Thlaspi arvense

<400> SEQUENCE: 46

Met Gly Arg Gly Lys Ile Glu Ile Lys Lys Ile Glu Asn Gln Thr Ala
1               5                   10                  15

Arg Gln Val Thr Phe Cys Lys Arg Arg Thr Gly Leu Ile Lys Lys Thr
            20                  25                  30

Asn Glu Leu Ser Val Leu Cys Asp Ala His Ile Gly Leu Ile Val Phe
        35                  40                  45

Ser Ser Thr Gly Lys Leu Ser Gln Tyr Cys Ser Glu Pro Leu Arg Met
    50                  55                  60

Pro Gln Leu Ile Asp Arg Tyr Leu Lys Thr Ser Gly Met Arg Leu Pro
65                  70                  75                  80

Asp Pro Asn Asp Gly Arg Glu Glu Leu Tyr Gln Glu Met Glu Val Leu
                85                  90                  95

Lys Arg Glu Thr Cys Lys Leu Glu Leu Arg Leu Arg Pro Tyr His Gly
            100                 105                 110

His Asp Leu Thr Ser Leu Pro Pro His Glu Leu Asp Gly Leu Glu Gln
        115                 120                 125

Gln Leu Glu His Ser Val Leu Lys Val Arg Glu Arg Lys Asn Glu Leu
    130                 135                 140

Met Gln Gln Gln Leu Glu Asn Leu Ser Arg Lys Arg Arg Met Leu Glu
145                 150                 155                 160

Glu Asp Asn Asn Asn Met Tyr Arg Leu Leu His Glu His Arg Asn Ala

```
                165                 170                 175

Val Glu Phe Gln Gln Ala Gly Ile Glu Thr Lys Pro Gly Glu Tyr Gln
            180                 185                 190

Gln Phe Leu Glu Gln Leu Gln Tyr Tyr Asn Asp His Gln Gln Gln Pro
        195                 200                 205

Asn Ser Val Leu Gln Leu Ala Thr Leu Pro Ser Glu Ile Asp Pro Asn
    210                 215                 220

Tyr His Leu Gln Leu Ala Gln Pro Asn Leu Gln Asn Asp Pro Thr Ala
225                 230                 235                 240

Lys Ile Asp
```

<210> SEQ ID NO 47
<211> LENGTH: 5332
<212> TYPE: DNA
<213> ORGANISM: Thlaspi arvense

<400> SEQUENCE: 47

```
ttacatttca aacagatttg acataacatg taatattgct taggacattt gtgttcatca     60

cgtccgtctt tcaatgacca attaatgctg ttttgtttgt ttgttttaac cacgttttag    120

caaaagtaca tttatacagg acttttttaa tccgctcgtt acttaatcga caaatatata    180

atgtccctca atactatttg gtatatattt tttacaaaac atgccactga aaatgattca    240

gttgtatatg ttcatatcat cacataattg tgttcaacct gatgtagcgg ctgattactc    300

tatgcacaat gttagaaaat ctgaatatta actcgatgat ctaaatacca atttcttttc    360

cagaatttta atacgttcga gtttcagcat aaaagctttt actcacacca cttgtttccc    420

cttgcgttgt gtggcaatgt cgctgtataa atgtacatat tccttttgtt ttcctccaaa    480

aagtttatta atgaaattca gattctacga tataataata aataatgtta cttcaaaaat    540

aaaagagtgt gccaatatgg actgtgcttt taccatgagg gatttaaact cgattttttt    600

tttgttacac tgaagttgat gaatatagac attaaattaa ctcgaataga caggaaaaat    660

ccgatgtcca aaaaaaaaga caggaaagag atatcacaaa taatctaaca aaactattat    720

ggctaagtat cacattttta gatatatcaa cggttcaaag cccgatccat actgtcatac    780

gtaaaaaaat attgttttgg caaaactaca tataaggtga tgttactata gaaataaaac    840

caaattaaga ggaaggtggg taagaaaaaa taagagagag tcactttcaa gtattgttac    900

attttgtctt ttcccatttg gctatctctc tcttttgcct tttccctttt gtggtaactt    960

tattttccct ataacatttt ttcattaagt ttccatttat ggattatttt ctagttgcgt   1020

caagcatgga atatcaaaga aattagttcg agatttgact aaaaagggtc atttctgcta   1080

aataaattac taacactgcc attaggccaa tcacatgtct agtaacaatt tgacatttca   1140

cttactattg taacttttga tagatattga gactttacaa aaaaatattt taagaaaatt   1200

ttgttgaaga aaaaaacttg aatatcattc actataaaaa aaaggaaaaa atgtataggt   1260

ttttgttaca atactgaacg taaattgtga ccatgattcc ataaagcagt aacatttcaa   1320

actctaaaaa ttgttgatat taaaaacttg aatatcatcc actataaaaa aaaggaaaaa   1380

atgtataggt ttttgttaca atactgaacg taaattgtga ccatgattcc ataaagcagt   1440

aacatttcaa actctaaaaa ttgttgatat taatctagtt tacagaaaaa gtagaagaaa   1500

gaaaaaatga aattagaaaa tgttgagctg acatcacacg ccacacacag aattgtatag   1560

aaaagaggaa gtgtaattaa gcatattctt ccgcattaac ctctctcctc tctgtgtcat   1620

ccaacctcat atactactga tctccatttc cagatcccca agaacacaac tcatcaacaa   1680
```

-continued

```
gtactttaaa tactctatct ctctctttag agatctctct ttctctctct ctctctctct   1740
ctctctctct ctctctttct ctctgtttct cactaattac tctctacctc tcttacatac   1800
acaaacacaa tctctctcgc ttctctctaa ttcacacatc aagataaaag aatcaaacca   1860
tccttgaaat gaatcctgta attaattata ggatttcagt tttgagtttt tttgttctta   1920
atttggtttt gtagttaatt agggtttctt tatagtttat ctaccttgca tatatatatg   1980
tatgacatag acttacatga cactgaatca ggaggaagag gaaggaacga ataagaggaa   2040
gaggagagag atgggaagag ggaagataga gataaagaag atagagaatc agacagcgag   2100
gcaagtgacc ttctgcaaga ggagaactgg tcttatcaag aagactaatg agctctctgt   2160
tctctgcgat gctcacattg gtctcatcgt cttctcctcc accggaaagc tctcgcagta   2220
ctgttccgaa cccctcaggt taacttcttc ttcctctccc tctctcgaat tagggtttca   2280
gagatctata catacatgtg tatgtattat ctaattaaat gagtaaataa gagatatata   2340
gctcgtgctt gtgaacagac aattctcatc attagtttct gaagttagca ggtatcatga   2400
atactatgtt tcagatttta atttgaccca gaagttaaga atctctctga tgctatatat   2460
atatatatat atatatatat atatttactt ttgcagtatt tgatttgtat atatctgtag   2520
atgcatgtat ataatcattg tttattgata tcggtcaaat tctgtaattt ctacacctgc   2580
caagcaaaga gatgtttttt caaagatttt tcatttcttg atcaaccttt tttcccatat   2640
aatgtttacg acatatatat atatatacct agtatatata taagtcttat ttgaatcatt   2700
cgatataagt accattaatt ataaaggatt tttattaaaa gttgtaaatc taagtcatga   2760
accagaagac gaatttattc acatctagcc taacaatata agaagaaagg tatgctgata   2820
tagtttgaat tttgctatca taaaacaaaa atggggaaaa tgtatactct ctccgttttt   2880
ttatataaaa tattttatga attgtttttt gttcaaaaat agttgatgtt ctcacatatc   2940
tatgcagaaa ttaattgcat tttattgatt ttaagtgttt aaattttgta tattgttttt   3000
ttattggttg aattgttttg gaattaatga ctaaaacatg ttttgttttg gaaatataca   3060
aaattaaatg atttcttaat ctatataaaa aaaccttaaa catcgtatat aaaaaaaacgg  3120
agggagtatg ttatttgatt tttgtgttcc tccaatgatg attaaagtct tgacgatgta   3180
cgattaaaga tactatttga taacaattta ttattaccaa tgttgaatag gatgcctcag   3240
ctcattgacc gatacttgaa gaccagtgga atgcgacttc ctgatcctaa tgacggccgg   3300
gtaatatata tatacacgca tacttattcc tttgtcttag ccaattcaaa acaaagaata   3360
taacattctc acaaaaatca ataatcattt ggagtttttt gtgtgtatat ataggaggaa   3420
ttgtaccaag agatggaagt actaaaaaga gagacatgta agcttgagct tcgtctgcgt   3480
ccataccatg gacatgactt aacctccctt cctccacacg agctcgatgg tctcgagcaa   3540
cagctcgaac attctgtcct taaagtccgc gagcgtaagg taacgtaata tatgttcaca   3600
tcaatataca tattctctta aaactatagt gattattaca cttttgtttg atctctcttt   3660
tctatctcta ctgttaataa attgaagaat gagttgatgc agcaacagtt ggagaatcta   3720
agcagaaagg tcgctctcta attaatcatt cttttgataa gtactcttaa ttttattttc   3780
ctctaattag tcatctttta taccgcggat ttaatgatca ttaccgtgtc tatataaata   3840
tatgatcaga ggcggatgct agaagaagat aacaacaata tgtaccgttt ggtaagtttg   3900
gttactagag aacgtttaat ttggttgcac attttcggtt tgtgtgacat aattattcaa   3960
cgtattaatt gcagcttcat gagcatcgta acgcggttga atttcagcaa gctgggatag   4020
```

```
agacgaaacc aggggagtat caacagtttc tagagcagct tcagtactat aatgatcatc   4080
agcaacaacc aaacagtgtt cttcagcttg ctacgcttcc ttctgagatt gatcctaatt   4140
accatctcca gcttgctcag cctaatcttc aaaacgatcc aacggccaag attgattagt   4200
cctcaaaagt gaatcattta tgtcttttat tactacctat tttgattata gccaatgcct   4260
tcttctgtgt ctgttttgtg tggttatgga aacctaatat tgtttgaagt acaattcact   4320
tgaaaagcgt ttatggtctt tctttgatta aataatttaa tcttcattat cacacatttg   4380
ccaactagag atcaactgtt tatgtaatcg cagattttga gatacatttt tggccataga   4440
aagagtggga gacacatgag taaactattc ttaggttgtt gacaaaagga agaaccaaca   4500
cctcagaatc ttaataatgt gtgatcgaca agcttatcaa ggaccttcac tgaaaataga   4560
ttttatatat ttcagacaga ttagatcgca atcccaaaaa tagctcttat aaactcagcc   4620
aagattgcaa aaattcaatc aacttctgta gggtattgca agggacgatc aagaagcagg   4680
aaaagagttc tggaagaaga atcttccttt cctcttttcc tcttcaatct gttttcatca   4740
taaagacgag aaaaaattga atacttggct tcttgatcgc tcgaataacc atcatcatca   4800
tctagatccc ccaaacgctg cgttttttgt tggctgaacc gtctacatcc atgacaggag   4860
gatattttat atccgagagt ggccatggaa aagagtacca agaaggccgt gttactgctt   4920
ttgtcgtgat ctcctgcatt gtggctgcaa tgggaggtct cctcttcggt tacgatatcg   4980
gtatctcagg tttgtttctt cccaaccaag aaaccccaag atttctcctt ctctcttctt   5040
ctttctcttc tcatcatggc gggatatatt tttttcagga ggagtgacat caatggatga   5100
gtttctaacg agattcttcc ccgacgtgca acgccaaagg caacacaata cagggcatga   5160
aacagagtat tgcaaattcg acaatgagct tctcactctc ttcacctcct ctctctacct   5220
cgcggctcta ttcgcttcct tcctcgcttc aacgatcaca aggctttttg gccggaaaat   5280
ctcaatgaag atcggaggtc tcgcttttct ctccggagct cttctcaacg gt           5332
```

<210> SEQ ID NO 48
<211> LENGTH: 1071
<212> TYPE: DNA
<213> ORGANISM: Thlaspi arvense

<400> SEQUENCE: 48

```
atggctgcag tagaaagagt ggagagttta gccaaaagcg gaatcaaatc tatcccaaaa     60
gattacgttc gtccgaaaga agagctcgag agcatcaacg acgttttcca agaagagaag    120
aaagaagaag gtcctcaagt ccccaccatc gatctacaag acatcgagtc agaagacgaa    180
acgatccgcg agaagtgcac agaggagctg aggaaggcgg ctatggattg gggagtgatg    240
catttgatca accatggtat accggtcgat ctaatggagc gtgtgaagaa aaccggagaa    300
gagtttttcg gttctcctgt ggaagtgaag gagaagtatg ccaacgatca agccacaggg    360
aagattcaag ggtatggaag taagttggct aacaacgcga gcggacagtt ggagtggcaa    420
gattacttct tccatcttgt ttatcctgaa gataagagag atctaacact ttggcccaag    480
acaccaagtg attacattga agcaacgagt gagtacgcga agtgtcttcg tttgctagcg    540
acaaaagtct tcaaggctct ttctatcggt ctagggttag agcctgaccg tttagagaga    600
gaagtgggtg gtttagaaga gcttcttcta cagatgaaga tcaattatta cccaaaatgc    660
cctcagcctg agctagcact tggcgtggaa gctcacaccg acgttagcgc cttaaccttc    720
attctacaca acatggttcc aggtttgcag ctattctacg agggcaaatg ggtcattgca    780
aaatgtgtcc ccgactcgat tgtgatgcac attggagaca ctctagagat tcttagtaat    840
```

```
ggcaagtata agagtatact tcatcgtggg ttggtgaaca aggagaaggt tagggtttct    900

tgggctgtgt tttgtgagcc accaaaggaa aagattgttc ttaaaccgtt gccggagttg    960

gtgactgttg agtctccggc taagtttcct ccaaggacat ttgcacaaca tgtcgagcat   1020

aagttgttta ggaaggaaca agaggaattg gtgtctgaga aaaaaagttg a            1071


<210> SEQ ID NO 49
<211> LENGTH: 356
<212> TYPE: PRT
<213> ORGANISM: Thlaspi arvense

<400> SEQUENCE: 49

Met Ala Ala Val Glu Arg Val Glu Ser Leu Ala Lys Ser Gly Ile Lys
1               5                   10                  15

Ser Ile Pro Lys Asp Tyr Val Arg Pro Lys Glu Glu Leu Glu Ser Ile
            20                  25                  30

Asn Asp Val Phe Gln Glu Glu Lys Lys Glu Glu Gly Pro Gln Val Pro
        35                  40                  45

Thr Ile Asp Leu Gln Asp Ile Glu Ser Glu Asp Glu Thr Ile Arg Glu
    50                  55                  60

Lys Cys Thr Glu Glu Leu Arg Lys Ala Ala Met Asp Trp Gly Val Met
65                  70                  75                  80

His Leu Ile Asn His Gly Ile Pro Val Asp Leu Met Glu Arg Val Lys
                85                  90                  95

Lys Thr Gly Glu Glu Phe Phe Gly Ser Pro Val Glu Val Lys Glu Lys
            100                 105                 110

Tyr Ala Asn Asp Gln Ala Thr Gly Lys Ile Gln Gly Tyr Gly Ser Lys
        115                 120                 125

Leu Ala Asn Asn Ala Ser Gly Gln Leu Glu Trp Gln Asp Tyr Phe Phe
    130                 135                 140

His Leu Val Tyr Pro Glu Asp Lys Arg Asp Leu Thr Leu Trp Pro Lys
145                 150                 155                 160

Thr Pro Ser Asp Tyr Ile Glu Ala Thr Ser Glu Tyr Ala Lys Cys Leu
                165                 170                 175

Arg Leu Leu Ala Thr Lys Val Phe Lys Ala Leu Ser Ile Gly Leu Gly
            180                 185                 190

Leu Glu Pro Asp Arg Leu Glu Arg Glu Val Gly Gly Leu Glu Glu Leu
        195                 200                 205

Leu Leu Gln Met Lys Ile Asn Tyr Tyr Pro Lys Cys Pro Gln Pro Glu
    210                 215                 220

Leu Ala Leu Gly Val Glu Ala His Thr Asp Val Ser Ala Leu Thr Phe
225                 230                 235                 240

Ile Leu His Asn Met Val Pro Gly Leu Gln Leu Phe Tyr Glu Gly Lys
                245                 250                 255

Trp Val Ile Ala Lys Cys Val Pro Asp Ser Ile Val Met His Ile Gly
            260                 265                 270

Asp Thr Leu Glu Ile Leu Ser Asn Gly Lys Tyr Lys Ser Ile Leu His
        275                 280                 285

Arg Gly Leu Val Asn Lys Glu Lys Val Arg Val Ser Trp Ala Val Phe
    290                 295                 300

Cys Glu Pro Pro Lys Glu Lys Ile Val Leu Lys Pro Leu Pro Glu Leu
305                 310                 315                 320

Val Thr Val Glu Ser Pro Ala Lys Phe Pro Pro Arg Thr Phe Ala Gln
                325                 330                 335
```

His Val Glu His Lys Leu Phe Arg Lys Glu Gln Glu Glu Leu Val Ser
340 345 350

Glu Lys Lys Ser
355

<210> SEQ ID NO 50
<211> LENGTH: 4065
<212> TYPE: DNA
<213> ORGANISM: Thlaspi arvense

<400> SEQUENCE: 50
gtaaagtaga cagctttttg gaatttgcag agattatggt acaggaataa acactgaatc 60
gagattatag ccactgaatc aatcaaagcc ttgagcaaat gcgattgaga gctgaaattt 120
aacagggttt cgagccacaa tactataaac tagtgactga aaaacttcga tcactaaagc 180
ttcagctaga tttggtggaa gaagaaatct accactaaat tctaaaaggc tccatctttg 240
tagaatcaat tgtgaacgga ttctaggtaa aggatgaaaa ttgaagacct gattgctctg 300
tggtggcttt tgcaggcaat aagaaggatc ttcttctcaa ggaaatcgat cttccagggc 360
tgagctgatc ccattgagtc ctcggcgacg acgacgacgg aggagaagga gaagagaaag 420
aagtggtggg tttgcgagaa acggcggaga aaagtcgagg gcttgtcaaa ttgaacaaca 480
tcttgctacc cattttcccc gggagaagca aggagagatc cttttcctct gttttccggg 540
aaggaacctg tggttgaaga tgagttactg tgagcttcag gttccttctg atttttttat 600
tttattttaa ttcaatattt tattatttat ttatttaatt tagtagagag gatttggagg 660
gaagaaatta ggaaagataa gagaggtgtg gagatgaatt cctaggcaga tctctgatat 720
tttttccccc tctcatctta aagaaaaaga atatccacgt cagcaataaa tatcccacct 780
ttctgtattt tttgtaactt tataagaatt ttatttactt taatattttt taaatgatac 840
agtgatttct ctttgtatat aaaaaaactt gaagtactaa tttactttag acaaacaaat 900
gtgatattat tatttccttt gttcagttga tcttttatac aattagtctt tttgaaactg 960
aaaccagtca aatactcaaa atgtttttag tgatgctaaa aattacagaa attatgataa 1020
aatgtggaca ttaaaaataa aataaaaagg tggataatgt acagacacct atattgattg 1080
aactatttaa aggtggacac gtggagatac gatttaggca cgtgcacacg gacgcagaag 1140
aaacgccacc aaaagtctga cgttgatagt catcggttta actctattgg gcttcttttt 1200
tatgggcttt taaatccaaa gcccttacca agctaggaca tactgtagta acttctcttc 1260
cagaattaaa agaaaacttt tttgaccgtt ggatctcaag gatggtgaaa ccatcagtca 1320
acctctctcg ttgacctgac cgtgaagtgt gttgtcactc actcacctgt tcttcctccc 1380
tacccaaccg gtagctccac acttcctaat tccttgatta attcttaatt ctaatggaaa 1440
attaatataa ttatctttgt tatataagaa agcctctgca tatatttcat ttgacatgca 1500
acaaaatcgg caagaagaat agtagaacaa agtatttatt cgttagttat cttacacact 1560
gttttttcct ctgctttatt aagtttcttt acttacttac tctgtttctt tgctctgttt 1620
tagcttttaa aagaagacaa taaagatggc tgcagtagaa agagtggaga gtttagccaa 1680
aagcggaatc aaatctatcc caaaagatta cgttcgtccg aaagaagagc tcgagagcat 1740
caacgacgtt ttccaagaag agaagaaaga agaaggtcct caagtcccca ccatcgatct 1800
acaagacatc gagtcagaag acgaaacgat ccgcgagaag tgcacagagg agctgaggaa 1860
ggcggctatg gattggggag tgatgcattt gatcaaccat ggtataccgg tcgatctaat 1920

-continued ggagcgtgtg aagaaaaccg gagaagagtt tttcggttct cctgtggaag tgaaggagaa 1980
gtatgccaac gatcaagcca cagggaagat tcaagggtat ggaagtaagt tggctaacaa 2040
cgcgagcgga cagttggagt ggcaagatta cttcttccat cttgtttatc ctgaagataa 2100
gagagatcta acactttggc ccaagacacc aagtgattac atgtaagctt ttgattcgtt 2160
tgttttatca tttataaaac aaagttcttg ctttggttat agtaacgttt tttggatgat 2220
tgtagtgaag caacgagtga gtacgcgaag tgtcttcgtt tgctagcgac aaaagtcttc 2280
aaggctcttt ctatcggtct agggttagag cctgaccgtt tagagagaga agtgggtggt 2340
ttagaagagc ttcttctaca gatgaagatc aattattacc caaaatgccc tcagcctgag 2400
ctagcacttg gcgtggaagc tcacaccgac gttagcgcct taaccttcat tctacacaac 2460
atggttccag gtttgcagct attctacgag ggcaaatggg tcattgcaaa atgtgtcccc 2520
gactcgattg tgatgcacat tggagacact ctagagattc ttagtaatgg caagtataag 2580
agtatacttc atcgtgggtt ggtgaacaag gagaaggtta gggtttcttg ggctgtgttt 2640
tgtgagccac caaaggaaaa gattgttctt aaaccgttgc cggagttggt gactgttgag 2700
tctccggcta agtttcctcc aaggacattt gcacaacatg tcgagcataa gttgtttagg 2760
aaggaacaag aggaattggt gtctgagaaa aaaagttgaa gtttgagtct aatatgagta 2820
aaaactccat gttaaagttt ctcgtttctt ttgtgtttat gtctttatcc tgtatttgat 2880
gcgtcttgtt gaagatgaca cgaaatattt ctaccgattg tgaaattgtt aaaaatttca 2940
ctctattata agttggtttt atgtatcgcc gaagtgacag atgttggaag aaatctagtc 3000
attggaaact gtattacatt cgtgctaatt gcatttcttt tcaagtttaa accaaattag 3060
tggaacgtct ccggttctag tctgtgtgac ttagttatag cttggtgaat agtaaaggaa 3120
gctcagtaaa tacgagtaac atagaaagat atttatgaac cacattgttg tattaaggac 3180
ttgagaatat tctgatttac atttccagtt tgttcttttt tgttatgcta ctaactgtaa 3240
aaaaactact cttctccctc ctttaatgat aattggcatt ccctgcttgg aaagagttca 3300
ctctattttc cttgaagacc ttaaaaccaa gaatagattg cacaactcaa tgattagtgt 3360
tggaaaatag aaaaaaaaaa atcaaaaatt gagtttcaag tttcacaagg ctgcaccttt 3420
ggttgacgaa atcttgtgag agatccattg ttttgctgga gctccgattt gatagagagc 3480
tgcacaggtt taatacgggt caagagagcg tatacaaata aactagagtg tgtttaagaa 3540
agatccatta catcaaacca tgagctgtac cttgctgaaa agatctgttg gtaaatctgg 3600
ctgaactctc ttttccgaat gaaaactaaa ctcctgtgtt tgcattccca aaacagtttg 3660
catcctcatc aggtaactca attttacaga catacagaag atcaagcgca aaaagaataa 3720
ttggtaaaga ctaccatacc aaaggtactg ttgtttctcg cttgctgttt ttgaaaatgc 3780
ccatgtctcc tctgcttgag agtatctgtt ttgcaggagt gtgaaactat gtaaggtgtg 3840
acacgtataa ttaacgcaag cgaaatgaga ctcgagaaag gataatacct tcttgttcag 3900
aggacgagct ttaaaaacgt gttttccctc cgagacatca tgcttaggta tatccataac 3960
gcttggtctg caagaaaaaa atacactttt atgtttacat tcacttcaac cacaagttga 4020
agtgagaaat caagcaatcc ttcttaatgt tccatgtgac tttat 4065

<210> SEQ ID NO 51
<211> LENGTH: 645
<212> TYPE: DNA
<213> ORGANISM: Thlaspi arvense

<400> SEQUENCE: 51

```
atggttgtga agctatacgg gcaggtaacg gcagcttgtc cacagagggt cttgctttgt     60

tttctggaga aagaaattga atttgagatt gttcatatcg atcttgatac atttgagcag    120

aaaaaaccag aacatcttct tcgtcagcca tttggtcaag ttccagccat agaagatgga    180

gatttcaagc tttttgaatc aagagccatt gcgagatact acgcgaccaa gtactcggac    240

caaggcacga accttttggg caagtctcta gagcaccgag ccatcgtgga tcagtgggcc    300

gatgttgaga cccattactt caacgttctg gcccaccca  ttgtgattaa cctagtcatc    360

aagcctaggt taggcgaaga atgtgacgtc gttttggtca aggacctcaa ggtgaagctt    420

gaggaagttt tggacatata cgagaaccgg cttgcttcga accggttttt ggctggtgat    480

gaattcacca tggctgattt gacgcacatg ccagctatgc ggtatttgat gggtataatc    540

gatataaacc ggatggtcaa ggctcgggtg aatatgaacc ggtggtggga agagattacg    600

gctagaccgg cttggaagaa gcttatggtg atggctggtt cttga                    645
```

<210> SEQ ID NO 52
<211> LENGTH: 214
<212> TYPE: PRT
<213> ORGANISM: Thlaspi arvense

<400> SEQUENCE: 52

```
Met Val Val Lys Leu Tyr Gly Gln Val Thr Ala Ala Cys Pro Gln Arg
1               5                   10                  15

Val Leu Leu Cys Phe Leu Glu Lys Glu Ile Glu Phe Glu Ile Val His
            20                  25                  30

Ile Asp Leu Asp Thr Phe Glu Gln Lys Lys Pro Glu His Leu Leu Arg
        35                  40                  45

Gln Pro Phe Gly Gln Val Pro Ala Ile Glu Asp Gly Asp Phe Lys Leu
    50                  55                  60

Phe Glu Ser Arg Ala Ile Ala Arg Tyr Tyr Ala Thr Lys Tyr Ser Asp
65                  70                  75                  80

Gln Gly Thr Asn Leu Leu Gly Lys Ser Leu Glu His Arg Ala Ile Val
                85                  90                  95

Asp Gln Trp Ala Asp Val Glu Thr His Tyr Phe Asn Val Leu Ala His
            100                 105                 110

Pro Ile Val Ile Asn Leu Val Ile Lys Pro Arg Leu Gly Glu Glu Cys
        115                 120                 125

Asp Val Val Leu Val Lys Asp Leu Lys Val Lys Leu Glu Glu Val Leu
    130                 135                 140

Asp Ile Tyr Glu Asn Arg Leu Ala Ser Asn Arg Phe Leu Ala Gly Asp
145                 150                 155                 160

Glu Phe Thr Met Ala Asp Leu Thr His Met Pro Ala Met Arg Tyr Leu
                165                 170                 175

Met Gly Ile Ile Asp Ile Asn Arg Met Val Lys Ala Arg Val Asn Met
            180                 185                 190

Asn Arg Trp Trp Glu Glu Ile Thr Ala Arg Pro Ala Trp Lys Lys Leu
        195                 200                 205

Met Val Met Ala Gly Ser
    210
```

<210> SEQ ID NO 53
<211> LENGTH: 3574
<212> TYPE: DNA
<213> ORGANISM: Thlaspi arvense

<400> SEQUENCE: 53

```
ttaaatgtcg gattccaatt gagttaagta agtctcatct atatgtaaat gggtttttgg     60
aatagtatca tcttataatc attttacaca gaatcaaagt tattagcctt gctaaatcta    120
ggttgtattg atcgaatgat cttcgaaaaa actcagttag ctgtaaatgc tttgcagggt    180
atgttaatga atgaaaatct acataatcac atccctcttg aactaatatg tctgtttata    240
gatcaaaaac aagttaggca tgtgaaagtt ttgtaatctt gttctggtta tggtatttgt    300
gcaagctttc gaactcgtgt ataaaggttt tcttctcatt ttcatgttac aacaacgcag    360
agatctcagg tcaaggttac caccacttca gatccactca cacgatgctc ttatccaaga    420
agtccagctt tggatctcgg cttcacttca gctatttttc taatgatggc tcagataatc    480
gtcagcgtcg gaagcggctg tctctgttgt agaaaaggtc ctgctccttc cagatctaat    540
tggattatcg ccttaacctg cttcgttgtt tcctggtaat cctcatcatt tctttctcct    600
atcgagcttt cctacttcac aattttgctg gacagacaca agtgacgaat ctttgtgttt    660
actcttaggt tcacttttgt gatagctttc ctcttgctgc taaccggagc tgcactcaac    720
gatgaacaca ctgaggagtc aatgtatgcc ggttactact cctgctacat tgtgaaaccg    780
ggagttttct ctaccggttc tttgctttcg cttctcactg ttgccctcgg gattgtctac    840
tatttgtgtt tgacttcgag taaacaaaac gttgctgaca cagcgacgac ggcgaaccga    900
ggaggaggta tagcaatggg acagcctcag attccggaga gagtggaaga tcctgtcttt    960
gttcatgaag atacttacat gagaagacag ttcacttaaa aacagaacat ggctttcttt   1020
ggatacacgt taggttttag gatgataatt agataaacaa gagatgctgt ttttttttt    1080
tggggatttt atctttgtga ttttagtatg tgaaactaag accatgaaac ttggtagctg   1140
gtaatgatga ttaatgatga ttgataacgt acagaaaacc aaacaaacgt ctccttttac   1200
ttatctatgt gaatttaaag tggttgttgg gaagtgttca caaaaatcag aaattgaaat   1260
aaataattaa cctatccacc ggtccgacca aacacgggac atctaataga aatcaatttt   1320
gtttatctcg aatcataaga cgaaaactac tgaaattttt atgttaataa gtttgtagag   1380
caactttgga tgatatccac cgttagtgga acaaccacca catgctctac ccaaccagca   1440
caacaaccag ctccttttaa atgtttttga gtctaataaa atgccaacac atctactact   1500
ctcacttctt cacatttata aataagatcc agagaagcaa ttttaaaata acacattgaa   1560
attgtttcaa agcttatttt tttttaaatt tatatcaata aaaatttggt tgcaaagtta   1620
ttgtaacgct tatagaatgg ttgtgaagct atacgggcag gtaacggcag cttgtccaca   1680
gagggtcttg ctttgttttc tggagaaaga aattgaattt gagattgttc atatcgatct   1740
tgatacattt gagcagaaaa aaccagaaca tcttcttcgt caggtcaaac attttatatt   1800
ttctaatttt gaaaagtcat gaattgtatt taatatcatt aatgttttct tttagccatt   1860
tggtcaagtt ccagccatag aagatggaga tttcaagctt tttggtaaga tcctaataac   1920
agcattgtaa aacattcttt aatacttgtt ttatatcatt aatatgtaga ttgtgttttg   1980
aaatttggcg tgtgtgctca gaatcaagag ccattgcgag atactacgcg accaagtact   2040
cggaccaagg cacgaacctt ttgggcaagt ctctagagca ccgagccatc gtggatcagt   2100
gggccgatgt tgagacccat tacttcaacg ttctggccca ccccattgtg attaacctag   2160
tcatcaagcc taggttaggc gaagaatgtg acgtcgtttt ggtcaaggac ctcaaggtga   2220
agcttgagga agttttggac atatacgaga accggcttgc ttcgaaccgg tttttggctg   2280
gtgatgaatt caccatggct gatttgacgc acatgccagc tatgcggtat ttgatgggta   2340
```

```
taatcgatat aaaccggatg gtcaaggctc gggtgaatat gaaccggtgg tgggaagaga   2400
ttacggctag accggcttgg aagaagctta tggtgatggc tggttcttga attatttcga   2460
atttatggtg atctgaacca aataagcttc atattttctg tactattttc tttatctatg   2520
ttttgtaagt ttcaattgat aaaataaatt tacttttaaa gatttaaatt cgttaatatt   2580
ttctttatct atgttttgta agtttcaatt gataaaataa atttactttt aaagatttaa   2640
attcgttaat tctcaatttt aaaggggact atagatttac agttatcatt ttgttacgta   2700
ttactacaaa ttgctgaatt gttatagaac tttttttcca attgtttgtg aacctaatac   2760
tttaaatctg aatagacatc atgtatttaa ttatttccca tgttatattt tcatctagta   2820
tatatagttc attcatttgt agccatgcag atgcacaatg aatctcgatt tttttttttt   2880
ttgtgcgagc acaatgaatc tcgatctctt agtgtttttg aattcagtaa cttctttgca   2940
tctttcacta aactatctct ccaaccaaaa aaattcatat ttcttcagca gccaagagag   3000
aaataaaaaa tttcaaaaat tactttttac atagagaaaa agaagggaac atccgcccat   3060
ttatatgtat attagttaac atgataaaaa atccgaccct aagtttttttc attaatcaca   3120
aaagccctct ctttggttgt ttttcttggc ttctctcatt catgtcgact tagaagaaga   3180
agctaatctt gagcttgaag tctttagcac tgattttgca taagccaatg gcaaagctgc   3240
aattttcttg gctttcccta cataagctct ctttgtaaaa ttgttgtaat cattcgcttc   3300
aatctcgtcc agtatcctcc tgtataatag cagcgatgcc catacctgaa aaaattgcac   3360
agccaagtgt aagggggtta aatcgatcca aacaaaaaag ctttggggcg aaaacaaaac   3420
aaaaatgtaa acggtaaagt gtaaacgtgg gggcttaaga gtgttgttag agacacttac   3480
cggccatctg cttgcggcgt cgagctccgt gacgcctttc tcagcttcgt cgaagaacat   3540
tcttgctcgt ttaagctgca ttttcatgaa gttt                               3574
```

<210> SEQ ID NO 54
<211> LENGTH: 1155
<212> TYPE: DNA
<213> ORGANISM: Thlaspi arvense

<400> SEQUENCE: 54

```
atggttagtc acaaagagac cgtgtgtgta acaggcgcat cgggattcat cggttcatgg     60
cttgttatgc gattattgga gcgtggttac tttgtccgtg ccactgttcg cgaccccgga    120
aatttgaaga aagtgcaaca tcttgttgat ttacctaacg ccaagacgca actcactcta    180
tggaaagccg atttatctga tgaaggaagc tacgatgacg ccataaacgg atgcgacggc    240
gttttccatg tagcaactcc catggatttt gaatcaacgg atccggaaaa cgaagtgata    300
aaaccaacag tgaatggagt gttgggggata atgaaagctt gtgataaggc aaaaacagta    360
cgaagaatca tctttacttc ttctgccgga actgttaatg tcgaggaaca tcagaaaaat    420
gtctacgttg aaaatgattg gagtgatctt gactttatca tgtccaaaaa gatgaccgga    480
tggatgtatt tcttgtcgaa aactttagcc gagaaagcag cgtgggatta tgcgaaggaa    540
aatggattag acttcattag tataattcct acattggtga tcggtccatt cataacaaca    600
tctatgccgc ctagcctcat caccgcgctc tctcctatca ctcggaacga ggcacattac    660
tcgatcataa gacaagggca gtacgtgcat ttggacgact tatgcaatgc tcatatattc    720
ttgtacgaac aagctgatgc caagggacgt tatgtttgtt cctctcacga tgccacgatt    780
cttagtatct ctgaatttat taggaaaaag taccccgagt ataacgtgcc ttcaacgttt    840
```

```
gaaggtgtgg atgaaaatct agagagcatt gtgttcagtt cgaagaagct gattgatatg    900

ggatttagct ttaagtatag tctcgaggag atgttggtcg aatcgattga gacatgtcgt    960

caaaagggtt ttctcccggt ttctttacca gatccatcaa tatttgagga caaagttccg   1020

actagtgatg acaagattga gcacaaaacc ggagctggtt tacccgatga tgtggtgccc   1080

tgtaagaaga cagaaccggt ggtaatccgc gagaaaaccg atgcttgcat gccggcagag   1140

cagatgtgtg cttag                                                    1155


<210> SEQ ID NO 55
<211> LENGTH: 384
<212> TYPE: PRT
<213> ORGANISM: Thlaspi arvense

<400> SEQUENCE: 55

Met Val Ser His Lys Glu Thr Val Cys Val Thr Gly Ala Ser Gly Phe
1               5                   10                  15

Ile Gly Ser Trp Leu Val Met Arg Leu Leu Glu Arg Gly Tyr Phe Val
            20                  25                  30

Arg Ala Thr Val Arg Asp Pro Gly Asn Leu Lys Lys Val Gln His Leu
        35                  40                  45

Val Asp Leu Pro Asn Ala Lys Thr Gln Leu Thr Leu Trp Lys Ala Asp
    50                  55                  60

Leu Ser Asp Glu Gly Ser Tyr Asp Asp Ala Ile Asn Gly Cys Asp Gly
65                  70                  75                  80

Val Phe His Val Ala Thr Pro Met Asp Phe Glu Ser Thr Asp Pro Glu
                85                  90                  95

Asn Glu Val Ile Lys Pro Thr Val Asn Gly Val Leu Gly Ile Met Lys
            100                 105                 110

Ala Cys Asp Lys Ala Lys Thr Val Arg Arg Ile Ile Phe Thr Ser Ser
        115                 120                 125

Ala Gly Thr Val Asn Val Glu Glu His Gln Lys Asn Val Tyr Val Glu
    130                 135                 140

Asn Asp Trp Ser Asp Leu Asp Phe Ile Met Ser Lys Lys Met Thr Gly
145                 150                 155                 160

Trp Met Tyr Phe Leu Ser Lys Thr Leu Ala Glu Lys Ala Ala Trp Asp
                165                 170                 175

Tyr Ala Lys Glu Asn Gly Leu Asp Phe Ile Ser Ile Ile Pro Thr Leu
            180                 185                 190

Val Ile Gly Pro Phe Ile Thr Thr Ser Met Pro Pro Ser Leu Ile Thr
        195                 200                 205

Ala Leu Ser Pro Ile Thr Arg Asn Glu Ala His Tyr Ser Ile Ile Arg
    210                 215                 220

Gln Gly Gln Tyr Val His Leu Asp Asp Leu Cys Asn Ala His Ile Phe
225                 230                 235                 240

Leu Tyr Glu Gln Ala Asp Ala Lys Gly Arg Tyr Val Cys Ser Ser His
                245                 250                 255

Asp Ala Thr Ile Leu Ser Ile Ser Glu Phe Ile Arg Lys Lys Tyr Pro
            260                 265                 270

Glu Tyr Asn Val Pro Ser Thr Phe Glu Gly Val Asp Glu Asn Leu Glu
        275                 280                 285

Ser Ile Val Phe Ser Ser Lys Lys Leu Ile Asp Met Gly Phe Ser Phe
    290                 295                 300

Lys Tyr Ser Leu Glu Glu Met Leu Val Glu Ser Ile Glu Thr Cys Arg
305                 310                 315                 320
```

```
Gln Lys Gly Phe Leu Pro Val Ser Leu Pro Asp Pro Ser Ile Phe Glu
                325                 330                 335

Asp Lys Val Pro Thr Ser Asp Asp Lys Ile Glu His Lys Thr Gly Ala
            340                 345                 350

Gly Leu Pro Asp Asp Val Val Pro Cys Lys Lys Thr Glu Pro Val Val
        355                 360                 365

Ile Arg Glu Lys Thr Asp Ala Cys Met Pro Ala Glu Gln Met Cys Ala
    370                 375                 380


<210> SEQ ID NO 56
<211> LENGTH: 4705
<212> TYPE: DNA
<213> ORGANISM: Thlaspi arvense

<400> SEQUENCE: 56

cctccgttat tatggagcct tgtaattagt gttcagaaaa tcaatcccaa caatattatc      60

taatattttc tatagaaaaa atatagttta acaagtgttt agatgcctca tatcaaactc     120

tctaagattg tgtttctaat ctagtactaa gtacaagtcc aatgactcca accacaatca     180

tatttattct acacatgagg ggtgaaattt taattgttaa ataaaaaaat atagatacaa     240

ttattctatt ctatagttta tatgttgaca aagaaatctt tggtaaattt tatttttaaa     300

agtcaaaaag atatttgtta aaagtattgt tgtttgagga aatgctccaa aataatccag     360

aataagaaaa taatatgaaa cggtactcca ttgagaaaaa actgtgaaaa taacccatat     420

tttatgattt tttttaaata ccagtgctac atttctaact atttttactt gtagtctaat     480

ggcatactga atgcagagta ctggcagact gattggtctt acaattgaat atagactatt     540

ggcagactaa atgcaaatta ctgacagact aacgacagat taaaagcata ttagtggatc     600

ctgcttatgg atcatttgaa aaaggttcat gtttggtaac aaaattacca aatgaataat     660

ttcaaaaatt atcccatttg agtaaagtat atttttattt ttggctaatt tcttctttga     720

attaacccaa attatggtgt ttgtaaattg taactgtgat tttttttttac atcaagaagt     780

gaatggttga caaaaaaaaa agaatgatta aggtttaaat actaaactcg tatatttaaa     840

ttataaactt ttcgaattca tttttttaa ttttatcaat ctttagaaaa atattatatg     900

tttctagaaa gtttctataa attctaatgt gtttaccatt aaaaatatat tatttatttt     960

cctcatttga aatatcaatt tatttatata taactcataa ttttaaaaat ttatatatca    1020

actcatgtca aaattttaat ttcatatcag tttatttcaa taatgttttt acacgtatta    1080

aaatctaatc aattacactc ttttattatt aacaaatttg acgtattaaa ttttatatga    1140

taaattttgt taacgtatta aaataatata aactcttctt gtagtttagt aacaaaataa    1200

aaaaattaca aaaaacaata agtaagaaaa ggaaacttca actcttgtcg ctatctcact    1260

aaacaaacaa gcaaacccat tcggcgtagt tcacccacca gtacaactaa aactatatcc    1320

taaaaaataa taaaatcaaa cttaccagtt tgtcacgtac cacacaaccc agtccttcgc    1380

caaccaacgt tcctcacgtg cttcgccggt tggtactcac gtgaccggca gctttctaat    1440

agcaattctc aatacatata taatctcttc ataccaaagc tacatatata gtctcttcat    1500

accaaagcta catagcaaag tctatcccaa agcacagtcc atctttataa tacacaaaaa    1560

tggttagtca caaagagacc gtgtgtgtaa caggcgcatc gggattcatc ggttcatggc    1620

ttgttatgcg attattggag cgtggttact ttgtccgtgc cactgttcgc gaccccggta    1680

cgtatatatg ttcttacaaa ctaactcgtt aattaatttt tcctaagatt aattaaatct    1740
```

-continued

```
atgtgtggct aatttacggg ttttattggg ttatttatat aggaaatttg aagaaagtgc   1800
aacatcttgt tgatttacct aacgccaaga cgcaactcac tctatggaaa gccgatttat   1860
ctgatgaagg aagctacgat gacgccataa acggatgcga cggcgttttc catgtagcaa   1920
ctcccatgga ttttgaatca acggatccgg aagtaagtta taatatgaac ctcttttagg   1980
tttcatatca accctaaaag atcttgttgg ttaaattttt tttttttttt aatcagaacg   2040
aagtgataaa accaacagtg aatggagtgt tggggataat gaaagcttgt gataaggcaa   2100
aaacagtacg aagaatcatc tttacttctt ctgccggaac tgttaatgtc gaggaacatc   2160
agaaaaatgt ctacgttgaa aatgattgga gtgatcttga ctttatcatg tccaaaaaga   2220
tgaccggatg ggtaaatata tataaattat atatcaaaca tcacactaac cctaagttta   2280
ttcttcttca tagttattta tgttttaata aaatgttttt ggcagatgta tttcttgtcg   2340
aaaactttag ccgagaaagc agcgtgggat tatgcgaagg aaaatggatt agacttcatt   2400
agtataattc ctacattggt gatcggtcca ttcataacaa catctatgcc gcctagcctc   2460
atcaccgcgc tctctcctat cactcgtgag ctctcactta atttctactc tttttgtaaa   2520
ctaagagatt tcttgacctt aggccaggtc ttgctcataa aatcaatgtc cactgagcaa   2580
tattctattt tataagccta ataatcataa atggcaagga aaacaaccta ttttttttta   2640
aagaacctta acgtctaacc aaaaattaca aaaagttata tggacccaat gcaaatacat   2700
ctttggcaca tgccaagaac cggatcgtag gaagatcttt ctggctagcg actagagcat   2760
gtcaactagt ctcttctatc ttccatcttc ttttgttgga atttgaaatg ttaatttttt   2820
ttaaaaacgg tgaaaatgtt tcagggaacg aggcacatta ctcgatcata agacaagggc   2880
agtacgtgca tttggacgac ttatgcaatg ctcatatatt cttgtacgaa caagctgatg   2940
ccaagggacg ttatgtttgt tcctctcacg atgccacgat tcttagtatc tctgaattta   3000
ttaggaaaaa gtaccccgag tataacgtgc cttcaacgta agatttatag atttaaatta   3060
cggagtttaa gccttgtttt gcttaagcaa tcaagatcgt ttgctgaaaa actatttgga   3120
acaggtttga aggtgtggat gaaaatctag agagcattgt gttcagttcg aagaagctga   3180
ttgatatggg atttagcttt aagtatagtc tcgaggagat gttggtcgaa tcgattgaga   3240
catgtcgtca aaagggtttt ctcccggttt ctttaccaga tccatcaata tttgaggaca   3300
aagttccgac tagtgatgac aagattgagc acaaaaccgg agctggttta cccgatgatg   3360
tggtgccctg taagaagaca gaaccggtgg taatccgcga gaaaaccgat gcttgcatgc   3420
cggcagagca gatgtgtgct tagagattta accggtatct attatatatc aattgtcgta   3480
tcgttttagt attggatgtg tgttttgaat ttgttacttt ctgaatcgta gattattatt   3540
gaagggtggt atggactgat tctgatagta acatgattga gtgtaacatt atgaactttt   3600
acatatttaa gaagcagagt gatatttaaa caatgttgcc ttgagtcaaa ttagtcgtgt   3660
aatgtcgctt gaatgcttcc ataatctata attagacaat ttcaacatct caatcgcagg   3720
catgcatttc ttaacaaaga gttatatatt cggtggtcac tggaaatatt tttatacatat   3780
ataatataat ttaactacta tgcagattac agagtataag aaaacaattc ttggctaaat   3840
agattttcag ttacaaaata aagaaaaacc aaatgactga actttttta tttgaagaac   3900
aaaaaatgaa aatttagtcg ttcgagttaa tttacggatc ctatcagcta aaaataattt   3960
agttctgttg agatgtccat gctttttttg gaatttggat tttccttttt ccatatgtga   4020
aacctttcca tataccaaaa actctatcat caaactaccc agcctttgta tctctatgcc   4080
aaaaaaaaaa aattaaacaa aatctttaat ttgaagtcgg actgtcggag tatatggttt   4140
```

ttcttgtacg tacgttttcc aaatgcttca gtaaattgct cttcgaagtc tttcatcgtc 4200
agctggaaag aaatacaaaa gtgattcctc ttgtgcctca aatgttcttt tgtagcttag 4260
gagaggatat tgggagatgg gttttaaaga atttttcaaa ttttgagatt ctattgttta 4320
taaattttta aaatcttaat agttaatatt gttattggtt gaaagatttt aaaattctat 4380
ccaaaatcct ttgttattta aaaaatttag cttttaaaga ttttatgatt tattaaaatc 4440
ttgtgttatt ggaacatgaa ttttaaacaa tctaacttat aaaataattc tttcaaaata 4500
ctacctatat agcttagatt ctcaaagtca ttataataaa atattttgat agatttttta 4560
aatataaaaa ctctttccaa atttaacaaa tattttttac aagtttaaca aatctcccaa 4620
ctcttgaaat caatcaaaac tttataattt catctcttaa tgaccctccc ttactctttg 4680
ctttttgttg tttgtttctc aattc 4705

<210> SEQ ID NO 57
<211> LENGTH: 1188
<212> TYPE: DNA
<213> ORGANISM: Thlaspi arvense

<400> SEQUENCE: 57
atggtgatgg gtacacaacc gtcgttggaa gagatcagaa aggcacagag agcggatggc 60
cccgcaggca tcttggggat aggcacggcc aaccctgcga accatgtgat ccaggcagag 120
tatccggact actacttccg catcaccaac agtgagcaca tgactgacct caaggagaag 180
ttcaagcgca tgtgcgacaa gtcgatgata cggaaacggc acatgcacct gacggaggag 240
ttcctgaagg agaatccgga catgtgcgcc tacatggctc cttctcttga tgtgaggcag 300
gacatcgtgg tggtcgaggt ccctaagcta gggaaagagg cggcagtgaa ggccatcaag 360
gagtggggtc agcccaagtc caagatcacc cacgtcgtct tctgcactac atccggagtt 420
gacatgcctg gtgctgacta ccagctcacc aagctcctcg gtcttcgccc ttccgtcaag 480
cgtctcatga tgtaccagca aggttgctac gccggcggca ctgtcctccg actcgccaag 540
gacctcgctg agaataaccg tggtgctcgt gtccttgtcg tctgctccga gatcacagcc 600
gtcaccttcc gtggcccctc tgacacacac ctcgactccc tcgttggtca ggctctcttc 660
agtgacggtg ctgccgcgct cattgttggt gcggaccctg atgcctccgt gggagagaag 720
cctatcttcg agatggtgtc tgctgcacag accatcctcc cagactcgga cggagccata 780
gatggacact tgagggaagt tggctcacc ttccatctcc tcaaggacgt ccctgggctc 840
atctcgaaga acatagagaa gagtctagaa gaagcgttta aaccgctcgg gataagtgac 900
tggaactctc tcttttggat agctcaccct ggaggtcctg cgatcctgga ccaggttgag 960
ttaaagctag gactcaagga agagaagatg agggccacgc gtcacgtgct gagcgagtac 1020
ggaaacatgt cgagcgcgtg cgttctcttc attatggacg agatgaggag gaagtccaag 1080
gaggatggtg tggccacgac aggagaaggg ttggagtggg gtgtcttgtt tggtttcgga 1140
ccaggtctca ccgtagagac agtcgtcttg cacagcgtcc ctgtttga 1188

<210> SEQ ID NO 58
<211> LENGTH: 395
<212> TYPE: PRT
<213> ORGANISM: Thlaspi arvense

<400> SEQUENCE: 58

Met Val Met Gly Thr Gln Pro Ser Leu Glu Glu Ile Arg Lys Ala Gln
1 5 10 15

```
Arg Ala Asp Gly Pro Ala Gly Ile Leu Gly Ile Gly Thr Ala Asn Pro
            20                  25                  30

Ala Asn His Val Ile Gln Ala Glu Tyr Pro Asp Tyr Tyr Phe Arg Ile
        35                  40                  45

Thr Asn Ser Glu His Met Thr Asp Leu Lys Glu Lys Phe Lys Arg Met
    50                  55                  60

Cys Asp Lys Ser Met Ile Arg Lys Arg His Met His Leu Thr Glu Glu
65                  70                  75                  80

Phe Leu Lys Glu Asn Pro Asp Met Cys Ala Tyr Met Ala Pro Ser Leu
                85                  90                  95

Asp Val Arg Gln Asp Ile Val Val Val Glu Val Pro Lys Leu Gly Lys
            100                 105                 110

Glu Ala Ala Val Lys Ala Ile Lys Glu Trp Gly Gln Pro Lys Ser Lys
        115                 120                 125

Ile Thr His Val Val Phe Cys Thr Thr Ser Gly Val Asp Met Pro Gly
    130                 135                 140

Ala Asp Tyr Gln Leu Thr Lys Leu Leu Gly Leu Arg Pro Ser Val Lys
145                 150                 155                 160

Arg Leu Met Met Tyr Gln Gln Gly Cys Tyr Ala Gly Gly Thr Val Leu
                165                 170                 175

Arg Leu Ala Lys Asp Leu Ala Glu Asn Asn Arg Gly Ala Arg Val Leu
            180                 185                 190

Val Val Cys Ser Glu Ile Thr Ala Val Thr Phe Arg Gly Pro Ser Asp
        195                 200                 205

Thr His Leu Asp Ser Leu Val Gly Gln Ala Leu Phe Ser Asp Gly Ala
    210                 215                 220

Ala Ala Leu Ile Val Gly Ala Asp Pro Asp Ala Ser Val Gly Glu Lys
225                 230                 235                 240

Pro Ile Phe Glu Met Val Ser Ala Ala Gln Thr Ile Leu Pro Asp Ser
                245                 250                 255

Asp Gly Ala Ile Asp Gly His Leu Arg Glu Val Gly Leu Thr Phe His
            260                 265                 270

Leu Leu Lys Asp Val Pro Gly Leu Ile Ser Lys Asn Ile Glu Lys Ser
        275                 280                 285

Leu Glu Glu Ala Phe Lys Pro Leu Gly Ile Ser Asp Trp Asn Ser Leu
    290                 295                 300

Phe Trp Ile Ala His Pro Gly Gly Pro Ala Ile Leu Asp Gln Val Glu
305                 310                 315                 320

Leu Lys Leu Gly Leu Lys Glu Glu Lys Met Arg Ala Thr Arg His Val
                325                 330                 335

Leu Ser Glu Tyr Gly Asn Met Ser Ser Ala Cys Val Leu Phe Ile Met
            340                 345                 350

Asp Glu Met Arg Arg Lys Ser Lys Glu Asp Gly Val Ala Thr Thr Gly
        355                 360                 365

Glu Gly Leu Glu Trp Gly Val Leu Phe Gly Phe Gly Pro Gly Leu Thr
    370                 375                 380

Val Glu Thr Val Val Leu His Ser Val Pro Val
385                 390                 395
```

<210> SEQ ID NO 59
<211> LENGTH: 4151
<212> TYPE: DNA
<213> ORGANISM: Thlaspi arvense

<400> SEQUENCE: 59

```
cgaatccgca tagagaagct gaagctcagg tttctcaatt atttcttctt tctttttcaa      60
aaggcttatc attgacttgt ctctgttttt tttttttttt ttttgtgatc attgattcag     120
tctctccaac ttgatgaaaa agataaccat ccaagagccc acctttgaga gaattattgt     180
agtatacagg tacaagagta gagtaatggt gaaatctttg gagggatgtg agtttgattc     240
tcattttggc tttggattca catacacgca ggagagtttc agggaagaga gaatcagaaa     300
ggaacatata tgtgaaacac ttcaagagca ttcctatggc tgatatggaa attgtgcttg     360
taagcatcca ttaaccaaca ctttgtgctc aaatgtatct tactaattat aaattaactg     420
attgctcata acggcacagc cagagaagaa aaatccaggt cttacgccac tggactgggt     480
caagtttctt gtctctgctg ccattggact ggtcagttct gctacactat tctaaagact     540
ttaataatca gactctgaaa attttgattt ctcaaactct gcttttacag gtcacagtgg     600
ttagttcagt gagcctaaaa aaaactgaca tcagagtcat tgctgccata cttagcacgg     660
tcgtggccta ctgcgttaaa acatatttca cgtaatctac actcaataat cagacaacac     720
cctcgcttat agctaaatta atccttaatt agctctgtct cttcctctgt atgaaatgta     780
ggttccagag aaacttggta gattatcaga gccttatcac aagatctgtg tatgataagc     840
agctagacag tggaagaggc actctgcttc acctctgcga tgaagtcatc caacaagagg     900
tgctaataaa tagtcctttt ttcttatttt tcttatgtca tattcttgtg ttttgctaat     960
taaaaaactg atcaaacgca ggttaaagag gtcattattt ccttcttcat gctgataaag    1020
caagggcgtc ccacgagcaa ggaggagctt gacatgcaaa gtgaagcatt catcaaagaa    1080
gaattcaacg aaagttgcaa tttcgatgtg gatgatgctg tcaagaagct tgagaagctt    1140
ggacttgtct ctcgtgtgag tctccttcat ctctcttcta taatcttttc tttttctcca    1200
cgcatatgct tgtatatact cagtaagtaa actaatattg tgaaaatgga aagggttggt    1260
caggattcag aagacaagta tagatgcgtg aatatgaagg aagcaaacga gataatggga    1320
acaacgacgg aagagatggt actcaaggca agaagaggtg gtgaatatga agatgaagag    1380
gcagcagaga ctgagccacg gatgaatcct caagatgaac tcacagcaaa ggaagaacgt    1440
tatcaatctc aattagacga gttcgagacc ttgtggttgt aaaaagattt gacgtcattc    1500
aagacaaata aatttgatat tgtattaaag aaaaagaaaa aaagacataa aggcagacaa    1560
attaattgaa aggacccatc aacaatgagt ccaccacatt tcacatttca cactaaatga    1620
attctccctt aattatttca tacataattt atattaaaat gaaaaacata agactcgatg    1680
atggaaagta tgtgtaggta ggtaggcata taagaggaga gcgctctgta tggtgatggg    1740
tacacaaccg tcgttggaag agatcagaaa ggcacagaga gcggatggcc ccgcaggcat    1800
cttggggata ggcacggcca accctgcgaa ccatgtgatc caggcagagt atccggacta    1860
ctacttccgc atcaccaaca gtgagcacat gactgacctc aaggagaagt tcaagcgcat    1920
gtgtgagtat ccctcttaat actccctatt ttgtatctct tcatttcttt tggcatatgg    1980
ttcccatagt taacaattac tgtaacaggc gacaagtcga tgatacggaa acggcacatg    2040
cacctgacgg aggagttcct gaaggagaat ccggacatgt gcgcctacat ggctccttct    2100
cttgatgtga ggcaggacat cgtggtggtc gaggtcccta agctagggaa agaggcggca    2160
gtgaaggcca tcaaggagtg gggtcagccc aagtccaaga tcacccacgt cgtcttctgc    2220
actacatccg gagttgacat gcctggtgct gactaccagc tcaccaagct cctcggtctt    2280
cgcccttccg tcaagcgtct catgatgtac cagcaaggtt gctacgccgg cggcactgtc    2340
```

ctccgactcg ccaaggacct cgctgagaat aaccgtggtg ctcgtgtcct tgtcgtctgc 2400
tccgagatca cagccgtcac cttccgtggc ccctctgaca cacacctcga ctccctcgtt 2460
ggtcaggctc tcttcagtga cggtgctgcc gcgctcattg ttggtgcgga ccctgatgcc 2520
tccgtgggag agaagcctat cttcgagatg gtgtctgctg cacagaccat cctcccagac 2580
tcggacggag ccatagatgg acacttgagg gaagttgggc tcaccttcca tctcctcaag 2640
gacgtccctg ggctcatctc gaagaacata gagaagagtc tagaagaagc gtttaaaccg 2700
ctcgggataa gtgactggaa ctctctcttt tggatagctc accctggagg tcctgcgatc 2760
ctggaccagg ttgagttaaa gctaggactc aaggaagaga agatgagggc cacgcgtcac 2820
gtgctgagcg agtacggaaa catgtcgagc gcgtgcgttc tcttcattat ggacgagatg 2880
aggaggaagt ccaaggagga tggtgtggcc acgacaggag aagggttgga gtggggtgtc 2940
ttgtttggtt tcggaccagg tctcaccgta gagacagtcg tcttgcacag cgtccctgtt 3000
tgacttttac aattcaagtc ttttagagtt tgatcgatga gtgagattgt gtactatgca 3060
agttatgtat atttgatggc aagcggagag tgggagttta tattaacgag agaaagggag 3120
aagagagagt gtggtaggtt agatggacgg gcagatgaag cactacgtgt ctatgtgtta 3180
gctccctttt atgtggttct ccttcttgct tccctttttat ttcgttactt accaagaata 3240
ttgaatggtg gtttttttat tgattttacg tatattcgca acaacaagtc atattaattt 3300
ctatgtgcgt aattattata tattcgatgt atatacatgt aaagatacgt acggcctact 3360
ggagaggtta gttgtataga ttttcccaca cgtgcatact taactccatc attagctcct 3420
actaatctaa ttttccttct taatatacct gataatccta taactaacta aaaattacat 3480
taggtacgtc tcgttttctc tctcccaccc catcatgatg atagtttgaa tctgctcctt 3540
tttcggcttc caacaacgca agatgcattt cgcatcccat cataatgata tttgtgttgt 3600
tgctgttctt tatgttagac taataaaaga tgcatttgta agcttttgcc tcattaattt 3660
tattcggaaa aaaattgaat atgcgtaata tcacatcgtt ttttgttagt attcatttat 3720
tcaattcatg tcttaataat gttgtagata tttttattgg aaaaataata tcaatgggcc 3780
cataaaagaa ggtgggccct agagctggtt atgcttagcc atgtgggcag aatataacca 3840
gagtgtgttg tcattgtggt aagtaggggc actccaatgc gggtgttttt atcaacccgg 3900
cccggcccaa agcctatccg tcgaaaaccc gtgtccatca aaaactcgcc aaactagcgg 3960
ttatatttag ggttgggcaa attatccgtt atatttgatt cgatctgcta tttgtttcga 4020
ttcgattcga aaaatccaga tatccatagc tttacggagc aaagcaaata ctaaattttg 4080
atattcgtta aaaacggagc aaatcacaaa tattaaaatt ttaagagtcg gatatccgat 4140
ctgctctaat a 4151

<210> SEQ ID NO 60
<211> LENGTH: 759
<212> TYPE: DNA
<213> ORGANISM: Thlaspi arvense

<400> SEQUENCE: 60
atgtcttctt ccgcatgtcc gtcaccgtta ccctcagtca gcaaacttca tgtcgattcc 60
gttacttttc caccgtccgt caattcaccg gcttcctcca atcccctatt cctcggtggc 120
gcaggggtgc gagggttaga tattcaagga aagtttgtga ttttcaccgt catcggagtt 180
tacctagacg ctgtcgccgt cccgtcactc tctgttaagt gggagggcaa aactacagaa 240
gagttaacgg aatccgtccc ttttttccgt gaaatcgtca caggtgcgtt tgagaaattc 300
ataaaggtga cgatgaaact gccgttaacg ggacagcagt attcggagaa agtaacggag 360
aattgtgtgg cgatttggaa atcgttaggg atttacacag agagtgaagc taaagctgtg 420
gagagatttt tggaagtctt caaggaccaa actttcgctc ctggtgcatc catcctcttc 480
gctctctccc ctaacggctc cctcacggtt gcgttttcga aagacgatag cattcctgaa 540
accggaaaag cggtgatcga gaataaattg ttggcagagg cagttcttga atcaataatt 600
ggaaagaagg gtgtgtctcc tgggactagg ctgagtatag cagagaggtt agctaagctg 660
atgaagaaga agaaggtcga agaagatgca tcatcactga ctgatcaaga ggaagctaca 720
gatctctccc tcggagataa attggccaaa gagaactga 759

<210> SEQ ID NO 61
<211> LENGTH: 252
<212> TYPE: PRT
<213> ORGANISM: Thlaspi arvense

<400> SEQUENCE: 61

```
Met Ser Ser Ser Ala Cys Pro Ser Pro Leu Pro Ser Val Ser Lys Leu
1               5                   10                  15

His Val Asp Ser Val Thr Phe Pro Pro Ser Val Asn Ser Pro Ala Ser
            20                  25                  30

Ser Asn Pro Leu Phe Leu Gly Gly Ala Gly Val Arg Gly Leu Asp Ile
        35                  40                  45

Gln Gly Lys Phe Val Ile Phe Thr Val Ile Gly Val Tyr Leu Asp Ala
    50                  55                  60

Val Ala Val Pro Ser Leu Ser Val Lys Trp Glu Gly Lys Thr Thr Glu
65                  70                  75                  80

Glu Leu Thr Glu Ser Val Pro Phe Phe Arg Glu Ile Val Thr Gly Ala
                85                  90                  95

Phe Glu Lys Phe Ile Lys Val Thr Met Lys Leu Pro Leu Thr Gly Gln
            100                 105                 110

Gln Tyr Ser Glu Lys Val Thr Glu Asn Cys Val Ala Ile Trp Lys Ser
        115                 120                 125

Leu Gly Ile Tyr Thr Glu Ser Glu Ala Lys Ala Val Glu Arg Phe Leu
    130                 135                 140

Glu Val Phe Lys Asp Gln Thr Phe Ala Pro Gly Ala Ser Ile Leu Phe
145                 150                 155                 160

Ala Leu Ser Pro Asn Gly Ser Leu Thr Val Ala Phe Ser Lys Asp Asp
                165                 170                 175

Ser Ile Pro Glu Thr Gly Lys Ala Val Ile Glu Asn Lys Leu Leu Ala
            180                 185                 190

Glu Ala Val Leu Glu Ser Ile Ile Gly Lys Lys Gly Val Ser Pro Gly
        195                 200                 205

Thr Arg Leu Ser Ile Ala Glu Arg Leu Ala Lys Leu Met Lys Lys Lys
    210                 215                 220

Lys Val Glu Glu Asp Ala Ser Ser Leu Thr Asp Gln Glu Glu Ala Thr
225                 230                 235                 240

Asp Leu Ser Leu Gly Asp Lys Leu Ala Lys Glu Asn
                245                 250
```

<210> SEQ ID NO 62
<211> LENGTH: 3963
<212> TYPE: DNA
<213> ORGANISM: Thlaspi arvense

<400> SEQUENCE: 62

```
ttccccacaa acaatgtgtg tgtcagctat atatttatgg gaaggctgaa acgtttaaat     60
actagcctct gcatcgtttg ttgtaatttt gtgataaaat tgtaacatat ttaatcgttt    120
tatctctagg tacttttatg gaatattgta aaagaattct atttttgtgt aaaatccaaa    180
ttagcgtatt atacttgaat acacaagcat ttcggcacat agttcaattg ggttaattc     240
atgaatcatt tttaattcaa aaatttcgac ccatcaaaat tagacaatga ccaaagaaat    300
tataaaaaat gagatgatgt ttgaaaatgt ttagtgagga agtgaaggta tagattatag    360
acgtttattg tcaaatttca acggatgtta tatacgttgt taaatttaaa acaactttag    420
aatatatatg gcgcgtgatt ttgttaaatc gactttggta ggaaaatgtt attttgcgat    480
tttgtcaaga aaacgtaatt ttgtgatttt gaccaaaaaa aatgttattt acagtaatag    540
aaaaaaataa ttttataatt taaaaaacat gatttttgat tttattgaaa ttttttttt     600
ttaattttag tgagaagtga ttgcacattt ttaatgggaa aattttctac aattttaatt    660
aaaaaaatga tttcagcata attttagtaa aaaaattgtg attttacagt tttataaaaa    720
aatatacgtt tttattttt tgaaataatt gaaaaatctc atttatatta tgttgattta     780
ttcatctgaa atttgcattt aaatattcta tctaaataaa agtattttaa ttatttgtta    840
ttttaaaata gattatttcc attttttatc aataaacaac cccatatgtt gttaaacaaa    900
gaaagaaagg acaatctata tttcttagtt atttttatta ttatattttc tttattcttt    960
attctcttta tttatattat ttttataatg ttcattaatt aaaacctacc tcttacagaa   1020
ctttttttggg ttgttttaaa aggatcagac atagtgtaaa ctaaaaaatt aaactgaacc  1080
aaaccaaact atgtcttata cttatcaagt aatatacact acatgataag cttaaactag   1140
attctatctt tatcataaat taattttatc tttatcacat tgtggtctac ataaatcctc   1200
attacataag tatcttaatt aaatcttcta gattcttcct taacagtaaa ccaagattaa   1260
aaatgatctg atttgaactg ataaaaccta aactaaaaag aaattggcat acctaccgac   1320
tctaaagcgg tcagagttcc cgcaaccacc aaaattataa accactgaat cttccaatca   1380
acaaaaccac gtgtttaccc atccaacact cgtaagctat tgctagttgc tacctacctc   1440
catcttctct tataattacc aatctccatc aaattctttt ttactttttt ttacattata   1500
atcaaaccta acaccctcaa agtcaaaacc atgtcttctt ccgcatgtcc gtcaccgtta   1560
ccctcagtca gcaaacttca tgtcgattcc gttacttttc caccgtccgt caattcaccg   1620
gcttcctcca atcccctatt cctcggtggc gcaggttcga gtgctgttta attcatttgc   1680
tcttgcagca ttcttttttt ttttttaaa tgcgtttttt gttgcctctt tgagtttctc    1740
tgtttcttgc taacttacgc aggggtgcga gggttagata ttcaaggaaa gtttgtgatt   1800
ttcaccgtca tcggagttta cctagacgct gtcgccgtcc cgtcactctc tgttaagtgg   1860
gagggcaaaa ctacagaaga gttaacggaa tccgtccctt ttttccgtga aatcgtcaca   1920
ggtgcttgtc atgcaacaaa ctgttttaag tcaaaaaggg attttaattt gtttagacca   1980
aactatttga ccgtcattaa tttattatta ccatttttag ttaattatga tttttttttg   2040
tttttgggca cgattaggtg cgtttgagaa attcataaag gtgacgatga aactgccgtt   2100
aacgggacag cagtattcgg agaaagtaac ggagaattgt gtggcgattt ggaaatcgtt   2160
agggatttac acagagagtg aagctaaagc tgtggagaga tttttggaag tcttcaagga   2220
ccaaactttc gctcctggtg catccatcct cttcgctctc tcccctaacg gctccctcac   2280
```

```
ggtacttctt gtcctatcac acagctttgc gtttgcgttt acattactat tacgaactgt   2340
ttacaatgaa acgcaaatta atgtagaaat agcgtttaaa acgaactgtg cccaaaacat   2400
gtatttttaa gtaagatttg gttttaaaaa ttgttttacg tgtattaaac gcaattgacg   2460
ttagaaaaac agtcgtaggt tgtaaaatgt ctttgttgtg aaaaaaaaat cgttttgcag   2520
gttgcgtttt cgaaagacga tagcattcct gaaaccggaa aagcggtgat cgagaataaa   2580
ttgttggcag aggcagttct tgaatcaata attggaaaga agggtgtgtc tcctgggact   2640
aggctgagta tagcagagag gttagctaag ctgatgaaga agaagaaggt cgaagaagat   2700
gcatcatcac tgactgatca agaggaagct acagatctct ccctcggaga taaattggcc   2760
aaagagaact gatcctatgc cgagattttt cttggtttct gagggatttt atgtttctgt   2820
tatatttaat cctattccat cgcatgttta atttatctct gttcgtaaga ataattaaat   2880
aacctcatgg tattggatca aagtttccaa acaaaacaaa attgtattgt caaatattta   2940
atacaagcca aacttgataa acatttagtt ctaggcttga tcacacggat ccgcaaggtt   3000
aagtaattgg ttaaccgaag ggaagggaaa acacctacac gaatcccgga ccgggcctaa   3060
attcttttaa ctagaacacg gcccaatctg tagaccagtt cggcccattg tagtatcaaa   3120
aatattccat aaacgaaatc atttgatttc aaatggagga aatcattaaa ttagcagacg   3180
cggaaaacca ctatctcatc aaaataaatt gcgaaattta ttgaataaac taatgaatca   3240
ataaataaat gaaatggtcc aaccatctaa aaattgattt tctaagatgt cactgtatca   3300
atatcaccca ttcatgttca tataaaccct acccgccagc ataatgcata ttgagtattg   3360
acgacttata aacaaaagaa gaaatcactt acagaaaaat gatttcttga ggaaatagat   3420
cacaggatgt gtatgttgat taatgaccta gggtacaata atgcagtttg attcactact   3480
agacccataa tttttttttt ttaaaaataa aaagggcttt catgacccat aaaaattatt   3540
attatctttt tttcccataa aaattatttg ataattgttt acgtgtttgt ttgttttctc   3600
gttcatattg atatttctct catccgaatt cttgcatttt caacgtgtca attatctttt   3660
taaaactacg taaatactat tatgatacct tgtaggcttg tactgaatat ttgtgagtat   3720
tttaggcttt ataaattctt atgccgactt tgttatcaag ccttcgacac attttctgtg   3780
gcgttcttga gactataaaa tttgggagac gattgaacca ttttgttttt atctataatg   3840
gtttttcttt tgtatccttt atttgatttt ttttcttctt tttttggctg gttctagaga   3900
ccttcttagc cacagtgatt cttctgtcat cagttcatca aatcctgaaa agagcatcat   3960
agc                                                                 3963
```

<210> SEQ ID NO 63
<211> LENGTH: 1239
<212> TYPE: DNA
<213> ORGANISM: Thlaspi arvense

<400> SEQUENCE: 63

```
atggctccag ggactctcac cgagctcgcc ggagaggcta agctcaactc taaattcgtc     60
cgggacgagg acgaacgtcc caaggtggca tacaacaagt ttagcgacga tatcccggtg    120
atatctctcg ccggactcga cgatgttggt gggaaaagag gagagatctg ccgtaagatc    180
gttgaggctt gcgagaattg gggcgtgttc caggtggtcg atcatggtgt cgataccaat    240
ttggtagagg atatgactcg cctcgctcgc gacttctttg ctttaccacc cgaagagaaa    300
cttagtttcg acatgtctgg tggtaagaaa ggcggcttca tcgtctctag tcaccttcag    360
ggagagactg tgcaagattg gagagagatc gtgacgtact tctcgtaccc ggtgagaaac    420
```

```
agagactact cacggtggcc agataagccg gaagggtggg tgaaagtgac ggaggagtac    480
agcgacaaac tgatgggttt agcttgtaag cttcttgagg ttttgtctga agctatgggg    540
ctcgagaaag aagcacttac caatgcttgc gtcgatatgg accaaaagat agttgttaat    600
tattacccta aatgccctca gcctgatctc accctcggac tcaagcgtca cactgatcct    660
ggaaccatca ctttgctgct ccaagaccag gtcggtggat tacaagccac acgcgacgat    720
ggcaaaacat ggataacggt tcagccaatt gagggagctt ttgtcgtgaa tctcggcgac    780
catggtcact atttgagcaa cgggaggttc aagaacgcgg atcatcaggc ggtggtgaat    840
tccaactcga gcaggctatc tatagccacg tttcagaatc cggcgcagga tgcaaccgtg    900
tatccgctta aagttagaga aggagagaag ccgatcttgg aggagccaat cacttttgca    960
gagatgtata agagaaagat gggaaaagat ctggagctgg ctcgcctcaa gaagcttgcg   1020
aaagaagaaa atgaccagaa gctggccaaa gaagaacatg acaagaacct ggccaaagaa   1080
gaaaatgatc agaagctggc taaagaagaa catgaccaga agctggccaa agaagaacat   1140
gacaagagcc ttgccaaaga agaaaattac caaaagctgg ccaaagatga acatagccac   1200
acggaagctg ttaagcgtct cggccaaatc ctcgcttag                          1239
```

<210> SEQ ID NO 64
<211> LENGTH: 412
<212> TYPE: PRT
<213> ORGANISM: Thlaspi arvense

<400> SEQUENCE: 64

```
Met Ala Pro Gly Thr Leu Thr Glu Leu Ala Gly Glu Ala Lys Leu Asn
1               5                   10                  15

Ser Lys Phe Val Arg Asp Glu Asp Glu Arg Pro Lys Val Ala Tyr Asn
            20                  25                  30

Lys Phe Ser Asp Asp Ile Pro Val Ile Ser Leu Ala Gly Leu Asp Asp
        35                  40                  45

Val Gly Gly Lys Arg Gly Glu Ile Cys Arg Lys Ile Val Glu Ala Cys
    50                  55                  60

Glu Asn Trp Gly Val Phe Gln Val Val Asp His Gly Val Asp Thr Asn
65                  70                  75                  80

Leu Val Glu Asp Met Thr Arg Leu Ala Arg Asp Phe Phe Ala Leu Pro
                85                  90                  95

Pro Glu Glu Lys Leu Ser Phe Asp Met Ser Gly Gly Lys Lys Gly Gly
            100                 105                 110

Phe Ile Val Ser Ser His Leu Gln Gly Glu Thr Val Gln Asp Trp Arg
        115                 120                 125

Glu Ile Val Thr Tyr Phe Ser Tyr Pro Val Arg Asn Arg Asp Tyr Ser
    130                 135                 140

Arg Trp Pro Asp Lys Pro Glu Gly Trp Val Lys Val Thr Glu Glu Tyr
145                 150                 155                 160

Ser Asp Lys Leu Met Gly Leu Ala Cys Lys Leu Leu Glu Val Leu Ser
                165                 170                 175

Glu Ala Met Gly Leu Glu Lys Glu Ala Leu Thr Asn Ala Cys Val Asp
            180                 185                 190

Met Asp Gln Lys Ile Val Val Asn Tyr Tyr Pro Lys Cys Pro Gln Pro
        195                 200                 205

Asp Leu Thr Leu Gly Leu Lys Arg His Thr Asp Pro Gly Thr Ile Thr
    210                 215                 220
```

Leu Leu Leu Gln Asp Gln Val Gly Gly Leu Gln Ala Thr Arg Asp Asp
225 230 235 240

Gly Lys Thr Trp Ile Thr Val Gln Pro Ile Glu Gly Ala Phe Val Val
245 250 255

Asn Leu Gly Asp His Gly His Tyr Leu Ser Asn Gly Arg Phe Lys Asn
260 265 270

Ala Asp His Gln Ala Val Val Asn Ser Asn Ser Ser Arg Leu Ser Ile
275 280 285

Ala Thr Phe Gln Asn Pro Ala Gln Asp Ala Thr Val Tyr Pro Leu Lys
290 295 300

Val Arg Glu Gly Glu Lys Pro Ile Leu Glu Glu Pro Ile Thr Phe Ala
305 310 315 320

Glu Met Tyr Lys Arg Lys Met Gly Lys Asp Leu Glu Leu Ala Arg Leu
325 330 335

Lys Lys Leu Ala Lys Glu Glu Asn Asp Gln Lys Leu Ala Lys Glu Glu
340 345 350

His Asp Lys Asn Leu Ala Lys Glu Glu Asn Asp Gln Lys Leu Ala Lys
355 360 365

Glu Glu His Asp Gln Lys Leu Ala Lys Glu Glu His Asp Lys Ser Leu
370 375 380

Ala Lys Glu Glu Asn Tyr Gln Lys Leu Ala Lys Asp Glu His Ser His
385 390 395 400

Thr Glu Ala Val Lys Arg Leu Gly Gln Ile Leu Ala
405 410

<210> SEQ ID NO 65
<211> LENGTH: 4251
<212> TYPE: DNA
<213> ORGANISM: Thlaspi arvense

<400> SEQUENCE: 65
aaaatgtagg gaaaaaaaaa cagagagaat cagatacaga gagacgaaat ccgaatcgga 60
gtctatctat ctacttgaaa ttggtgacag aagaggaaca gagaattgct aataaaattc 120
taagataggc acaaaaaaac aagaacaagt ttcatttgga acaagaagat gactgaaaga 180
aactgcaaga agagaatcat ggaaagacaa aacataccta atgaaaaggg aattttagag 240
tcagaatcag agttactgat tgaaaagata gcctgcgatc tagtgactct tcttgctgat 300
gatggagtct ccattaggat cttgatcgtc ttgcaagcaa caacggctaa agatcaagtg 360
aaagaatttc tgggaaaatc aatctgaatt tcaatatctg agatatcaat aaagaagaga 420
aaggggataa acaattgcga atctcttagg tagcagtatt ataggtatgg ggaaaaggtt 480
accgtttgaa ataaactagc cgttgcgtct aaacggaagg aaggagccgt aatactagcc 540
gttgggtcca ttctctcatg gaaagaaatc aagaatggtt aaagacttaa agtagctgtt 600
tgggttgaaa tctcagtacg ttaggggctt ttacggatta agaaggctgc gattaatagc 660
tcggcccatt tatctctctg ttgcgagttg caagctgcta aaagttttat aagctttttt 720
attcggttat ttgccaatcg tttaaattac tcctatgatt tataaatctt ggaatgtgtg 780
tatgagacga agtattcatt gttttcaatc tatggtgtct gttttatgtt ttgctttttt 840
ttttttaatt aaatatacaa ctcacaattc acaagccatg acaaaacata tcaaaatgtt 900
gataagagta atgaaaacta aatacactag aaaagtcaga tccaacattt cgtcttctcg 960
gattaaggac gatataaata taatatatat agtgaaaaaa aggtttttct tctctgatct 1020
caatgggatt atgtacaaat aaccatgcaa aattgatgat catttggatt tttgtagtgc 1080

```
aaacccgtaa cgtaacaatt tttgccatgt gaattcaccg agaacgacca tttttttttct   1140
tttttaata aaaaaatatg caacccattt tttaagacgt ggcattaaat tcaccgtaaa   1200
aaacatttaa ctatattggg catggtgtta aagcaacttt actagaaacg atttatgtac   1260
acaatggaat gtagcgcaga aaatatgatt tattagaaag aaattaaaga cagaagcacg   1320
tataggaagt tgagtaactg cgtgtttcta gaaacagaac ggacggtata gtactgtggt   1380
aggtagcgag cgacctcttc gttcgtcagt cttcacaacc tttgaaaggt ttttcagcta   1440
ccagtcatct ccttatatat tggttacctc ttttatctct ctttataaac ttaattagtc   1500
ttttgccttt gtaaccaaac actcacaaaa aaatataaaa atggctccag ggactctcac   1560
cgagctcgcc ggagaggcta agctcaactc taaattcgtc cgggacgagg acgaacgtcc   1620
caaggtggca tacaacaagt ttagcgacga tatcccggtg atatctctcg ccggactcga   1680
cgatgttggt gggaaaagag gagagatctg ccgtaagatc gttgaggctt gcgagaattg   1740
gggcgtgttc caggtggtcg atcatggtgt cgataccaat ttggtagagg atatgactcg   1800
cctcgctcgc gacttctttg ctttaccacc cgaagagaaa cttagtttcg acatgtctgg   1860
tggtaagaaa ggcggcttca tcgtctctag tcaccttcag gtaaagccac acaatttacg   1920
ttacgttttc atgcgactca aacttttata ctgtagactt aattagacct ataatcacat   1980
ttcgggccgc aaaaatacga attatgtttt gatcttgtag ttaaatacga aataatgatg   2040
ataaacgcag ggagagactg tgcaagattg gagagagatc gtgacgtact tctcgtaccc   2100
ggtgagaaac agagactact cacggtggcc agataagccg gaagggtggg tgaaagtgac   2160
ggaggagtac agcgacaaac tgatgggttt agcttgtaag cttcttgagg ttttgtctga   2220
agctatgggg ctcgagaaag aagcacttac caatgcttgc gtcgatatgg accaaaagat   2280
agttgttaat tattacccta aatgccctca gcctgatctc accctcggac tcaagcgtca   2340
cactgatcct ggaaccatca ctttgctgct ccaagaccag gtcggtggat tacaagccac   2400
acgcgacgat ggcaaaacat ggataacggt tcagccaatt gagggagctt ttgtcgtgaa   2460
tctcggcgac catggtcacg tacgtcagta tactctctca atctctctgc ttatattttt   2520
ctccgtttgt gattttgact tggccaaact tgcttgtcta ttgaagtatt tgagcaacgg   2580
gaggttcaag aacgcggatc atcaggcggt ggtgaattcc aactcgagca ggctatctat   2640
agccacgttt cagaatccgg cgcaggatgc aaccgtgtat ccgcttaaag ttagagaagg   2700
agagaagccg atcttggagg agccaatcac ttttgcagag atgtataaga gaaagatggg   2760
aaaagatctg gagctggctc gcctcaagaa gcttgcgaaa gaagaaaatg accagaagct   2820
ggccaaagaa gaacatgaca agaacctggc caaagaagaa aatgatcaga agctggctaa   2880
agaagaacat gaccagaagc tggccaaaga agaacatgac aagagccttg ccaaagaaga   2940
aaattaccaa aagctggcca aagatgaaca tagccacacg gaagctgtta agcgtctcgg   3000
ccaaatcctc gcttagagtc cttgttgctc cgctgtgttg gtttcggttt ggttttgtaa   3060
tttgttttat cgtcaagtta acgaacgtgg tgtgtttgag tttcttctca atatagaaat   3120
aatgacaagt aatgcaattg tacttgctct gtttgtttgg ttacttttta tgtcagaagc   3180
acatacatta ctttctcgct attcgtgtgg atgtaaattt aataagataa tgacggttaa   3240
accggtagta ggaccatttt atttctttat ggtttcttta cgccacgtgt ccgtctaaaa   3300
gaaacttacc ttgaaaaagt gaataattca tccctctttt tcaagtttcg atttttttttt   3360
ctcttttcga gtcattttgt tctaatcaac gacgacgcga cggagatgaa tccttttcac   3420
```

ggtgccgacg ggaagcaaag accggcgatg tatccggaca tcgatcaatc aattccggat 3480
aatcctttcg ctcagacaaa cccttatgcc gcttctgccc ctaatctcta cccttctccc 3540
tcctcgaaca atctcgggcc taatcttttc ccggaccacg gagatgcatc caacaaccag 3600
tcaccgtctg ctccgcctca agcgacggag gaggttctca tccgtgtccc gggctccatt 3660
ctcaacctta tcgacaaatc ctacagcgtc gaactcgcgt gcggtgactt caccatcgtt 3720
cgaatcgtcc agggccagaa catcgtcgcc gttctcgcca acgtcgccga tgagattcaa 3780
tggccgttga acaagagcga ggtagcagcg aaggtcgatg ggtcgcacta tttcttttca 3840
atccacccgc caaaggaaga gggtcacgga tctgggtccg actccgatgg tgagaagcag 3900
gggaaaaaga gcaatccgaa accggaggac gaaattctca attacggatt gaccattgct 3960
tcgaaagggc aagagaacgt attaaacgag ctcgaccggg ttctccggga ctattgctgc 4020
ttcacggagc agaggatgtc tgaaaaggcg aaggagacgg gagaggaggt gctgggaaac 4080
tccatggctg cggcgacttc gccggaggag ctgaagggtg agaggaaaga catcgtggag 4140
ggtcaatgcg cggcgtattg gaccacactc gcgcctaaca tcgaggatta cagtagcaag 4200
actgctaagt tgatagcttc cgggtcaggt cagctgatca gagggatact t 4251

<210> SEQ ID NO 66
<211> LENGTH: 1545
<212> TYPE: DNA
<213> ORGANISM: Thlaspi arvense

<400> SEQUENCE: 66
atggccactc tcttactcac aatcctcctc cccactttcc tcttcctcct cgtcctcctc 60
ctttctctcc gccgcaacca caaccgcagt agccgtctcc caccaggccc aaaaccatgg 120
cccatcctcg gaaacctccc tcacatgggt cctaaacccc atcgaaccct agccgccatg 180
gtaaccacct acggtccaat cctccacctc cgattagggt tctccaacgt cgtggttgct 240
gcgtctaaat ccgtggccga acagttcttc aaaatccatg atgccaattt cgctagccga 300
ccaccaaatt caggagccaa acacatggca tataactatc aagatcttgt ctttgcgcct 360
tacggacaac gatggagaat gttgaggaag attagttctg ttcatttatt ttcagctaaa 420
gctcttgaag attacaagca tgttcggcag gaagaggtag gaacgctcac gcgcgagcta 480
gtggatgcag gcacgaaacc cgtaaactta ggccagttgg tgaacatgtg tgtggtcaac 540
gcgcttggaa gagagatgat cggacggcgt ctgttcggcg ccggagctga tcacaaagcg 600
gaggagtttc gatcgatggt gacggaaatg atggctctcg ccggagtatt caacctcgga 660
gatttcgtgc cggctctgga ttggttagat ttacaaggcg ttgctggtaa aatgaaacgg 720
ctacacaaaa gattcgacac ttttctatcg tcgattttga aggagcacga gatgatgcac 780
ggtcaagatc aaaagcataa agatatgctc agcactttaa tctcgctcaa gggaactgat 840
tttgacggtg acggcggaag cctaacggat actgagatca aagccttgct cttgaacatg 900
tttacggctg gaactgacac gtcagcaagt acggtggact gggccatagc tgaactgata 960
cgacacccgg atgcaatgac cagagcccaa gaagaacttg attcagttgt aggccgcgat 1020
aggcccatta acgagtcaga cctttctcgg cttccttatc ttcaggcggt tatcaaagag 1080
aatttcaggc ttcatccgcc gacaccactc tcgttaccac acatcgcatc agagagctgt 1140
gagatcaacg gctaccatat cccgaaagga tcgactcttt taacaaacat atgggccata 1200
gcccgtgacc cggaacaatg gtccgacccg ttatcgtttc gacccgagag atttttacag 1260
ggtggagaaa aatccggcgt cgatgtgaaa ggaagcgatt tcgagcttat accgttcgga 1320

```
gccgggagga gaatctgcgc tgggctcagt ttagggctac ggatgattca gttactgacg   1380

gcgacgctgg ttcacggatt tgattgggaa ttggccggag gaattccgcc ggagaagctg   1440

aatatggagg agacttatgg gattactctg caaagagcag ttcctttggt ggtgcatcct   1500

aagccaaggt tggctcccag tgtttacgaa ctcgggtcgc gctaa                   1545


<210> SEQ ID NO 67
<211> LENGTH: 514
<212> TYPE: PRT
<213> ORGANISM: Thlaspi arvense

<400> SEQUENCE: 67

Met Ala Thr Leu Leu Leu Thr Ile Leu Leu Pro Thr Phe Leu Phe Leu
1               5                   10                  15

Leu Val Leu Leu Leu Ser Leu Arg Arg Asn His Asn Arg Ser Ser Arg
            20                  25                  30

Leu Pro Pro Gly Pro Lys Pro Trp Pro Ile Leu Gly Asn Leu Pro His
        35                  40                  45

Met Gly Pro Lys Pro His Arg Thr Leu Ala Ala Met Val Thr Thr Tyr
    50                  55                  60

Gly Pro Ile Leu His Leu Arg Leu Gly Phe Ser Asn Val Val Val Ala
65                  70                  75                  80

Ala Ser Lys Ser Val Ala Glu Gln Phe Phe Lys Ile His Asp Ala Asn
                85                  90                  95

Phe Ala Ser Arg Pro Pro Asn Ser Gly Ala Lys His Met Ala Tyr Asn
            100                 105                 110

Tyr Gln Asp Leu Val Phe Ala Pro Tyr Gly Gln Arg Trp Arg Met Leu
        115                 120                 125

Arg Lys Ile Ser Ser Val His Leu Phe Ser Ala Lys Ala Leu Glu Asp
    130                 135                 140

Tyr Lys His Val Arg Gln Glu Glu Val Gly Thr Leu Thr Arg Glu Leu
145                 150                 155                 160

Val Asp Ala Gly Thr Lys Pro Val Asn Leu Gly Gln Leu Val Asn Met
                165                 170                 175

Cys Val Val Asn Ala Leu Gly Arg Glu Met Ile Gly Arg Arg Leu Phe
            180                 185                 190

Gly Ala Gly Ala Asp His Lys Ala Glu Glu Phe Arg Ser Met Val Thr
        195                 200                 205

Glu Met Met Ala Leu Ala Gly Val Phe Asn Leu Gly Asp Phe Val Pro
    210                 215                 220

Ala Leu Asp Trp Leu Asp Leu Gln Gly Val Ala Gly Lys Met Lys Arg
225                 230                 235                 240

Leu His Lys Arg Phe Asp Thr Phe Leu Ser Ser Ile Leu Lys Glu His
                245                 250                 255

Glu Met Met His Gly Gln Asp Gln Lys His Lys Asp Met Leu Ser Thr
            260                 265                 270

Leu Ile Ser Leu Lys Gly Thr Asp Phe Asp Gly Asp Gly Gly Ser Leu
        275                 280                 285

Thr Asp Thr Glu Ile Lys Ala Leu Leu Leu Asn Met Phe Thr Ala Gly
    290                 295                 300

Thr Asp Thr Ser Ala Ser Thr Val Asp Trp Ala Ile Ala Glu Leu Ile
305                 310                 315                 320

Arg His Pro Asp Ala Met Thr Arg Ala Gln Glu Glu Leu Asp Ser Val
                325                 330                 335
```

```
Val Gly Arg Asp Arg Pro Ile Asn Glu Ser Asp Leu Ser Arg Leu Pro
            340                 345                 350

Tyr Leu Gln Ala Val Ile Lys Glu Asn Phe Arg Leu His Pro Pro Thr
        355                 360                 365

Pro Leu Ser Leu Pro His Ile Ala Ser Glu Ser Cys Glu Ile Asn Gly
    370                 375                 380

Tyr His Ile Pro Lys Gly Ser Thr Leu Leu Thr Asn Ile Trp Ala Ile
385                 390                 395                 400

Ala Arg Asp Pro Glu Gln Trp Ser Asp Pro Leu Ser Phe Arg Pro Glu
                405                 410                 415

Arg Phe Leu Gln Gly Gly Glu Lys Ser Gly Val Asp Val Lys Gly Ser
            420                 425                 430

Asp Phe Glu Leu Ile Pro Phe Gly Ala Gly Arg Arg Ile Cys Ala Gly
        435                 440                 445

Leu Ser Leu Gly Leu Arg Met Ile Gln Leu Leu Thr Ala Thr Leu Val
    450                 455                 460

His Gly Phe Asp Trp Glu Leu Ala Gly Gly Ile Pro Pro Glu Lys Leu
465                 470                 475                 480

Asn Met Glu Glu Thr Tyr Gly Ile Thr Leu Gln Arg Ala Val Pro Leu
                485                 490                 495

Val Val His Pro Lys Pro Arg Leu Ala Pro Ser Val Tyr Glu Leu Gly
            500                 505                 510

Ser Arg
```

<210> SEQ ID NO 68
<211> LENGTH: 7303
<212> TYPE: DNA
<213> ORGANISM: Thlaspi arvense

<400> SEQUENCE: 68

```
ctctttttcg tttaaaaata aatataaaat cagttcttta tgaaattcaa atgcggtcta     60

tgatccataa acgtggcctt ggcatttacc cgaatcccat ccgtctccat catttgcctt    120

tcgatcgtat atggaagttg gaacgacgtc gacgccaatt ctgcggtaat cgtaatagta    180

ttaaaattgt ggagccaacg gaaacacaat gcatttttgc atttccatgc acacctttgt    240

ttaattttct aaagagaaat tagtatatat ataatttgta ttgatctaat ttttttaaat    300

ccagttcgac tttgaaggaa tttaagttcg acttgtatat aattcttgtc aagacctcga    360

tcccgcatcc agtaataaaa taataatgat tgcaaaggac aacactaata aagaaaatgc    420

tataacgaga aagaattctg aaagacgtac taacgaaaat tgtgtcctag tgaccataac    480

aggagtatca tccaacacta tgaaccacat atcttaccta cccttcacga gtactctcca    540

gctaccacga ttaacgataa atatatggtc cagagaattt ccgaatgatc cgctaatatt    600

cgaataactg aaattatcaa gcagtgagtt taattttttg taaccgtata tctttttagc    660

cttttaaaat gataaactca tttatgaatt aattgaatat atattacgtt taacccatcc    720

attcatattg tcacatattt ttgaattttg ttaacttcct ttttatttct tttcgtattt    780

tctcaaaatc atatgtagtc attatatata cacacaaaaa aaagagatag atattgacta    840

aaaggtagtg aaaaattaca aatctataga cattacacca taaaaaccat ttttcaatag    900

acaaatatat ggttttacta tgtgttgcgg gaatcaacgg aatcaacttg atgttagtat    960

ttacaaatag acgataaatc ttctaaaatt aattataaac acgtgaaagc ttaaagacat   1020

tgtgtaatat cttctgataa tttttaatgt tcaagacagt attttgatta tgaagcttgg   1080
```

```
tcgaaaccaa aaacaaaaat caaaagacaa gaagaattga agaagtgaag aacacaacgt   1140
ttcgttttaa accatacaaa aaagtggttc acgatgtgat cttaaatgta tatctcttta   1200
ataatcactt ttccgttgaa aaggagagga aaaaatcact gtagacttag tttttggaaa   1260
gtatttctca tcccctttc gcaaggggat tgtgtttttt tttatcgaaa atacatggtc   1320
catggttaaa tgggtcaaga gtataattta gtactataat tttataatca aaatgttcta   1380
agttctatct tatatttata taaaaataga agaagatgtt ctaacttata tcatattaat   1440
tagtggcttt acttaaccaa aagattgtta cttatatttt tcaacctacg ttctactaac   1500
gactaagtat tcagtaagat atatagctac ctttcatagt attaatcaaa tcttacgaac   1560
cagaaagctc acctaccatt cgactctctt tcgcttccaa cttattctac ataagataag   1620
attttctcat ctacatattc gtatgtttga cgtcgtggtg ggatccatga tttatccact   1680
ttaacaatag aaaacaaaaa cctaatcaga gaaatataag ctcttatgtt ttaaaaggaa   1740
aaaagcaatg gaaattgaag ctttttaacc aacaaaaaaa ccagagaaat atacattatt   1800
ataattttat atattctgtc aagacgataa ttatcaatgt atatgtgtac taataatgtt   1860
attactcgat tacacccgta gttaataagc cacttaaaat taactattta caaaaaaaaa   1920
aaatcttttg gtgactttga tttgatggtg tgaaaatcta catctcattc ttcagtattc   1980
agatgattat aacaaaatgt tttttttcta aacttgcatt tccgataatc taatactaaa   2040
aaatgtatcg gcagaaagaa tactagcttg aaaaaccttt ttataaaaaa gaaaagtaaa   2100
tatactagct aatggtgccc aacaggagat cgaagtggtg atgtttaatt agttaaaggt   2160
aaaagaaaac ctatttctaa cttttgatga aacaataaaa acaaaaaaat ctttctaacc   2220
taaccgagac atgcatagat agattattgg atttcgcaaa aaaaaaaaaa tcacccttta   2280
tttatagctt atgtttgtta ttcctcattt ctcacttacc attcaaaccc aacactatgg   2340
ccactctctt actcacaatc ctcctcccca ctttcctctt cctcctcgtc ctcctccttt   2400
ctctccgccg caaccacaac cgcagtagcc gtctcccacc aggcccaaaa ccatggccca   2460
tcctcggaaa cctccctcac atgggtccta aaccccatcg aaccctagcc gccatggtaa   2520
ccacctacgg tccaatcctc cacctccgat tagggttctc caacgtcgtg gttgctgcgt   2580
ctaaatccgt ggccgaacag ttcttcaaaa tccatgatgc caatttcgct agccgaccac   2640
caaattcagg agccaaacac atggcatata actatcaaga tcttgtcttt gcgccttacg   2700
gacaacgatg gagaatgttg aggaagatta gttctgttca tttattttca gctaaagctc   2760
ttgaagatta caagcatgtt cggcaggtaa cagtattagt tataaacgtt attctcattt   2820
cctaacgcta taactcacct atatatagag atagtcatgc cgttaatttt tatatttatg   2880
attagtttat tttatatcat tatttaactg tggtacgaac tctagaattt aataaaataa   2940
atttagagaa gtacgtatag agatttttaa tggtggagtg gcgttttttt gtttagtatt   3000
atgttttcag tgttgataaa ataaccaaaa aataataatg ttagtaatcg ttaaaacaca   3060
aaacaaattt tgttgataaa acgagattta tgacttttta tcaacagatt ttgttttgaa   3120
aaacgagaac tagaacataa tactataaca agttccaatc ctgtagaact agtcaccaag   3180
tcataaaact ggaacttttt tatcaaaaaa tattgtttcg tttttcacga tttgcaacct   3240
ttttcgttat tttaacaata ttggaaacat tgcaacctat aaaccccaat ttaaacgagt   3300
aaaacaaaaa aaaaatacta aagtaggcct aagtgcaact gtgcaatact gtcgttgcca   3360
tagacgtaca gtacgatgta tccttgataa taccatggaa aaatggaaag ttcatcagaa   3420
```

acccaaggac aaaatacttc aatatgtatg gaccacattt ttccttaaat aagatgtatc 3480
aacgagtcac cacgagacac gagtgattca ctttcagtag tataagattg tttttgcatt 3540
ttcgtttaaa aaaatgtaga tgaacataca agatgatcct gacaatttat ttataggtag 3600
attacttttc attgatggaa caattgaata tacaaaaatg taaactagac ttcagaattt 3660
taagtttagg ggttaaagta acttaactag ggtctaaagt gtatataggc tttatatttg 3720
agcttaggat ttagatattg gttaattagt ggattttaat cgatttaaat ttagaagcaa 3780
gattatttgt tattaagtta ttacttttta aaatcatagt taaagtcatg tgttaggggt 3840
ttaataaatt ctaaatatta gttgaaattt aatgttatta atttttataa gaaatcgatt 3900
ttacattcga ttttagtttt taacatcttt gtaagtgctt ttgagttact aaagcaactt 3960
tcttatttaa aaacaggctt attgaatttt ttttaaaaat tacgttttga aagcatttga 4020
gtaattgtaa atcttaagta aatttataaa tcaattataa ccctaactaa aatttattaa 4080
tcaactaaac ttcatacacc aataatccta cttagagttt tataaggttt ttgctgttaa 4140
tcaaacatca agatttaaaa atgagtaaaa taaattccaa aatcaactaa tatacccaaa 4200
attttccatt tatagtttaa gtagagcaaa attgaatttt acaggaagag gtaggaacgc 4260
tcacgcgcga gctagtggat gcaggcacga aacccgtaaa cttaggccag ttggtgaaca 4320
tgtgtgtggt caacgcgctt ggaagagaga tgatcggacg gcgtctgttc ggcgccggag 4380
ctgatcacaa agcggaggag tttcgatcga tggtgacgga aatgatggct ctcgccggag 4440
tattcaacct cggagatttc gtgccggctc tggattggtt agatttacaa ggcgttgctg 4500
gtaaaatgaa acggctacac aaaagattcg acacttttct atcgtcgatt ttgaaggagc 4560
acgagatgat gcacggtcaa gatcaaaagc ataaagatat gctcagcact ttaatctcgc 4620
tcaagggaac tgattttgac ggtgacggcg gaagcctaac ggatactgag atcaaagcct 4680
tgctcttggt tcgtataacg atcaattaat tgtagtatta atttcatact ttatgaaaag 4740
ttattgattc cttcttaaat acagaacatg tttacggctg gaactgacac gtcagcaagt 4800
acggtggact gggccatagc tgaactgata cgacacccgg atgcaatgac cagagcccaa 4860
gaagaacttg attcagttgt aggccgcgat aggcccatta acgagtcaga cctttctcgg 4920
cttccttatc ttcaggtata cccttaaccg ggaattagga attgtcttgg ttaacgagct 4980
ctattgttaa tccggtttaa acggttttgt tttaaaaaca ggcggttatc aaagagaatt 5040
tcaggcttca tccgccgaca ccactctcgt taccacacat cgcatcagag agctgtgaga 5100
tcaacggcta ccatatcccg aaaggatcga ctcttttaac aaacatatgg gccatagccc 5160
gtgacccgga acaatggtcc gacccgttat cgtttcgacc cgagagattt ttacagggtg 5220
gagaaaaatc cggcgtcgat gtgaaaggaa gcgatttcga gcttataccg ttcggagccg 5280
ggaggagaat ctgcgctggg ctcagtttag ggctacggat gattcagtta ctgacggcga 5340
cgctggttca cggatttgat tgggaattgg ccggaggaat tccgccggag aagctgaata 5400
tggaggagac ttatgggatt actctgcaaa gagcagttcc tttggtggtg catcctaagc 5460
caaggttggc tcccagtgtt tacgaactcg ggtcgcgcta aacctaagtt tgcttgccag 5520
caaaggtagg tcttgcacgg aggttaaaaa gcttgtttct ggaatttcct caaataaagt 5580
ttaaaatagc gtaatgtggt ccggagtata aggctatgtt atctgcgtcg tcgatccgat 5640
gccgaggaag aagacgatgg ctctcgaaag caaacctgat ccgcggaccc gacccgtttt 5700
atacgactaa gattttcatt cataatagta tatgataatt ttaaatttta aatttttatc 5760
gtgtaatttt tacagtactg aattttgtat taaagcatct tccttactgt accagatgca 5820

```
tttacaactc tagatttttt tctgccagca aaatcagatt tttccatctt ttttatatat   5880
attaaagtgg aacaccacta caacctgcaa ttctgcaaca catgttacat tacacattca   5940
tttggcgttt tccaataagt tataaacagt gaatgtttgt agacaataga caattataaa   6000
cagtaaatca tgtttcccct ctgttttcaa aagtgaaaaa gtttctaaat atgtatatgt   6060
attatacttt aataactcgt cggaccatac tattcccacc ttctaattaa ccttgtatac   6120
actggtttac caacaccatg tctcttcctt gttcaaaaaa actccatgtc tctttaatta   6180
cttttttct tcttctcgaa atttgttgat aatagaaact agtcgaagtt tctctttaat   6240
tctgttttca tttaatataa gcgtcgttgt tataatttca aatttcaaaa aggtacttac   6300
aagttcacac ggagagctac aataatggaa aagctgactc aagaagggct agaaaagaaa   6360
caagagtcac ggaacaagta gtcactttca atctcagtat acagtacact agtgtctgct   6420
tgcatctctc tctctctctc tctctctctc ttggtctaaa aatatcagaa gagaaaatct   6480
ctctatctat ttatctctct ttccctttct ctttcaacaa gacaatagtg acgacatttg   6540
tgtttccatg gctgttctgg ttctctatct cctcggtttc ctcatggctg gccactgtag   6600
taagaaactc tcgctcttca ctacattact tatctctctc tttttttaa atgtgtctat   6660
tgatgggaac taaatttcaa taaaattctt tcggctctta gctagttatc actacatctc   6720
ttaagttcac gaccctcaaa aagaaggttt cctcaaatct tcttggcttc acacttacaa   6780
tttgtttcat ttggtaggcg cgacgtggtg tgtgtgcaaa acaggactga gtgactcagt   6840
gctacaaaag acattagact atgcttgcgg gaatggagct gactgtaacc caactcaccc   6900
aaaagggtct tgcttcaacc ccgacaatgt tagggctcat tgtaactatg ctgtcaatag   6960
cttctatcaa aagaaaggtc aagcttctga atcttgtaat ttcactggaa ctgccactcc   7020
taccacaact gatcccagta agtttccctc agaaatctga tgcttttact gtgattgttt   7080
acaactctaa atagttttg gagtcacaga aagtccaccg tcattttggt tacttaaaat   7140
gatttggtat tagagattag tgaatattaa agtttaaagt aacaatttgg ttttagtaat   7200
gtatgaggag gatctgattt ggttacagta cactaaatgt tttttttttt gtgtgtgtgc   7260
ttttttgctt tgatgggtga acattttgtc acaggctact cag                      7303
```

<210> SEQ ID NO 69
<211> LENGTH: 1581
<212> TYPE: DNA
<213> ORGANISM: Thlaspi arvense

<400> SEQUENCE: 69

```
atggatgaat caagtatttt tacggcagag aaagtgatcg gagctgagaa aagagagctt     60
caagggctgc ttaaggcggc ggtgcaatct gtggagtgga cttatagtct cttctggcaa    120
ctttgtcctc aacaaagggt tttgctgtgg gagaatggat actacaacgg tgcaataaag    180
acgaggaaga caactcagcc ggcggaagtg acggcggaag aggctgcgtt agagaggagt    240
cagcagctaa gggaacttta cgaggcccctt ttggccggag agtcctcatc ggaagctagg   300
gcatgcacgg cattatcgcc ggaggatctg acggagactg aatggtttta tctaatgtgt    360
gtctctttct ctttccctcc tccttccggg atgccaggaa aggcgtatgc gaggaggaaa    420
cacgtatggc tatgtggtgc aaatgaggtt gacagtaaaa tcttttctag ggctattctc    480
gcaaagagtg ccaaaatcca gcagacagtg gtttgcattc ccatgcttga tggcgttgtg    540
gaactaggca caacgaacaa ggtaaaagaa gatatagcgt ttgttgagct cataaagagt    600
```

```
tttttccata accaccccaa gtcaaaccca aaagctgctc tttctgaaca ctccatcaac    660

gaagagcacg aagaagacga agaacaagaa gaagaagaag aagaagaagt agaagaagaa    720

atgacaatgt cagaggagat aaggcttggc tctcctgatg atgatgacgt ctccaatcaa    780

aacctactct ctgatttcca tgtagaatca acccacactt tagacacaca catggacatg    840

atgaatctaa tggaggaggg tggaaactat tctcagacag tatcaacact tcttatgtca    900

caacccacga gtctttttc agattcagtt tccacatctt cttacatcca atcatcattt    960

gccacatgga aggctgataa ttttaaagag catcagcgag tggaaactaa atcgacgtcg   1020

tcgtcgcaat ggatgctcaa acacataatc ttgagagttc ctttactcca cgaccacact   1080

aaagaaaaga ggctgcctcg agaagagctt aatcacgtgg tggcagagcg ccgcaggaga   1140

gagaagctga atgagagatt cataacactg agatcattgg ttccctttgt gaccaagatg   1200

gataaagtct caattcttgg agacaccatc aactacgtaa accatcttcg aaatagggtc   1260

caagagctgg agactaatca tcacgaacaa aaacataagc ggatgcgtag ctgtaaggga   1320

aaaacgtggg aagaggtcgt tgaggtttcc atcatagaga gtgatgtttt gttagagatg   1380

agatgcgagt accgagatgg tctattgctc gacatccttc aggttcttaa ggaacatggt   1440

atagagacta ctgcagttca taccgcggtg aacgagcgtg atttcgaggc cgagataagg   1500

gctatggtga gagggaagaa accaagcatt gctgaggtca aaagagccat ccatcaaact   1560

atatccaata ttaaactata g                                             1581
```

```
<210> SEQ ID NO 70
<211> LENGTH: 526
<212> TYPE: PRT
<213> ORGANISM: Thlaspi arvense

<400> SEQUENCE: 70

Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Lys Thr Arg Lys Thr
    50                  55                  60

Thr Gln Pro Ala Glu Val Thr Ala Glu Glu Ala Ala Leu Glu Arg Ser
65                  70                  75                  80

Gln Gln Leu Arg Glu Leu Tyr Glu Ala Leu Leu Ala Gly Glu Ser Ser
                85                  90                  95

Ser Glu Ala Arg Ala Cys Thr Ala Leu Ser Pro Glu Asp Leu Thr Glu
            100                 105                 110

Thr Glu Trp Phe Tyr Leu Met Cys Val Ser Phe Ser Phe Pro Pro Pro
        115                 120                 125

Ser Gly Met Pro Gly Lys Ala Tyr Ala Arg Arg Lys His Val Trp Leu
    130                 135                 140

Cys Gly Ala Asn Glu Val Asp Ser Lys Ile Phe Ser Arg Ala Ile Leu
145                 150                 155                 160

Ala Lys Ser Ala Lys Ile Gln Gln Thr Val Val Cys Ile Pro Met Leu
                165                 170                 175

Asp Gly Val Val Glu Leu Gly Thr Thr Asn Lys Val Lys Glu Asp Ile
            180                 185                 190

Ala Phe Val Glu Leu Ile Lys Ser Phe Phe His Asn His Pro Lys Ser
```

```
        195                 200                 205

Asn Pro Lys Ala Ala Leu Ser Glu His Ser Ile Asn Glu Glu His Glu
    210                 215                 220

Glu Asp Glu Glu Gln Glu Glu Glu Glu Glu Glu Glu Val Glu Glu Glu
225                 230                 235                 240

Met Thr Met Ser Glu Glu Ile Arg Leu Gly Ser Pro Asp Asp Asp Asp
                245                 250                 255

Val Ser Asn Gln Asn Leu Leu Ser Asp Phe His Val Glu Ser Thr His
            260                 265                 270

Thr Leu Asp Thr His Met Asp Met Met Asn Leu Met Glu Glu Gly Gly
        275                 280                 285

Asn Tyr Ser Gln Thr Val Ser Thr Leu Leu Met Ser Gln Pro Thr Ser
    290                 295                 300

Leu Phe Ser Asp Ser Val Ser Thr Ser Ser Tyr Ile Gln Ser Ser Phe
305                 310                 315                 320

Ala Thr Trp Lys Ala Asp Asn Phe Lys Glu His Gln Arg Val Glu Thr
                325                 330                 335

Lys Ser Thr Ser Ser Ser Gln Trp Met Leu Lys His Ile Ile Leu Arg
            340                 345                 350

Val Pro Leu Leu His Asp His Thr Lys Glu Lys Arg Leu Pro Arg Glu
        355                 360                 365

Glu Leu Asn His Val Val Ala Glu Arg Arg Arg Arg Glu Lys Leu Asn
    370                 375                 380

Glu Arg Phe Ile Thr Leu Arg Ser Leu Val Pro Phe Val Thr Lys Met
385                 390                 395                 400

Asp Lys Val Ser Ile Leu Gly Asp Thr Ile Asn Tyr Val Asn His Leu
                405                 410                 415

Arg Asn Arg Val Gln Glu Leu Glu Thr Asn His His Glu Gln Lys His
            420                 425                 430

Lys Arg Met Arg Ser Cys Lys Gly Lys Thr Trp Glu Glu Val Val Glu
        435                 440                 445

Val Ser Ile Ile Glu Ser Asp Val Leu Leu Glu Met Arg Cys Glu Tyr
    450                 455                 460

Arg Asp Gly Leu Leu Leu Asp Ile Leu Gln Val Leu Lys Glu His Gly
465                 470                 475                 480

Ile Glu Thr Thr Ala Val His Thr Ala Val Asn Glu Arg Asp Phe Glu
                485                 490                 495

Ala Glu Ile Arg Ala Met Val Arg Gly Lys Lys Pro Ser Ile Ala Glu
            500                 505                 510

Val Lys Arg Ala Ile His Gln Thr Ile Ser Asn Ile Lys Leu
        515                 520                 525
```

<210> SEQ ID NO 71
<211> LENGTH: 5726
<212> TYPE: DNA
<213> ORGANISM: Thlaspi arvense

<400> SEQUENCE: 71

```
atctaatcaa gagaagctag ctaacaatat cgaagggaag acatgaacac atcctcactt      60

ttgcctaatc gaatgaaagc taaaaatgga tctagggttt aagggatcta acgatggaaa     120

gcaaaggact caagagaacg gcggctagga acggcggaac gacggcggct ctcctcagcg     180

gcggcggtcg gcggcgaaaa cgaacggcgg cggcggcttg ctcggttagg gttcctaggt     240

tatatctctg agtgctttgg gagttatgat ggaaaaccta attctctaac tctgtttata     300
```

```
tagggaagac tcaggaaaaa tcctaatatc cttttctctt gggcttctga cacatgaacc    360
tttccttttc ctattgagcc tagatccagg acgttacaac tagaatcaga atcgaacaac    420
aagcgtatgc gcttaagaaa tgatttttac tcacactata tgggcgcgca tggcattgtc    480
gtaagaatta aataagcttc gtcccactcc ttaatggatt tacgcacaca gtcaatccac    540
gtggttgtca taactaaata taattggtga aaaaactaat ttaaagacaa agtaagaagc    600
ggaaaccgaa ggaaaagcca aacaacatta tgtttatcga caaaaaagcc aaaacaacat    660
ttaatgttaa tttttgtcca aaccaggaat acatcactca tacggtcata tataccatac    720
cccaaattgt atgtactaca tgtgtacgta actgatttat gtatatctat ctatttctct    780
tttattgtag gggtcaaaat ctacctatcg atatttataa ataggatttt ataagacatt    840
gttaaaatgg aaaacatggt agctacttgg ccagcgatta acatcaataa ttaaaaatac    900
gaattgtgaa acatctcact ctcttccttt tatcacacca aaccacttct ctttctttac    960
ttaccggtca ggtcaacaat tctaccattc cctttattta gttttttttt ttcatctatc   1020
tctcttttca tttttaactt ttaaaaaata ttagtccgaa aatcgcactc ttttatattc   1080
gttgatgggc attaaaatat tgtaaaaatt aaaaaaaatg tgtaaattaa aacgcaattt   1140
gtttgcacct gcagcagtag taacacacaa gtcaaagcaa tgtctgtttt ctcttgtatg   1200
tcggttagct attttatgta ctgaaatatg ttattctttc tgaccaaaac atattaagaa   1260
atttgcattc tgtaatttga tttatccaat cagtagagga cacgtaacca agataattag   1320
atatttttat tctatctgta tactactaat tcatccaacg tctgttggac gaccaaccag   1380
tcaaaactca taaaagtcaa cttttactac atcgtgaatt ttttggtcat gcatttatat   1440
acacatacat ggaagaaaaa acaatacttt acctatgtca aaatgctgca aaagcattaa   1500
gatggtatgt atacatacat attgatataa cagtggtccc atatatcatt ttaaatcatc   1560
ataaagagta tccatcttct ttcatattaa catccccttc aaagttataa gatttttctc   1620
tcttcattag agagagagag agagagaatt aacacaagtt ttaatctccg ggaaagatgg   1680
atgaatcaag tatttttacg gcagagaaag tgatcggagc tgagaaaaga gagcttcaag   1740
ggctgcttaa ggcggcggtg caatctgtgg agtggactta tagtctcttc tggcaacttt   1800
gtcctcaaca aaggttcttt ttttttttta ataaatttca tcgatctctc acaataaaaa   1860
ccctaaattt tatatcattt attattatat gtttaactac ataattatca gtattttaac   1920
cgtccatgtg ctttatttgg ttccatttct gtctcatatt ttacttgagg ttcagactgc   1980
cgagcacatc tctcgtttgt ctcgaatctg tgagactttt tcgtttattg gcacttctgt   2040
gtcaattgag ttatactgaa gtaattatat gtttaaatga attagggttt tgctgtggga   2100
gaatggatac tacaacggtg caataaagac gaggaagaca actcagccgg cggaagtgac   2160
ggcggaagag gctgcgttag agaggagtca gcagctaagg gaactttacg aggccctttt   2220
ggccggagag tcctcatcgg aagctagggc atgcacggca ttatcgccgg aggatctgac   2280
ggagactgaa tggttttatc taatgtgtgt ctctttctct ttccctcctc cttccgggta   2340
cccaactctc tctctctctc tctctctctc tctctctctc tctctctctc tctctctctt   2400
ttgtctatac tgaagtttct taatttatct ttttatcatc tcctactgaa gacaaaaata   2460
gtattgtgtg ttaaatgcga atcacgaata ttgtggaagc attaaaaaca aactgaggag   2520
gttgagttac tgaaagaaga aatgtattgg agttgatgaa acgtacactc cattttagtg   2580
aacataattg gaccgttgag attcttattt ttttgctgat tgattatcta aagtagaagc   2640
```

-continued

```
ataaatagat aatacataaa tgcataacaa attgtgttag ttatgggtat agttaatgct   2700
ttttctctat gagaggaaaa aaaaaaaaat atataaatgt ggaagtaata attttgtagg   2760
atgccaggaa aggcgtatgc gaggaggaaa cacgtatggc tatgtggtgc aaatgaggtt   2820
gacagtaaaa tcttttctag ggctattctc gcaaaggtct atttcctttt tcatttacca   2880
ctactctatg catctacttc tctacctatt tatatatctc atctttcaaa ttaattaatt   2940
ttctgtcttt attttcttgg atgctccttc tacatcggtc ggttccttaa tggttagagt   3000
gccaaaatcc aggtaaacgt tgtctttatt gattaattct aattttgagt aatattttac   3060
atttatttta catgtttgaa aattgttttg tgataaaaaa aaagcagaca gtggtttgca   3120
ttcccatgct tgatggcgtt gtggaactag gcacaacgaa caaggtacgg cgtagttatc   3180
tttttatata tgcataacca aatggttaag aaaaaggtta gaagagaaat agatcatgct   3240
taagttttat cagttaaatt aaaaatgtaa aaataagata ttatgttcat taataatgta   3300
tagtccctgt tagttaaaaa aaagaataaa atatttaacc atttgaagtc ataatataaa   3360
aatattgttt ttggagatag tacataattc tcacaataaa aaaaataaca aagggatgat   3420
taagggaagg agttggatac atgttgtttg tctgtgtgtg tgaaggtaaa agaagatata   3480
gcgtttgttg agctcataaa gagtttttc cataaccacc ccaagtcaaa cccaaaagct   3540
gctctttctg aacactccat caacgaagag cacgaagaag acgaagaaca agaagaagaa   3600
gaagaagaag aagtagaaga agaaatgaca atgtcagagg agataaggct tggctctcct   3660
gatgatgatg acgtctccaa tcaaaaccta ctctctgatt tccatgtaga atcaacccac   3720
actttaggta tacacttata cattaaatta gttaacgata tcattacacg tatctattta   3780
ttttgttaac aagaaattta aaaatattcg ccatttcttt gttatgtcta aagaaaatct   3840
ataaaatttt atgaatagac acacacatgg acatgatgaa tctaatggag gagggtggaa   3900
actattctca gacagtatca acacttctta tgtcacaacc cacgagtctt ttttcagatt   3960
cagtttccac atcttcttac atccaatcat catttgccac atggaaggct gataatttta   4020
aagagcatca gcgagtggaa actaaatcga cgtcgtcgtc gcaatggatg ctcaaacaca   4080
taatcttgag agttccttta ctccacgacc acactaaaga aaagaggctg cctcgagaag   4140
agcttaatca cgtggtggca gagcgccgca ggagagagaa gctgaatgag agattcataa   4200
cactgagatc attggttccc tttgtgacca agatggataa agtctcaatt cttggagaca   4260
ccatcaacta cgtaaaccat cttcgaaata gggtccaaga gctggagact aatcatcacg   4320
aacaaaaaca taagcggatg cgtagctgta agggaaaaac gtgggaagag gtcgttgagg   4380
tttccatcat agagagtgat gttttgttag agatgagatg cgagtaccga gatggtctat   4440
tgctcgacat ccttcaggtt cttaaggaac atggtataga gactactgca gttcataccg   4500
cggtgaacga gcgtgatttc gaggccgaga taagggctat ggtgagaggg aagaaaccaa   4560
gcattgctga ggtcaaaaga gccatccatc aaactatatc caatattaaa ctatagttta   4620
agactctaac aatattgatg ccaactctag aaaaggacaa ctgaacttat tttgttttaa   4680
gccttggcta tattacatta tcagttttac acttctacgt atacacaact ttaatttttc   4740
tatattacta catgcatact agatgttaga aatatcttat ataagcatac atattaaatt   4800
agttatgcga tatttaaaat taatgtatat aaatattcag tttcaaagct tacgaatacg   4860
taaaattaat caatacaaac cgaaaccaaa aagccacttc tcatctcaaa atgttaatta   4920
caaatttaca ataagccgaa tcactatcta aaaagctttt gggatcccga gacccaaaac   4980
atttcttcgt ataagtgcaa caattatcga gtgtgatgag acacgtaaaa agcaaggatc   5040
```

```
gggacaacga ttttcggcta tatagtagtt tctcatatct gactttatta gcaaattact   5100

acataaaatt gcttttaagt atgattaacg gaacaagtat aatgcgttta tttaattaca   5160

gatctggcta aatgtaatat ggtatcaaag ctggaaagac aaatagtcta aggtttggaa   5220

tttttcatct gtctataaaa ttcttaagac actgatagat cattaactta ttttggagtc   5280

accaatggac aaatcaataa ctattgatgt ccaaaaccca caagacaagc ctattttttt   5340

tgcacgtgca agtacaccgg tggaagaatt catttgtata ctgaatctga aattataaaa   5400

gattagaatt ggttgaagaa tttacttcaa aacaagctag aagatggtgt tatttaaata   5460

aacaatgtta aattatatca atgactttca aattttatca aaacattttt tgaaagagaa   5520

tcacgcacaa agtatttcga attacaaaac aattttttgc aataaatttt atagttaaag   5580

caaattttgt caattattga aaaaaattac ttagataaaa tatctaattt tttttttaa   5640

acaatgtctc tataaaagat ggattagcca agaaaatctg atggatgcta caacgcaggg   5700

ttggagatat ggtgctgaca ctacat                                        5726
```

<210> SEQ ID NO 72
<211> LENGTH: 2583
<212> TYPE: DNA
<213> ORGANISM: Thlaspi arvense

<400> SEQUENCE: 72

```
atggaaggga actctttaag ttcatcttcc ttagtttcag ccaatcgggt gggtcaatgt     60

gacaatcttg agcatagtag aatgacttgt tctcgaaatt tcattgagat gcatttgact    120

gaccagctga gaaaaactca gatagtgaac gagaccaata aggatcttgt tgtcgaggca    180

ctgagatcaa tcgcggagat attgacttat ggcgatcagc acgacccttt attctttgaa    240

ttttttatgg agaagcaagt aatgggagag tttgtacgta ttttgagggt tagcaagaca    300

gtaacagttt ccgttcagtt gttgcaaacc atgagtatta tgatccagaa cctaaaaagt    360

gaacaagcca tctactactt gttcagtaac gaatatgtaa attatttgat aacatataca    420

tttgacttcc aacatgaaga gcttctatct tactacatat ccttcctaag agctgttagt    480

gggaaactaa accagcatac aatatcgttg cttttgaaga ccgagaacga tgtagtagtt    540

tcttttcccc tttacgtcga gggcataaaa tttgcatttc atgaagagaa catgatacgc    600

actgcagttc gtgccctgac tcttaatgtg tatcatgttg gcgatgaatc tgtgaatgat    660

tatgtagtta gtccaccgca cactgagtac ttttcaaaat tagttacatt tttccaaaag    720

caatgcatgg atctaagtgc aatggtgttg aacactctaa agagcccatc ccgagactca    780

ggtggaaaat tgtttgctgc cgttgatggg atcgaggaca cgctgtacta ctttagtgat    840

gttatctctg ctggcatacc tgatatcggg aggctgataa cagatcacat tctacagcat    900

ctaactctcc cacttcttct cccgtctttg tgctctgagg ctgataaatc agttgatcct    960

gtgacttctc tctatctgct ctgttgcatc gtgcggatag ttaaaatcaa agatttggcg   1020

aatttgactg ctgctacttt tttctgccct gtagaagctt tcatttcaag ttccctagtg   1080

aaacctaata gtagcttggc tcctgaacgt cttacatatg gaaatgggca tccagacaat   1140

ggtgttgctg aggaaacagt tcaacagtgt ccaagcactg cagtctcgag tgaatatgga   1200

aattcccacg tttgcagtga aaatactacg aaaagcatct tcaacaattc acgtattacg   1260

tttagggata ctttacttca atatatttct gagggagatg atgtgcaagc tcagggttcc   1320

ttgtttgtgc tagccacgtt gttgcagaca aaagaacttg aagagtcaat gctagatgct   1380
```

```
tttggcattc ttcctcagcg taagcagcac aaaaagcttt tgctgcaatc tttggttggg   1440

gaagacactg gtgaagaaca actgttttca ccacaaaatg gttccatgag agatggctta   1500

agcagcgaac ttgattggta tctacggagg ttggaggagc agtttggagt atgctgttca   1560

ctgcctgggg ctgcaatgtg cccgcgtgta catagacatc aggtggtgga tgcattggtc   1620

attcttctct gccgtgaaaa catatctgca gaaacattat gggatggagg gtggctttta   1680

cggcagttgc ttccttatag cgaggcagag tttaatcgta aacatctcaa aatgctgaat   1740

gattcatatg agaagtgcac aagtgcacta atccgggagg ttaaaggtac ctggcctgat   1800

ctactcatca cggtgctgct tgatgagtgg aaaaagttga tcgaagctcc atcccctcaa   1860

aaagagccta aatctgttct tctccagctg gataaatcct cttctagtgg taacactgtt   1920

agcgaatcat cattcacagc cggtgaaaaa ctgtgcgagg tggtgaaggt tttgtgcttt   1980

cttcaccaac tccagatctt ctcgcttggt aggcccttgc cagagcagcc tcctatccat   2040

cctcctgcag acagatctga aacgtctcgc gccacaagtg ctggtttgga tgtttcagtc   2100

cccaaaactg gcaccgaagt gaagctagtt gatgctgtac actgtaggat tgcctttgaa   2160

agaggcaagg agcggaattt ctcgtttcta gcattatcat ctggtgtgtc tgggtggatt   2220

gtccttgctg aagaatcgct ttcgaagcca gatcacggaa ccgtccgtgt taccgcacct   2280

ttagccggct gcaaaccccg gatagatgaa aagcacccaa gatggctaca cttgaagatc   2340

cggccatcga cgttaccatt cttggatcca acaaagcgag gagtctatga gaagctcaag   2400

tccaaaggtc tagtagacgg gagatggaca ttagcattca gagacgaaga gtcttgttac   2460

tctgcttact caatggttgt acatgagatc gatctacaat gcagcgaggt tgaaaggagg   2520

ttaaagccat tgttcgacct tgagagaaac cagcaagatc aatcaaacgt tgcttctcta   2580

tag                                                                 2583
```

<210> SEQ ID NO 73
<211> LENGTH: 860
<212> TYPE: PRT
<213> ORGANISM: Thlaspi arvense

<400> SEQUENCE: 73

```
Met Glu Gly Asn Ser Leu Ser Ser Ser Ser Leu Val Ser Ala Asn Arg
1               5                   10                  15

Val Gly Gln Cys Asp Asn Leu Glu His Ser Arg Met Thr Cys Ser Arg
            20                  25                  30

Asn Phe Ile Glu Met His Leu Thr Asp Gln Leu Arg Lys Thr Gln Ile
        35                  40                  45

Val Asn Glu Thr Asn Lys Asp Leu Val Val Glu Ala Leu Arg Ser Ile
    50                  55                  60

Ala Glu Ile Leu Thr Tyr Gly Asp Gln His Asp Pro Leu Phe Phe Glu
65                  70                  75                  80

Phe Phe Met Glu Lys Gln Val Met Gly Glu Phe Val Arg Ile Leu Arg
                85                  90                  95

Val Ser Lys Thr Val Thr Val Ser Val Gln Leu Leu Gln Thr Met Ser
            100                 105                 110

Ile Met Ile Gln Asn Leu Lys Ser Glu Gln Ala Ile Tyr Tyr Leu Phe
        115                 120                 125

Ser Asn Glu Tyr Val Asn Tyr Leu Ile Thr Tyr Thr Phe Asp Phe Gln
    130                 135                 140

His Glu Glu Leu Leu Ser Tyr Tyr Ile Ser Phe Leu Arg Ala Val Ser
145                 150                 155                 160
```

```
Gly Lys Leu Asn Gln His Thr Ile Ser Leu Leu Leu Lys Thr Glu Asn
                165                 170                 175

Asp Val Val Val Ser Phe Pro Leu Tyr Val Glu Gly Ile Lys Phe Ala
            180                 185                 190

Phe His Glu Glu Asn Met Ile Arg Thr Ala Val Arg Ala Leu Thr Leu
        195                 200                 205

Asn Val Tyr His Val Gly Asp Glu Ser Val Asn Asp Tyr Val Val Ser
    210                 215                 220

Pro Pro His Thr Glu Tyr Phe Ser Lys Leu Val Thr Phe Phe Gln Lys
225                 230                 235                 240

Gln Cys Met Asp Leu Ser Ala Met Val Leu Asn Thr Leu Lys Ser Pro
                245                 250                 255

Ser Arg Asp Ser Gly Gly Lys Leu Phe Ala Ala Val Asp Gly Ile Glu
            260                 265                 270

Asp Thr Leu Tyr Tyr Phe Ser Asp Val Ile Ser Ala Gly Ile Pro Asp
        275                 280                 285

Ile Gly Arg Leu Ile Thr Asp His Ile Leu Gln His Leu Thr Leu Pro
    290                 295                 300

Leu Leu Leu Pro Ser Leu Cys Ser Glu Ala Asp Lys Ser Val Asp Pro
305                 310                 315                 320

Val Thr Ser Leu Tyr Leu Leu Cys Cys Ile Val Arg Ile Val Lys Ile
                325                 330                 335

Lys Asp Leu Ala Asn Leu Thr Ala Ala Thr Phe Phe Cys Pro Val Glu
            340                 345                 350

Ala Phe Ile Ser Ser Ser Leu Val Lys Pro Asn Ser Ser Leu Ala Pro
        355                 360                 365

Glu Arg Leu Thr Tyr Gly Asn Gly His Pro Asp Asn Gly Val Ala Glu
    370                 375                 380

Glu Thr Val Gln Gln Cys Pro Ser Thr Ala Val Ser Ser Glu Tyr Gly
385                 390                 395                 400

Asn Ser His Val Cys Ser Glu Asn Thr Thr Lys Ser Ile Phe Asn Asn
                405                 410                 415

Ser Arg Ile Thr Phe Arg Asp Thr Leu Leu Gln Tyr Ile Ser Glu Gly
            420                 425                 430

Asp Asp Val Gln Ala Gln Gly Ser Leu Phe Val Leu Ala Thr Leu Leu
        435                 440                 445

Gln Thr Lys Glu Leu Glu Glu Ser Met Leu Asp Ala Phe Gly Ile Leu
    450                 455                 460

Pro Gln Arg Lys Gln His Lys Lys Leu Leu Leu Gln Ser Leu Val Gly
465                 470                 475                 480

Glu Asp Thr Gly Glu Glu Gln Leu Phe Ser Pro Gln Asn Gly Ser Met
                485                 490                 495

Arg Asp Gly Leu Ser Ser Glu Leu Asp Trp Tyr Leu Arg Arg Leu Glu
            500                 505                 510

Glu Gln Phe Gly Val Cys Cys Ser Leu Pro Gly Ala Ala Met Cys Pro
        515                 520                 525

Arg Val His Arg His Gln Val Val Asp Ala Leu Val Ile Leu Leu Cys
    530                 535                 540

Arg Glu Asn Ile Ser Ala Glu Thr Leu Trp Asp Gly Gly Trp Leu Leu
545                 550                 555                 560

Arg Gln Leu Leu Pro Tyr Ser Glu Ala Glu Phe Asn Arg Lys His Leu
                565                 570                 575
```

```
Lys Met Leu Asn Asp Ser Tyr Glu Lys Cys Thr Ser Ala Leu Ile Arg
            580                 585                 590

Glu Val Lys Gly Thr Trp Pro Asp Leu Leu Ile Thr Val Leu Leu Asp
        595                 600                 605

Glu Trp Lys Lys Leu Ile Glu Ala Pro Ser Pro Gln Lys Glu Pro Lys
    610                 615                 620

Ser Val Leu Leu Gln Leu Asp Lys Ser Ser Ser Ser Gly Asn Thr Val
625                 630                 635                 640

Ser Glu Ser Ser Phe Thr Ala Gly Glu Lys Leu Cys Glu Val Val Lys
                645                 650                 655

Val Phe Val Leu Leu His Gln Leu Gln Ile Phe Ser Leu Gly Arg Pro
            660                 665                 670

Leu Pro Glu Gln Pro Pro Ile His Pro Pro Ala Asp Arg Ser Glu Thr
        675                 680                 685

Ser Arg Ala Thr Ser Ala Gly Leu Asp Val Ser Val Pro Lys Thr Gly
    690                 695                 700

Thr Glu Val Lys Leu Val Asp Ala Val His Cys Arg Ile Ala Phe Glu
705                 710                 715                 720

Arg Gly Lys Glu Arg Asn Phe Ser Phe Leu Ala Leu Ser Ser Gly Val
                725                 730                 735

Ser Gly Trp Ile Val Leu Ala Glu Glu Ser Leu Ser Lys Pro Asp His
            740                 745                 750

Gly Thr Val Arg Val Thr Ala Pro Leu Ala Gly Cys Lys Pro Arg Ile
        755                 760                 765

Asp Glu Lys His Pro Arg Trp Leu His Leu Lys Ile Arg Pro Ser Thr
    770                 775                 780

Leu Pro Phe Leu Asp Pro Thr Lys Arg Gly Val Tyr Glu Lys Leu Lys
785                 790                 795                 800

Ser Lys Gly Leu Val Asp Gly Arg Trp Thr Leu Ala Phe Arg Asp Glu
                805                 810                 815

Glu Ser Cys Tyr Ser Ala Tyr Ser Met Val Val His Glu Ile Asp Leu
            820                 825                 830

Gln Cys Ser Glu Val Glu Arg Arg Leu Lys Pro Leu Phe Asp Leu Glu
        835                 840                 845

Arg Asn Gln Gln Asp Gln Ser Asn Val Ala Ser Leu
    850                 855                 860
```

<210> SEQ ID NO 74
<211> LENGTH: 7185
<212> TYPE: DNA
<213> ORGANISM: Thlaspi arvense

<400> SEQUENCE: 74

```
cgtggatgga ggaagggttt ctcgtcgtgt tcgtcgcgaa agatggttcc tcttctgcgc      60

cgccaccgcc ggagatcgag gagaatcgca acgtgagagt cgtggaaatc accggtgatg     120

aatgaatgaa taattatgtc tttaaaactt caaaatctgt gtattatatg aacagagtaa     180

tcatgttgtg atcgtgctgc tgttttcgta tgtaatagtg aaagttgcat aaaagccctt     240

aaactaatca aagttttcaa aataacccat catttaagaa aactataaaa cgatcaaaat     300

taatgtaaaa tctacatttg agcttccgac tacaacattt attcgattca atttcccttt     360

taataatcta acaaattttc caaatttcaa caaatctcga accgaatgat tatttgattc     420

aaagacaaac tattatgttt tcgctacaac ccaaaacgat gaatttaagt gtacagtcgg     480

aattgtatta ctgtatagat tttaaattag atgggacatt tgtttaaaca atttaattaa     540
```

```
gtgagggtta ttttacaact ttgctatatt ttgaggggtt ttgttataat tttgtgactt    600
aatagcaaga gtcgtctttg aaggaaccgt tgtgacgtgg cggtcttcaa cactcgaatg    660
gtcgatcgta aaaataaatg ttttccctaa ttaaaatgcc atagacggat ccccccattc    720
taaagattct ttctttgaat tcgatattga acccgacccg gatccgaatc tggatacttg    780
acccaacgcc agctcaacgc cccacttcgg tgcttgcttc tattcgtctc tccgtcaaca    840
attctgttgt ttaccggaat acctagagcc ttcgagaaat tcaaacacga cgcagatatc    900
attctttcgc ttacgctatt gatttgtatg attttgtcgt cggtgaagca atccgaaccg    960
gaactggaat cggatttcat caggacttgt ggggttccct ttaatcgagg agcaaccatg   1020
gaattggggt tttcgcggga gtgaaggatg atccagagaa gactggattc agaggattga   1080
tccgataatc atgtggttct ccttcttaag acccagagat cgattctcct tggtcgaact   1140
caggttaaat ttttttttgt ttgatcgggt cgatcccgca acaagttcca tttgcgatat   1200
atatctctgt ttcgtttgat ccctattgtg actaagatta gcggattttt gtgaattctg   1260
gccttaaaat gtgtctttta agggtggttg agaggttttt cgtcgtaatc tctttggtgt   1320
gaatgacttg ttctcgaaat ttcattgaga ttttagtgta cgacaagtat ttgttcggtg   1380
attgtaagcg ttgaaatttt gagtttttttc gtcgtagtct cttcggaatt agaatgggca   1440
gtttgcagtt atctgttagg gttttcgaga atttgaacat ttgatcgctt gaatggtgtc   1500
atggaaggga actctttaag ttcatcttcc ttagtttcag ccaatcgggt gggtcaatgt   1560
gacaatcttg agcatagtag aatgacttgt tctcgaaatt tcattgagat gttagtgtac   1620
gacaagtatt tgttcggtga ttataccaga tgatgaagca taaacgttga aactttgggt   1680
tttgtttttg taggcatttg actgaccagc tgagaaaaac tcagatagtg aacgagacca   1740
ataaggtcag tgggataaaa gtctttttca ctttagcaac tttgtcttgg cattactgtt   1800
ctgtttttc cttgtggatt cgatctttgt ttaccgtttt gaaggatctt gttgtcgagg   1860
cactgagatc aatcgcggag atattgactt atggcgatca gcacgaccct ttattctttg   1920
agtgagagtc tttatgtcaa ttatcagtca atgcccttca ttttcttatt ggcatatatg   1980
ctaataatac tttgcgctcg ttgcagattt tttatggaga agcaagtaat gggagagttt   2040
gtacgtattt tgagggttag caagacagta acagtttccg ttcagttgtt gcaaaccatg   2100
agtattatga tccagaacct aaaaagtgaa caagccatct gtgagttcat cagaagcagt   2160
gtatattttg tctttgataa ttcgtaatga ttatagccta ttgatgatct tcttttgaaa   2220
ctacttgcag actacttgtt cagtaacgaa tatgtaaatt atttgataac atatacattt   2280
gacttccaac atgaagagct tctatcttac tacatatcct tcctaaggta cattcttctg   2340
ttgttgacct cggcttcagg aagtacatgt tgactgtatc tggtaactgt tttgttttct   2400
ttttgtagag ctgttagtgg gaaactaaac cagcatacaa tatcgttgct tttgaagacc   2460
gagaacgtga gtattcttta agttgcatct tccttaaact tctataatag tcctttatgg   2520
atttttttt tctgccatat tttaattctg cgtttctgcg tctaggatgt agtagtttct   2580
tttcccctt acgtcgaggg cataaaattt gcatttcatg aagagaacat gatacgcact   2640
gcagttcgtg ccctgactct taatgtgtat catggtaagt cactcagtcc tttcgatttg   2700
tcactttaat gactcagaag cttttagcaa tgtttctgat gcctttagtt tttttttct   2760
tttcgcagtt ggcgatgaat ctgtgaatga ttatgtagtt agtccaccgc acactgagta   2820
cttttcaaaa ttagttacat ttttccaaaa gcaatgcatg gatctaagtg caatggtgtt   2880
```

```
gaacactcta aagtaagatt cactgcatct tcatttccca gggcaataat atcgtgttaa   2940
atacgtatca tatccccttt tcatctattg actcattagt tatattcttc tgaaagattt   3000
ccatttactt tgtctaaagg agcccatccc gagactcagg tggaaaattg tttgctgccg   3060
ttgatgggat cgaggacacg ctgtactact ttagtgatgt tatctctgct ggcatacctg   3120
atatcgggag gctgataaca gatcacattc tacagcatct aactctccca cttcttctcc   3180
cgtctttgtg ctctgaggct gtaaatgtat aacatatcta ctttttcgat ttattttgtc   3240
cttttgtgct aattttgtaa gccttgttag ttttttctat gcaagagtac aatttctaat   3300
gtcagtatac tgtttgttct gtggttattt caggataaat cagttgatcc tgtgacttct   3360
ctctatctgc tctgttgcat cgtgcggata gttaaaatca aagatttggc gaatttgact   3420
gctgctactt ttttctgccc tgtagaagct ttcatttcaa gttccctagt gaaacctaat   3480
agtagcttgg ctcctgaacg tcttacatat ggaaatgggc atccagacaa tggtgttgct   3540
gaggaaacag ttcaacagtg tccaagcact gcagtctcga gtgaatatgg aaattcccac   3600
gtttgcagtg aaaatactac gaaaagcatc ttcaacaatt cacgtattac gtttaggtaa   3660
catgttatct aacaacctga gtgaatttga gatagttgct tttacactc cttaagctgt    3720
cttaatcata atatattcct atatctctcc gaagctgatg ttccttttgt aaatagggat   3780
actttacttc aatatatttc tgagggagat gatgtgcaag ctcagggttc cttgtttgtg   3840
ctagccacgt tgttgcagac aaaaggtatt ggtagtggct ttgtgcatct ccttatttta   3900
tttctagttt tgacagggaa attcgcatct cacgcttaca ttctctttgt ggtagaactt   3960
gaagagtcaa tgctagatgc ttttggcatt cttcctcagc gtaagcagca caaaaagctt   4020
ttgctggtga gtatctgtca ttattcttta tcttctgctc ttttccagca aattccaagg   4080
cagattgcca gggaaattcg catctcatgg tttatggacc gtctactata gtctggacca   4140
aaaatataag ctttacttct tggatagcta aacttaattt ggtggtcatc tctgacagca   4200
atctttggtt ggggaagaca ctggtgaaga acaactgttt tcaccacaaa atggttccat   4260
gagagatggc ttaagcagcg aacttgattg gtatctacgg aggttggagg tacttcagtc   4320
actgcatatc ttagaatttt gcaaacacgt tctacttctc catctctttg gtgttgtgtt   4380
aaattgtgat tgacttactc attcaagtac cctcaacagg agcagtttgg agtatgctgt   4440
tcactgcctg ggctgcaat gtgcccgcgt gtacatagac atcaggtaaa ttacgaatgt    4500
ttgtaaacct aaattattag cctcgcttct tctgaaaagt gaaaattcca tctgcttgag   4560
ttaggttctt tcttcatcac agagcaagtt cttgtcttga atcaatgaaa aaattgtggt   4620
ataggtggtg gatgcattgg tcattcttct ctgccgtgaa aacatatctg cagaaacatt   4680
atgggatgga gggtggcttt tacggcagtt gcttccttat agcgaggcag agtttaatcg   4740
taaacatctc aaaatgctga atgtatgtgt gttgctttta agatgttgac actgttacac   4800
tctccctttc gtcattattt accagtttcc tgctgatgtc aggattcata tgagaagtgc   4860
acaagtgcac taatccggga ggttaaaggt acctggcctg atctactcat cacggtgctg   4920
cttgatgagt ggaaaaagtg taaaagaggc aagtaaagaa gcaaaatgtt tggattttga   4980
ttctaaattt acatgttcag tgaatctaat accaaatctc ttgtgacagt gatcgaagct   5040
ccatcccctc aaaaagagcc taaatctgtt cttctccagc tggataaatc ctcttctagt   5100
ggtagaattt ttgttttaca atcaatgtga atgatataga cactcccttg ttcagttcct   5160
gctaatgcaa accgttaaca actgaacttt tacaggtaac actgttagcg aatcatcatt   5220
cacagccggt gaaaaactgt gcgaggtggt gaaggtaagt ccattgtgtt ccctctgtat   5280
```

```
tttcaatcag cgcttgtcgt tgatgtgtaa atgctacaga aatctgagaa tggagcattt   5340
tactccttag gtttttgtgc ttcttcacca actccagatc ttctcgcttg gtaggccctt   5400
gccagagcag cctcctatcc atcctcctgc agacagatct gaaacgtctc gcgccacaag   5460
tgctggtttg gatgtttcag tccccaaaac tggcaccgaa gtgaagctag gttagcacat   5520
gatgctcttt atgcttgctt agttcaacat ctaccaaacc gacaccatgt ccgtagttaa   5580
actgatgttt gaaatttccc ggtgcagttg atgctgtaca ctgtaggatt gcctttgaaa   5640
gaggcaagga gcggaatttc tcgtttctag cattatcatc tggtgtgtct gggtggattg   5700
tccttgctga agaatcgctt tcgaagccag atcacggaac cgtccgtgtt accgcacctt   5760
tagccggctg caaagtacgt gctcacctac attgtctttt tttttgtaac gatattgctt   5820
gtgaacacca cttacaagga cagatataat catgatgttg gcatagagaa atgagctatc   5880
ttttgtttgg tattcagccc cggatagatg aaaagcaccc aagatggcta cacttgaaga   5940
tccggccatc gacgttacca ttcttggatc caacaaagcg aggagtctat gagaagctca   6000
agtccaaagg tctagtagac gggagatgga cattagcatt cagagacgaa gagtcttgtt   6060
actctgctta ctcaatggtt gtacatgaga tcgatctaca atgcagcgag gttgaaagga   6120
ggttaaagcc attgttcgac cttgagagaa accagcaaga tcaatcaaac gttgcttctc   6180
tatagctctt gggtttgttt ttgttttatt cattaaattt tttgtttctt ctttgtaatg   6240
ttgctataat gtgataatat cgttgtatat ttgaaagtga tagtgaattt cagtttttat   6300
cacacaaaaa tatgactagt gtgagtgtcg agaactctgc ttactcttat aattctgtga   6360
ttctgcgtct cttcttgttg aatatgaaac cctaaaacaa atgaaccctt actcttcttt   6420
atgcatcctg tagctgtcaa cgagagcagt tttgtatgag ttacggacac tctgtttcca   6480
gatggagaga gaagcaatca ccgtccgtat tttgagcaat cctcttttta acgcagctaa   6540
tggatgcaac attggctttt agacttgtaa ctatgtctct ctctctctct ctcttccttc   6600
agccgcagtt taaaagaccc acatacagta ccacatcata cctcagatgt gaatggtttg   6660
tcttcactaa aaggtttgct ggaaccaaaa cctaaacagg aaacataact ccttgaccca   6720
cagtaaatta aactaccaga atcactctga aagaagttcc tcgaccagaa atatccaaaa   6780
gccacataaa cagggtctgg tcagacataa cagtggcaac atcgtaataa gaaagatgcc   6840
aagaagttgc agaggctaat gtttgaaaaa aaaagaagcc atgagagacc aaaattaaga   6900
gaatttgtaa ttaatacagt actcaggaaa agagtttcaa ccacttgcgc caacaaacta   6960
gatagacatt gttatccaac acacaaactc atgtccaacc aaaagataga gagataaaga   7020
gacattatcc aacacaacac atgtccaaat aaaagagata acagataaaa gatagaagag   7080
tgggttctcc ttttcttact acaaacaccc atgaattcga ttccctactt tcggccaagt   7140
accctgaaac acaacacaaa actgaattgt tatacaaaac tatgt                   7185
```

<210> SEQ ID NO 75
<211> LENGTH: 1026
<212> TYPE: DNA
<213> ORGANISM: Thlaspi arvense

<400> SEQUENCE: 75

```
atggataact cagctccgga ttctttgtcc agatcggaaa ccgccgtcac ctacgattct     60
ccttacccac tctacgccat ggccttctct tccatcggta ctccctccgg ccaccgaatc    120
gccgtcggaa gcttcctcga ggattacaac aaccgcatcg acattctctc cttcgattcc    180
```

```
gactccatga cggtgaagcc tctcccgaat ctctccttcg atcatcctta tcctcccaca    240

aagctgatgt tcagccctcc ctccctccgt cgtccctccg ccggcgatct cctcgcttcc    300

tccggcgatt tcctccgttt atgggagatc agtgaagatt cctccaccgt cgagcctgtc    360

tcggtgctca acaacagcaa gacgagcgag ttctgcgcgc cgttgacctc cttcgactgg    420

aacgacgtcg agccgaaacg cctgggaacc tgcagcatcg acacgacctg cacgatttgg    480

gacatcgaga agtgcgtggt ggagacgcag ctcatagcgc acgataagga ggtccacgac    540

atcgcttggg gagaagctag ggttttcgcg tcggtctccg ccgacggatc cgtcaggatc    600

ttcgatctac gcgacaagga gcattccacc atcatctacg agagtcctca gcccgatacg    660

cctctcctaa gactcgcctg gaacaaacaa gacctgaggt acatggcgac gatcctgatg    720

gattcgaata aggtcgtgat tctcgacatt cgctcgccga cgatgcctgt cgccgagctc    780

gaacggcacc aggctagcgt caacgccata gcttgggctc cacagagctg caaacacatc    840

tgctctgctg gtgacgacac gcaggctctc atctgggagc tcccgactgt agctggaccc    900

aacggcattg atccgatgtc ggtttactca gccggctcgg agataaacca gttgcagtgg    960

tcctcttcac agcctgattg gattggcatc gctttcgcta acaaaatgca gctccttaga   1020

gtttga                                                              1026
```

```
<210> SEQ ID NO 76
<211> LENGTH: 341
<212> TYPE: PRT
<213> ORGANISM: Thlaspi arvense

<400> SEQUENCE: 76

Met Asp Asn Ser Ala Pro Asp Ser Leu Ser Arg Ser Glu Thr Ala Val
1               5                   10                  15

Thr Tyr Asp Ser Pro Tyr Pro Leu Tyr Ala Met Ala Phe Ser Ser Ile
            20                  25                  30

Gly Thr Pro Ser Gly His Arg Ile Ala Val Gly Ser Phe Leu Glu Asp
        35                  40                  45

Tyr Asn Asn Arg Ile Asp Ile Leu Ser Phe Asp Ser Asp Ser Met Thr
    50                  55                  60

Val Lys Pro Leu Pro Asn Leu Ser Phe Asp His Pro Tyr Pro Pro Thr
65                  70                  75                  80

Lys Leu Met Phe Ser Pro Pro Ser Leu Arg Arg Pro Ser Ala Gly Asp
                85                  90                  95

Leu Leu Ala Ser Ser Gly Asp Phe Leu Arg Leu Trp Glu Ile Ser Glu
            100                 105                 110

Asp Ser Ser Thr Val Glu Pro Val Ser Val Leu Asn Asn Ser Lys Thr
        115                 120                 125

Ser Glu Phe Cys Ala Pro Leu Thr Ser Phe Asp Trp Asn Asp Val Glu
    130                 135                 140

Pro Lys Arg Leu Gly Thr Cys Ser Ile Asp Thr Thr Cys Thr Ile Trp
145                 150                 155                 160

Asp Ile Glu Lys Cys Val Val Glu Thr Gln Leu Ile Ala His Asp Lys
                165                 170                 175

Glu Val His Asp Ile Ala Trp Gly Glu Ala Arg Val Phe Ala Ser Val
            180                 185                 190

Ser Ala Asp Gly Ser Val Arg Ile Phe Asp Leu Arg Asp Lys Glu His
        195                 200                 205

Ser Thr Ile Ile Tyr Glu Ser Pro Gln Pro Asp Thr Pro Leu Leu Arg
    210                 215                 220
```

```
Leu Ala Trp Asn Lys Gln Asp Leu Arg Tyr Met Ala Thr Ile Leu Met
225                 230                 235                 240

Asp Ser Asn Lys Val Val Ile Leu Asp Ile Arg Ser Pro Thr Met Pro
                245                 250                 255

Val Ala Glu Leu Glu Arg His Gln Ala Ser Val Asn Ala Ile Ala Trp
            260                 265                 270

Ala Pro Gln Ser Cys Lys His Ile Cys Ser Ala Gly Asp Asp Thr Gln
        275                 280                 285

Ala Leu Ile Trp Glu Leu Pro Thr Val Ala Gly Pro Asn Gly Ile Asp
    290                 295                 300

Pro Met Ser Val Tyr Ser Ala Gly Ser Glu Ile Asn Gln Leu Gln Trp
305                 310                 315                 320

Ser Ser Ser Gln Pro Asp Trp Ile Gly Ile Ala Phe Ala Asn Lys Met
                325                 330                 335

Gln Leu Leu Arg Val
            340


<210> SEQ ID NO 77
<211> LENGTH: 4435
<212> TYPE: DNA
<213> ORGANISM: Thlaspi arvense

<400> SEQUENCE: 77

acacatatct aatactataa aaaaaggtgt atagcgtccg cgaaactcat gtcttccata     60

atcattaatc aaaaaccgat atctctaatc aagatgcatt tgacaagaaa aaagaatcaa    120

aatgcattgc caagaaaaaa agaatcaaga tgcatgattg tttggtgagt aaacgagaca    180

tcttaatttt aatataacaa ttcgttcctt gttttttttt ttcctgtatc gtacgtgatt    240

catgtgttca actgttttgt tgtcatctca tgtgttagtt aaattctatc ttattgattt    300

taatacatag atatttcggt gcagcgcaaa aacattatta tatttcggtg tagccgcatt    360

tagcacaatc atacctaaat attaccaaat tgtgctccac tatcttacgt gattcatgtg    420

ttaaactgtt ttttctttcc tgtggtctac caaaattaag tttttaattg caaagacgat    480

tgccaatttt aattgacgat ctaatttgtc acagataaca taattatctg atggcgtata    540

agttataagc tcttttattt tttgaacaaa atatttttgt tcttagctga gctgggaaat    600

gtcgtattta aagtattaaa cctataatct cttcggtaat atgttaaata aatctgtttt    660

ttcaggtcgt tagtaaatta tttcggctac agacgccata tcaaataata tatcaggttg    720

ctgtgaatga gtatctcaat ttgcatgcta agaactatat aaactgtatt aacttttatc    780

ttaataccat gagtaagtcg aattatcgat ctatctatta tttttatttt taaacgtgtg    840

gcctgattga taaaataaac ttgtggtcat atcaaatctg aaactggagt aaacgtggga    900

ttggggatga agaaattagg gcatgtcaac gtcttgggac ttaccgtcat gtcccttcac    960

tgtaatattg gacctatcat tttcttcctt atcatcttag tttttttttgt cgtctcatcc   1020

tctttaaaat aaagtaaaag taattaacac tattatattt tctcacaaaa ttagatatta   1080

tatgctcttt tcaaaaaaat gttaggcatc taacatgata tttttgagat agaaaatgac   1140

acaaatactc ttcaccccaa cctcacgcat atctctatat ttattacatc gctattacac   1200

acattacaca tagtattcat gtacatgtct atttacgcaa aggatcacac gttccacaaa   1260

ccatttgcta aatcctaaat gagtagtaac aagatattgt ccgtctcaaa acaaaatata   1320

tatttgtaga gaatatcata attttagtat cgtcttcaaa atggtttgaa aatgttattg   1380
```

-continued

```
acttttgta gacaacattt taatctgtgt gtttgggaaa gaaatgtgga aagctcgctt   1440
agcgttgaaa aggcctacta tgtaaagaca caaggcccaa aaatgcgttg aaaggcccac   1500
tatcaataga tattgattga cacagagggt ttagcatgca gtcaaaatat cgcactggac   1560
actgaccata gaactttctg tcattttcct ctgaaaaacg gagatgtcgc cgtgaagaat   1620
ccaaaaatcg aatcgaatca gatcaaacca ttccacattt tcgtgcagag ataatggata   1680
actcagctcc ggattctttg tccagatcgg aaaccgccgt cacctacgat tctccttacc   1740
cactctacgc catggccttc tcttccatcg gtactccctc cggccaccga atcgccgtcg   1800
gaagcttcct cgaggattac aacaaccgca tcgacattct ctccttcgat tccgactcca   1860
tgacggtgaa gcctctcccg aatctctcct tcgatcatcc ttatcctccc acaaagctga   1920
tgttcagccc tccctccctc cgtcgtccct ccgccggcga tctcctcgct tcctccggcg   1980
atttcctccg tttatgggag atcagtgaag attcctccac cgtcgagcct gtctcggtgc   2040
tcaacaacag caagacgagc gagttctgcg cgccgttgac ctccttcgac tggaacgacg   2100
tcgagccgaa acgcctggga acctgcagca tcgacacgac ctgcacgatt tgggacatcg   2160
agaagtgcgt ggtggagacg cagctcatag cgcacgataa ggaggtccac gacatcgctt   2220
ggggagaagc tagggttttc gcgtcggtct ccgccgacgg atccgtcagg atcttcgatc   2280
tacgcgacaa ggagcattcc accatcatct acgagagtcc tcagcccgat acgcctctcc   2340
taagactcgc ctggaacaaa caagacctga ggtacatggc gacgatcctg atggattcga   2400
ataaggtcgt gattctcgac attcgctcgc cgacgatgcc tgtcgccgag ctcgaacggc   2460
accaggctag cgtcaacgcc atagcttggg ctccacagag ctgcaaacac atctgctctg   2520
ctggtgacga cacgcaggct ctcatctggg agctcccgac tgtagctgga cccaacggca   2580
ttgatccgat gtcggtttac tcagccggct cggagataaa ccagttgcag tggtcctctt   2640
cacagcctga ttggattggc atcgctttcg ctaacaaaat gcagctcctt agagtttgag   2700
gttaggtttt atatttaact atgaagtcga tgatatgaat gatatcacct ggttaggcct   2760
aatgaattcg caaagaaagt tgaactgaaa actcacttga atgctttcat ggctggctat   2820
tacagattgt cttgtagcta taagagaact ttgttagtaa atgatctcac agttgctgta   2880
atggctgata aaatgatatt catgtagacg atgattgggt acaaaacacc tttgtacttt   2940
gtgcttcagg tttttgcaac tcatatagag aatctagatt gaacaataac attgcacatg   3000
tagaaaatca aataacattt ccttattata tacatctcgc ttgatgtcag atgcagatgg   3060
tgaagtggtc aaaatcagat ttagcataga cccgatgtga caagtaggtt cggtgcacgc   3120
gcactctcgc gtcttgggtc agcaagcaat gcctctgtat ctacctgatt gtaactaaaa   3180
ctgatttcat ttgatgaacc aaatgccact gttatctttc tgttttgtgt ataaacccca   3240
accagaattt attgcggttt ctggtgttta gatttgaagt ggaagcttat tacagtataa   3300
tgcaccctgt ctttcctttg ttgggtattc ttcggataaa acagctactt gtcatcggtt   3360
atttagcatc taaacaaagc aattataaaa tatgtgttac aggttccaac ttcgaacacc   3420
tgtttttagt cagagttttt tttttgtatt ttgcaaatta acttcaagtg acaagcaaat   3480
tctcaattta ttataccttc ttcgtttgag aaaacctctg aacgtccgac tgttatattt   3540
ctctatctca ttctttacaa agagataaat ttatgttaaa cttctctatt taccattttt   3600
aaaatttcat ataaccaatt tacataactt tggagaacgt tgatattcat attttccatt   3660
taataaaatg aataaaaata gaaaatttag cttaaggaaa aggaaaatat gtgtcagatt   3720
cttgatttca caaaacccta caagcaaccc cctctacata taaatagcaa cgtccttgta   3780
```

acttaaaagg caagtgataa taatagtgca aaaagatttg aaaaaaaagg ttagagagaa 3840
tgtccaccag cgagcttgcc tgcacatatg ccgctctaat cctccacgat gatgggattg 3900
acatcaccgt tagttttctc ttctctctaa ttctcaattt taacctcttt ttgatctagt 3960
ttctactctt tttctttgct cttcatgcat gtacttatat atgttgtagt tgcgaatttc 4020
gtttatatag tttcatgtcg gtaactttct tgtttattgt ggatttacta ggccgagaag 4080
atatcaaagc tggtgaaagc agccaacgtg aatgttgaat catactggcc tagcctcttt 4140
gctaagctat gtgcgaagaa gaatattgac gatctcatca tgaatgttgg agccagtggt 4200
ggtggtgagg cagctccggt tgcaaccaac gttcctccaa ctgctcaagc agctccagca 4260
gttgaggaga caaagaagaa gaaggtatat cctattgtct ttctaacagt cttagcgtta 4320
ttgcaatcca aatcatcaac tatataattt aacaagctta tgattaaaac taaccaatgg 4380
gaatattgtt ttaaaaattc tcaggaggag gtgaaggaag agagtgaaga tgaca 4435

<210> SEQ ID NO 78
<211> LENGTH: 1275
<212> TYPE: DNA
<213> ORGANISM: Thlaspi arvense

<400> SEQUENCE: 78
atggaggtga aagagagtga aagagtggta atagccaaac cagtggcttc aaggccttca 60
tgctctagct tcaggacttt cactgagctt ctgactgatt cagctactgt gtctcctcaa 120
tcgaattgcc acgagattgt agacgctgcc attagaccaa agactctcag gtttaaccag 180
ccagctgcag ctgcggtctc atgtccacgg gctaaagaaa atggcaatgg aaagtcttgt 240
gatgacacag atggcggaaa ctacgtcgtt tacaaaccta aagcaaagct tgtctccaaa 300
gcaaccgtct ctgtgttggc taacatgggg aatcgtcaac agacttggag acaacccgaa 360
gcagtagcgt atgggaagag tgtgagtcaa ggtactggtc ctaatctagt ccagagagtt 420
tcatccttta cagaaacaga gacatcggtc ggggacagat catctgtgga cggatacaac 480
tggaggaaat acggacagaa gcaagttaaa ggaagtgagt gtccaagaag ctattacaaa 540
tgcacacacc cgaaatgtcc ggtgaagaag aaagtagaga ggtcattggg aggtcaggtc 600
tcagagattg tgtatcaagg tgagcataat cactcgaagc cgtcttgtcc acttccacgg 660
cgcgcttcgt catcatcctc ttcagggttt cagaaaccac caaaagggct tgtctctgaa 720
ggatcaatgg gacaagaccc taatagtaat gccttttatc atcatcctct ttggagcaat 780
caaagcaatg actcgtctaa gatgtatgag ggttgtgttg taactccatt cgagttcgct 840
gttccaagat cggcgaattc aaccggcgga acttcggatt ccggttgtcg aagtagccag 900
tgtgatgaag gcagcaatgg aggagagctt gatgatccaa gcagaagcaa aagaagcagg 960
aagaacgaga agcaatcaag tgaagcagga gtatcgcaag gttcggtgga atcagacagt 1020
cttgaagatg gatttaggtg gagaaaatac ggacagaaag ttgttggagg caatgcgtat 1080
ccaagaagtt attacagatg cacgagcgcg aattgcagag caaggaaaca cgtcgagaga 1140
gcgagtgatg atccaagagc ttttattaca acctacgaag gtaaacacaa tcaccatttg 1200
ctcttgagac ctccaccttc gtctacggtt cttcttccct ttaactccac acaacattct 1260
aatcaagcca tttga 1275

<210> SEQ ID NO 79
<211> LENGTH: 424
<212> TYPE: PRT

<213> ORGANISM: Thlaspi arvense

<400> SEQUENCE: 79

```
Met Glu Val Lys Glu Ser Glu Arg Val Val Ile Ala Lys Pro Val Ala
1               5                   10                  15

Ser Arg Pro Ser Cys Ser Ser Phe Arg Thr Phe Thr Glu Leu Leu Thr
            20                  25                  30

Asp Ser Ala Thr Val Ser Pro Gln Ser Asn Cys His Glu Ile Val Asp
        35                  40                  45

Ala Ala Ile Arg Pro Lys Thr Leu Arg Phe Asn Gln Pro Ala Ala Ala
    50                  55                  60

Ala Val Ser Cys Pro Arg Ala Lys Glu Asn Gly Asn Gly Lys Ser Cys
65                  70                  75                  80

Asp Asp Thr Asp Gly Gly Asn Tyr Val Val Tyr Lys Pro Lys Ala Lys
                85                  90                  95

Leu Val Ser Lys Ala Thr Val Ser Val Leu Ala Asn Met Gly Asn Arg
            100                 105                 110

Gln Gln Thr Trp Arg Gln Pro Glu Ala Val Ala Tyr Gly Lys Ser Val
        115                 120                 125

Ser Gln Gly Thr Gly Pro Asn Leu Val Gln Arg Val Ser Ser Phe Thr
    130                 135                 140

Glu Thr Glu Thr Ser Val Gly Asp Arg Ser Ser Val Asp Gly Tyr Asn
145                 150                 155                 160

Trp Arg Lys Tyr Gly Gln Lys Gln Val Lys Gly Ser Glu Cys Pro Arg
                165                 170                 175

Ser Tyr Tyr Lys Cys Thr His Pro Lys Cys Pro Val Lys Lys Lys Val
            180                 185                 190

Glu Arg Ser Leu Gly Gly Gln Val Ser Glu Ile Val Tyr Gln Gly Glu
        195                 200                 205

His Asn His Ser Lys Pro Ser Cys Pro Leu Pro Arg Arg Ala Ser Ser
    210                 215                 220

Ser Ser Ser Ser Gly Phe Gln Lys Pro Pro Lys Gly Leu Val Ser Glu
225                 230                 235                 240

Gly Ser Met Gly Gln Asp Pro Asn Ser Asn Ala Phe Tyr His His Pro
                245                 250                 255

Leu Trp Ser Asn Gln Ser Asn Asp Ser Ser Lys Met Tyr Glu Gly Cys
            260                 265                 270

Val Val Thr Pro Phe Glu Phe Ala Val Pro Arg Ser Ala Asn Ser Thr
        275                 280                 285

Gly Gly Thr Ser Asp Ser Gly Cys Arg Ser Ser Gln Cys Asp Glu Gly
    290                 295                 300

Ser Asn Gly Gly Glu Leu Asp Asp Pro Ser Arg Ser Lys Arg Ser Arg
305                 310                 315                 320

Lys Asn Glu Lys Gln Ser Ser Glu Ala Gly Val Ser Gln Gly Ser Val
                325                 330                 335

Glu Ser Asp Ser Leu Glu Asp Gly Phe Arg Trp Arg Lys Tyr Gly Gln
            340                 345                 350

Lys Val Val Gly Gly Asn Ala Tyr Pro Arg Ser Tyr Tyr Arg Cys Thr
        355                 360                 365

Ser Ala Asn Cys Arg Ala Arg Lys His Val Glu Arg Ala Ser Asp Asp
    370                 375                 380

Pro Arg Ala Phe Ile Thr Thr Tyr Glu Gly Lys His Asn His His Leu
385                 390                 395                 400
```

```
Leu Leu Arg Pro Pro Pro Ser Ser Thr Val Leu Leu Pro Phe Asn Ser
                405                 410                 415

Thr Gln His Ser Asn Gln Ala Ile
            420


<210> SEQ ID NO 80
<211> LENGTH: 5443
<212> TYPE: DNA
<213> ORGANISM: Thlaspi arvense
<220> FEATURE:
<221> NAME/KEY: misc_feature
<222> LOCATION: (887)..(887)
<223> OTHER INFORMATION: n is a, c, g, or t

<400> SEQUENCE: 80

ttgaatgtga tatatgatat tgcggctggc cgagctggct ggtttaagta ctcaaccaga      60

cagtaaagta aaacagccgc atagattgaa atctcgtgga acgtataacc agctcctgtc     120

tgtcctagaa ttggcggttc gggatagaac tgttccttac atctcttgga atctccggtt     180

gagttgatgc taattgtatc actacttgtg atgtgatcta gaaacaaaca tagcttatgt     240

tttgcgtttg cggtctctga gaaatcgttg gggttctatg attcttctgg cctgacaatt     300

aaaatcattt tatggaccca attgaaagac taaaccggac gcagcctatt gcaatttaaa     360

gaacaataac gagcatgtag gttagaaacc ggtttgtagt tccacttgag tcgaaactgt     420

actacttgaa aaatttgggt tttagactta aactggtttc aagctccttt tatctagggt     480

ggagagaact tgttaggaaa aaaaacaaat tgttgtaatg cgcggaacgg atcgacttat     540

gctctataaa agtctgcgga cgcagccaat attaaaggca tgttattata agaaaatgtc     600

ttgcggatgc aaaattaagg taaaataaaa cttctgtttt aaactgtaac tgtgtgtaca     660

ttgattatgc tcaaacaaac caccttctta acgaatcttt aaggaggtgt tattggttct     720

tatattttaa tggatttgag aatctaaacc aaattcagta ttattggttt ttgtatttta     780

aaatttatat tgaaatatag tgttattagt tttatgattt taaaattcat aatgaaatac     840

agtgttattg gttctattat tttagaatct aaatattata aggattnaag aaaatgtctt     900

gcggatgcaa aattaaggta aaataaaact tctgttttaa actgtaactg tgtgtacatt     960

gattatgctc aaacaaacca ccttcttaac gaatctttaa ggaggtgtta ttggttttta    1020

tattttaatg gatttgagaa tctaaaccaa attcagtatt attattttaa aatttatatt    1080

gaaatatagt gttattagtt ttatgatttt aaaatccata atgaaataca gtgttattgt    1140

atctatcatt ttagaatcta aatattataa ggatttgagt tttaattgaa tttgaatgga    1200

tttggaagga ttttcatgac taaaatataa agatccaaat acaaagtcta attttggtat    1260

ttaaatagat ttgatttttt ttttatttta ttgattttga aatcaataaa tttatcaaat    1320

ccaaaaaaga tttataaatc taccaaaata caagaaccaa taacccctag taagtaatcc    1380

agcaaactgt ttgtataatg tcacctctaa tagtagttga aaattacaaa ctaataattg    1440

tttaactttc ataaatgttt ctgttaatgg ataattcata atattttttg tattgtgata    1500

ctttattata ttcatgcgaa taataatatt ttagtttcgg ttcaatataa acttctgaaa    1560

ttgggacaac agcaacgtga taatattata tatcttctta tttctgacaa tggagagggg    1620

tgaaatcgag aatgaaccgg tttaaatttc ggtacggttc agttcacttt gtctaaacga    1680

gttggtatgg ttcacgcgtg ctttacttct aacaagacaa gctcgcgcgc gtgtgtcaac    1740

aaccaaccaa agtcactttg gccgctggag cctcaaccaa aattcgaaac gacgccgttt    1800

ctttggccgc gtttccaact aactttcaaa ggcctataaa actcaactaa cgttcaacca    1860
```

```
aaactatctg tctcttctct gtctttcatt ttcatcgcct tctttcatca ctatagacta   1920
gctcatctaa agtacggacc ttgatccatc caacgtaccc taccttgaca cgtgtccctt   1980
gacagtgtgt cggcaagact caacgaactg aaccgatacg acggatacat caacgcccac   2040
cttaatgaaa aacccgaatt cggatcttcc taaagggttt tgcctcaaac tcctttttttg   2100
aacttcagat tctgcatcat catctctctc accgtgagta acttacttat gtcctctctt   2160
ttgcgtcact tatggtttta catttgtatt catcttttgg gtttttgatt tggaatgatt   2220
cagaacctaa tcacaactgt atcggcgcat gtgggtatca tcaagtttct tttttttttt   2280
tttccggcat catcaagttt ctttcttttt gctatagttt gcatcaaact ttccaaggct   2340
ctatatatag atcgagatta tgtattgttg gatttgatgc ttctcaccgt ccaaatccaa   2400
tcttttgttc ctctcctttt aaaaccttct cgatacttga cttaagactc tagaaaatga   2460
gctccgattc agaatctgaa tctcttataa atttgattga ggctatgtga agctaatgtg   2520
ttgattttta atctgtggaa catttttcag gttgaatcaa agctttttga ctggaaacaa   2580
ttttgggtgg taaggttgga acaatggagg tgaaagagag tgaaagagtg gtaatagcca   2640
aaccagtggc ttcaaggcct tcatgctcta gcttcaggac tttcactgag cttctgactg   2700
attcagctac tgtgtctcct caatcgaatt gccacgagat tgtagacgct gccattagac   2760
caaagactct caggtttaac cagccagctg cagctgcggt ctcatgtcca cgggtgattc   2820
atcttattaa tctcttggca atataatata tcttcttatt tctgaatctt ctgcatttta   2880
gcactgactc gtataagttt ttctcataat cttaggctaa agaaaatggc aatggaaagt   2940
cttgtgatga cacagatggc ggaaactacg tcgtttacaa acctaaagca aagcttgtct   3000
ccaaagcaac cgtctctgtg ttggctaaca tggtaagttg tttctagtgc tacaaagatc   3060
aagaatttct cggaattagt ttcttaactc tgtttttgtt ttagcttcag gggaatcgtc   3120
aacagacttg gagacaaccc gaagcagtag cgtatgggaa gagtgtgagt caaggtactg   3180
gtcctaatct agtccagaga gtttcatcct ttacagaaac agagacatcg gtcggggaca   3240
gatcatctgt ggacggatac aactggagga aatacggaca gaagcaagtt aaaggaagtg   3300
agtgtccaag aagctattac aaatgcacac acccgaaatg tccggtgaag aagaaagtag   3360
agaggtcatt gggaggtcag gtctcagaga ttgtgtatca aggtgagcat aatcactcga   3420
agccgtcttg tccacttcca cggcgcgctt cgtcatcatc ctcttcaggg tttcagaaac   3480
caccaaaagg gcttgtctct gaaggatcaa tgggacaaga ccctaatagt aatgcctttt   3540
atcatcatcc tctttggagc aatcaaagca atgactcgtc taagatgtat gagggttgtg   3600
ttgtaactcc attcgagttc gctgttccaa gatcggcgaa ttcaaccggc ggaacttcgg   3660
attccggttg tcgaagtagc cagtgtgatg aaggcagcaa tggaggagag cttgatgatc   3720
caagcagaag caaaagaagg tataatatta gagagctttg aatagtttca aaacaccaat   3780
cttcttcgtt tactgttaca ttgactttta tgaataataa tatacagcag gaagaacgag   3840
aagcaatcaa gtgaagcagg agtatcgcaa ggttcggtgg aatcagacag tcttgaagat   3900
ggatttaggt ggagaaaata cggacagaaa gttgttggag gcaatgcgta tccaagaagt   3960
tattacagat gcacgagcgc gaattgcaga gcaaggaaac acgtcgagag agcgagtgat   4020
gatccaagag cttttattac aacctacgaa ggtaaacaca atcaccattt gctcttgaga   4080
cctccacctt cgtctacggt tcttcttccc tttaactcca cacaacattc taatcaagcc   4140
atttgatgaa tgatggtata ttgatacatt acttcttcaa tcttcatagc aacattagtt   4200
```

```
catcattttc ttgttgttgc actgtgaatt tatttatttt acatcaaaat tgtaaggaga   4260

agcaaaatag ttgttattta acaaacgaaa aaaaaagcaa ataaaaagag tgttatattt   4320

taggtttaac aacttatgtt cccatgttgt agctttcttc tgttagtata ttgggtttga   4380

tctacagtag tggtaaaaag aaactacttt tactaatcac aaaaacagta aatgtaaaac   4440

gcaacacaca cttaccgctt aataaatcat ttgaagctta accaccaatt agttgaaata   4500

caaacatgaa aggtttggtt acaattgatt tcatggcaat aaacaatttt tatttaggaa   4560

aatagcagaa aatcggaata tttaatttgg agttaagaac cattgaagat ggaaaccata   4620

tcactttaat gtatcagctt tctaattaga aatataaaga tgaaatattc ttaaatatga   4680

aaccgtttga tcaaagatcc caagtcgata aagcgtcaaa acttgattaa aggtagagaa   4740

attttctgaa acatatccaa agctaacgaa aacagcacaa aaaaaatgtc tttggagata   4800

taatgcaaac tcagggcaaa ggaagatccc ttaacgattg gccttggcaa cacgctcaat   4860

ctcatctttc ttcttgatag catagctgca aagacaagac aaagatgcat ctcatcagct   4920

actaaagtaa cacaaatgtg aagccattta atagacaaga cgatgtagag aatttgtttt   4980

ataaaacctg ttggaagatc ccttggcagc attgatgagt tcatcagcaa ggcactcagc   5040

gattgtcttg acgtttctaa acgcagcctc acgtgcacca gtggtgatca agaagattgc   5100

ttggttcaca cgtcttagag gagagatatc aacggcctgc ctcctaacca caccagcaga   5160

tccaatcctg gtagcatctt ctctcggacc actgtctcac caaaaataaa cgaacatcat   5220

gagaaaagag gttcataaca acacaacaag aaagtgagag ggtttcagta tcaccacatg   5280

tttgatttac ttacctgtta acaatggcat caatgataac ctgaatcggg ttctggtcag   5340

acaagagatg gatgatctcc atggcgtgct tgatgatcct gacggccatc agcttcttac   5400

cgttgttcct tccgtgcatc atgagagagt tcgtgagcct ctc                     5443
```

<210> SEQ ID NO 81
<211> LENGTH: 404
<212> TYPE: DNA
<213> ORGANISM: Thlaspi arvense

<400> SEQUENCE: 81

```
caaacacacg ctcggacgca tattacacat gttcatacac ttaatactcg ctgttttgaa     60

ttgatgtttt aggaatatat atgtagctat ctgatcggtc agtattttca caggtcgtga    120

tatgattcaa ttagcttccg actcattcat ccaaataccg agtcgccaaa attcaaacta    180

gactcgttaa atgaatgaat gatgcggtag acaaattgga tcattgattc tctttgataa    240

tactcaccga tcagacagct ctcttttgta ttccaatttt cttgattaat ctttcctgca    300

caaaaacatg cttgatccac taagtgacat atatgctgcc ttcgtatata tagttctggt    360

aaaattaaca ttttgggttt atctttattt aaggcatcgc catg                     404
```

<210> SEQ ID NO 82
<211> LENGTH: 404
<212> TYPE: DNA
<213> ORGANISM: Thlaspi arvense

<400> SEQUENCE: 82

```
caaacacacg ctcggacgca tattacacat gttcatacac ttaatactcg ctgttttgaa     60

ttgatgtttt aggaatatat atgtaggaac gtattaccta cacattttca caggtcgtga    120

tatgattcaa ttagcttccg actcattcat ccaaataccg agtcgccaaa attcaaacta    180

gactcgttaa atgaatgaat gatgcggtag acaaattgga tcattgattc tctttgataa    240
```

tgtgaaggta atacgctcct ctcttttgta ttccaatttt cttgattaat ctttcctgca 300
caaaaacatg cttgatccac taagtgacat atatgctgcc ttcgtatata tagttctggt 360
aaaattaaca ttttgggttt atctttattt aaggcatcgc catg 404

<210> SEQ ID NO 83
<211> LENGTH: 404
<212> TYPE: DNA
<213> ORGANISM: Thlaspi arvense

<400> SEQUENCE: 83
caaacacacg ctcggacgca tattacacat gttcatacac ttaatactcg ctgttttgaa 60
ttgatgtttt aggaatatat atgtagtcag ctccgagtta tcaattttca caggtcgtga 120
tatgattcaa ttagcttccg actcattcat ccaaataccg agtcgccaaa attcaaacta 180
gactcgttaa atgaatgaat gatgcggtag acaaattgga tcattgattc tctttgataa 240
ttgaaaactc ggagccgact ctcttttgta ttccaatttt cttgattaat ctttcctgca 300
caaaaacatg cttgatccac taagtgacat atatgctgcc ttcgtatata tagttctggt 360
aaaattaaca ttttgggttt atctttattt aaggcatcgc catg 404

<210> SEQ ID NO 84
<211> LENGTH: 404
<212> TYPE: DNA
<213> ORGANISM: Thlaspi arvense

<400> SEQUENCE: 84
caaacacacg ctcggacgca tattacacat gttcatacac ttaatactcg ctgttttgaa 60
ttgatgtttt aggaatatat atgtaggaac ttgacagtat aatcttttca caggtcgtga 120
tatgattcaa ttagcttccg actcattcat ccaaataccg agtcgccaaa attcaaacta 180
gactcgttaa atgaatgaat gatgcggtag acaaattgga tcattgattc tctttgataa 240
gattttactg tcaagctcct ctcttttgta ttccaatttt cttgattaat ctttcctgca 300
caaaaacatg cttgatccac taagtgacat atatgctgcc ttcgtatata tagttctggt 360
aaaattaaca ttttgggttt atctttattt aaggcatcgc catg 404

<210> SEQ ID NO 85
<211> LENGTH: 1998
<212> TYPE: DNA
<213> ORGANISM: Thlaspi arvense

<400> SEQUENCE: 85
ctataaaata taatatttag caccttgaca ggattgtcag ttattatatt gttagagtga 60
taaagatcat catcacgtac atataaagag attataagat aaaaataatt ttcggtactg 120
taggttttct gcaatttaaa ttatttaaaa tatgtaattg agaaaatatt cggtcgcctg 180
gtttatatag tcaagtgtta cgaaaacatg tttgttttgt atgcaatttt tgttttactt 240
atttgagaca taaatgagtt attttataat gggctgttac agatatgttt aattaatata 300
aattattggt ttttaacttg ttgatttttt atttttattt ttcaagcttt agaaactgat 360
gccacgtggc attgtgggag agagtttttt ttgcttaggt ggatagccta agaagcccca 420
aataatcctt tttatttagt atagattagt cacggcttcc acgaaacaag ttcaattaaa 480
tttaacggaa ataaatggta attaatgaaa gtttgaattg tattaattac tgcttccacg 540
aaacaaccaa aaaaatcatt tgacaaagta atttgtgtac ggtattagcc acatggggcc 600

```
aatcctctat gtatatcgga gttgttttgc caaatgccca attcttactc tagtaaatat    660
taaaccattt tgtagatcct aatcttgagt caactcaaag tcctatgttt ggaaactaaa    720
aataagttta aatcctctag actacgacta agttgtaaaa agaaatgttc aaaattcctt    780
agacattgaa attgaatact tcaattaaag aaaattttac cagcatgttc atagtagtag    840
accaccacag aacaaaatta atagttttta cattgcattc ttatataata attttggagt    900
ataattgtaa ttataaacaa aataactaaa agaaaaggaa agtattcttg acatatttat    960
aggtactaat ttgctagtac gactattaat tatggagatt aaatctagta tttgactaac   1020
cagaaacatt ttaaaggtaa gtgataagtt gataacctcg caattatttt tgaaagctat   1080
taatcacttt agcagaatgt atacaagttc tatattaaca agtttatctc aaaatcttga   1140
gatcctacta ataaatcata acttttctct tattggtatg tcgaatctag tgtttaccaa   1200
actagaggtg ttgaccgtta gagacaatta aacaacttac atacatacaa aagtacaagc   1260
cgaagaataa tagtaataac agtgcatttt ctacaataat taaaacaaaa aagtatatta   1320
aaaattagca tttattccaa ttaataccaa tattcgaaaa ttaatatggt agaaaagcaa   1380
aaagcttacg taaattccac agattgtcaa aaccctgcaa tgaaaaagtt gccaaaaatt   1440
gacgaggttg gtccacaaaa tttaaggttc tttgcttcac actctattta taggcgaaga   1500
gatgaaacag aggaaattaa ttactcctta acaaaggttg ttttcactca accacatgcc   1560
ttctcaagtg tctgctgctc acattccccg agattctcat ttacttactc ctctatttgg   1620
tacgtccttt atattacaat tctagtattt tttttttcat tattcgtttt gttcatactt   1680
cgtttcataa acatatatag ttaatcttat attatacagt aactttgata aatatgtatc   1740
ttaatttact cacgcagttt agagagacga ttgatacgtg gggactactt acgtacctgc   1800
atgattatat aagttataaa agttattgca gaacattaaa ttactttgat agctcgagag   1860
caatcattat ataaagctat atttttaatc acaaatatac atctactcga aagttttttt   1920
tttaaaaaaa agatgaaatc cctaaacaaa cgttcccaaa tgttctcatc actctccaac   1980
cacgattcac cacattca                                                 1998
```

<210> SEQ ID NO 86
<211> LENGTH: 1978
<212> TYPE: DNA
<213> ORGANISM: Thlaspi arvense

<400> SEQUENCE: 86

```
agtaactgag aggaatgtaa ctgagagaaa aaagaaaagt aataattaaa ataattgaaa     60
ataataagta agagcatcta gatagtcctt accaaaaaaa agatcatcta gatagtcttt    120
ccatagtatc tgatttatat aatactaata taatgtattt atataattaa attataaatt    180
aataaagaga tgaaccaatt cttaacagac atttgcctag agacatatct ttattcttaa    240
caaacatttg gctagaaaca tatctaatag tttcttgttt caaaaatgtc ttcgcttttt    300
ttctgttttt ctcccttcct ttttccttat tttttttatt tttcttattc actaaatata    360
ctcccataat atctgctata taatattaat ataatatatt tatataatta aattaaaaat    420
tcataaagag atgaaccaat tcttaataga tatttggcta aatacatatt taatattttt    480
ttgtttgaaa gatatctttg ctattttttt tctgtttctt tctcttcttt tcttcttata    540
tttcttattt tttttattca ataaatatat tttaaaaaac accaattttc ttataagaat    600
atctgaaaat aattgagaat aattaaatta aatattttct tttagtaaaa cttataatta    660
tatatatgct aaaaagatat gtgatattta ttattctatc tttaaagatt tttttatcgt    720
```

gaatcactat tttcagttat ccaacctaaa atgaatactc agagagcaac cacatcgaaa 780
gtgttagaga ttgaatgaat acagttctta aaaggtttat ttcacattaa tgaagtctat 840
caaaacaaaa tttatctaat tacatctcta taacaaaaat gataattcta aagttaaatg 900
aaaaaaaaaa acaaaaaaat agagagaatt tttctttaaa aaaaagataa gaaagatcaa 960
taaaaccgac ttcctcacat tataaataga aaagtcttca taatttgaag attcaatccg 1020
aaaatcccta aaattctaga aagtaagacc aaatgttcaa agttttctag tttaattttt 1080
tcaagtgttc ttacacacag tttagcaaaa cgtgattgtt aagctatctt tgtaatcact 1140
ctgagctttt gagtaataat gagatttaat tttttaaaca cacaacctta tattgctttt 1200
tttctttgag tgatatcttg gttaacaatt gacgtcgtct gtagaaaata aagaataaat 1260
tcttaagcaa aacaaggttt agagatgagc tctccgaata agagcaatca acacactcaa 1320
atccctacct ttgatgagca cagcaacccc cattgtcatt ggaaatcaaa caccacctcc 1380
accactagcc acatgaacat tgacccttgt ctctaccggt gatcttgctg ctgcaattca 1440
acccgcccta aaaatcgatc acctaagacc ttagttccaa attcgataac ttgcaagctc 1500
agcaagcaag ggatcaggaa caactcaacc tcatggcaac ctcggccact aaacaagttg 1560
caccacttgg acgaagactt gtctttgaga cacccaccgt ccacatcgta gcaagagcca 1620
caacagacac ccaagcaaac aagacgaatg tcccagccct aactaatgaa gcgttacatg 1680
ccaaggtggg ttatgaagtc tcacctgcca aggtgggtta gacgaatgtc tctctgttag 1740
acacctccac ttgaccactt gtttgaggat ggtaaggagt agcaacctta tgcttaacac 1800
catgcttcct tagcagattc tcaaaaactt tgttgatgaa gtggcttcct ccatcactta 1860
taacacacct tggaacacca aaccttggga agatgattat cttgaaaagt ttcagcacaa 1920
ccctagcatc atttgttgga ctggctatgg cttcaaccca ctttgagaca tagtctac 1978

<210> SEQ ID NO 87
<211> LENGTH: 1424
<212> TYPE: DNA
<213> ORGANISM: Thlaspi arvense

<400> SEQUENCE: 87
tgctttggga gttatgatgg aaaacctaat tctctaactc tgtttatata gggaagactc 60
aggaaaaatc ctaatatcct tttctcttgg gcttctgaca catgaacctt tccttttcct 120
attgagccta gatccagaac gttacaacta gaatcagaat cgaacaacaa gcgtatgcgc 180
ttaagaaatg atttttactc acactatatg ggcgcgcatg gcattgtcgt aagaattaaa 240
taagcttcgt cccactcctt attggattta cgcacacagt caatccacgt ggttgtcata 300
actaaatata attggtgaaa aaactaattt aaagacaaag taagaagcgg aaaccgaagg 360
aaaagccaaa caacattatg tttatcgaca aaaaagccaa aacaacattt aatgttaatt 420
tttgtccaaa ccaggaatac atcactcata cggtcatata taccataccc caaattgtat 480
gtactacatg tgtacgtaac tgatttatgt atatctatct atttctcttt tattgtaggg 540
gtcaaaatct acctatcgat atttataaat aggattttat aagacattgt taaaatggaa 600
aacatggtag ctacttggcc agcgattaac atcaataatt aaaaatacga attgtgaaac 660
atctcactct cttcctttta tcacaccaaa ccacttctct ttctttactt accggtcagg 720
tcaacaattc taccattccc tttatttagt tttttttttt catctatctc tcttttcatt 780
tttaactttt aaaaaatatt agtccgaaaa tcgcactctt ttatattcgt tgatgggcat 840

```
taaaatattg taaaaattaa aaaaaatgtg taaattaaaa cgcaatttgt ttgcacctgc    900
agcagtagta acacacaagt caaagcaatg tctgttttct cttgtatgtc ggttagctat    960
tttatgtact gaaatatgtt attctttctg accaaaacat attaagaaat ttgcattctg   1020
taatttgatt tatccaatca gtagaggaca cgtaaccaag ataattagat atttttattc   1080
tatctgtata ctactaattc atccaacgtc tgttggacga ccaaccagtc aaaactcata   1140
aaagtcaact tttactacat cgtgaatttt ttggtcatgc atttatatac acatacatgg   1200
aagaaaaaac aatactttac ctatgtcaaa atgctgcaaa agcattaaga tggtatgtat   1260
acatacatat tgatataaca gtggtcccat atatcatttt aaatcatcat aaagagtatc   1320
catcttcttt catattaaca tccccttcaa agttataaga tttttctctc ttcattagag   1380
agagagagag agagaattaa cacaagtttt aatctccggg aaag                    1424
```

<210> SEQ ID NO 88
<211> LENGTH: 1982
<212> TYPE: DNA
<213> ORGANISM: Thlaspi arvense

<400> SEQUENCE: 88

```
tttaagactc taacaatatt gatgccaact ctagaaaagg acaactgaac ttattttgtt     60
ttaagccttg gctatattac attatcagtt ttacacttct acgtatacac aactttaatt    120
tttctatatt actacatgca tactagatgt tagaaatatc ttatataagc atacatatta    180
aattagttat gcgatattta aaattaatgt atataaatat tcagtttcaa agcttacgaa    240
tacgtaaaat taatcaatac aaaccgaaac caaaaagcca cttctcatct caaaatgtta    300
attacaaatt tacaataagc cgaatcacta tctaaaaagc ttttgggatc ccgagaccca    360
aaacatttct tcgtataagt gcaacaatta tcgagtgtga tgagacacgt aaaaagcaag    420
gatcgggaca acgattttcg gctatatagt agtttctcat atctgacttt attagcaaat    480
tactacataa aattgctttt aagtatgatt aacggaacaa gtataatgcg tttatttaat    540
tacagatctg gctaaatgta atatggtatc aaagctggaa agacaaatag tctaaggttt    600
ggaatttttc atctgtctat aaaattctta agacactgat agatcattaa cttattttgg    660
agtcaccaat ggacaaatca ataactattg atgtccaaaa cccacaagac aagcctattt    720
tttttgcacg tgcaagtaca ccggtggaag aattcatttg tatactgaat ctgaaattat    780
aaaagattag aattggttga agaatttact tcaaaacaag ctagaagatg gtgttattta    840
aataaacaat gttaaattat atcaatgact ttcaaatttt atcaaaacat tttttgaaag    900
agaatcacgc acaaagtatt tcgaattaca aaacaatttt ttgcaataaa ttttatagtt    960
aaagcaaatt ttgtcaatta ttgaaaaaaa ttacttagat aaaatatcta atttttttttt   1020
ttaaacaatg tctctataaa agatggatta gccaagaaaa tctgatggat gctacaacgc   1080
agggttggag atatggtgct gacactacat actattaatt ggttgataga atcggtaaat   1140
atagatatga atatcgaaat ggagacaaca ggaaactcaa ccgtatggaa ggaataaaat   1200
agaggaactt taaagagaac ttgaggatat acaaacagat gactcacgta tgcaagagaa   1260
gcttaatgag ataacaaata actaaaggat gcgtatcggg atgagaaaca attctggcaa   1320
cagaagagca gaaacttatg gaacaaatgt ggagatttta atacataatt ttataatact   1380
tcaacaaagc aacggaggac tataaacaga atagtgggac tacatgatag tcagggtgta   1440
tggataactt aggttgcatg gaaactccct ccgaggtacg tttctcgctt ccgaaacgtt   1500
tcggaaaccg aaactctcgg aagctcgtcg gaaacacaaa aatcacgttt cctaaaaatt   1560
```

ctaatttgtg aatactttgg aaacacgttt ccattttaaa aacacatgtt tccattttgg 1620
aaagaagata aaaactaatt ttttttgttt tatgaaataa atagataatt ataaaaatta 1680
gatttaaatg atcaatttaa ttatttatag taaataataa ttgatttggt aactaaaatt 1740
aattttgata ttattaagtt tgaaaattat tctttccatg aattagaatt agagatagtt 1800
tggttaatga aactaataaa attgataata aagaaaatct tctaaatttt tgactttaca 1860
tattttaatt tttatagttt aataattatg taaaaattat atattagatt ttgttgattt 1920
aaatattcta cttataacat aattagatct ttaataatta atatatatat atacacattt 1980
cc 1982

<210> SEQ ID NO 89
<211> LENGTH: 24
<212> TYPE: DNA
<213> ORGANISM: Thlaspi arvense

<400> SEQUENCE: 89
attgtatatc atgatccatg gcga 24

<210> SEQ ID NO 90
<211> LENGTH: 24
<212> TYPE: DNA
<213> ORGANISM: Thlaspi arvense

<400> SEQUENCE: 90
aaactcgcca tggatcatga tata 24

<210> SEQ ID NO 91
<211> LENGTH: 24
<212> TYPE: DNA
<213> ORGANISM: Thlaspi arvense

<400> SEQUENCE: 91
attgatctga tggatttgga aggt 24

<210> SEQ ID NO 92
<211> LENGTH: 24
<212> TYPE: DNA
<213> ORGANISM: Thlaspi arvense

<400> SEQUENCE: 92
aaacaccttc caaatccatc agat 24

<210> SEQ ID NO 93
<211> LENGTH: 24
<212> TYPE: DNA
<213> ORGANISM: Thlaspi arvense

<400> SEQUENCE: 93
attgttcgtg ctgatgaatc ttct 24

<210> SEQ ID NO 94
<211> LENGTH: 24
<212> TYPE: DNA
<213> ORGANISM: Thlaspi arvense

<400> SEQUENCE: 94
aaacagaaga ttcatcagca cgaa 24

<210> SEQ ID NO 95

<211> LENGTH: 24
<212> TYPE: DNA
<213> ORGANISM: Thlaspi arvense

<400> SEQUENCE: 95
attgacaacg gtgcaataaa gacg 24

<210> SEQ ID NO 96
<211> LENGTH: 24
<212> TYPE: DNA
<213> ORGANISM: Thlaspi arvense

<400> SEQUENCE: 96
aaaccgtctt tattgcaccg ttgt 24

<210> SEQ ID NO 97
<211> LENGTH: 24
<212> TYPE: DNA
<213> ORGANISM: Thlaspi arvense

<400> SEQUENCE: 97
attggcatgc cctagcttcc gatg 24

<210> SEQ ID NO 98
<211> LENGTH: 24
<212> TYPE: DNA
<213> ORGANISM: Thlaspi arvense

<400> SEQUENCE: 98
aaaccatcgg aagctagggc atgc 24

<210> SEQ ID NO 99
<211> LENGTH: 24
<212> TYPE: DNA
<213> ORGANISM: Thlaspi arvense

<400> SEQUENCE: 99
attgatgcac ggcattatcg ccgg 24

<210> SEQ ID NO 100
<211> LENGTH: 24
<212> TYPE: DNA
<213> ORGANISM: Thlaspi arvense

<400> SEQUENCE: 100
aaacccggcg ataatgccgt gcat 24

<210> SEQ ID NO 101
<211> LENGTH: 24
<212> TYPE: DNA
<213> ORGANISM: Thlaspi arvense

<400> SEQUENCE: 101
attgagtttc ctggaccagt gtta 24

<210> SEQ ID NO 102
<211> LENGTH: 24
<212> TYPE: DNA
<213> ORGANISM: Thlaspi arvense

<400> SEQUENCE: 102
aaactaacac tggtccagga aact 24

<210> SEQ ID NO 103
<211> LENGTH: 24
<212> TYPE: DNA
<213> ORGANISM: Thlaspi arvense

<400> SEQUENCE: 103
attgccatcg aagacgcgac tgtt 24

<210> SEQ ID NO 104
<211> LENGTH: 24
<212> TYPE: DNA
<213> ORGANISM: Thlaspi arvense

<400> SEQUENCE: 104
aaacaacagt cgcgtcttcg atgg 24

<210> SEQ ID NO 105
<211> LENGTH: 24
<212> TYPE: DNA
<213> ORGANISM: Thlaspi arvense

<400> SEQUENCE: 105
attggttctc tgcgatgctc acat 24

<210> SEQ ID NO 106
<211> LENGTH: 24
<212> TYPE: DNA
<213> ORGANISM: Thlaspi arvense

<400> SEQUENCE: 106
aaacatgtga gcatcgcaga gaac 24

<210> SEQ ID NO 107
<211> LENGTH: 24
<212> TYPE: DNA
<213> ORGANISM: Thlaspi arvense

<400> SEQUENCE: 107
attggaccga tacttgaaga ccag 24

<210> SEQ ID NO 108
<211> LENGTH: 24
<212> TYPE: DNA
<213> ORGANISM: Thlaspi arvense

<400> SEQUENCE: 108
aaacctggtc ttcaagtatc ggtc 24

<210> SEQ ID NO 109
<211> LENGTH: 20
<212> TYPE: DNA
<213> ORGANISM: Thlaspi arvense

<400> SEQUENCE: 109
cggaagaggc tgcgttagag 20

<210> SEQ ID NO 110
<211> LENGTH: 20
<212> TYPE: DNA
<213> ORGANISM: Thlaspi arvense

<400> SEQUENCE: 110
gcagctaagg gaactttacg 20

<210> SEQ ID NO 111
<211> LENGTH: 20
<212> TYPE: DNA
<213> ORGANISM: Thlaspi arvense

<400> SEQUENCE: 111
cggaagaggc tgcgttagag 20

<210> SEQ ID NO 112
<211> LENGTH: 20
<212> TYPE: DNA
<213> ORGANISM: Thlaspi arvense

<400> SEQUENCE: 112
caggaaaggc gtatgcgagg 20

<210> SEQ ID NO 113
<211> LENGTH: 20
<212> TYPE: DNA
<213> ORGANISM: Thlaspi arvense

<400> SEQUENCE: 113
cgccgtcgga agcttcctcg 20

<210> SEQ ID NO 114
<211> LENGTH: 20
<212> TYPE: DNA
<213> ORGANISM: Thlaspi arvense

<400> SEQUENCE: 114
caaacaagac ctgaggtaca 20

<210> SEQ ID NO 115
<211> LENGTH: 20
<212> TYPE: DNA
<213> ORGANISM: Thlaspi arvense

<400> SEQUENCE: 115
agcattccac catcatctac 20

<210> SEQ ID NO 116
<211> LENGTH: 20
<212> TYPE: DNA
<213> ORGANISM: Thlaspi arvense

<400> SEQUENCE: 116
tcgactggaa cgacgtcgag 20

<210> SEQ ID NO 117
<211> LENGTH: 1188
<212> TYPE: DNA
<213> ORGANISM: Thlaspi arvense

<400> SEQUENCE: 117
atggtgatgg gtacacaacc gtcgttggaa gagatcagaa aggcacagag agcggatggc 60
cccgcaggca tcttggggat aggcacggcc aaccctgcga accatgtgat ccaggcagag 120
tatccggact actacttccg catcaccaac agtgagcaca tgactgacct caaggagaag 180
ttcaagcgca tgtgcgacaa gtcgatgata cggaaacggc acatgcacct gacggaggag 240
ttcctgaagg agaatccgga catgtgcgcc tacatggctc cttctcttga tgtgaggcag 300
gacatcgtgg tggtcgaggt ccctaagcta gggaaagagg cggcagtgaa ggccatcaag 360

```
gagtggggtc agcccaagtc caagatcacc cacgtcgtct tctgcactac atccggagtt    420

gacatgcctg gtgctgacta ccagctcacc aagctcctcg gtcttcgccc ttccgtcaag    480

cgtctcatga tgtaccagca aggttgctac gccggcggca ctgtcctccg actcgccaag    540

gacctcgctg agaataaccg tggtgctcgt gtccttgtcg tctgctccaa gatcacagcc    600

gtcaccttcc gtggcccctc tgacacacac ctcgactccc tcgttggtca ggctctcttc    660

agtgacggtg ctgccgcgct cattgttggt gcggaccctg atgcctccgt gggagagaag    720

cctatcttcg agatggtgtc tgctgcacag accatcctcc cagactcgga cggagccata    780

gatggacact tgagggaagt tgggctcacc ttccatctcc tcaaggacgt ccctgggctc    840

atctcgaaga acatagagaa gagtctagaa gaagcgttta aaccgctcgg gataagtgac    900

tggaactctc tcttttggat agctcaccct ggaggtcctg cgatcctgga ccaggttgag    960

ttaaagctag gactcaagga agagaagatg agggccacgc gtcacgtgct gagcgagtac   1020

ggaaacatgt cgagcgcgtg cgttctcttc attatggacg agatgaggag gaagtccaag   1080

gaggatggtg tggccacgac aggagaaggg ttggagtggg gtgtcttgtt tggtttcgga   1140

ccaggtctca ccgtagagac agtcgtcttg cacagcgtcc ctgtttga                1188


<210> SEQ ID NO 118
<211> LENGTH: 395
<212> TYPE: PRT
<213> ORGANISM: Thlaspi arvense

<400> SEQUENCE: 118

Met Val Met Gly Thr Gln Pro Ser Leu Glu Glu Ile Arg Lys Ala Gln
1               5                   10                  15

Arg Ala Asp Gly Pro Ala Gly Ile Leu Gly Ile Gly Thr Ala Asn Pro
            20                  25                  30

Ala Asn His Val Ile Gln Ala Glu Tyr Pro Asp Tyr Tyr Phe Arg Ile
        35                  40                  45

Thr Asn Ser Glu His Met Thr Asp Leu Lys Glu Lys Phe Lys Arg Met
    50                  55                  60

Cys Asp Lys Ser Met Ile Arg Lys Arg His Met His Leu Thr Glu Glu
65                  70                  75                  80

Phe Leu Lys Glu Asn Pro Asp Met Cys Ala Tyr Met Ala Pro Ser Leu
                85                  90                  95

Asp Val Arg Gln Asp Ile Val Val Val Glu Val Pro Lys Leu Gly Lys
            100                 105                 110

Glu Ala Ala Val Lys Ala Ile Lys Glu Trp Gly Gln Pro Lys Ser Lys
        115                 120                 125

Ile Thr His Val Val Phe Cys Thr Thr Ser Gly Val Asp Met Pro Gly
    130                 135                 140

Ala Asp Tyr Gln Leu Thr Lys Leu Leu Gly Leu Arg Pro Ser Val Lys
145                 150                 155                 160

Arg Leu Met Met Tyr Gln Gln Gly Cys Tyr Ala Gly Gly Thr Val Leu
                165                 170                 175

Arg Leu Ala Lys Asp Leu Ala Glu Asn Asn Arg Gly Ala Arg Val Leu
            180                 185                 190

Val Val Cys Ser Lys Ile Thr Ala Val Thr Phe Arg Gly Pro Ser Asp
        195                 200                 205

Thr His Leu Asp Ser Leu Val Gly Gln Ala Leu Phe Ser Asp Gly Ala
    210                 215                 220
```

```
Ala Ala Leu Ile Val Gly Ala Asp Pro Asp Ala Ser Val Gly Glu Lys
225                 230                 235                 240

Pro Ile Phe Glu Met Val Ser Ala Ala Gln Thr Ile Leu Pro Asp Ser
                245                 250                 255

Asp Gly Ala Ile Asp Gly His Leu Arg Glu Val Gly Leu Thr Phe His
            260                 265                 270

Leu Leu Lys Asp Val Pro Gly Leu Ile Ser Lys Asn Ile Glu Lys Ser
        275                 280                 285

Leu Glu Glu Ala Phe Lys Pro Leu Gly Ile Ser Asp Trp Asn Ser Leu
    290                 295                 300

Phe Trp Ile Ala His Pro Gly Gly Pro Ala Ile Leu Asp Gln Val Glu
305                 310                 315                 320

Leu Lys Leu Gly Leu Lys Glu Glu Lys Met Arg Ala Thr Arg His Val
                325                 330                 335

Leu Ser Glu Tyr Gly Asn Met Ser Ser Ala Cys Val Leu Phe Ile Met
            340                 345                 350

Asp Glu Met Arg Arg Lys Ser Lys Glu Asp Gly Val Ala Thr Thr Gly
        355                 360                 365

Glu Gly Leu Glu Trp Gly Val Leu Phe Gly Phe Gly Pro Gly Leu Thr
    370                 375                 380

Val Glu Thr Val Val Leu His Ser Val Pro Val
385                 390                 395
```

<210> SEQ ID NO 119
<211> LENGTH: 1188
<212> TYPE: DNA
<213> ORGANISM: Thlaspi arvense

<400> SEQUENCE: 119

```
atggtgatgg gtacacaacc gtcgttggaa gagatcagaa aggcacagag agcggatggc      60

cccgcaggca tcttggggat aggcacggcc aaccctgcga accatgtgat ccaggcagag     120

tatccggact actacttccg catcaccaac agtgagcaca tgactgacct caaggagaag     180

ttcaagcgca tgtgcgacaa gtcgatgata cggaaacggc acatgcacct gacggaggag     240

ttcctgaagg agaatccgga catgtgcgcc tacatggctc cttctcttga tgtgaggcag     300

gacatcgtgg tggtcgaggt ccctaagcta gggaaagagg cggcagtgaa ggccatcaag     360

gagtggggtc agcccaagtc caagatcacc cacgtcgtct tctgcactac atccggagtt     420

gacatgcctg gtgctgacta ccagctcacc aagctcctcg gtcttcgccc ttccgtcaag     480

cgtctcatga tgtaccagca aggttgctac gccggcggca ctgtcctccg actcgccaag     540

gacctcgctg agaataaccg tggtgctcgt gtccttgtcg tctgctccga gatcacagcc     600

gtcaccttcc gtggcccctc tgacacacac ctcgactccc tcgttggtca ggctctcttc     660

agtgacggtg ctgccgcgct cattgttggt gcggaccctg atgcctccgt gggagagaag     720

cctatcttcg agatggtgtc tgctgcacag accatcctcc cagactcgga cggagccata     780

gatggacact tgagggaagt tgggctcacc ttccatctcc tcaaggacgt ccctgggctc     840

atctcgaaga acatagagaa gagtctagaa gaagcgttta aaccgctcgg gataagtgac     900

tgaaactctc tcttttggat agctcaccct ggaggtcctg cgatcctgga ccaggttgag     960

ttaaagctag gactcaagga agagaagatg agggccacgc gtcacgtgct gagcgagtac    1020

ggaaacatgt cgagcgcgtg cgttctcttc attatggacg agatgaggag gaagtccaag    1080

gaggatggtg tggccacgac aggagaaggg ttggagtggg gtgtcttgtt tggtttcgga    1140
```

ccaggtctca ccgtagagac agtcgtcttg cacagcgtcc ctgtttga 1188

<210> SEQ ID NO 120
<211> LENGTH: 300
<212> TYPE: PRT
<213> ORGANISM: Thlaspi arvense

<400> SEQUENCE: 120

Met Val Met Gly Thr Gln Pro Ser Leu Glu Glu Ile Arg Lys Ala Gln
1 5 10 15

Arg Ala Asp Gly Pro Ala Gly Ile Leu Gly Ile Gly Thr Ala Asn Pro
20 25 30

Ala Asn His Val Ile Gln Ala Glu Tyr Pro Asp Tyr Tyr Phe Arg Ile
35 40 45

Thr Asn Ser Glu His Met Thr Asp Leu Lys Glu Lys Phe Lys Arg Met
50 55 60

Cys Asp Lys Ser Met Ile Arg Lys Arg His Met His Leu Thr Glu Glu
65 70 75 80

Phe Leu Lys Glu Asn Pro Asp Met Cys Ala Tyr Met Ala Pro Ser Leu
85 90 95

Asp Val Arg Gln Asp Ile Val Val Val Glu Val Pro Lys Leu Gly Lys
100 105 110

Glu Ala Ala Val Lys Ala Ile Lys Glu Trp Gly Gln Pro Lys Ser Lys
115 120 125

Ile Thr His Val Val Phe Cys Thr Thr Ser Gly Val Asp Met Pro Gly
130 135 140

Ala Asp Tyr Gln Leu Thr Lys Leu Leu Gly Leu Arg Pro Ser Val Lys
145 150 155 160

Arg Leu Met Met Tyr Gln Gln Gly Cys Tyr Ala Gly Gly Thr Val Leu
165 170 175

Arg Leu Ala Lys Asp Leu Ala Glu Asn Asn Arg Gly Ala Arg Val Leu
180 185 190

Val Val Cys Ser Glu Ile Thr Ala Val Thr Phe Arg Gly Pro Ser Asp
195 200 205

Thr His Leu Asp Ser Leu Val Gly Gln Ala Leu Phe Ser Asp Gly Ala
210 215 220

Ala Ala Leu Ile Val Gly Ala Asp Pro Asp Ala Ser Val Gly Glu Lys
225 230 235 240

Pro Ile Phe Glu Met Val Ser Ala Ala Gln Thr Ile Leu Pro Asp Ser
245 250 255

Asp Gly Ala Ile Asp Gly His Leu Arg Glu Val Gly Leu Thr Phe His
260 265 270

Leu Leu Lys Asp Val Pro Gly Leu Ile Ser Lys Asn Ile Glu Lys Ser
275 280 285

Leu Glu Glu Ala Phe Lys Pro Leu Gly Ile Ser Asp
290 295 300

<210> SEQ ID NO 121
<211> LENGTH: 1239
<212> TYPE: DNA
<213> ORGANISM: Thlaspi arvense

<400> SEQUENCE: 121
atggctccag ggactctcac cgagctcgcc ggagaggcta agctcaactc taaattcgtc 60
cgggacgagg acgaacgtcc caaggtggca tacaacaagt ttagcgacga tatcccggtg 120

```
atatctctcg ccggactcga cgatgttggt gggaaaagag gagagatctg ccgtaagatc    180

gttgaggctt gcgagaattg gggcgtgttc caggtggtcg atcatggtgt cgataccaat    240

ttggtagagg atatgactcg cctcgctcgc gacttctttg ctttaccacc cgaagagaaa    300

cttagtttcg acatgtctgg tggtaagaaa ggcggcttca tcgtctctag tcaccttcag    360

ggagagactg tgtaagattg gagagagatc gtgacgtact tctcgtaccc ggtgagaaac    420

agagactact cacggtggcc agataagccg gaagggtggg tgaaagtgac ggaggagtac    480

agcgacaaac tgatgggttt agcttgtaag cttcttgagg ttttgtctga agctatgggg    540

ctcgagaaag aagcacttac caatgcttgc gtcgatatgg accaaaagat agttgttaat    600

tattacccta aatgccctca gcctgatctc accctcggac tcaagcgtca cactgatcct    660

ggaaccatca ctttgctgct ccaagaccag gtcggtggat tacaagccac acgcgacgat    720

ggcaaaacat ggataacggt tcagccaatt gagggagctt ttgtcgtgaa tctcggcgac    780

catggtcact atttgagcaa cgggaggttc aagaacgcgg atcatcaggc ggtggtgaat    840

tccaactcga gcaggctatc tatagccacg tttcagaatc cggcgcagga tgcaaccgtg    900

tatccgctta aagttagaga aggagagaag ccgatcttgg aggagccaat cacttttgca    960

gagatgtata agagaaagat gggaaaagat ctggagctgg ctcgcctcaa gaagcttgcg   1020

aaagaagaaa atgaccagaa gctggccaaa gaagaacatg acaagaacct ggccaaagaa   1080

gaaaatgatc agaagctggc taaagaagaa catgaccaga agctggccaa agaagaacat   1140

gacaagagcc ttgccaaaga agaaaattac caaaagctgg ccaaagatga acatagccac   1200

acggaagctg ttaagcgtct cggccaaatc ctcgcttag                          1239
```

<210> SEQ ID NO 122
<211> LENGTH: 124
<212> TYPE: PRT
<213> ORGANISM: Thlaspi arvense

<400> SEQUENCE: 122

```
Met Ala Pro Gly Thr Leu Thr Glu Leu Ala Gly Glu Ala Lys Leu Asn
1               5                   10                  15

Ser Lys Phe Val Arg Asp Glu Asp Glu Arg Pro Lys Val Ala Tyr Asn
            20                  25                  30

Lys Phe Ser Asp Asp Ile Pro Val Ile Ser Leu Ala Gly Leu Asp Asp
        35                  40                  45

Val Gly Gly Lys Arg Gly Glu Ile Cys Arg Lys Ile Val Glu Ala Cys
    50                  55                  60

Glu Asn Trp Gly Val Phe Gln Val Val Asp His Gly Val Asp Thr Asn
65                  70                  75                  80

Leu Val Glu Asp Met Thr Arg Leu Ala Arg Asp Phe Phe Ala Leu Pro
                85                  90                  95

Pro Glu Glu Lys Leu Ser Phe Asp Met Ser Gly Gly Lys Lys Gly Gly
            100                 105                 110

Phe Ile Val Ser Ser His Leu Gln Gly Glu Thr Val
        115                 120
```

<210> SEQ ID NO 123
<211> LENGTH: 1239
<212> TYPE: DNA
<213> ORGANISM: Thlaspi arvense

<400> SEQUENCE: 123

```
atggctccag ggactctcac cgagctcgcc ggagaggcta agctcaactc taaattcgtc     60
```

```
cgggacgagg acgaacgtcc caaggtggca tacaacaagt ttagcgacga tatcccggtg    120
atatctctcg ccggactcga cgatgttggt gggaaaagag gagagatctg ccgtaagatc    180
gttgaggctt gcgagaattg ggcgtgttc caggtggtcg atcatggtgt cgataccaat    240
ttggtagagg atatgactcg cctcgctcgc gacttctttg ctttaccacc cgaagagaaa    300
cttagtttcg acatgtctgg tggtaagaaa ggcggcttca tcgtctctag tcaccttcag    360
ggagagactg tgcaagattg gagagagatc gtgacgtact tctcgtaccc ggtgagaaac    420
agagactact cacggtggcc agataagccg gaagggtggg tgaaagtgac ggaggagtac    480
agcgacaaac tgatgggttt agcttgtaag cttcttgagg ttttgtctga agctatgggg    540
ctcgagaaag aagcacttac caatgcttgc gtcgatatgg accaaaagat agttgttaat    600
tattacccta aatgccctca gcctgatctc accctcggac tcaagcgtca cactgatcct    660
ggaaccatca ctttgctgct ccaagaccag gtcggtggat tacaagccac acgcgacgat    720
ggcaaaacat ggataacggt tcagccaatt gagggagctt ttgtcgtgaa tctcggcgac    780
catggtcact atttgagcaa cgggaggttc aagaacgcgg atcatcaggc ggtggtgaat    840
tccaactcga gcaggctatc tatagccacg tttcagaatc tggcgcagga tgcaaccgtg    900
tatccgctta aagttagaga aggagagaag ccgatcttgg aggagccaat cacttttgca    960
gagatgtata agagaaagat gggaaaagat ctggagctgg ctcgcctcaa gaagcttgcg   1020
aaagaagaaa atgaccagaa gctggccaaa gaagaacatg acaagaacct ggccaaagaa   1080
gaaaatgatc agaagctggc taaagaagaa catgaccaga agctggccaa agaagaacat   1140
gacaagagcc ttgccaaaga agaaaattac caaaagctgg ccaaagatga acatagccac   1200
acggaagctg ttaagcgtct cggccaaatc ctcgcttag                          1239
```

<210> SEQ ID NO 124
<211> LENGTH: 412
<212> TYPE: PRT
<213> ORGANISM: Thlaspi arvense

<400> SEQUENCE: 124

```
Met Ala Pro Gly Thr Leu Thr Glu Leu Ala Gly Glu Ala Lys Leu Asn
1               5                   10                  15

Ser Lys Phe Val Arg Asp Glu Asp Glu Arg Pro Lys Val Ala Tyr Asn
            20                  25                  30

Lys Phe Ser Asp Asp Ile Pro Val Ile Ser Leu Ala Gly Leu Asp Asp
        35                  40                  45

Val Gly Gly Lys Arg Gly Glu Ile Cys Arg Lys Ile Val Glu Ala Cys
    50                  55                  60

Glu Asn Trp Gly Val Phe Gln Val Val Asp His Gly Val Asp Thr Asn
65                  70                  75                  80

Leu Val Glu Asp Met Thr Arg Leu Ala Arg Asp Phe Phe Ala Leu Pro
                85                  90                  95

Pro Glu Glu Lys Leu Ser Phe Asp Met Ser Gly Gly Lys Lys Gly Gly
            100                 105                 110

Phe Ile Val Ser Ser His Leu Gln Gly Glu Thr Val Gln Asp Trp Arg
        115                 120                 125

Glu Ile Val Thr Tyr Phe Ser Tyr Pro Val Arg Asn Arg Asp Tyr Ser
    130                 135                 140

Arg Trp Pro Asp Lys Pro Glu Gly Trp Val Lys Val Thr Glu Glu Tyr
145                 150                 155                 160
```

```
Ser Asp Lys Leu Met Gly Leu Ala Cys Lys Leu Leu Glu Val Leu Ser
                165                 170                 175

Glu Ala Met Gly Leu Glu Lys Glu Ala Leu Thr Asn Ala Cys Val Asp
            180                 185                 190

Met Asp Gln Lys Ile Val Val Asn Tyr Tyr Pro Lys Cys Pro Gln Pro
        195                 200                 205

Asp Leu Thr Leu Gly Leu Lys Arg His Thr Asp Pro Gly Thr Ile Thr
    210                 215                 220

Leu Leu Leu Gln Asp Gln Val Gly Gly Leu Gln Ala Thr Arg Asp Asp
225                 230                 235                 240

Gly Lys Thr Trp Ile Thr Val Gln Pro Ile Glu Gly Ala Phe Val Val
                245                 250                 255

Asn Leu Gly Asp His Gly His Tyr Leu Ser Asn Gly Arg Phe Lys Asn
            260                 265                 270

Ala Asp His Gln Ala Val Val Asn Ser Asn Ser Ser Arg Leu Ser Ile
        275                 280                 285

Ala Thr Phe Gln Asn Leu Ala Gln Asp Ala Thr Val Tyr Pro Leu Lys
    290                 295                 300

Val Arg Glu Gly Glu Lys Pro Ile Leu Glu Glu Pro Ile Thr Phe Ala
305                 310                 315                 320

Glu Met Tyr Lys Arg Lys Met Gly Lys Asp Leu Glu Leu Ala Arg Leu
                325                 330                 335

Lys Lys Leu Ala Lys Glu Glu Asn Asp Gln Lys Leu Ala Lys Glu Glu
            340                 345                 350

His Asp Lys Asn Leu Ala Lys Glu Glu Asn Asp Gln Lys Leu Ala Lys
        355                 360                 365

Glu Glu His Asp Gln Lys Leu Ala Lys Glu Glu His Asp Lys Ser Leu
    370                 375                 380

Ala Lys Glu Glu Asn Tyr Gln Lys Leu Ala Lys Asp Glu His Ser His
385                 390                 395                 400

Thr Glu Ala Val Lys Arg Leu Gly Gln Ile Leu Ala
                405                 410
```

<210> SEQ ID NO 125
<211> LENGTH: 1545
<212> TYPE: DNA
<213> ORGANISM: Thlaspi arvense

<400> SEQUENCE: 125

```
atggccactc tcttactcac aatcctcctc cccactttcc tcttcctcct cgtcctcctc      60

ctttctctcc gccgcaacca caaccgcagt agccgtctcc caccaggccc aaaaccatgg     120

cccatcctcg gaaacctccc tcacatgggt cctaaacccc atcgaaccct agccgccatg     180

gtaaccacct acggtccaat cctccacctc cgattagggt tctccaacgt cgtggttgct     240

gcgtctaaat ccgtggccga acagttcttc aaaatccatg atgccaattt cgctagccga     300

ccaccaaatt caagagccaa acacatggca tataactatc aagatcttgt ctttgcgcct     360

tacggacaac gatggagaat gttgaggaag attagttctg ttcatttatt ttcagctaaa     420

gctcttgaag attacaagca tgttcggcag gaagaggtag gaacgctcac gcgcgagcta     480

gtggatgcag gcacgaaacc cgtaaactta ggccagttgg tgaacatgtg tgtggtcaac     540

gcgcttggaa gagagatgat cggacggcgt ctgttcggcg ccggagctga tcacaaagcg     600

gaggagtttc gatcgatggt gacggaaatg atggctctcg ccggagtatt caacctcgga     660

gatttcgtgc cggctctgga ttggttagat ttacaaggcg ttgctggtaa aatgaaacgg     720
```

```
ctacacaaaa gattcgacac ttttctatcg tcgattttga aggagcacga gatgatgcac     780

ggtcaagatc aaaagcataa agatatgctc agcactttaa tctcgctcaa gggaactgat     840

tttgacggtg acggcggaag cctaacggat actgagatca aagccttgct cttgaacatg     900

tttacggctg gaactgacac gtcagcaagt acggtggact gggccatagc tgaactgata     960

cgacacccgg atgcaatgac cagagcccaa gaagaacttg attcagttgt aggccgcgat    1020

aggcccatta acgagtcaga cctttctcgg cttccttatc ttcaggcggt tatcaaagag    1080

aatttcaggc ttcatccgcc gacaccactc tcgttaccac acatcgcatc agagagctgt    1140

gagatcaacg gctaccatat cccgaaagga tcgactcttt taacaaacat atgggccata    1200

gcccgtgacc cggaacaatg gtccgacccg ttatcgtttc gacccgagag atttttacag    1260

ggtggagaaa aatccggcgt cgatgtgaaa ggaagcgatt tcgagcttat accgttcgga    1320

gccgggagga gaatctgcgc tgggctcagt ttagggctac ggatgattca gttactgacg    1380

gcgacgctgg ttcacggatt tgattgggaa ttggccggag gaattccgcc ggagaagctg    1440

aatatggagg agacttatgg gattactctg caaagagcag ttcctttggt ggtgcatcct    1500

aagccaaggt tggctcccag tgtttacgaa ctcgggtcgc gctaa                    1545


<210> SEQ ID NO 126
<211> LENGTH: 514
<212> TYPE: PRT
<213> ORGANISM: Thlaspi arvense

<400> SEQUENCE: 126

Met Ala Thr Leu Leu Leu Thr Ile Leu Leu Pro Thr Phe Leu Phe Leu
1               5                   10                  15

Leu Val Leu Leu Leu Ser Leu Arg Arg Asn His Asn Arg Ser Ser Arg
            20                  25                  30

Leu Pro Pro Gly Pro Lys Pro Trp Pro Ile Leu Gly Asn Leu Pro His
        35                  40                  45

Met Gly Pro Lys Pro His Arg Thr Leu Ala Ala Met Val Thr Thr Tyr
    50                  55                  60

Gly Pro Ile Leu His Leu Arg Leu Gly Phe Ser Asn Val Val Val Ala
65                  70                  75                  80

Ala Ser Lys Ser Val Ala Glu Gln Phe Phe Lys Ile His Asp Ala Asn
                85                  90                  95

Phe Ala Ser Arg Pro Pro Asn Ser Arg Ala Lys His Met Ala Tyr Asn
            100                 105                 110

Tyr Gln Asp Leu Val Phe Ala Pro Tyr Gly Gln Arg Trp Arg Met Leu
        115                 120                 125

Arg Lys Ile Ser Ser Val His Leu Phe Ser Ala Lys Ala Leu Glu Asp
    130                 135                 140

Tyr Lys His Val Arg Gln Glu Glu Val Gly Thr Leu Thr Arg Glu Leu
145                 150                 155                 160

Val Asp Ala Gly Thr Lys Pro Val Asn Leu Gly Gln Leu Val Asn Met
                165                 170                 175

Cys Val Val Asn Ala Leu Gly Arg Glu Met Ile Gly Arg Arg Leu Phe
            180                 185                 190

Gly Ala Gly Ala Asp His Lys Ala Glu Glu Phe Arg Ser Met Val Thr
        195                 200                 205

Glu Met Met Ala Leu Ala Gly Val Phe Asn Leu Gly Asp Phe Val Pro
    210                 215                 220
```

Ala Leu Asp Trp Leu Asp Leu Gln Gly Val Ala Gly Lys Met Lys Arg
225 230 235 240

Leu His Lys Arg Phe Asp Thr Phe Leu Ser Ser Ile Leu Lys Glu His
245 250 255

Glu Met Met His Gly Gln Asp Gln Lys His Lys Asp Met Leu Ser Thr
260 265 270

Leu Ile Ser Leu Lys Gly Thr Asp Phe Asp Gly Asp Gly Gly Ser Leu
275 280 285

Thr Asp Thr Glu Ile Lys Ala Leu Leu Leu Asn Met Phe Thr Ala Gly
290 295 300

Thr Asp Thr Ser Ala Ser Thr Val Asp Trp Ala Ile Ala Glu Leu Ile
305 310 315 320

Arg His Pro Asp Ala Met Thr Arg Ala Gln Glu Glu Leu Asp Ser Val
325 330 335

Val Gly Arg Asp Arg Pro Ile Asn Glu Ser Asp Leu Ser Arg Leu Pro
340 345 350

Tyr Leu Gln Ala Val Ile Lys Glu Asn Phe Arg Leu His Pro Pro Thr
355 360 365

Pro Leu Ser Leu Pro His Ile Ala Ser Glu Ser Cys Glu Ile Asn Gly
370 375 380

Tyr His Ile Pro Lys Gly Ser Thr Leu Leu Thr Asn Ile Trp Ala Ile
385 390 395 400

Ala Arg Asp Pro Glu Gln Trp Ser Asp Pro Leu Ser Phe Arg Pro Glu
405 410 415

Arg Phe Leu Gln Gly Gly Glu Lys Ser Gly Val Asp Val Lys Gly Ser
420 425 430

Asp Phe Glu Leu Ile Pro Phe Gly Ala Gly Arg Arg Ile Cys Ala Gly
435 440 445

Leu Ser Leu Gly Leu Arg Met Ile Gln Leu Leu Thr Ala Thr Leu Val
450 455 460

His Gly Phe Asp Trp Glu Leu Ala Gly Gly Ile Pro Pro Glu Lys Leu
465 470 475 480

Asn Met Glu Glu Thr Tyr Gly Ile Thr Leu Gln Arg Ala Val Pro Leu
485 490 495

Val Val His Pro Lys Pro Arg Leu Ala Pro Ser Val Tyr Glu Leu Gly
500 505 510

Ser Arg

<210> SEQ ID NO 127
<211> LENGTH: 1581
<212> TYPE: DNA
<213> ORGANISM: Thlaspi arvense

<400> SEQUENCE: 127
atggatgaat caagtatttt tacggcaaag aaagtgatcg gagctgagaa aagagagctt 60
caagggctgc ttaaggcggc ggtgcaatct gtggagtgga cttatagtct cttctggcaa 120
ctttgtcctc aacaaagggt tttgctgtgg gagaatggat actacaacgg tgcaataaag 180
acgaggaaga caactcagcc ggcggaagtg acggcggaag aggctgcgtt agagaggagt 240
cagcagctaa gggaacttta cgaggcccctt ttggccggag agtcctcatc ggaagctagg 300
gcatgcacgg cattatcgcc ggaggatctg acggagactg aatggtttta tctaatgtgt 360
gtctctttct ctttccctcc tccttccggg atgccaggaa aggcgtatgc gaggaggaaa 420
cacgtatggc tatgtggtgc aaatgaggtt gacagtaaaa tcttttctag ggctattctc 480

```
gcaaagagtg ccaaaatcca gcagacagtg gtttgcattc ccatgcttga tggcgttgtg    540

gaactaggca caacgaacaa ggtaaaagaa gatatagcgt ttgttgagct cataaagagt    600

tttttccata accaccccaa gtcaaaccca aaagctgctc tttctgaaca ctccatcaac    660

gaagagcacg aagaagacga agaacaagaa gaagaagaag aagaagaagt agaagaagaa    720

atgacaatgt cagaggagat aaggcttggc tctcctgatg atgatgacgt ctccaatcaa    780

aacctactct ctgatttcca tgtagaatca acccacactt tagacacaca catggacatg    840

atgaatctaa tggaggaggg tggaaactat tctcagacag tatcaacact tcttatgtca    900

caacccacga gtcttttttc agattcagtt tccacatctt cttacatcca atcatcattt    960

gccacatgga aggctgataa ttttaaagag catcagcgag tggaaactaa atcgacgtcg   1020

tcgtcgcaat ggatgctcaa acacataatc ttgagagttc ctttactcca cgaccacact   1080

aaagaaaaga ggctgcctcg agaagagctt aatcacgtgg tggcagagcg ccgcaggaga   1140

gagaagctga atgagagatt cataacactg agatcattgg ttccctttgt gaccaagatg   1200

gataaagtct caattcttgg agacaccatc aactacgtaa accatcttcg aaatagggtc   1260

caagagctgg agactaatca tcacgaacaa aaacataagc ggatgcgtag ctgtaaggga   1320

aaaacgtggg aagaggtcgt tgaggtttcc atcatagaga gtgatgtttt gttagagatg   1380

agatgcgagt accgagatgg tctattgctc gacatccttc aggttcttaa ggaacatggt   1440

atagagacta ctgcagttca taccgcggtg aacgagcgtg atttcgaggc cgagataagg   1500

gctatggtga gagggaagaa accaagcatt gctgaggtca aaagagccat ccatcaaact   1560

atatccaata ttaaactata g                                              1581
```

```
<210> SEQ ID NO 128
<211> LENGTH: 526
<212> TYPE: PRT
<213> ORGANISM: Thlaspi arvense

<400> SEQUENCE: 128

Met Asp Glu Ser Ser Ile Phe Thr Ala Lys Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Lys Thr Arg Lys Thr
    50                  55                  60

Thr Gln Pro Ala Glu Val Thr Ala Glu Glu Ala Ala Leu Glu Arg Ser
65                  70                  75                  80

Gln Gln Leu Arg Glu Leu Tyr Glu Ala Leu Leu Ala Gly Glu Ser Ser
                85                  90                  95

Ser Glu Ala Arg Ala Cys Thr Ala Leu Ser Pro Glu Asp Leu Thr Glu
            100                 105                 110

Thr Glu Trp Phe Tyr Leu Met Cys Val Ser Phe Ser Phe Pro Pro Pro
        115                 120                 125

Ser Gly Met Pro Gly Lys Ala Tyr Ala Arg Arg Lys His Val Trp Leu
    130                 135                 140

Cys Gly Ala Asn Glu Val Asp Ser Lys Ile Phe Ser Arg Ala Ile Leu
145                 150                 155                 160

Ala Lys Ser Ala Lys Ile Gln Gln Thr Val Val Cys Ile Pro Met Leu
                165                 170                 175
```

Asp Gly Val Val Glu Leu Gly Thr Thr Asn Lys Val Lys Glu Asp Ile
180 185 190

Ala Phe Val Glu Leu Ile Lys Ser Phe Phe His Asn His Pro Lys Ser
195 200 205

Asn Pro Lys Ala Ala Leu Ser Glu His Ser Ile Asn Glu Glu His Glu
210 215 220

Glu Asp Glu Glu Gln Glu Glu Glu Glu Glu Glu Glu Val Glu Glu Glu
225 230 235 240

Met Thr Met Ser Glu Glu Ile Arg Leu Gly Ser Pro Asp Asp Asp Asp
245 250 255

Val Ser Asn Gln Asn Leu Leu Ser Asp Phe His Val Glu Ser Thr His
260 265 270

Thr Leu Asp Thr His Met Asp Met Met Asn Leu Met Glu Glu Gly Gly
275 280 285

Asn Tyr Ser Gln Thr Val Ser Thr Leu Leu Met Ser Gln Pro Thr Ser
290 295 300

Leu Phe Ser Asp Ser Val Ser Thr Ser Ser Tyr Ile Gln Ser Ser Phe
305 310 315 320

Ala Thr Trp Lys Ala Asp Asn Phe Lys Glu His Gln Arg Val Glu Thr
325 330 335

Lys Ser Thr Ser Ser Ser Gln Trp Met Leu Lys His Ile Ile Leu Arg
340 345 350

Val Pro Leu Leu His Asp His Thr Lys Glu Lys Arg Leu Pro Arg Glu
355 360 365

Glu Leu Asn His Val Val Ala Glu Arg Arg Arg Arg Glu Lys Leu Asn
370 375 380

Glu Arg Phe Ile Thr Leu Arg Ser Leu Val Pro Phe Val Thr Lys Met
385 390 395 400

Asp Lys Val Ser Ile Leu Gly Asp Thr Ile Asn Tyr Val Asn His Leu
405 410 415

Arg Asn Arg Val Gln Glu Leu Glu Thr Asn His His Glu Gln Lys His
420 425 430

Lys Arg Met Arg Ser Cys Lys Gly Lys Thr Trp Glu Glu Val Val Glu
435 440 445

Val Ser Ile Ile Glu Ser Asp Val Leu Leu Glu Met Arg Cys Glu Tyr
450 455 460

Arg Asp Gly Leu Leu Leu Asp Ile Leu Gln Val Leu Lys Glu His Gly
465 470 475 480

Ile Glu Thr Thr Ala Val His Thr Ala Val Asn Glu Arg Asp Phe Glu
485 490 495

Ala Glu Ile Arg Ala Met Val Arg Gly Lys Lys Pro Ser Ile Ala Glu
500 505 510

Val Lys Arg Ala Ile His Gln Thr Ile Ser Asn Ile Lys Leu
515 520 525

<210> SEQ ID NO 129
<211> LENGTH: 1581
<212> TYPE: DNA
<213> ORGANISM: Thlaspi arvense

<400> SEQUENCE: 129
atggatgaat caagtatttt tacggcagag aaagtgatcg gagctgagaa aagagagctt 60
caagggctgc ttaaggcggc ggtgcaatct gtggagtgga cttatagtct cttctggcaa 120

```
ctttgtcctc aacaaagggt tttgctgtgg gagaatggat actacaacgg tgcaataaag    180

acgaggaaga caactcagcc ggcggaagtg acggcggaag aggctgcgtt agagaggagt    240

cagcagctaa gggaacttta cgaggccctt ttggccggag agtcctcatc ggaagctagg    300

gcatgcacgg cattatcgcc ggaggatctg acggagactg aatggtttta tctaatgtgt    360

gtctctttct ctttccctcc tccttccggg atgccaggaa aggcgtatgc gaggaggaaa    420

cacgtatggc tatgtggtgc aaatgaggtt gacagtaaaa tcttttctag ggctattctc    480

gcaaagagtg ccaaaatcca gcagacagtg gtttgcattc ccatgcttga tggcgttgtg    540

gaactaggca caacgaacaa ggtaaaagaa gatatagcgt ttgttgagct cataaagagt    600

tttttccata accaccccaa gtcaaaccca aaagctgctc tttctgaaca ctccatcaac    660

gaagagcacg aagaagacga agaacaagaa gaagaagaag aagaagaagt agaagaagaa    720

atgacaatgt cagaggagat aaggcttggc tctcctgatg atgatgacgt ctccaatcaa    780

aacctactct ctgatttcca tgtagaatca acccacactt tagacacaca catggacatg    840

atgaatctaa tggaggaggg tggaaactat tctcagacag tatcaacact tcttatgtca    900

caacccacga gtctttttc agattcagtt tccacatctt cttacatcta atcatcattt    960

gccacatgga aggctgataa ttttaaagag catcagcgag tggaaactaa atcgacgtcg   1020

tcgtcgcaat ggatgctcaa acacataatc ttgagagttc ctttactcca cgaccacact   1080

aaagaaaaga ggctgcctcg agaagagctt aatcacgtgg tggcagagcg ccgcaggaga   1140

gagaagctga atgagagatt cataacactg agatcattgg ttccctttgt gaccaagatg   1200

gataaagtct caattcttgg agacaccatc aactacgtaa accatcttcg aaatagggtc   1260

caagagctgg agactaatca tcacgaacaa aaacataagc ggatgcgtag ctgtaaggga   1320

aaaacgtggg aagaggtcgt tgaggtttcc atcatagaga gtgatgtttt gttagagatg   1380

agatgcgagt accgagatgg tctattgctc gacatccttc aggttcttaa ggaacatggt   1440

atagagacta ctgcagttca taccgcggtg aacgagcgtg atttcgaggc cgagataagg   1500

gctatggtga gagggaagaa accaagcatt gctgaggtca aaagagccat ccatcaaact   1560

atatccaata ttaaactata g                                              1581
```

```
<210> SEQ ID NO 130
<211> LENGTH: 316
<212> TYPE: PRT
<213> ORGANISM: Thlaspi arvense

<400> SEQUENCE: 130

Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Lys Thr Arg Lys Thr
    50                  55                  60

Thr Gln Pro Ala Glu Val Thr Ala Glu Glu Ala Ala Leu Glu Arg Ser
65                  70                  75                  80

Gln Gln Leu Arg Glu Leu Tyr Glu Ala Leu Leu Ala Gly Glu Ser Ser
                85                  90                  95

Ser Glu Ala Arg Ala Cys Thr Ala Leu Ser Pro Glu Asp Leu Thr Glu
            100                 105                 110
```

```
Thr Glu Trp Phe Tyr Leu Met Cys Val Ser Phe Ser Phe Pro Pro Pro
        115                 120                 125

Ser Gly Met Pro Gly Lys Ala Tyr Ala Arg Arg Lys His Val Trp Leu
    130                 135                 140

Cys Gly Ala Asn Glu Val Asp Ser Lys Ile Phe Ser Arg Ala Ile Leu
145                 150                 155                 160

Ala Lys Ser Ala Lys Ile Gln Gln Thr Val Val Cys Ile Pro Met Leu
                165                 170                 175

Asp Gly Val Val Glu Leu Gly Thr Thr Asn Lys Val Lys Glu Asp Ile
            180                 185                 190

Ala Phe Val Glu Leu Ile Lys Ser Phe Phe His Asn His Pro Lys Ser
        195                 200                 205

Asn Pro Lys Ala Ala Leu Ser Glu His Ser Ile Asn Glu Glu His Glu
    210                 215                 220

Glu Asp Glu Glu Gln Glu Glu Glu Glu Glu Glu Glu Val Glu Glu Glu
225                 230                 235                 240

Met Thr Met Ser Glu Glu Ile Arg Leu Gly Ser Pro Asp Asp Asp Asp
                245                 250                 255

Val Ser Asn Gln Asn Leu Leu Ser Asp Phe His Val Glu Ser Thr His
            260                 265                 270

Thr Leu Asp Thr His Met Asp Met Met Asn Leu Met Glu Glu Gly Gly
        275                 280                 285

Asn Tyr Ser Gln Thr Val Ser Thr Leu Leu Met Ser Gln Pro Thr Ser
    290                 295                 300

Leu Phe Ser Asp Ser Val Ser Thr Ser Ser Tyr Ile
305                 310                 315
```

<210> SEQ ID NO 131
<211> LENGTH: 1581
<212> TYPE: DNA
<213> ORGANISM: Thlaspi arvense

<400> SEQUENCE: 131

```
atggatgaat caagtatttt tacggcagag aaagtgatcg gagctgagaa aagagagctt      60

caagggctgc ttaaggcggc ggtgcaatct gtggagtgga cttatagtct cttctggcaa     120

ctttgtcctc aacaaagggt tttgctgtgg gagaatggat actacaacgg tgcaataaag     180

acgaggaaga caactcagcc ggcggaagtg acggcggaag aggctgcgtt agagaggagt     240

cagcagctaa gggaacttta cgaggccctt ttggccggag agtcctcatc ggaagctagg     300

gcatgcacgg cattatcgcc ggaggatctg acggagactg aatggtttta tctaatgtgt     360

gtctctttct ctttccctcc tccttccggg atgccaggaa aggcgtatgc gaggaggaaa     420

cacgtatggc tatgtggtgc aaatgaggtt gacagtaaaa tcttttctag ggctattctc     480

gcaaagagtg ccaaaatcca gcagacagtg gtttgcattc ccatgcttga tggcgttgtg     540

gaactaggca caacgaacaa ggtaaaagaa gatatagcgt ttgttgagct cataaagagt     600

tttttccata accaccccaa gtcaaaccca aaagctgctc tttctgaaca ctccatcaac     660

gaagagcacg aagaagacga agaacaagaa gaagaagaag aagaagaagt agaagaagaa     720

atgacaatgt cagaggagat aaggcttggc tctcctgatg atgatgacgt ctccaatcaa     780

aacctactct ctgatttcca tgtagaatca acccacactt tagacacaca catggacatg     840

atgaatctaa tggaggaggg tggaaactat tctcagacag tatcaacact tcttatgtca     900

caacccacga gtctttttc agattcagtt tccacatctt cttacatcca atcatcattt     960
```

```
gccacatgaa aggctgataa ttttaaagag catcagcgag tggaaactaa atcgacgtcg   1020

tcgtcgcaat ggatgctcaa acacataatc ttgagagttc ctttactcca cgaccacact   1080

aaagaaaaga ggctgcctcg agaagagctt aatcacgtgg tggcagagcg ccgcaggaga   1140

gagaagctga atgagagatt cataacactg agatcattgg ttccctttgt gaccaagatg   1200

gataaagtct caattcttgg agacaccatc aactacgtaa accatcttcg aaatagggtc   1260

caagagctgg agactaatca tcacgaacaa aaacataagc ggatgcgtag ctgtaaggga   1320

aaaacgtggg aagaggtcgt tgaggtttcc atcatagaga gtgatgtttt gttagagatg   1380

agatgcgagt accgagatgg tctattgctc gacatccttc aggttcttaa ggaacatggt   1440

atagagacta ctgcagttca taccgcggtg aacgagcgtg atttcgaggc cgagataagg   1500

gctatggtga gagggaagaa accaagcatt gctgaggtca aaagagccat ccatcaaact   1560

atatccaata ttaaactata g                                             1581
```

<210> SEQ ID NO 132
<211> LENGTH: 322
<212> TYPE: PRT
<213> ORGANISM: Thlaspi arvense

<400> SEQUENCE: 132

```
Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Lys Thr Arg Lys Thr
    50                  55                  60

Thr Gln Pro Ala Glu Val Thr Ala Glu Glu Ala Ala Leu Glu Arg Ser
65                  70                  75                  80

Gln Gln Leu Arg Glu Leu Tyr Glu Ala Leu Leu Ala Gly Glu Ser Ser
                85                  90                  95

Ser Glu Ala Arg Ala Cys Thr Ala Leu Ser Pro Glu Asp Leu Thr Glu
            100                 105                 110

Thr Glu Trp Phe Tyr Leu Met Cys Val Ser Phe Ser Phe Pro Pro Pro
        115                 120                 125

Ser Gly Met Pro Gly Lys Ala Tyr Ala Arg Arg Lys His Val Trp Leu
    130                 135                 140

Cys Gly Ala Asn Glu Val Asp Ser Lys Ile Phe Ser Arg Ala Ile Leu
145                 150                 155                 160

Ala Lys Ser Ala Lys Ile Gln Gln Thr Val Val Cys Ile Pro Met Leu
                165                 170                 175

Asp Gly Val Val Glu Leu Gly Thr Thr Asn Lys Val Lys Glu Asp Ile
            180                 185                 190

Ala Phe Val Glu Leu Ile Lys Ser Phe Phe His Asn His Pro Lys Ser
        195                 200                 205

Asn Pro Lys Ala Ala Leu Ser Glu His Ser Ile Asn Glu Glu His Glu
    210                 215                 220

Glu Asp Glu Glu Gln Glu Glu Glu Glu Glu Glu Glu Val Glu Glu Glu
225                 230                 235                 240

Met Thr Met Ser Glu Glu Ile Arg Leu Gly Ser Pro Asp Asp Asp Asp
                245                 250                 255

Val Ser Asn Gln Asn Leu Leu Ser Asp Phe His Val Glu Ser Thr His
```

260 265 270

Thr Leu Asp Thr His Met Asp Met Met Asn Leu Met Glu Glu Gly Gly
275 280 285

Asn Tyr Ser Gln Thr Val Ser Thr Leu Leu Met Ser Gln Pro Thr Ser
290 295 300

Leu Phe Ser Asp Ser Val Ser Thr Ser Ser Tyr Ile Gln Ser Ser Phe
305 310 315 320

Ala Thr

<210> SEQ ID NO 133
<211> LENGTH: 1582
<212> TYPE: DNA
<213> ORGANISM: Thlaspi arvense

<400> SEQUENCE: 133
atggatgaat caagtatttt tacggcagag aaagtgatcg gagctgagaa aagagagctt 60
caagggctgc ttaaggcggc ggtgcaatct gtggagtgga cttatagtct cttctggcaa 120
ctttgtcctc aacaaagggt tttgctgtgg gagaatggat actacaacgg tgcaataaag 180
aacgaggaag acaactcagc cggcggaagt gacggcggaa gaggctgcgt tagagaggag 240
tcagcagcta agggaacttt acgaggccct tttggccgga gagtcctcat cggaagctag 300
ggcatgcacg gcattatcgc cggaggatct gacggagact gaatggtttt atctaatgtg 360
tgtctctttc tctttccctc ctccttccgg gatgccagga aaggcgtatg cgaggaggaa 420
acacgtatgg ctatgtggtg caaatgaggt tgacagtaaa atcttttcta gggctattct 480
cgcaaagagt gccaaaatcc agcagacagt ggtttgcatt cccatgcttg atggcgttgt 540
ggaactaggc acaacgaaca aggtaaaaga agatatagcg tttgttgagc tcataaagag 600
ttttttccat aaccacccca agtcaaaccc aaaagctgct ctttctgaac actccatcaa 660
cgaagagcac gaagaagacg aagaacaaga agaagaagaa gaagaagaag tagaagaaga 720
aatgacaatg tcagaggaga taaggcttgg ctctcctgat gatgatgacg tctccaatca 780
aaacctactc tctgatttcc atgtagaatc aacccacact ttagacacac acatggacat 840
gatgaatcta atggaggagg gtggaaacta ttctcagaca gtatcaacac ttcttatgtc 900
acaacccacg agtctttttt cagattcagt ttccacatct tcttacatcc aatcatcatt 960
tgccacatgg aaggctgata attttaaaga gcatcagcga gtggaaacta aatcgacgtc 1020
gtcgtcgcaa tggatgctca aacacataat cttgagagtt cctttactcc acgaccacac 1080
taaagaaaag aggctgcctc gagaagagct taatcacgtg gtggcagagc gccgcaggag 1140
agagaagctg aatgagagat tcataacact gagatcattg gttccctttg tgaccaagat 1200
ggataaagtc tcaattcttg gagacaccat caactacgta aaccatcttc gaaatagggt 1260
ccaagagctg gagactaatc atcacgaaca aaaacataag cggatgcgta gctgtaaggg 1320
aaaaacgtgg gaagaggtcg ttgaggtttc catcatagag agtgatgttt tgttagagat 1380
gagatgcgag taccgagatg gtctattgct cgacatcctt caggttctta aggaacatgg 1440
tatagagact actgcagttc ataccgcggt gaacgagcgt gatttcgagg ccgagataag 1500
ggctatggtg agagggaaga aaccaagcat tgctgaggtc aaaagagcca tccatcaaac 1560
tatatccaat attaaactat ag 1582

<210> SEQ ID NO 134
<211> LENGTH: 99
<212> TYPE: PRT

<213> ORGANISM: Thlaspi arvense

<400> SEQUENCE: 134

Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Lys Asn Glu Glu Asp
    50                  55                  60

Asn Ser Ala Gly Gly Ser Asp Gly Gly Arg Gly Cys Val Arg Glu Glu
65                  70                  75                  80

Ser Ala Ala Lys Gly Thr Leu Arg Gly Pro Phe Gly Arg Arg Val Leu
                85                  90                  95

Ile Gly Ser

<210> SEQ ID NO 135
<211> LENGTH: 1579
<212> TYPE: DNA
<213> ORGANISM: Thlaspi arvense

<400> SEQUENCE: 135
atggatgaat caagtatttt tacggcagag aaagtgatcg gagctgagaa aagagagctt 60
caagggctgc ttaaggcggc ggtgcaatct gtggagtgga cttatagtct cttctggcaa 120
ctttgtcctc aacaaagggt tttgctgtgg gagaatggat actacaacgg tgcaataaac 180
gaggaagaca actcagccgg cggaagtgac ggcggaagag gctgcgttag agaggagtca 240
gcagctaagg gaactttacg aggccctttt ggccggagag tcctcatcgg aagctagggc 300
atgcacggca ttatcgccgg aggatctgac ggagactgaa tggttttatc taatgtgtgt 360
ctctttctct ttccctcctc cttccgggat gccaggaaag gcgtatgcga ggaggaaaca 420
cgtatggcta tgtggtgcaa atgaggttga cagtaaaatc ttttctaggg ctattctcgc 480
aaagagtgcc aaaatccagc agacagtggt ttgcattccc atgcttgatg gcgttgtgga 540
actaggcaca acgaacaagg taaaagaaga tatagcgttt gttgagctca taaagagttt 600
tttccataac caccccaagt caaacccaaa agctgctctt tctgaacact ccatcaacga 660
agagcacgaa gaagacgaag aacaagaaga agaagaagaa gaagaagtag aagaagaaat 720
gacaatgtca gaggagataa ggcttggctc tcctgatgat gatgacgtct ccaatcaaaa 780
cctactctct gatttccatg tagaatcaac ccacacttta gacacacaca tggacatgat 840
gaatctaatg gaggagggtg gaaactattc tcagacagta tcaacacttc ttatgtcaca 900
acccacgagt ctttttttcag attcagtttc cacatcttct tacatccaat catcatttgc 960
cacatggaag gctgataatt ttaaagagca tcagcgagtg gaaactaaat cgacgtcgtc 1020
gtcgcaatgg atgctcaaac acataatctt gagagttcct ttactccacg accacactaa 1080
agaaaagagg ctgcctcgag aagagcttaa tcacgtggtg gcagagcgcc gcaggagaga 1140
gaagctgaat gagagattca taacactgag atcattggtt ccctttgtga ccaagatgga 1200
taaagtctca attcttggag acaccatcaa ctacgtaaac catcttcgaa atagggtcca 1260
agagctggag actaatcatc acgaacaaaa acataagcgg atgcgtagct gtaagggaaa 1320
aacgtgggaa gaggtcgttg aggtttccat catagagagt gatgttttgt tagagatgag 1380
atgcgagtac cgagatggtc tattgctcga catccttcag gttcttaagg aacatggtat 1440
agagactact gcagttcata ccgcggtgaa cgagcgtgat ttcgaggccg agataagggc 1500
tatggtgaga gggaagaaac caagcattgc tgaggtcaaa agagccatcc atcaaactat 1560
atccaatatt aaactatag 1579

<210> SEQ ID NO 136
<211> LENGTH: 98
<212> TYPE: PRT
<213> ORGANISM: Thlaspi arvense

<400> SEQUENCE: 136

Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Asn Glu Glu Asp Asn
    50                  55                  60

Ser Ala Gly Gly Ser Asp Gly Gly Arg Gly Cys Val Arg Glu Glu Ser
65                  70                  75                  80

Ala Ala Lys Gly Thr Leu Arg Gly Pro Phe Gly Arg Arg Val Leu Ile
                85                  90                  95

Gly Ser

<210> SEQ ID NO 137
<211> LENGTH: 1582
<212> TYPE: DNA
<213> ORGANISM: Thlaspi arvense

<400> SEQUENCE: 137
atggatgaat caagtatttt tacggcagag aaagtgatcg gagctgagaa aagagagctt 60
caagggctgc ttaaggcggc ggtgcaatct gtggagtgga cttatagtct cttctggcaa 120
ctttgtcctc aacaaagggt tttgctgtgg gagaatggat actacaacgg tgcaataaag 180
gacgaggaag acaactcagc cggcggaagt gacggcggaa gaggctgcgt tagagaggag 240
tcagcagcta agggaacttt acgaggccct tttggccgga gagtcctcat cggaagctag 300
ggcatgcacg gcattatcgc cggaggatct gacggagact gaatggtttt atctaatgtg 360
tgtctctttc tctttccctc ctccttccgg gatgccagga aaggcgtatg cgaggaggaa 420
acacgtatgg ctatgtggtg caaatgaggt tgacagtaaa atcttttcta gggctattct 480
cgcaaagagt gccaaaatcc agcagacagt ggtttgcatt cccatgcttg atggcgttgt 540
ggaactaggc acaacgaaca aggtaaaaga agatatagcg tttgttgagc tcataaagag 600
ttttttccat aaccacccca agtcaaaccc aaaagctgct ctttctgaac actccatcaa 660
cgaagagcac gaagaagacg aagaacaaga agaagaagaa gaagaagaag tagaagaaga 720
aatgacaatg tcagaggaga taaggcttgg ctctcctgat gatgatgacg tctccaatca 780
aaacctactc tctgatttcc atgtagaatc aacccacact ttagacacac acatggacat 840
gatgaatcta atggaggagg gtggaaacta ttctcagaca gtatcaacac ttcttatgtc 900
acaacccacg agtctttttt cagattcagt ttccacatct tcttacatcc aatcatcatt 960
tgccacatgg aaggctgata attttaaaga gcatcagcga gtggaaacta aatcgacgtc 1020
gtcgtcgcaa tggatgctca aacacataat cttgagagtt cctttactcc acgaccacac 1080

```
taaagaaaag aggctgcctc gagaagagct taatcacgtg gtggcagagc gccgcaggag   1140

agagaagctg aatgagagat tcataacact gagatcattg gttccctttg tgaccaagat   1200

ggataaagtc tcaattcttg gagacaccat caactacgta aaccatcttc gaaatagggt   1260

ccaagagctg gagactaatc atcacgaaca aaaacataag cggatgcgta gctgtaaggg   1320

aaaaacgtgg gaagaggtcg ttgaggtttc catcatagag agtgatgttt tgttagagat   1380

gagatgcgag taccgagatg gtctattgct cgacatcctt caggttctta aggaacatgg   1440

tatagagact actgcagttc ataccgcggt gaacgagcgt gatttcgagg ccgagataag   1500

ggctatggtg agagggaaga aaccaagcat tgctgaggtc aaaagagcca tccatcaaac   1560

tatatccaat attaaactat ag                                            1582
```

<210> SEQ ID NO 138
<211> LENGTH: 99
<212> TYPE: PRT
<213> ORGANISM: Thlaspi arvense

<400> SEQUENCE: 138

```
Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Lys Asn Glu Glu Asp
    50                  55                  60

Asn Ser Ala Gly Gly Ser Asp Gly Gly Arg Gly Cys Val Arg Glu Glu
65                  70                  75                  80

Ser Ala Ala Lys Gly Thr Leu Arg Gly Pro Phe Gly Arg Arg Val Leu
                85                  90                  95

Ile Gly Ser
```

<210> SEQ ID NO 139
<211> LENGTH: 1707
<212> TYPE: DNA
<213> ORGANISM: Thlaspi arvense

<400> SEQUENCE: 139

```
atgtcacaat attccttctt ctatttcttc ctaatctctc ttttcctcta cgaaaattgc     60

attgcgtatc gctacacatt cacggttatt gaagctccat atagcaaact gtgtagcacg    120

aagaagattt tgaccgttaa tggtcagttt cctggaccag tgttaagggc ttacaaaggt    180

gacaccattt acgttaacgt tcgtaaccaa gctagtgaaa atatcacatt gcattggcat    240

ggtgtagagc agccgagaaa cccgtggtca gatggacccg aatacatcac acaatgcccg    300

attcaacccg ggtcagattt tacgtacaaa attttacttt ccatcgaaga cgcgactgtt    360

tgatggcatg cgcatagctc gtggacacgt gccaccgtac acggtctgat tttcgtgtat    420

cctcggcctc ctgataccct gccttttcca gaaccggact acgaagtccc cttagttttt    480

ggagagtggt ggaagaggga tgtgagagaa gtagtggagg atttcatgag gaacggaggt    540

gaacctaatg tgtccgatgc tttgactatc aatgggcatc ctggtttctt gtatccttgc    600

tctcaatcag atacattcaa gctcgtggta gagaagggca aaacctaccg cattcggatg    660

gtaaacgccg cgatgaacct aattctcttc ttcgccatcg cgaaccacaa actcaccgtg    720

gtcgccgccg atggccacta caccaaacct ctaaccgcta gttatatcac catatctcct    780
```

```
ggccaaacgc tagacctgtt actatacgcc gaccaaagtc cagagagcac ttataacatg    840

gcggccagag cttaccatag caaccccaac gttgggttca acaactctac caccgtcggg    900

atcttacgtt actactcttc aaacgacgcc ggaacgtctt catcagaacg ttacccgtac    960

cttcctggct acaatgacac ctcagcagct ttcgatttct tcacaaaaat caaaggctta   1020

tactccagag tagctcccgc caaagtttca cgtaggataa tcacgacggt ttcgataaat   1080

ctcctcaagt gtcccaacga ctcgtgtgca ggcccaaacg ggtcgaggtt agcggcgagt   1140

atgaacaaca tatcgttcgt cacaccgagc cacgtggaca tactaagagc ttattacctt   1200

cacattaacg gcgtttacgg aacgcggttt ccggagttcc caccgcggat attcaatttc   1260

acagcggacg accaaccgct gtttttgcag actccgaggc tggcgacgga ggtaaagaag   1320

tttcagtacg gggagacggt tgagattgtt atacaaggga cgagtttggt aggtggtgga   1380

atcgatcatc ctatgcatct ccatggtttt agcttctacg tggttggttt agggtttggg   1440

aattttaacg cacgtaaaga tccctccaac tataatctag acgatcctcc ttacagaaac   1500

acggcgactg tgcccaggaa cggttggatc gctatcagat tcgtagctga caatccaggg   1560

gtttggttca tgcactgtca ctttgataga catcaaacgt ggggtatgaa tgttgtcttc   1620

attgttaaga atggaataaa accaaatcag aagattctac ctccaccgcc tggcttacca   1680

ccttgtgacc aatttgagaa tctataa                                       1707
```

<210> SEQ ID NO 140
<211> LENGTH: 120
<212> TYPE: PRT
<213> ORGANISM: Thlaspi arvense

<400> SEQUENCE: 140

```
Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly Pro Val Leu Arg Ala Tyr Lys Gly Asp Thr Ile Tyr
    50                  55                  60

Val Asn Val Arg Asn Gln Ala Ser Glu Asn Ile Thr Leu His Trp His
65                  70                  75                  80

Gly Val Glu Gln Pro Arg Asn Pro Trp Ser Asp Gly Pro Glu Tyr Ile
                85                  90                  95

Thr Gln Cys Pro Ile Gln Pro Gly Ser Asp Phe Thr Tyr Lys Ile Leu
            100                 105                 110

Leu Ser Ile Glu Asp Ala Thr Val
        115                 120
```

<210> SEQ ID NO 141
<211> LENGTH: 1707
<212> TYPE: DNA
<213> ORGANISM: Thlaspi arvense

<400> SEQUENCE: 141

```
atgtcacaat attccttctt ctatttcttc ctaatctctc ttttcctcta cgaaaattgc     60

attgcgtatc gctacacatt cacggttatt gaagctccat atagcaaact gtgtagcacg    120

aagaagattt tgaccgttaa tggtcagttt cctggaccag tgttaagggc ttacaaaggt    180
```

```
gacaccattt acgttaacgt tcgtaaccaa gctagtgaaa atatcacatt gcattggcat    240

ggtgtagagc agccgagaaa cccgtggtca gatggacccg aatacatcac acaatgcccg    300

attcaacccg ggtcagattt tacgtacaaa attttacttt ccatcgaaga cgcgactgtt    360

tggtggcatg cgcatagctc gtggacacgt gccaccgtac acggtctgat tttcgtgtat    420

cctcggcctc ctgataccct gccttttcca gaaccggact acgaagtccc cttagttttt    480

ggagagtggt ggaagaggga tgtgagagaa gtagtggagg atttcatgag gaacggaggt    540

gaacctaatg tgtccgatgc tttgactatc aatgggcatc ctggtttctt gtatccttgc    600

tctcaatcag atacattcaa gctcgtggta gagaagggca aaacctaccg catttggatg    660

gtaaacgccg cgatgaacct aattctcttc ttcgccatcg cgaaccacaa actcaccgtg    720

gtcgccgccg atggccacta caccaaacct ctaaccgcta gttatatcac catatctcct    780

ggccaaacgc tagacctgtt actatacgcc gaccaaagtc cagagagcac ttataacatg    840

gcggccagag cttaccatag caaccccaac gttgggttca acaactctac caccgtcggg    900

atcttacgtt actactcttc aaacgacgcc ggaacgtctt catcagaacg ttacccgtac    960

cttcctggct acaatgacac ctcagcagct ttcgatttct tcacaaaaat caaaggctta   1020

tactccagag tagctcccgc caaagtttca cgtaggataa tcacgacggt ttcgataaat   1080

ctcctcaagt gtcccaacga ctcgtgtgca ggcccaaacg ggtcgaggtt agcggcgagt   1140

atgaacaaca tatcgttcgt cacaccgagc cacgtggaca tactaagagc ttattacctt   1200

cacattaacg gcgtttacgg aacgcggttt ccggagttcc caccgcggat attcaatttc   1260

acagcggacg accaaccgct gtttttgcag actccgaggc tggcgacgga ggtaaagaag   1320

tttcagtacg gggagacggt tgagattgtt atacaaggga cgagtttggt aggtggtgga   1380

atcgatcatc ctatgcatct ccatggtttt agcttctacg tggttggttt agggtttggg   1440

aattttaacg cacgtaaaga tccctccaac tataatctag acgatcctcc ttacagaaac   1500

acggcgactg tgcccaggaa cggttggatc gctatcagat tcgtagctga caatccaggg   1560

gtttggttca tgcactgtca ctttgataga catcaaacgt ggggtatgaa tgttgtcttc   1620

attgttaaga atggaataaa accaaatcag aagattctac ctccaccgcc tggcttacca   1680

ccttgtgacc aatttgagaa tctataa                                       1707
```

```
<210> SEQ ID NO 142
<211> LENGTH: 568
<212> TYPE: PRT
<213> ORGANISM: Thlaspi arvense

<400> SEQUENCE: 142

Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly Pro Val Leu Arg Ala Tyr Lys Gly Asp Thr Ile Tyr
    50                  55                  60

Val Asn Val Arg Asn Gln Ala Ser Glu Asn Ile Thr Leu His Trp His
65                  70                  75                  80

Gly Val Glu Gln Pro Arg Asn Pro Trp Ser Asp Gly Pro Glu Tyr Ile
                85                  90                  95

Thr Gln Cys Pro Ile Gln Pro Gly Ser Asp Phe Thr Tyr Lys Ile Leu
```

-continued

```
            100                 105                 110

Leu Ser Ile Glu Asp Ala Thr Val Trp Trp His Ala His Ser Ser Trp
        115                 120                 125

Thr Arg Ala Thr Val His Gly Leu Ile Phe Val Tyr Pro Arg Pro Pro
    130                 135                 140

Asp Thr Leu Pro Phe Pro Glu Pro Asp Tyr Glu Val Pro Leu Val Phe
145                 150                 155                 160

Gly Glu Trp Trp Lys Arg Asp Val Arg Glu Val Val Glu Asp Phe Met
                165                 170                 175

Arg Asn Gly Gly Glu Pro Asn Val Ser Asp Ala Leu Thr Ile Asn Gly
            180                 185                 190

His Pro Gly Phe Leu Tyr Pro Cys Ser Gln Ser Asp Thr Phe Lys Leu
        195                 200                 205

Val Val Glu Lys Gly Lys Thr Tyr Arg Ile Trp Met Val Asn Ala Ala
    210                 215                 220

Met Asn Leu Ile Leu Phe Phe Ala Ile Ala Asn His Lys Leu Thr Val
225                 230                 235                 240

Val Ala Ala Asp Gly His Tyr Thr Lys Pro Leu Thr Ala Ser Tyr Ile
                245                 250                 255

Thr Ile Ser Pro Gly Gln Thr Leu Asp Leu Leu Leu Tyr Ala Asp Gln
            260                 265                 270

Ser Pro Glu Ser Thr Tyr Asn Met Ala Ala Arg Ala Tyr His Ser Asn
        275                 280                 285

Pro Asn Val Gly Phe Asn Asn Ser Thr Thr Val Gly Ile Leu Arg Tyr
    290                 295                 300

Tyr Ser Ser Asn Asp Ala Gly Thr Ser Ser Ser Glu Arg Tyr Pro Tyr
305                 310                 315                 320

Leu Pro Gly Tyr Asn Asp Thr Ser Ala Ala Phe Asp Phe Phe Thr Lys
                325                 330                 335

Ile Lys Gly Leu Tyr Ser Arg Val Ala Pro Ala Lys Val Ser Arg Arg
            340                 345                 350

Ile Ile Thr Thr Val Ser Ile Asn Leu Leu Lys Cys Pro Asn Asp Ser
        355                 360                 365

Cys Ala Gly Pro Asn Gly Ser Arg Leu Ala Ala Ser Met Asn Asn Ile
    370                 375                 380

Ser Phe Val Thr Pro Ser His Val Asp Ile Leu Arg Ala Tyr Tyr Leu
385                 390                 395                 400

His Ile Asn Gly Val Tyr Gly Thr Arg Phe Pro Glu Phe Pro Pro Arg
                405                 410                 415

Ile Phe Asn Phe Thr Ala Asp Asp Gln Pro Leu Phe Leu Gln Thr Pro
            420                 425                 430

Arg Leu Ala Thr Glu Val Lys Lys Phe Gln Tyr Gly Glu Thr Val Glu
        435                 440                 445

Ile Val Ile Gln Gly Thr Ser Leu Val Gly Gly Gly Ile Asp His Pro
    450                 455                 460

Met His Leu His Gly Phe Ser Phe Tyr Val Val Gly Leu Gly Phe Gly
465                 470                 475                 480

Asn Phe Asn Ala Arg Lys Asp Pro Ser Asn Tyr Asn Leu Asp Asp Pro
                485                 490                 495

Pro Tyr Arg Asn Thr Ala Thr Val Pro Arg Asn Gly Trp Ile Ala Ile
            500                 505                 510

Arg Phe Val Ala Asp Asn Pro Gly Val Trp Phe Met His Cys His Phe
        515                 520                 525
```

```
Asp Arg His Gln Thr Trp Gly Met Asn Val Val Phe Ile Val Lys Asn
    530                 535                 540

Gly Ile Lys Pro Asn Gln Lys Ile Leu Pro Pro Pro Pro Gly Leu Pro
545                 550                 555                 560

Pro Cys Asp Gln Phe Glu Asn Leu
                565
```

<210> SEQ ID NO 143
<211> LENGTH: 1708
<212> TYPE: DNA
<213> ORGANISM: Thlaspi arvense

<400> SEQUENCE: 143

```
atgtcacaat attccttctt ctatttcttc ctaatctctc ttttcctcta cgaaaattgc     60

attgcgtatc gctacacatt cacggttatt gaagctccat atagcaaact gtgtagcacg    120

aagaagattt tgaccgttaa tggtcagttt cctggaccag tgtttaaggg cttacaaagg    180

tgacaccatt tacgttaacg ttcgtaacca agctagtgaa aatatcacat tgcattggca    240

tggtgtagag cagccgagaa acccgtggtc agatggaccc gaatacatca cacaatgccc    300

gattcaaccc gggtcagatt ttacgtacaa aattttactt tccatcgaag acgcgactgt    360

ttggtggcat gcgcatagct cgtggacacg tgccaccgta cacggtctga ttttcgtgta    420

tcctcggcct cctgataccc tgccttttcc agaaccggac tacgaagtcc ccttagtttt    480

tggagagtgg tggaagaggg atgtgagaga agtagtggag gatttcatga ggaacggagg    540

tgaacctaat gtgtccgatg ctttgactat caatgggcat cctggtttct tgtatccttg    600

ctctcaatca gatacattca agctcgtggt agagaagggc aaaacctacc gcattcggat    660

ggtaaacgcc gcgatgaacc taattctctt cttcgccatc gcgaaccaca aactcaccgt    720

ggtcgccgcc gatggccact acaccaaacc tctaaccgct agttatatca ccatatctcc    780

tggccaaacg ctagacctgt tactatacgc cgaccaaagt ccagagagca cttataacat    840

ggcggccaga gcttaccata gcaaccccaa cgttgggttc aacaactcta ccaccgtcgg    900

gatcttacgt tactactctt caaacgacgc cggaacgtct tcatcagaac gttacccgta    960

ccttcctggc tacaatgaca cctcagcagc tttcgatttc ttcacaaaaa tcaaaggctt   1020

atactccaga gtagctcccg ccaaagtttc acgtaggata atcacgacgg tttcgataaa   1080

tctcctcaag tgtcccaacg actcgtgtgc aggcccaaac gggtcgaggt tagcggcgag   1140

tatgaacaac atatcgttcg tcacaccgag ccacgtggac atactaagag cttattacct   1200

tcacattaac ggcgtttacg gaacgcggtt tccggagttc ccaccgcgga tattcaattt   1260

cacagcggac gaccaaccgc tgtttttgca gactccgagg ctggcgacgg aggtaaagaa   1320

gtttcagtac ggggagacgg ttgagattgt tatacaaggg acgagtttgg taggtggtgg   1380

aatcgatcat cctatgcatc tccatggttt tagcttctac gtggttggtt tagggtttgg   1440

gaattttaac gcacgtaaag atccctccaa ctataatcta gacgatcctc cttacagaaa   1500

cacggcgact gtgcccagga acggttggat cgctatcaga ttcgtagctg acaatccagg   1560

ggtttggttc atgcactgtc actttgatag acatcaaacg tggggtatga atgttgtctt   1620

cattgttaag aatggaataa aaccaaatca gaagattcta cctccaccgc ctggcttacc   1680

accttgtgac caatttgaga atctataa                                       1708
```

<210> SEQ ID NO 144
<211> LENGTH: 60

<212> TYPE: PRT
<213> ORGANISM: Thlaspi arvense

<400> SEQUENCE: 144

```
Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly Pro Val Phe Lys Gly Leu Gln Arg
    50                  55                  60
```

<210> SEQ ID NO 145
<211> LENGTH: 1708
<212> TYPE: DNA
<213> ORGANISM: Thlaspi arvense

<400> SEQUENCE: 145

```
atgtcacaat attccttctt ctatttcttc ctaatctctc ttttcctcta cgaaaattgc      60

attgcgtatc gctacacatt cacggttatt gaagctccat atagcaaact gtgtagcacg     120

aagaagattt tgaccgttaa tggtcagttt cctggaccag tgattaaggg cttacaaagg     180

tgacaccatt tacgttaacg ttcgtaacca agctagtgaa aatatcacat tgcattggca     240

tggtgtagag cagccgagaa acccgtggtc agatggaccc gaatacatca cacaatgccc     300

gattcaaccc gggtcagatt ttacgtacaa aattttactt tccatcgaag acgcgactgt     360

ttggtggcat gcgcatagct cgtggacacg tgccaccgta cacggtctga ttttcgtgta     420

tcctcggcct cctgataccc tgccttttcc agaaccggac tacgaagtcc ccttagtttt     480

tggagagtgg tggaagaggg atgtgagaga agtagtggag gatttcatga ggaacggagg     540

tgaacctaat gtgtccgatg ctttgactat caatgggcat cctggtttct tgtatccttg     600

ctctcaatca gatacattca agctcgtggt agagaagggc aaaacctacc gcattcggat     660

ggtaaacgcc gcgatgaacc taattctctt cttcgccatc gcgaaccaca aactcaccgt     720

ggtcgccgcc gatggccact acaccaaacc tctaaccgct agttatatca ccatatctcc     780

tggccaaacg ctagacctgt tactatacgc cgaccaaagt ccagagagca cttataacat     840

ggcggccaga gcttaccata gcaaccccaa cgttgggttc aacaactcta ccaccgtcgg     900

gatcttacgt tactactctt caaacgacgc cggaacgtct tcatcagaac gttacccgta     960

ccttcctggc tacaatgaca cctcagcagc tttcgatttc ttcacaaaaa tcaaaggctt    1020

atactccaga gtagctcccg ccaaagtttc acgtaggata atcacgacgg tttcgataaa    1080

tctcctcaag tgtcccaacg actcgtgtgc aggcccaaac gggtcgaggt tagcggcgag    1140

tatgaacaac atatcgttcg tcacaccgag ccacgtggac atactaagag cttattacct    1200

tcacattaac ggcgtttacg gaacgcggtt tccggagttc ccaccgcgga tattcaattt    1260

cacagcggac gaccaaccgc tgtttttgca gactccgagg ctggcgacgg aggtaaagaa    1320

gtttcagtac ggggagacgg ttgagattgt tatacaaggg acgagtttgg taggtggtgg    1380

aatcgatcat cctatgcatc tccatggttt tagcttctac gtggttggtt tagggtttgg    1440

gaattttaac gcacgtaaag atccctccaa ctataatcta gacgatcctc cttacagaaa    1500

cacggcgact gtgcccagga acggttggat cgctatcaga ttcgtagctg acaatccagg    1560

ggtttggttc atgcactgtc actttgatag acatcaaacg tggggtatga atgttgtctt    1620
```

```
cattgttaag aatggaataa aaccaaatca gaagattcta cctccaccgc ctggcttacc   1680

accttgtgac caatttgaga atctataa                                      1708


<210> SEQ ID NO 146
<211> LENGTH: 60
<212> TYPE: PRT
<213> ORGANISM: Thlaspi arvense

<400> SEQUENCE: 146

Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly Pro Val Phe Lys Gly Leu Gln Arg
    50                  55                  60


<210> SEQ ID NO 147
<211> LENGTH: 1700
<212> TYPE: DNA
<213> ORGANISM: Thlaspi arvense

<400> SEQUENCE: 147

atgtcacaat attccttctt ctatttcttc ctaatctctc ttttcctcta cgaaaattgc     60

attgcgtatc gctacacatt cacggttatt gaagctccat atagcaaact gtgtagcacg    120

aagaagattt tgaccgttaa tggtcagttt cctggttaag ggcttacaaa ggtgacacca    180

tttacgttaa cgttcgtaac caagctagtg aaaatatcac attgcattgg catggtgtag    240

agcagccgag aaacccgtgg tcagatggac ccgaatacat cacacaatgc ccgattcaac    300

ccgggtcaga ttttacgtac aaaattttac tttccatcga agacgcgact gtttggtggc    360

atgcgcatag ctcgtggaca cgtgccaccg tacacggtct gattttcgtg tatcctcggc    420

ctcctgatac cctgcctttt ccagaaccgg actacgaagt ccccttagtt tttggagagt    480

ggtggaagag ggatgtgaga gaagtagtgg aggatttcat gaggaacgga ggtgaaccta    540

atgtgtccga tgctttgact atcaatgggc atcctggttt cttgtatcct tgctctcaat    600

cagatacatt caagctcgtg gtagagaagg gcaaaaccta ccgcattcgg atggtaaacg    660

ccgcgatgaa cctaattctc ttcttcgcca tcgcgaacca caaactcacc gtggtcgccg    720

ccgatggcca ctacaccaaa cctctaaccg ctagttatat caccatatct cctggccaaa    780

cgctagacct gttactatac gccgaccaaa gtccagagag cacttataac atggcggcca    840

gagcttacca tagcaacccc aacgttgggt tcaacaactc taccaccgtc gggatcttac    900

gttactactc ttcaaacgac gccggaacgt cttcatcaga acgttacccg taccttcctg    960

gctacaatga cacctcagca gctttcgatt tcttcacaaa aatcaaaggc ttatactcca   1020

gagtagctcc cgccaaagtt tcacgtagga taatcacgac ggtttcgata aatctcctca   1080

agtgtcccaa cgactcgtgt gcaggcccaa acgggtcgag gttagcggcg agtatgaaca   1140

acatatcgtt cgtcacaccg agccacgtgg acatactaag agcttattac cttcacatta   1200

acggcgttta cggaacgcgg tttccggagt tcccaccgcg gatattcaat ttcacagcgg   1260

acgaccaacc gctgtttttg cagactccga ggctggcgac ggaggtaaag aagtttcagt   1320

acggggagac ggttgagatt gttatacaag ggacgagttt ggtaggtggt ggaatcgatc   1380

atcctatgca tctccatggt tttagcttct acgtggttgg tttagggttt gggaatttta   1440
```

```
acgcacgtaa agatccctcc aactataatc tagacgatcc tccttacaga aacacggcga   1500

ctgtgcccag gaacggttgg atcgctatca gattcgtagc tgacaatcca ggggtttggt   1560

tcatgcactg tcactttgat agacatcaaa cgtggggtat gaatgttgtc ttcattgtta   1620

agaatggaat aaaaccaaat cagaagattc tacctccacc gcctggctta ccaccttgtg   1680

accaatttga gaatctataa                                                1700
```

```
<210> SEQ ID NO 148
<211> LENGTH: 52
<212> TYPE: PRT
<213> ORGANISM: Thlaspi arvense

<400> SEQUENCE: 148

Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly
    50
```

```
<210> SEQ ID NO 149
<211> LENGTH: 1520
<212> TYPE: DNA
<213> ORGANISM: Thlaspi arvense

<400> SEQUENCE: 149

atgagctcca cggagacata tgagcctcta ttgagacggc tccactcaga ttctcagtta     60

accgtaggtt cttcaccgga gatagaggag tttctcggcc gtcgtagatc cacggtgacg    120

ccacggtggt ggctaaggct ggccgtatgg gaatcaaagc ttctttggac gctctctgga    180

gcctccatag tggtctctgt gctgaattac atgctcagct tcgtcaccgt tatgttcatc    240

ggccatcttg gctctcttca gctcgccggc gcatccatcg ccaccgtcgg tatccaaggc    300

ctcgcttacg gtatcatgtt gggaatggcg agcgcggtcc agacagtgtg tggtcaagcg    360

tacggcgcga ggcagtactc atcaatggga ataatttgcc aacgagccat ggtcttgcac    420

ctcgcagctg cggtcctcct cacgttcctc tactggtact cgggtccgat cctaaaggcg    480

atgggccaat ccgcagccat cgcacgcgag ggtcaggtct ttgcacgtgg gattattccg    540

cagatttatg cttttgccct cgcttgccct atgcagaggt tcctccaggc tcaaaaaatt    600

gtaaaccctt ttacatgtca ctaggagttt tcgtgctaca cacgctacta acctggctgg    660

taaccaacgt cctgcatttc ggcttgctcg gtgcagctct ggtgctgagt ttttcgtggt    720

ggcttctcgc ggctgtgaat ggtctgtata tcgtgatgag cccgagttgc aaggaaactt    780

ggaccgggtt ctcagctagg gctttaagag ggatttggcc ttacttcaag ctcacgatag    840

cttcagcagt catgctatgt ttggagatat ggtacgtcca agggctagtg attatttccg    900

gtttactcac caatcccaca attgccctag acgcaatttc gatttgcatg tattactgga    960

attgggatat gcagttcatg cttggtctaa gtgcggcaat cactgtccga gtgagcaacg   1020

agctaggagc gggaaaccca cgagtggcta agttatcagt ggtagtggtt aacatcacga   1080

cggttgtcat cagcttattc ctctgtgtcg ttgtgctcgt gttccgcatt ggccttagta   1140

aagccttcac cagcgacgca gaggttatag ctgcagtctc tgatctcttt cccctgctcg   1200
```

```
ccgtttccat tttcttaaac ggaatccaac caattctctc tggtgttgcc attggaagtg   1260

ggtggcaagc agtggtggct tatgtgaatc ttgttactta ctatgtcatt ggtcttccta   1320

ttggctgtgt tcttggcttc aaaaccagtc ttggagttgc ggggatctgg tgggggatga   1380

ttgcaggagt tatacttcaa accctaactt tgattgttct tacactcaga actaactgga   1440

attccgaggt ggagaatgca gctcataggt taaaagcttc agcaaatgag agtcaagaaa   1500

tggctaccga aggaatctaa                                               1520
```

<210> SEQ ID NO 150
<211> LENGTH: 207
<212> TYPE: PRT
<213> ORGANISM: Thlaspi arvense

<400> SEQUENCE: 150

```
Met Ser Ser Thr Glu Thr Tyr Glu Pro Leu Leu Arg Arg Leu His Ser
1               5                   10                  15

Asp Ser Gln Leu Thr Val Gly Ser Ser Pro Glu Ile Glu Glu Phe Leu
            20                  25                  30

Gly Arg Arg Arg Ser Thr Val Thr Pro Arg Trp Trp Leu Arg Leu Ala
        35                  40                  45

Val Trp Glu Ser Lys Leu Leu Trp Thr Leu Ser Gly Ala Ser Ile Val
    50                  55                  60

Val Ser Val Leu Asn Tyr Met Leu Ser Phe Val Thr Val Met Phe Ile
65                  70                  75                  80

Gly His Leu Gly Ser Leu Gln Leu Ala Gly Ala Ser Ile Ala Thr Val
                85                  90                  95

Gly Ile Gln Gly Leu Ala Tyr Gly Ile Met Leu Gly Met Ala Ser Ala
            100                 105                 110

Val Gln Thr Val Cys Gly Gln Ala Tyr Gly Ala Arg Gln Tyr Ser Ser
        115                 120                 125

Met Gly Ile Ile Cys Gln Arg Ala Met Val Leu His Leu Ala Ala Ala
    130                 135                 140

Val Leu Leu Thr Phe Leu Tyr Trp Tyr Ser Gly Pro Ile Leu Lys Ala
145                 150                 155                 160

Met Gly Gln Ser Ala Ala Ile Ala Arg Glu Gly Gln Val Phe Ala Arg
                165                 170                 175

Gly Ile Ile Pro Gln Ile Tyr Ala Phe Ala Leu Ala Cys Pro Met Gln
            180                 185                 190

Arg Phe Leu Gln Ala Gln Lys Ile Val Asn Pro Phe Thr Cys His
        195                 200                 205
```

<210> SEQ ID NO 151
<211> LENGTH: 1524
<212> TYPE: DNA
<213> ORGANISM: Thlaspi arvense

<400> SEQUENCE: 151

```
atgagctcca cggagacata tgagcctcta ttgagacggc tccactcaga ttctcagtta     60

accgtaggtt cttcaccgga gatagaggag tttctcggcc gtcgtagatc cacggtgacg    120

ccacggtggt ggctaaggct ggccgtatgg gaatcaaagc ttctttggac gctctctgga    180

gcctccatag tggtctctgt gctgaattac atgctcagct tcgtcaccgt tatgttcatc    240

ggccatcttg gctctcttca gctcgccggc gcatccatcg ccaccgtcgg tatccaaggc    300

ctcgcttacg gtatcatgtt gggaatggcg agcgcggtcc agacagtgtg tggtcaagcg    360
```

```
tacggcgcga ggcagtactc atcaatggga ataatttgcc aacgagccat ggtcttgcac    420

ctcgcagctg cggtcctcct cacgttcctc tactggtact cgggtccgat cctaaaggcg    480

atgggccaat ccgcagccat cgcacgcgag ggtcaggtct ttgcacgtgg gattattccg    540

cagatttatg cttttgccct cgcttgccct atgcagaggt tcctccaggc tcaaaaaatt    600

gtaaaccctt tggcttacat gtcactagga gttttcgtgc tacacacgct actaacctgg    660

ctggtaacca acgtcctgca tttcggcttg ctcggtgcag ctctggtgct gagtttttcg    720

tggtggcttc tcgcggctgt gaatggtctg tatatcgtga tgagcccgag ttgcaaggaa    780

acttggaccg ggttctcagc tagggcttta agagggattt ggccttactt caagctcacg    840

atagcttcag cagtcatgct atgtttggag atatggtacg tccaagggct agtgattatt    900

tccggtttac tcaccaatcc cacaattgcc ctagacgcaa tttcgatttg catgtattac    960

tggaattggg atatgcagtt catgcttggt ctaagtgcgg caatcactgt ccgagtgagc   1020

aacgagctag gagcgggaaa cccacgagtg gctaagttat cagtggtagt ggttaacatc   1080

acgacggttg tcatcagctt attcctctgt gtcgttgtgc tcgtgttccg cattggcctt   1140

agtaaagcct tcaccagcga cgcagaggtt atagctgcag tctctgatct ctttcccctg   1200

ctcgccgttt ccattttctt aaacggaatc caaccaattc tctctagtgt tgccattgga   1260

agtgggtggc aagcagtggt ggcttatgtg aatcttgtta cttactatgt cattggtctt   1320

cctattggct gtgttcttgg cttcaaaacc agtcttggag ttgcggggat ctggtggggg   1380

atgattgcag gagttatact tcaaacccta actttgattg ttcttacact cagaactaac   1440

tggaattccg aggtggagaa tgcagctcat aggttaaaag cttcagcaaa tgagagtcaa   1500

gaaatggcta ccgaaggaat ctaa                                          1524
```

```
<210> SEQ ID NO 152
<211> LENGTH: 507
<212> TYPE: PRT
<213> ORGANISM: Thlaspi arvense

<400> SEQUENCE: 152

Met Ser Ser Thr Glu Thr Tyr Glu Pro Leu Leu Arg Arg Leu His Ser
1               5                   10                  15

Asp Ser Gln Leu Thr Val Gly Ser Ser Pro Glu Ile Glu Glu Phe Leu
            20                  25                  30

Gly Arg Arg Arg Ser Thr Val Thr Pro Arg Trp Trp Leu Arg Leu Ala
        35                  40                  45

Val Trp Glu Ser Lys Leu Leu Trp Thr Leu Ser Gly Ala Ser Ile Val
    50                  55                  60

Val Ser Val Leu Asn Tyr Met Leu Ser Phe Val Thr Val Met Phe Ile
65                  70                  75                  80

Gly His Leu Gly Ser Leu Gln Leu Ala Gly Ala Ser Ile Ala Thr Val
                85                  90                  95

Gly Ile Gln Gly Leu Ala Tyr Gly Ile Met Leu Gly Met Ala Ser Ala
            100                 105                 110

Val Gln Thr Val Cys Gly Gln Ala Tyr Gly Ala Arg Gln Tyr Ser Ser
        115                 120                 125

Met Gly Ile Ile Cys Gln Arg Ala Met Val Leu His Leu Ala Ala Ala
    130                 135                 140

Val Leu Leu Thr Phe Leu Tyr Trp Tyr Ser Gly Pro Ile Leu Lys Ala
145                 150                 155                 160

Met Gly Gln Ser Ala Ala Ile Ala Arg Glu Gly Gln Val Phe Ala Arg
```

```
                165                 170                 175

Gly Ile Ile Pro Gln Ile Tyr Ala Phe Ala Leu Ala Cys Pro Met Gln
            180                 185                 190

Arg Phe Leu Gln Ala Gln Lys Ile Val Asn Pro Leu Ala Tyr Met Ser
        195                 200                 205

Leu Gly Val Phe Val Leu His Thr Leu Leu Thr Trp Leu Val Thr Asn
    210                 215                 220

Val Leu His Phe Gly Leu Leu Gly Ala Ala Leu Val Leu Ser Phe Ser
225                 230                 235                 240

Trp Trp Leu Leu Ala Ala Val Asn Gly Leu Tyr Ile Val Met Ser Pro
                245                 250                 255

Ser Cys Lys Glu Thr Trp Thr Gly Phe Ser Ala Arg Ala Leu Arg Gly
            260                 265                 270

Ile Trp Pro Tyr Phe Lys Leu Thr Ile Ala Ser Ala Val Met Leu Cys
        275                 280                 285

Leu Glu Ile Trp Tyr Val Gln Gly Leu Val Ile Ile Ser Gly Leu Leu
    290                 295                 300

Thr Asn Pro Thr Ile Ala Leu Asp Ala Ile Ser Ile Cys Met Tyr Tyr
305                 310                 315                 320

Trp Asn Trp Asp Met Gln Phe Met Leu Gly Leu Ser Ala Ala Ile Thr
                325                 330                 335

Val Arg Val Ser Asn Glu Leu Gly Ala Gly Asn Pro Arg Val Ala Lys
            340                 345                 350

Leu Ser Val Val Val Val Asn Ile Thr Thr Val Val Ile Ser Leu Phe
        355                 360                 365

Leu Cys Val Val Val Leu Val Phe Arg Ile Gly Leu Ser Lys Ala Phe
    370                 375                 380

Thr Ser Asp Ala Glu Val Ile Ala Ala Val Ser Asp Leu Phe Pro Leu
385                 390                 395                 400

Leu Ala Val Ser Ile Phe Leu Asn Gly Ile Gln Pro Ile Leu Ser Ser
                405                 410                 415

Val Ala Ile Gly Ser Gly Trp Gln Ala Val Val Ala Tyr Val Asn Leu
            420                 425                 430

Val Thr Tyr Tyr Val Ile Gly Leu Pro Ile Gly Cys Val Leu Gly Phe
        435                 440                 445

Lys Thr Ser Leu Gly Val Ala Gly Ile Trp Trp Gly Met Ile Ala Gly
    450                 455                 460

Val Ile Leu Gln Thr Leu Thr Leu Ile Val Leu Thr Leu Arg Thr Asn
465                 470                 475                 480

Trp Asn Ser Glu Val Glu Asn Ala Ala His Arg Leu Lys Ala Ser Ala
                485                 490                 495

Asn Glu Ser Gln Glu Met Ala Thr Glu Gly Ile
            500                 505


<210> SEQ ID NO 153
<211> LENGTH: 2214
<212> TYPE: DNA
<213> ORGANISM: Thlaspi arvense

<400> SEQUENCE: 153

atgcttccat taatggcgat accacttgcg acttgcagga gcatcaactg gtcagccacg      60

gaaaggattc ctgtttcgct tctgttccgg agtattcttc tccaagacga cgaagtttgt     120

agcgctgtgc cactataccg gatcctcgat cagaatgacg ggcaacttgg tcctataagt     180
```

atggccgagg aatcagacaa accattgctg gatcctgata ctctcaacag agaaggaatt 240
gacttgggtc tgttgccatt ggaggaggtt tttgaatacc taagaacatc tccacggggg 300
cttttatctg gagatgctga agaaagattg acgatatttg gtcctaacag ccttgaagag 360
aaacgggaga acaagtttct gaagttccta ggttttatgt ggaatccttt gtcatgggtt 420
atggaagctg cagcattgat ggccatcgcc ctagcagata gtgaagtaga gactatcagt 480
cttttgctat accatttctg ctcagtgctg accggagaat cgctacctgt gaccaagaag 540
aagggtgagc aagtcttctc tggctctact tgtaagcaag gtgagataga agctgttgtg 600
atagccaccg gttcgagcac tttctttggt aaaacagcat ctttggtgga cagcacagat 660
gcaactggac attttcagca ggttctaagc ttgtgccagc agaaaaatga gattgcgcaa 720
agagtttatg ccatcataaa tagatttgca gaaaaaggtt tgaggtctct tgctgttgct 780
tatcaggaaa ttccagagag aagcagcaac agtcctggag gaccatggtt gttctgtggt 840
ctgttgccac tgtttgatcc tccaaggcat gacagtgctg aaaccatact gagagctctt 900
aactttggag tttgtgttaa gatgatcacc ggtgatcagt tggcgattgc aaaggagaca 960
ggaaggcgac ttgggatggg aaccaatatg tatccttctt cctctttgtt aggccacaac 1020
aacgatgatc acgaagccat tccattggat gagcttattg aaatggcaga tggatttgct 1080
ggagtgttcc ctgaacacaa gtatgagatt gtaaagatat tacaagaaaa gaagcatgtg 1140
gttggaatga ccggagatgg tgtgaatgat gctcctgctc tgaaaaaggc tgacattgga 1200
atagctgtcg ctgatgcaac agatgccgca agaagttctg ctgacattgt actaactgag 1260
cctggcttaa gtgtaattat cagtgctgtc ttgaccagca gagccatttt ccagcgtatg 1320
aagaactata cagtatatgc agtctcgatc accatacgaa tagtgctcgg ttttacactt 1380
ttagcgttga tatgggaata cgactttcca cctttcatgg ttttgataat cgcaatactc 1440
aatgacggga ccatcatgac tatctctaaa gatcgagtaa ggccatctcc tacacccgag 1500
agttggaagc tcaaccagat atttgcgact ggaattgtca ttggaacata ccttgcattg 1560
gtcactgtcc tattctactg gatcattgtc tctaccacct tcttcgagaa acacttccat 1620
gtaaaatcaa tcggcaacaa cagtgaacaa gtctcatccg ctctgtatct ccaagtaagc 1680
atcatcagtc aagcactcat atttgtaaca cgtagtcgaa gctggtcttt tcttgaacgt 1740
cccgggactc tcctgatttt cgccttcctt gttgcccaac ttgccgctac attgattgct 1800
gtctatgcca acatcagctt tgctaacatc accggcattg gatggggatg ggcaggtgtt 1860
atatggttat acagtttgat tttttacata cctcttgata ttataaagtt cttcttccac 1920
tacgcattga gtggagatgc ttggaacctt gtatttgacc gtaagacagc atttactaat 1980
aagaaagatt atagaaaaga tgacggagcg tccaatgtaa ccatctctca gagaagtcac 2040
tctgcagaag aactcagtgg aagtcgttct cgcgcatctt ggatcgctga gcagaccaga 2100
aggcgtgcag aaaccgccag gctcttggag ggacactcgg tgtcaaggca tttggaatca 2160
gtaatgaagc tcaaacaaat tgaccccaag atgattcgtg cagacactgt ctaa 2214

<210> SEQ ID NO 154
<211> LENGTH: 737
<212> TYPE: PRT
<213> ORGANISM: Thlaspi arvense

<400> SEQUENCE: 154

Met Leu Pro Leu Met Ala Ile Pro Leu Ala Thr Cys Arg Ser Ile Asn
1 5 10 15

```
Trp Ser Ala Thr Glu Arg Ile Pro Val Ser Leu Leu Phe Arg Ser Ile
            20                  25                  30

Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125

Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160

Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Phe Gly Val
    290                 295                 300

Cys Val Lys Met Ile Thr Gly Asp Gln Leu Ala Ile Ala Lys Glu Thr
305                 310                 315                 320

Gly Arg Arg Leu Gly Met Gly Thr Asn Met Tyr Pro Ser Ser Ser Leu
                325                 330                 335

Leu Gly His Asn Asn Asp Asp His Glu Ala Ile Pro Leu Asp Glu Leu
            340                 345                 350

Ile Glu Met Ala Asp Gly Phe Ala Gly Val Phe Pro Glu His Lys Tyr
        355                 360                 365

Glu Ile Val Lys Ile Leu Gln Glu Lys Lys His Val Val Gly Met Thr
    370                 375                 380

Gly Asp Gly Val Asn Asp Ala Pro Ala Leu Lys Lys Ala Asp Ile Gly
385                 390                 395                 400

Ile Ala Val Ala Asp Ala Thr Asp Ala Ala Arg Ser Ser Ala Asp Ile
                405                 410                 415

Val Leu Thr Glu Pro Gly Leu Ser Val Ile Ile Ser Ala Val Leu Thr
            420                 425                 430

Ser Arg Ala Ile Phe Gln Arg Met Lys Asn Tyr Thr Val Tyr Ala Val
```

```
        435                 440                 445

Ser Ile Thr Ile Arg Ile Val Leu Gly Phe Thr Leu Leu Ala Leu Ile
    450                 455                 460

Trp Glu Tyr Asp Phe Pro Pro Phe Met Val Leu Ile Ile Ala Ile Leu
465                 470                 475                 480

Asn Asp Gly Thr Ile Met Thr Ile Ser Lys Asp Arg Val Arg Pro Ser
                485                 490                 495

Pro Thr Pro Glu Ser Trp Lys Leu Asn Gln Ile Phe Ala Thr Gly Ile
            500                 505                 510

Val Ile Gly Thr Tyr Leu Ala Leu Val Thr Val Leu Phe Tyr Trp Ile
        515                 520                 525

Ile Val Ser Thr Thr Phe Phe Glu Lys His Phe His Val Lys Ser Ile
    530                 535                 540

Gly Asn Asn Ser Glu Gln Val Ser Ser Ala Leu Tyr Leu Gln Val Ser
545                 550                 555                 560

Ile Ile Ser Gln Ala Leu Ile Phe Val Thr Arg Ser Arg Ser Trp Ser
                565                 570                 575

Phe Leu Glu Arg Pro Gly Thr Leu Leu Ile Phe Ala Phe Leu Val Ala
            580                 585                 590

Gln Leu Ala Ala Thr Leu Ile Ala Val Tyr Ala Asn Ile Ser Phe Ala
        595                 600                 605

Asn Ile Thr Gly Ile Gly Trp Gly Trp Ala Gly Val Ile Trp Leu Tyr
    610                 615                 620

Ser Leu Ile Phe Tyr Ile Pro Leu Asp Ile Ile Lys Phe Phe Phe His
625                 630                 635                 640

Tyr Ala Leu Ser Gly Asp Ala Trp Asn Leu Val Phe Asp Arg Lys Thr
                645                 650                 655

Ala Phe Thr Asn Lys Lys Asp Tyr Arg Lys Asp Asp Gly Ala Ser Asn
            660                 665                 670

Val Thr Ile Ser Gln Arg Ser His Ser Ala Glu Glu Leu Ser Gly Ser
        675                 680                 685

Arg Ser Arg Ala Ser Trp Ile Ala Glu Gln Thr Arg Arg Arg Ala Glu
    690                 695                 700

Thr Ala Arg Leu Leu Glu Gly His Ser Val Ser Arg His Leu Glu Ser
705                 710                 715                 720

Val Met Lys Leu Lys Gln Ile Asp Pro Lys Met Ile Arg Ala Asp Thr
                725                 730                 735

Val


<210> SEQ ID NO 155
<211> LENGTH: 2214
<212> TYPE: DNA
<213> ORGANISM: Thlaspi arvense

<400> SEQUENCE: 155

atgcttccat taatggcgat accacttgcg acttgcagga gcatcaactg gtcagccacg      60

gaaaggattc ctgtttcgct tctgttccgg agtattcttc tccaagacga cgaagtttgt     120

agcgctgtgc cactataccg gatcctcgat cagaatgacg ggcaacttgg tcctataagt     180

atggccgagg aatcagacaa accattgctg gatcctgata ctctcaacag agaaggaatt     240

gacttgggtc tgttgccatt ggaggaggtt tttgaatacc taagaacatc tccacggggg     300

cttttatctg gagatgctga agaaagattg acgatatttg gtcctaacag ccttgaagag     360

aaacgggaga acaagtttct gaagttccta ggttttatgt ggaatccttt gtcatgggtt     420
```

```
atggaagctg cagcattgat ggccatcgcc ctagcagata gtgaagtaga gactatcagt    480
cttttgctat accatttctg ctcagtgctg accggagaat cgctacctgt gaccaagaag    540
aagggtgagc aagtcttctc tggctctact tgtaagcaag gtgagataga agctgttgtg    600
atagccaccg gttcgagcac tttctttggt aaaacagcat ctttggtgga cagcacagat    660
gcaactggac attttcagca ggttctaagc ttgtgccagc agaaaaatga gattgcgcaa    720
agagtttatg ccatcataaa tagatttgca gaaaaaggtt tgaggtctct tgctgttgct    780
tatcaggaaa ttccagagag aagcagcaac agtcctggag gaccatggtt gttctgtggt    840
ctgttgccac tgtttgatcc tccaaggcat gacagtgctg aaaccatact gagagctctt    900
aaccttggag tttgtgttaa gatgatcacc ggtgatcagt tggcgattgc aaaggagaca    960
ggaaggtgac ttgggatggg aaccaatatg tatccttctt cctctttgtt aggccacaac   1020
aacgatgatc acgaagccat tccattggat gagcttattg aaatggcaga tggatttgct   1080
ggagtgttcc ctgaacacaa gtatgagatt gtaaagatat tacaagaaaa gaagcatgtg   1140
gttggaatga ccggagatgg tgtgaatgat gctcctgctc tgaaaaaggc tgacattgga   1200
atagctgtcg ctgatgcaac agatgccgca agaagttctg ctgacattgt actaactgag   1260
cctggcttaa gtgtaattat cagtgctgtc ttgaccagca gagccatttt ccagcgtatg   1320
aagaactata cagtatatgc agtctcgatc accatacgaa tagtgctcgg ttttacactt   1380
ttagcgttga tatgggaata cgactttcca cctttcatgg ttttgataat cgcaatactc   1440
aatgacggga ccatcatgac tatctctaaa gatcgagtaa ggccatctcc tacacccgag   1500
agttggaagc tcaaccagat atttgcgact ggaattgtca ttggaacata ccttgcattg   1560
gtcactgtcc tattctactg gatcattgtc tctaccacct tcttcgagaa acacttccat   1620
gtaaaatcaa tcggcaacaa cagtgaacaa gtctcatccg ctctgtatct ccaagtaagc   1680
atcatcagtc aagcactcat atttgtaaca cgtagtcgaa gctggtcttt tcttgaacgt   1740
cccgggactc tcctgatttt cgccttcctt gttgcccaac ttgccgctac attgattgct   1800
gtctatgcca acatcagctt tgctaacatc accggcattg gatggggatg ggcaggtgtt   1860
atatggttat acagtttgat tttttacata cctcttgata ttataaagtt cttcttccac   1920
tacgcattga gtggagatgc ttggaacctt gtatttgacc gtaagacagc atttactaat   1980
aagaaagatt atagaaaaga tgacggagcg tccaatgtaa ccatctctca gagaagtcac   2040
tctgcagaag aactcagtgg aagtcgttct cgcgcatctt ggatcgctga gcagaccaga   2100
aggcgtgcag aaaccgccag gctcttggag ggacactcgg tgtcaaggca tttggaatca   2160
gtaatgaagc tcaaacaaat tgaccccaag atgattcgtg cagacactgt ctaa         2214
```

```
<210> SEQ ID NO 156
<211> LENGTH: 322
<212> TYPE: PRT
<213> ORGANISM: Thlaspi arvense

<400> SEQUENCE: 156

Met Leu Pro Leu Met Ala Ile Pro Leu Ala Thr Cys Arg Ser Ile Asn
1               5                   10                  15

Trp Ser Ala Thr Glu Arg Ile Pro Val Ser Leu Leu Phe Arg Ser Ile
            20                  25                  30

Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
```

```
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125

Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160

Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Leu Gly Val
    290                 295                 300

Cys Val Lys Met Ile Thr Gly Asp Gln Leu Ala Ile Ala Lys Glu Thr
305                 310                 315                 320

Gly Arg
```

<210> SEQ ID NO 157
<211> LENGTH: 2214
<212> TYPE: DNA
<213> ORGANISM: Thlaspi arvense

<400> SEQUENCE: 157

```
atgcttccat taatggcgat accacttgcg acttgcagga gcatcaactg gtcagccacg      60

gaaaggattc ctgtttcgct tctgttccgg agtattcttc tccaagacga cgaagtttgt     120

agcgctgtgc cactataccg gatcctcgat cagaatgacg ggcaacttgg tcctataagt     180

atggccgagg aatcagacaa accattgctg gatcctgata ctctcaacag agaaggaatt     240

gacttgggtc tgttgccatt ggaggaggtt tttgaatacc taagaacatc tccacggggg     300

cttttatctg gagatgctga agaaagattg acgatatttg gtcctaacag ccttgaagag     360

aaacgggaga acaagtttct gaagttccta ggttttatgt ggaatccttt gtcatgggtt     420

atggaagctg cagcattgat ggccatcgcc ctagcagata gtgaagtaga gactatcagt     480

cttttgctat accatttctg ctcagtgctg accggagaat cgctacctgt gaccaagaag     540

aagggtgagc aagtcttctc tggctctact tgtaagcaag gtgagataga agctgttgtg     600
```

```
atagccaccg gttcgagcac tttctttggt aaaacagcat ctttggtgga cagcacagat    660

gcaactggac attttcagca ggttctaagc ttgtgccagc agaaaaatga gattgcgcaa    720

agagtttatg ccatcataaa tagatttgca gaaaaaggtt tgaggtctct tgctgttgct    780

tatcaggaaa ttccagagag aagcagcaac agtcctggag gaccatggtt gttctgtggt    840

ctgttgccac tgtttgatcc tccaaggcat gacagtgctg aaaccatact gagagctctt    900

aaccttggag tttgtgttaa gatgatcacc ggtgatcagt tggcgattgc aaaggagaca    960

ggaaggcgac ttgggatggg aaccaatatg tatccttctt cctctttgtt aggccacaac   1020

aacgatgatc acgaagccat tccattggat gagcttattg aaatggcaga tggatttgct   1080

ggagtgttcc ctgaacacaa gtatgagatt gtaaagatat tacaagaaaa gaagcatgtg   1140

gttggaatga ccagagatgg tgtgaatgat gctcctgctc tgaaaaaggc tgacattgga   1200

atagctgtcg ctgatgcaac agatgccgca agaagttctg ctgacattgt actaactgag   1260

cctggcttaa gtgtaattat cagtgctgtc ttgaccagca gagccatttt ccagcgtatg   1320

aagaactata cagtatatgc agtctcgatc accatacgaa tagtgctcgg ttttacactt   1380

ttagcgttga tatgggaata cgactttcca cctttcatgg ttttgataat cgcaatactc   1440

aatgacggga ccatcatgac tatctctaaa gatcgagtaa ggccatctcc tacacccgag   1500

agttggaagc tcaaccagat atttgcgact ggaattgtca ttggaacata ccttgcattg   1560

gtcactgtcc tattctactg gatcattgtc tctaccacct tcttcgagaa acacttccat   1620

gtaaaatcaa tcggcaacaa cagtgaacaa gtctcatccg ctctgtatct ccaagtaagc   1680

atcatcagtc aagcactcat atttgtaaca cgtagtcgaa gctggtcttt tcttgaacgt   1740

cccgggactc tcctgatttt cgccttcctt gttgcccaac ttgccgctac attgattgct   1800

gtctatgcca acatcagctt tgctaacatc accggcattg gatggggatg ggcaggtgtt   1860

atatggttat acagtttgat tttttacata cctcttgata ttataaagtt cttcttccac   1920

tacgcattga gtggagatgc ttggaacctt gtatttgacc gtaagacagc atttactaat   1980

aagaaagatt atagaaaaga tgacggagcg tccaatgtaa ccatctctca gagaagtcac   2040

tctgcagaag aactcagtgg aagtcgttct cgcgcatctt ggatcgctga gcagaccaga   2100

aggcgtgcag aaaccgccag gctcttggag ggacactcgg tgtcaaggca tttggaatca   2160

gtaatgaagc tcaaacaaat tgaccccaag atgattcgtg cagacactgt ctaa         2214
```

<210> SEQ ID NO 158
<211> LENGTH: 737
<212> TYPE: PRT
<213> ORGANISM: Thlaspi arvense

<400> SEQUENCE: 158

```
Met Leu Pro Leu Met Ala Ile Pro Leu Ala Thr Cys Arg Ser Ile Asn
1               5                   10                  15

Trp Ser Ala Thr Glu Arg Ile Pro Val Ser Leu Leu Phe Arg Ser Ile
            20                  25                  30

Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
```

```
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125

Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160

Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Leu Gly Val
    290                 295                 300

Cys Val Lys Met Ile Thr Gly Asp Gln Leu Ala Ile Ala Lys Glu Thr
305                 310                 315                 320

Gly Arg Arg Leu Gly Met Gly Thr Asn Met Tyr Pro Ser Ser Ser Leu
                325                 330                 335

Leu Gly His Asn Asn Asp Asp His Glu Ala Ile Pro Leu Asp Glu Leu
            340                 345                 350

Ile Glu Met Ala Asp Gly Phe Ala Gly Val Phe Pro Glu His Lys Tyr
        355                 360                 365

Glu Ile Val Lys Ile Leu Gln Glu Lys Lys His Val Val Gly Met Thr
    370                 375                 380

Arg Asp Gly Val Asn Asp Ala Pro Ala Leu Lys Lys Ala Asp Ile Gly
385                 390                 395                 400

Ile Ala Val Ala Asp Ala Thr Asp Ala Ala Arg Ser Ser Ala Asp Ile
                405                 410                 415

Val Leu Thr Glu Pro Gly Leu Ser Val Ile Ile Ser Ala Val Leu Thr
            420                 425                 430

Ser Arg Ala Ile Phe Gln Arg Met Lys Asn Tyr Thr Val Tyr Ala Val
        435                 440                 445

Ser Ile Thr Ile Arg Ile Val Leu Gly Phe Thr Leu Leu Ala Leu Ile
    450                 455                 460

Trp Glu Tyr Asp Phe Pro Pro Phe Met Val Leu Ile Ile Ala Ile Leu
465                 470                 475                 480

Asn Asp Gly Thr Ile Met Thr Ile Ser Lys Asp Arg Val Arg Pro Ser
                485                 490                 495

Pro Thr Pro Glu Ser Trp Lys Leu Asn Gln Ile Phe Ala Thr Gly Ile
            500                 505                 510
```

```
Val Ile Gly Thr Tyr Leu Ala Leu Val Thr Val Leu Phe Tyr Trp Ile
        515                 520                 525

Ile Val Ser Thr Thr Phe Phe Glu Lys His Phe His Val Lys Ser Ile
    530                 535                 540

Gly Asn Asn Ser Glu Gln Val Ser Ser Ala Leu Tyr Leu Gln Val Ser
545                 550                 555                 560

Ile Ile Ser Gln Ala Leu Ile Phe Val Thr Arg Ser Arg Ser Trp Ser
                565                 570                 575

Phe Leu Glu Arg Pro Gly Thr Leu Leu Ile Phe Ala Phe Leu Val Ala
            580                 585                 590

Gln Leu Ala Ala Thr Leu Ile Ala Val Tyr Ala Asn Ile Ser Phe Ala
        595                 600                 605

Asn Ile Thr Gly Ile Gly Trp Gly Trp Ala Gly Val Ile Trp Leu Tyr
    610                 615                 620

Ser Leu Ile Phe Tyr Ile Pro Leu Asp Ile Ile Lys Phe Phe Phe His
625                 630                 635                 640

Tyr Ala Leu Ser Gly Asp Ala Trp Asn Leu Val Phe Asp Arg Lys Thr
                645                 650                 655

Ala Phe Thr Asn Lys Lys Asp Tyr Arg Lys Asp Asp Gly Ala Ser Asn
            660                 665                 670

Val Thr Ile Ser Gln Arg Ser His Ser Ala Glu Glu Leu Ser Gly Ser
        675                 680                 685

Arg Ser Arg Ala Ser Trp Ile Ala Glu Gln Thr Arg Arg Arg Ala Glu
    690                 695                 700

Thr Ala Arg Leu Leu Glu Gly His Ser Val Ser Arg His Leu Glu Ser
705                 710                 715                 720

Val Met Lys Leu Lys Gln Ile Asp Pro Lys Met Ile Arg Ala Asp Thr
                725                 730                 735

Val
```

<210> SEQ ID NO 159
<211> LENGTH: 733
<212> TYPE: DNA
<213> ORGANISM: Thlaspi arvense

<400> SEQUENCE: 159

```
atgggaagag ggaagataga gataaagaag atagagaatc agacagcgag gcaagtgacc      60

ttctgcaaga ggagaactgg tcttatcaag aagactaatg agctctctgt tctctgcgat     120

gctcacattg gtctcatcgt cttctcctcc accggaaagc tctcgcagta ctgttccgaa     180

cccctcagga tgcctcagct cattgaccga tacttgaaga cccagtggaa tgcgacttcc     240

tgatcctaat gacggccggg aggaattgta ccaagagatg gaagtactaa aaagagagac     300

atgtaagctt gagcttcgtc tgcgtccata ccatggacat gacttaacct cccttcctcc     360

acacgagctc gatggtctcg agcaacagct cgaacattct gtccttaaag tccgcgagcg     420

taagaatgag ttgatgcagc aacagttgga gaatctaagc agaaagaggc ggatgctaga     480

agaagataac aacaatatgt accgtttgct tcatgagcat cgtaacgcgg ttgaatttca     540

gcaagctggg atagagacga aaccagggga gtatcaacag tttctagagc agcttcagta     600

ctataatgat catcagcaac aaccaaacag tgttcttcag cttgctacgc ttccttctga     660

gattgatcct aattaccatc tccagcttgc tcagcctaat cttcaaaacg atccaacggc     720

caagattgat tag                                                         733
```

<210> SEQ ID NO 160
<211> LENGTH: 80
<212> TYPE: PRT
<213> ORGANISM: Thlaspi arvense

<400> SEQUENCE: 160

Met Gly Arg Gly Lys Ile Glu Ile Lys Lys Ile Glu Asn Gln Thr Ala
1 5 10 15

Arg Gln Val Thr Phe Cys Lys Arg Arg Thr Gly Leu Ile Lys Lys Thr
20 25 30

Asn Glu Leu Ser Val Leu Cys Asp Ala His Ile Gly Leu Ile Val Phe
35 40 45

Ser Ser Thr Gly Lys Leu Ser Gln Tyr Cys Ser Glu Pro Leu Arg Met
50 55 60

Pro Gln Leu Ile Asp Arg Tyr Leu Lys Thr Gln Trp Asn Ala Thr Ser
65 70 75 80

<210> SEQ ID NO 161
<211> LENGTH: 733
<212> TYPE: DNA
<213> ORGANISM: Thlaspi arvense

<400> SEQUENCE: 161
atgggaagag ggaagataga gataaagaag atagagaatc agacagcgag gcaagtgacc 60
ttctgcaaga ggagaactgg tcttatcaag aagactaatg agctctctgt tctctgcgat 120
gctcacattg gtctcatcgt cttctcctcc accggaaagc tctcgcagta ctgttccgaa 180
cccctcagga tgcctcagct cattgaccga tacttgaaga cgcagtggaa tgcgacttcc 240
tgatcctaat gacggccggg aggaattgta ccaagagatg gaagtactaa aaagagagac 300
atgtaagctt gagcttcgtc tgcgtccata ccatggacat gacttaacct cccttcctcc 360
acacgagctc gatggtctcg agcaacagct cgaacattct gtccttaaag tccgcgagcg 420
taagaatgag ttgatgcagc aacagttgga gaatctaagc agaaagaggc ggatgctaga 480
agaagataac aacaatatgt accgtttgct tcatgagcat cgtaacgcgg ttgaatttca 540
gcaagctggg atagagacga aaccagggga gtatcaacag tttctagagc agcttcagta 600
ctataatgat catcagcaac aaccaaacag tgttcttcag cttgctacgc ttccttctga 660
gattgatcct aattaccatc tccagcttgc tcagcctaat cttcaaaacg atccaacggc 720
caagattgat tag 733

<210> SEQ ID NO 162
<211> LENGTH: 80
<212> TYPE: PRT
<213> ORGANISM: Thlaspi arvense

<400> SEQUENCE: 162

Met Gly Arg Gly Lys Ile Glu Ile Lys Lys Ile Glu Asn Gln Thr Ala
1 5 10 15

Arg Gln Val Thr Phe Cys Lys Arg Arg Thr Gly Leu Ile Lys Lys Thr
20 25 30

Asn Glu Leu Ser Val Leu Cys Asp Ala His Ile Gly Leu Ile Val Phe
35 40 45

Ser Ser Thr Gly Lys Leu Ser Gln Tyr Cys Ser Glu Pro Leu Arg Met
50 55 60

Pro Gln Leu Ile Asp Arg Tyr Leu Lys Thr Gln Trp Asn Ala Thr Ser
65 70 75 80

<210> SEQ ID NO 163
<211> LENGTH: 733
<212> TYPE: DNA
<213> ORGANISM: Thlaspi arvense

<400> SEQUENCE: 163
atgggaagag ggaagataga gataaagaag atagagaatc agacagcgag gcaagtgacc 60
ttctgcaaga ggagaactgg tcttatcaag aagactaatg agctctctgt tctctgcgat 120
gctcacattg gtctcatcgt cttctcctcc accggaaagc tctcgcagta ctgttccgaa 180
cccctcagga tgcctcagct cattgaccga tacttgaaga ctcagtggaa tgcgacttcc 240
tgatcctaat gacggccggg aggaattgta ccaagagatg gaagtactaa aaagagagac 300
atgtaagctt gagcttcgtc tgcgtccata ccatggacat gacttaacct cccttcctcc 360
acacgagctc gatggtctcg agcaacagct cgaacattct gtccttaaag tccgcgagcg 420
taagaatgag ttgatgcagc aacagttgga gaatctaagc agaaagaggc ggatgctaga 480
agaagataac aacaatatgt accgtttgct tcatgagcat cgtaacgcgg ttgaatttca 540
gcaagctggg atagagacga aaccagggga gtatcaacag tttctagagc agcttcagta 600
ctataatgat catcagcaac aaccaaacag tgttcttcag cttgctacgc ttccttctga 660
gattgatcct aattaccatc tccagcttgc tcagcctaat cttcaaaacg atccaacggc 720
caagattgat tag 733

<210> SEQ ID NO 164
<211> LENGTH: 80
<212> TYPE: PRT
<213> ORGANISM: Thlaspi arvense

<400> SEQUENCE: 164

Met Gly Arg Gly Lys Ile Glu Ile Lys Lys Ile Glu Asn Gln Thr Ala
1 5 10 15

Arg Gln Val Thr Phe Cys Lys Arg Arg Thr Gly Leu Ile Lys Lys Thr
20 25 30

Asn Glu Leu Ser Val Leu Cys Asp Ala His Ile Gly Leu Ile Val Phe
35 40 45

Ser Ser Thr Gly Lys Leu Ser Gln Tyr Cys Ser Glu Pro Leu Arg Met
50 55 60

Pro Gln Leu Ile Asp Arg Tyr Leu Lys Thr Gln Trp Asn Ala Thr Ser
65 70 75 80

<210> SEQ ID NO 165
<211> LENGTH: 1005
<212> TYPE: DNA
<213> ORGANISM: Thlaspi arvense

<400> SEQUENCE: 165
atggataact cagctccgga ttctttgtcc agatcggaaa ccgccgtcac ctacgattct 60
ccttacccac tctacgccat ggccttctct tccatcggta ctccctccgg ccaccgaatc 120
gccgtcggaa gcttcctcga ggattacaac aaccgcatcg acattctctc cttcgattcc 180
gactccatga cggtgaagcc tctcccgaat ctctccttcg atcatcctta tcctcccaca 240
aagctgatgt tcagccctcc ctccctccgt cgtccctccg ccggcgatct cctccgttta 300
tgggagatca gtgaagattc ctccaccgtc gagcctgtct cggtgctcaa caacagcaag 360
acgagcgagt tctgcgcgcc gttgacctcc ttcgactgga acgacgtcga gccgaaacgc 420

```
ctgggaacct gcagcatcga cacgacctgc acgatttggg acatcgagaa gtgcgtggtg    480

gagacgcagc tcatagcgca cgataaggag gtccacgaca tcgcttgggg agaagctagg    540

gttttcgcgt cggtctccgc cgacggatcc gtcaggatct tcgatctacg cgacaaggag    600

cattccacca tcatctacga gagtcctcag cccgatacgc ctctcctaag actcgcctgg    660

aacaaacaag acctgaggta catggcgacg atcctgatgg attcgaataa ggtcgtgatt    720

ctcgacattc gctcgccgac gatgcctgtc gccgagctcg aacggcacca ggctagcgtc    780

aacgccatag cttgggctcc acagagctgc aaacacatct gctctgctgg tgacgacacg    840

caggctctca tctgggagct cccgactgta gctggaccca acggcattga tccgatgtcg    900

gtttactcag ccggctcgga gataaaccag ttgcagtggt cctcttcaca gcctgattgg    960

attggcatcg ctttcgctaa caaaatgcag ctccttagag tttga                   1005
```

<210> SEQ ID NO 166
<211> LENGTH: 334
<212> TYPE: PRT
<213> ORGANISM: Thlaspi arvense

<400> SEQUENCE: 166

```
Met Asp Asn Ser Ala Pro Asp Ser Leu Ser Arg Ser Glu Thr Ala Val
1               5                   10                  15

Thr Tyr Asp Ser Pro Tyr Pro Leu Tyr Ala Met Ala Phe Ser Ser Ile
            20                  25                  30

Gly Thr Pro Ser Gly His Arg Ile Ala Val Gly Ser Phe Leu Glu Asp
        35                  40                  45

Tyr Asn Asn Arg Ile Asp Ile Leu Ser Phe Asp Ser Asp Ser Met Thr
    50                  55                  60

Val Lys Pro Leu Pro Asn Leu Ser Phe Asp His Pro Tyr Pro Pro Thr
65                  70                  75                  80

Lys Leu Met Phe Ser Pro Pro Ser Leu Arg Arg Pro Ser Ala Gly Asp
                85                  90                  95

Leu Leu Arg Leu Trp Glu Ile Ser Glu Asp Ser Ser Thr Val Glu Pro
            100                 105                 110

Val Ser Val Leu Asn Asn Ser Lys Thr Ser Glu Phe Cys Ala Pro Leu
        115                 120                 125

Thr Ser Phe Asp Trp Asn Asp Val Glu Pro Lys Arg Leu Gly Thr Cys
    130                 135                 140

Ser Ile Asp Thr Thr Cys Thr Ile Trp Asp Ile Glu Lys Cys Val Val
145                 150                 155                 160

Glu Thr Gln Leu Ile Ala His Asp Lys Glu Val His Asp Ile Ala Trp
                165                 170                 175

Gly Glu Ala Arg Val Phe Ala Ser Val Ser Ala Asp Gly Ser Val Arg
            180                 185                 190

Ile Phe Asp Leu Arg Asp Lys Glu His Ser Thr Ile Ile Tyr Glu Ser
        195                 200                 205

Pro Gln Pro Asp Thr Pro Leu Leu Arg Leu Ala Trp Asn Lys Gln Asp
    210                 215                 220

Leu Arg Tyr Met Ala Thr Ile Leu Met Asp Ser Asn Lys Val Val Ile
225                 230                 235                 240

Leu Asp Ile Arg Ser Pro Thr Met Pro Val Ala Glu Leu Glu Arg His
                245                 250                 255

Gln Ala Ser Val Asn Ala Ile Ala Trp Ala Pro Gln Ser Cys Lys His
            260                 265                 270
```

Ile Cys Ser Ala Gly Asp Asp Thr Gln Ala Leu Ile Trp Glu Leu Pro
275 280 285

Thr Val Ala Gly Pro Asn Gly Ile Asp Pro Met Ser Val Tyr Ser Ala
290 295 300

Gly Ser Glu Ile Asn Gln Leu Gln Trp Ser Ser Ser Gln Pro Asp Trp
305 310 315 320

Ile Gly Ile Ala Phe Ala Asn Lys Met Gln Leu Leu Arg Val
325 330

<210> SEQ ID NO 167
<211> LENGTH: 1026
<212> TYPE: DNA
<213> ORGANISM: Thlaspi arvense

<400> SEQUENCE: 167
atggataact cagctccgga ttctttgtcc agatcggaaa ccgccgtcac ctacgattct 60
ccttacccac tctacgccat ggccttctct tccatcggta ctccctccgg ccaccgaatc 120
gccgtcggaa gcttcctcga ggattacaac aaccgcatcg acattctctc cttcgattcc 180
gactccatga cggtgaagcc tctcccgaat ctctccttcg atcatcctta tcctcccaca 240
aagctgatgt tcagccctcc ctccctccgt cgtccctccg ccggcgatct cctcgcttcc 300
ttcggcgatt tcctccgttt atgggagatc agtgaagatt cctccaccgt cgagcctgtc 360
tcggtgctca acaacagcaa gacgagcgag ttctgcgcgc cgttgacctc cttcgactgg 420
aacgacgtcg agccgaaacg cctgggaacc tgcagcatcg acacgacctg cacgatttgg 480
gacatcgaga agtgcgtggt ggagacgcag ctcatagcgc acgataagga ggtccacgac 540
atcgcttggg gagaagctag ggttttcgcg tcggtctccg ccgacggatc cgtcaggatc 600
ttcgatctac gcgacaagga gcattccacc atcatctacg agagtcctca gcccgatacg 660
cctctcctaa gactcgcctg gaacaaacaa gacctgaggt acatggcgac gatcctgatg 720
gattcgaata aggtcgtgat tctcgacatt cgctcgccga cgatgcctgt cgccgagctc 780
gaacggcacc aggctagcgt caacgccata gcttgggctc cacagagctg caaacacatc 840
tgctctgctg gtgacgacac gcaggctctc atctgggagc tcccgactgt agctggaccc 900
aacggcattg atccgatgtc ggtttactca gccggctcgg agataaacca gttgcagtgg 960
tcctcttcac agcctgattg gattggcatc gctttcgcta acaaaatgca gctccttaga 1020
gtttga 1026

<210> SEQ ID NO 168
<211> LENGTH: 341
<212> TYPE: PRT
<213> ORGANISM: Thlaspi arvense

<400> SEQUENCE: 168

Met Asp Asn Ser Ala Pro Asp Ser Leu Ser Arg Ser Glu Thr Ala Val
1 5 10 15

Thr Tyr Asp Ser Pro Tyr Pro Leu Tyr Ala Met Ala Phe Ser Ser Ile
20 25 30

Gly Thr Pro Ser Gly His Arg Ile Ala Val Gly Ser Phe Leu Glu Asp
35 40 45

Tyr Asn Asn Arg Ile Asp Ile Leu Ser Phe Asp Ser Asp Ser Met Thr
50 55 60

Val Lys Pro Leu Pro Asn Leu Ser Phe Asp His Pro Tyr Pro Pro Thr
65 70 75 80

```
Lys Leu Met Phe Ser Pro Pro Ser Leu Arg Arg Pro Ser Ala Gly Asp
                85                  90                  95

Leu Leu Ala Ser Phe Gly Asp Phe Leu Arg Leu Trp Glu Ile Ser Glu
            100                 105                 110

Asp Ser Ser Thr Val Glu Pro Val Ser Val Leu Asn Asn Ser Lys Thr
        115                 120                 125

Ser Glu Phe Cys Ala Pro Leu Thr Ser Phe Asp Trp Asn Asp Val Glu
    130                 135                 140

Pro Lys Arg Leu Gly Thr Cys Ser Ile Asp Thr Thr Cys Thr Ile Trp
145                 150                 155                 160

Asp Ile Glu Lys Cys Val Val Glu Thr Gln Leu Ile Ala His Asp Lys
                165                 170                 175

Glu Val His Asp Ile Ala Trp Gly Glu Ala Arg Val Phe Ala Ser Val
            180                 185                 190

Ser Ala Asp Gly Ser Val Arg Ile Phe Asp Leu Arg Asp Lys Glu His
        195                 200                 205

Ser Thr Ile Ile Tyr Glu Ser Pro Gln Pro Asp Thr Pro Leu Leu Arg
    210                 215                 220

Leu Ala Trp Asn Lys Gln Asp Leu Arg Tyr Met Ala Thr Ile Leu Met
225                 230                 235                 240

Asp Ser Asn Lys Val Val Ile Leu Asp Ile Arg Ser Pro Thr Met Pro
                245                 250                 255

Val Ala Glu Leu Glu Arg His Gln Ala Ser Val Asn Ala Ile Ala Trp
            260                 265                 270

Ala Pro Gln Ser Cys Lys His Ile Cys Ser Ala Gly Asp Asp Thr Gln
        275                 280                 285

Ala Leu Ile Trp Glu Leu Pro Thr Val Ala Gly Pro Asn Gly Ile Asp
    290                 295                 300

Pro Met Ser Val Tyr Ser Ala Gly Ser Glu Ile Asn Gln Leu Gln Trp
305                 310                 315                 320

Ser Ser Ser Gln Pro Asp Trp Ile Gly Ile Ala Phe Ala Asn Lys Met
                325                 330                 335

Gln Leu Leu Arg Val
            340
```

<210> SEQ ID NO 169
<211> LENGTH: 1026
<212> TYPE: DNA
<213> ORGANISM: Thlaspi arvense

<400> SEQUENCE: 169

```
atggataact cagctccgga ttctttgtcc agatcggaaa ccgccgtcac ctacgattct      60

ccttacccac tctacgccat ggccttctct tccatcggta ctccctccgg ccaccgaatc     120

gccgtcggaa gcttcctcga ggattacaac aaccgcatcg acattctctc cttcgattcc     180

gactccatga cggtgaagcc tctcccgaat ctctccttcg atcatcctta tcctcccaca     240

aagctgatgt tcagccctcc ctccctccgt cgtccctccg ccggcgatct cctcgcttcc     300

tccggcgatt tcctccgttt atgggagatc agtgaagatt cctccaccgt cgagcctgtc     360

tcggtgctca acaacagcaa gacgagcgag ttctgcgcgc cgttgacctc cttcgactgg     420

aacgacgtcg agccgaaacg cctgggaacc tgcagcatcg acacgacctg cacgatttgg     480

gacatcgaga agtgcgtggt ggagacgcag ctcatagcgc acgataagga ggtccacgac     540

atcgcttggg aagaagctag ggttttcgcg tcggtctccg ccgacggatc cgtcaggatc     600
```

```
ttcgatctac gcgacaagga gcattccacc atcatctacg agagtcctca gcccgatacg    660

cctctcctaa gactcgcctg gaacaaacaa gacctgaggt acatggcgac gatcctgatg    720

gattcgaata aggtcgtgat tctcgacatt cgctcgccga cgatgcctgt cgccgagctc    780

gaacggcacc aggctagcgt caacgccata gcttgggctc cacagagctg caaacacatc    840

tgctctgctg gtgacgacac gcaggctctc atctgggagc tcccgactgt agctggaccc    900

aacggcattg atccgatgtc ggtttactca gccggctcgg agataaacca gttgcagtgg    960

tcctcttcac agcctgattg gattggcatc gctttcgcta acaaaatgca gctccttaga   1020

gtttga                                                              1026


<210> SEQ ID NO 170
<211> LENGTH: 341
<212> TYPE: PRT
<213> ORGANISM: Thlaspi arvense

<400> SEQUENCE: 170

Met Asp Asn Ser Ala Pro Asp Ser Leu Ser Arg Ser Glu Thr Ala Val
1               5                   10                  15

Thr Tyr Asp Ser Pro Tyr Pro Leu Tyr Ala Met Ala Phe Ser Ser Ile
            20                  25                  30

Gly Thr Pro Ser Gly His Arg Ile Ala Val Gly Ser Phe Leu Glu Asp
        35                  40                  45

Tyr Asn Asn Arg Ile Asp Ile Leu Ser Phe Asp Ser Asp Ser Met Thr
    50                  55                  60

Val Lys Pro Leu Pro Asn Leu Ser Phe Asp His Pro Tyr Pro Pro Thr
65                  70                  75                  80

Lys Leu Met Phe Ser Pro Pro Ser Leu Arg Arg Pro Ser Ala Gly Asp
                85                  90                  95

Leu Leu Ala Ser Ser Gly Asp Phe Leu Arg Leu Trp Glu Ile Ser Glu
            100                 105                 110

Asp Ser Ser Thr Val Glu Pro Val Ser Val Leu Asn Asn Ser Lys Thr
        115                 120                 125

Ser Glu Phe Cys Ala Pro Leu Thr Ser Phe Asp Trp Asn Asp Val Glu
    130                 135                 140

Pro Lys Arg Leu Gly Thr Cys Ser Ile Asp Thr Thr Cys Thr Ile Trp
145                 150                 155                 160

Asp Ile Glu Lys Cys Val Val Glu Thr Gln Leu Ile Ala His Asp Lys
                165                 170                 175

Glu Val His Asp Ile Ala Trp Glu Glu Ala Arg Val Phe Ala Ser Val
            180                 185                 190

Ser Ala Asp Gly Ser Val Arg Ile Phe Asp Leu Arg Asp Lys Glu His
        195                 200                 205

Ser Thr Ile Ile Tyr Glu Ser Pro Gln Pro Asp Thr Pro Leu Leu Arg
    210                 215                 220

Leu Ala Trp Asn Lys Gln Asp Leu Arg Tyr Met Ala Thr Ile Leu Met
225                 230                 235                 240

Asp Ser Asn Lys Val Val Ile Leu Asp Ile Arg Ser Pro Thr Met Pro
                245                 250                 255

Val Ala Glu Leu Glu Arg His Gln Ala Ser Val Asn Ala Ile Ala Trp
            260                 265                 270

Ala Pro Gln Ser Cys Lys His Ile Cys Ser Ala Gly Asp Asp Thr Gln
        275                 280                 285
```

```
Ala Leu Ile Trp Glu Leu Pro Thr Val Ala Gly Pro Asn Gly Ile Asp
    290                 295                 300

Pro Met Ser Val Tyr Ser Ala Gly Ser Glu Ile Asn Gln Leu Gln Trp
305                 310                 315                 320

Ser Ser Ser Gln Pro Asp Trp Ile Gly Ile Ala Phe Ala Asn Lys Met
                325                 330                 335

Gln Leu Leu Arg Val
            340


<210> SEQ ID NO 171
<211> LENGTH: 1917
<212> TYPE: DNA
<213> ORGANISM: Thlaspi arvense

<400> SEQUENCE: 171

atgatggatg gaatggttac tgaacaaaac agaatatctg ttccggagaa tctgaaaaaa     60

cagctcgcag tttcagttcg aagaattcaa tggagttacg caatcttctg gtctatttct    120

gcttctcagc ctggagtgtt agaatgggga gatggatact ataatggaga tatcaaaacg    180

aggaagacga ttctagcatc ggagatcaaa gctgatcagc ttggtttacg aaggagcgag    240

caacttaggg agctttacga gtctctttct gtcgctgaat cttcttcctc cggcgtcgcc    300

gccggatctc aggtcactag acgagcttct gccgccgcac tctcgccgga agatctcgcc    360

gacacagagt ggtactactt ggtttgtatg tctttcgtct tcaacatcgg tgaaggaatg    420

cctggacgaa cgtttgcgaa cagtgaaccg atatggttgt gcaacgctca caccgcagat    480

agtaaagtct ttagccgctc tcttctggca aaaagtgctt cggttgtgac agtgatttgc    540

ttcccgtttc ttggaggagt cgttgagatc ggtactacag aacatatcat agaggacatg    600

aatgtaatac aatgcgtgaa gacatcattc ctcgaagctc cagatccata cgcttcactg    660

ttaccaacaa gatccgatta tcacatcgac aacgttctcg atccgcaaca gatcctaggt    720

gacgagattt acgcgcctat gtttggtact gagacttttc cggcgacttc tcctagcaga    780

actaccagca ggttcgatcc tgaacacgag caagtagcag aagatcatga ctcgttcatg    840

gccgaaggaa tcaatggagg agcttctcag gttcaaagct ggcagttcat ggacgaagag    900

cttagtaact gcgttcacca atcgcttaat tccagtgatt gcgtctctca aacgtttgtt    960

aaagcagcgg ctggacgagt ttcttgcaac gcaagaaaag gaagggctca aaggttaggg   1020

catattcaag agcggcagag aaatgtgaaa atgttgtctt ttgatccaag aaacgatgac   1080

gttcattacc aaagtgtgat ctccacaatt tttaagacca accatcagtt aattctcgga   1140

ccgcagttcc ggaattgcga taagcggtca agcttcacga ggtggaagaa attatcgtca   1200

tcatcatctg gaaccgcgtc aatcgtatca ccgtcacaag gaatgttaaa gaagattctt   1260

ttcgaggttc ctcgagtgca ccagaaagag aagttgttgt tggattcacc agggatcggg   1320

gatgaaacca cgaaccacgc ggttttagag aagaaacggc gtgagaaatt gaacgaacgg   1380

ttcatgatct tgagatcaat cattccatca atcaataaga tcgataaagt atcaattctt   1440

gacgatacga tagagtatct tcaagaactg gaaagacgtg ttcaagaact agaatcttgc   1500

agagaatcaa ccgatacaga aacacgtggg acaatgacag tgaagaggaa gaaatctcac   1560

gacgcagggg aaagaacttc agccaactgc acaaacaatg aaaccggaaa cgggaagaga   1620

gttcaggttg gagaaaccga gccggcagag accgattata ccggtttaac tgataattta   1680

aggatcggtt cgtttggtaa tgaggtcgtt attgagctta gatgtgcttg gagagaagga   1740

gtattgcttg agataatgga tgtcattagt gatctcaact tagattctca ttcggtacaa   1800
```

tcctcgacag gagatggttt actctgctta accgtcaact gcaagcacaa gggttcaaaa 1860
atgacgacaa caggaatgat caaagaggca cttcaaaagg ttgcatggat ctgttga 1917

<210> SEQ ID NO 172
<211> LENGTH: 638
<212> TYPE: PRT
<213> ORGANISM: Thlaspi arvense

<400> SEQUENCE: 172

Met Met Asp Gly Met Val Thr Glu Gln Asn Arg Ile Ser Val Pro Glu
1 5 10 15

Asn Leu Lys Lys Gln Leu Ala Val Ser Val Arg Arg Ile Gln Trp Ser
20 25 30

Tyr Ala Ile Phe Trp Ser Ile Ser Ala Ser Gln Pro Gly Val Leu Glu
35 40 45

Trp Gly Asp Gly Tyr Tyr Asn Gly Asp Ile Lys Thr Arg Lys Thr Ile
50 55 60

Leu Ala Ser Glu Ile Lys Ala Asp Gln Leu Gly Leu Arg Arg Ser Glu
65 70 75 80

Gln Leu Arg Glu Leu Tyr Glu Ser Leu Ser Val Ala Glu Ser Ser Ser
85 90 95

Ser Gly Val Ala Ala Gly Ser Gln Val Thr Arg Arg Ala Ser Ala Ala
100 105 110

Ala Leu Ser Pro Glu Asp Leu Ala Asp Thr Glu Trp Tyr Tyr Leu Val
115 120 125

Cys Met Ser Phe Val Phe Asn Ile Gly Glu Gly Met Pro Gly Arg Thr
130 135 140

Phe Ala Asn Ser Glu Pro Ile Trp Leu Cys Asn Ala His Thr Ala Asp
145 150 155 160

Ser Lys Val Phe Ser Arg Ser Leu Leu Ala Lys Ser Ala Ser Val Val
165 170 175

Thr Val Ile Cys Phe Pro Phe Leu Gly Gly Val Val Glu Ile Gly Thr
180 185 190

Thr Glu His Ile Ile Glu Asp Met Asn Val Ile Gln Cys Val Lys Thr
195 200 205

Ser Phe Leu Glu Ala Pro Asp Pro Tyr Ala Ser Leu Leu Pro Thr Arg
210 215 220

Ser Asp Tyr His Ile Asp Asn Val Leu Asp Pro Gln Gln Ile Leu Gly
225 230 235 240

Asp Glu Ile Tyr Ala Pro Met Phe Gly Thr Glu Thr Phe Pro Ala Thr
245 250 255

Ser Pro Ser Arg Thr Thr Ser Arg Phe Asp Pro Glu His Glu Gln Val
260 265 270

Ala Glu Asp His Asp Ser Phe Met Ala Glu Gly Ile Asn Gly Gly Ala
275 280 285

Ser Gln Val Gln Ser Trp Gln Phe Met Asp Glu Glu Leu Ser Asn Cys
290 295 300

Val His Gln Ser Leu Asn Ser Ser Asp Cys Val Ser Gln Thr Phe Val
305 310 315 320

Lys Ala Ala Ala Gly Arg Val Ser Cys Asn Ala Arg Lys Gly Arg Ala
325 330 335

Gln Arg Leu Gly His Ile Gln Glu Arg Gln Arg Asn Val Lys Met Leu
340 345 350

```
Ser Phe Asp Pro Arg Asn Asp Asp Val His Tyr Gln Ser Val Ile Ser
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asp Asn Leu
545                 550                 555                 560

Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635
```

<210> SEQ ID NO 173
<211> LENGTH: 3577
<212> TYPE: DNA
<213> ORGANISM: Thlaspi arvense

<400> SEQUENCE: 173

```
atgatgtaaa gagttgcagg tttttctttt cttttttgt ttgctataat tttaacccca      60

aaaaaaaaac tcacttttc taaatcagga caaaaatgaa attgatcctt ttgttttctt     120

tttccatttt gtatggtttc atgaaaattt agggatggaa tggttactga acaaaacaga     180

atatctgttc cggagaatct gaaaaaacag ctcgcagttt cagttcgaag aattcaatgg     240

agttacgcaa tcttctggtc tatttctgct tctcagcctg ggtgagtttc ttaatcacta     300

tccttgaaac tgatcagttt tgttattttt gaaggttcaa atctctacta gggggaaaaa     360

aatgaatttc gaattttcat tgctaaagcc tttgtctgaa gctagaagtg cttttggttc     420

tgccttaaaa attattaaaa ctttgataaa aagattactg atttaatttg ggaaattttg     480

atttattctg cttctaagtt ccatcaatga agttcttcaa ctcaagacaa tgttctaagt     540
```

```
cgatttgagt tttaggttga tactgtctta gagattatta gaaattttat aagtggaaat    600
agtgagacct tattagttac aaaaaaaact caaaacaaag attaattatg gttttttttt    660
tcttaaaatt caattttctt ttgtcttttt tttgtgtgtg gataattcgg gccggaaacc    720
gattaatctc agagtgtgca agttcgttgg gttcttgaag ttcttcatta gtttcttact    780
gattcgattc gatttttttgt tttttattgt ttgaaccaaa agagtgttag aatggggaga    840
tggatactat aatggagata tcaaaacgag gaagacgatt ctagcatcgg agatcaaagc    900
tgatcagctt ggtttacgaa ggagcgagca acttagggag ctttacgagt ctctttctgt    960
cgctgaatct tcttcctccg gcgtcgccgc cggatctcag gtcactagac gagcttctgc   1020
cgccgcactc tcgccggaag atctcgccga cacagagtgg tactacttgg tttgtatgtc   1080
tttcgtcttc aacatcggtg aagggtaatt gcgtctattt atctttcggc attgacattt   1140
actatgtgcg tcgtcatgtt cggattgatc ttgtcagtga aataaataaa aaaaagacaa   1200
aataccccttt tattacatgt atgtctggat attagacttt ttggtaaaaa actaaaaagt   1260
tttaactaga aaccaaaaat tattattttc cacaatcgtt tgaaatttct tttttttttc   1320
tttttttttt ggtttggttt ggttcagttt agggtttttt tggattttca gatttttagg   1380
tcctggagaa aagaagtcca agatcggttt ggttaagtca aattttaaaa tgatttggat   1440
aattggtctt ggtttggttt ttaattaaaa attaatcaaa atgaaaatat ataattagat   1500
ttaatcatta ttataaattt tgtaaatgct taatgaaatg aatttcgatt tattcagttc   1560
tgttacacca aatatgcgtt tggttttgct ttttatgcat ggcatttccg tcttttcacg   1620
tatctagcta ttcattcaca gaatgcctgg acgaacgttt gcgaacagtg aaccgatatg   1680
gttgtgcaac gctcacaccg cagatagtaa agtctttagc cgctctcttc tggcaaaagt   1740
tagttgtatt atattgtagt tgctatataa catttctttt tttgcgactg caaacgctta   1800
aattaatcgt tttttttgtg tgtttgtgtg ttttgtgcct gtttagagtg cttcggttgt   1860
gacagtgatt tgcttcccgt ttcttggagg agtcgttgag atcggtacta cagaacatgt   1920
aaggcaaaat ttccattttc tgtcacaatt tgagaatagt tataaaacaa ccactagtta   1980
agtttataac agtgcgaact aattcatcag accgacgaat taaggtataa agttatgata   2040
caaaaagttt aaagacttat cttgttgtgt gttttatccc gtagatcata gaggacatga   2100
atgtaataca atgcgtgaag acatcattcc tcgaagctcc agatccatac gcttcactgt   2160
taccaacaag atccgattat cacatcgaca acgttctcga tccgcaacag atcctaggtg   2220
acgagattta cgcgcctatg tttggtactg agacttttcc ggcgacttct cctagcagaa   2280
ctaccagcag gttcgatcct gaacacgagc aagtagcaga agatcatgac tcgttcatgg   2340
ccgaaggaat caatggagga gcttctcagg ttcaaagctg gcagttcatg gacgaagagc   2400
ttagtaactg cgttcaccaa tcgcttaatt ccagtgattg cgtctctcaa acgtttgtta   2460
aagcagcggc tggacgagtt tcttgcaacg caagaaaagg aagggctcaa aggttagggc   2520
atattcaaga gcggcagaga aatgtgaaaa tgttgtcttt tgatccaaga aacgatgacg   2580
ttcattacca aagtgtgatc tccacaattt ttaagaccaa ccatcagtta attctcggac   2640
cgcagttccg gaattgcgat aagcggtcaa gcttcacgag gtggaagaaa ttatcgtcat   2700
catcatctgg aaccgcgtca atcgtatcac cgtcacaagg aatgttaaag aagattcttt   2760
tcgaggttcc tcgagtgcac cagaaagaga agttgttgtt ggattcacca gggatcgggg   2820
atgaaaccac gaaccacgcg gttttagaga agaaacggcg tgagaaattg aacgaacggt   2880
```

```
tcatgatctt gagatcaatc attccatcaa tcaataaggt atatataacc gaatcttcaa   2940
aaattcaaat tcatattatg taaccagagt taactaattc taggtttgac attttcaata   3000
gatcgataaa gtatcaattc ttgacgatac gatagagtat cttcaagaac tggaaagacg   3060
tgttcaagaa ctagaatctt gcagagaatc aaccgataca gaaacacgtg ggacaatgac   3120
agtgaagagg aagaaatctc acgacgcagg ggaaagaact tcagccaact gcacaaacaa   3180
tgaaaccgga aacgggaaga gagttcaggt tggagaaacc gagccggcag agaccgatta   3240
taccggttta actgataatt taaggatcgg ttcgtttggt aatgaggtcg ttattgagct   3300
tagatgtgct tggagagaag gagtattgct tgagataatg gatgtcatta gtgatctcaa   3360
cttagattct cattcggtac aatcctcgac aggagatggt ttactctgct taaccgtcaa   3420
ctgcaaggta cagcctttaa cctaattttt gcttaaccgg gataaggtta acatggattg   3480
atatattgtg aaatgttggt ttcagcacaa gggttcaaaa atgacgacaa caggaatgat   3540
caaagaggca cttcaaaagg ttgcatggat ctgttga                            3577
```

<210> SEQ ID NO 174
<211> LENGTH: 1917
<212> TYPE: DNA
<213> ORGANISM: Thlaspi arvense

<400> SEQUENCE: 174

```
atgatggatg gaatggttac tgaacaaaac agaatatctg ttccggagaa tctgaaaaaa     60
cagctcgcag tttcagttcg aagaattcaa tggagttacg caatcttctg gtctatttct    120
gcttctcagc ctggagtgtt agaatgggga gatggatact ataatggaga tatcaaaacg    180
aggaagacga ttctagcatc ggagatcaaa gctgatcagc ttggtttacg aaggagcgag    240
caacttagga agctttacga gtctctttct gtcgctgaat cttcttcctc cggcgtcgcc    300
gccggatctc aggtcactag acgagcttct gccgccgcac tctcgccgga agatctcgcc    360
gacacagagt ggtactactt ggtttgtatg tctttcgtct tcaacatcgg tgaaggaatg    420
cctggacgaa cgtttgcgaa cagtgaaccg atatggttgt gcaacgctca caccgcagat    480
agtaaagtct ttagccgctc tcttctggca aaaagtgctt cggttgtgac agtgatttgc    540
ttcccgtttc ttggaggagt cgttgagatc ggtactacag aacatatcat agaggacatg    600
aatgtaatac aatgcgtgaa gacatcattc ctcgaagctc cagatccata cgcttcactg    660
ttaccaacaa gatccgatta tcacatcgac aacgttctcg atccgcaaca gatcctaggt    720
gacgagattt acgcgcctat gtttggtact gagacttttc cggcgacttc tcctagcaga    780
actaccagca ggttcgatcc tgaacacgag caagtagcag aagatcatga ctcgttcatg    840
gccgaaggaa tcaatggagg agcttctcag gttcaaagct ggcagttcat ggacgaagag    900
cttagtaact gcgttcacca atcgcttaat tccagtgatt gcgtctctca aacgtttgtt    960
aaagcagcgg ctggacgagt ttcttgcaac gcaagaaaag gaagggctca aaggttaggg   1020
catattcaag agcggcagag aaatgtgaaa atgttgtctt ttgatccaag aaacgatgac   1080
gttcattacc aaagtgtgat ctccacaatt tttaagacca accatcagtt aattctcgga   1140
ccgcagttcc ggaattgcga taagcggtca agcttcacga ggtggaagaa attatcgtca   1200
tcatcatctg gaaccgcgtc aatcgtatca ccgtcacaag gaatgttaaa gaagattctt   1260
ttcgaggttc ctcgagtgca ccagaaagag aagttgttgt tggattcacc agggatcggg   1320
gatgaaacca cgaaccacgc ggttttagag aagaaacggc gtgagaaatt gaacgaacgg   1380
ttcatgatct tgagatcaat cattccatca atcaataaga tcgataaagt atcaattctt   1440
```

```
gacgatacga tagagtatct tcaagaactg gaaagacgtg ttcaagaact agaatcttgc   1500

agagaatcaa ccgatacaga aacacgtggg acaatgacag tgaagaggaa gaaatctcac   1560

gacgcagggg aaagaacttc agccaactgc acaaacaatg aaaccggaaa cgggaagaga   1620

gttcaggttg gagaaaccga gccggcagag accgattata ccggtttaac tgataattta   1680

aggatcggtt cgtttggtaa tgaggtcgtt attgagctta gatgtgcttg gagagaagga   1740

gtattgcttg agataatgga tgtcattagt gatctcaact tagattctca ttcggtacaa   1800

tcctcgacag gagatggttt actctgctta accgtcaact gcaagcacaa gggttcaaaa   1860

atgacgacaa caggaatgat caaagaggca cttcaaaagg ttgcatggat ctgttga      1917
```

<210> SEQ ID NO 175
<211> LENGTH: 638
<212> TYPE: PRT
<213> ORGANISM: Thlaspi arvense

<400> SEQUENCE: 175

```
Met Met Asp Gly Met Val Thr Glu Gln Asn Arg Ile Ser Val Pro Glu
1               5                   10                  15

Asn Leu Lys Lys Gln Leu Ala Val Ser Val Arg Arg Ile Gln Trp Ser
            20                  25                  30

Tyr Ala Ile Phe Trp Ser Ile Ser Ala Ser Gln Pro Gly Val Leu Glu
        35                  40                  45

Trp Gly Asp Gly Tyr Tyr Asn Gly Asp Ile Lys Thr Arg Lys Thr Ile
    50                  55                  60

Leu Ala Ser Glu Ile Lys Ala Asp Gln Leu Gly Leu Arg Arg Ser Glu
65                  70                  75                  80

Gln Leu Arg Lys Leu Tyr Glu Ser Leu Ser Val Ala Glu Ser Ser Ser
                85                  90                  95

Ser Gly Val Ala Ala Gly Ser Gln Val Thr Arg Arg Ala Ser Ala Ala
            100                 105                 110

Ala Leu Ser Pro Glu Asp Leu Ala Asp Thr Glu Trp Tyr Tyr Leu Val
        115                 120                 125

Cys Met Ser Phe Val Phe Asn Ile Gly Glu Gly Met Pro Gly Arg Thr
    130                 135                 140

Phe Ala Asn Ser Glu Pro Ile Trp Leu Cys Asn Ala His Thr Ala Asp
145                 150                 155                 160

Ser Lys Val Phe Ser Arg Ser Leu Leu Ala Lys Ser Ala Ser Val Val
                165                 170                 175

Thr Val Ile Cys Phe Pro Phe Leu Gly Gly Val Val Glu Ile Gly Thr
            180                 185                 190

Thr Glu His Ile Ile Glu Asp Met Asn Val Ile Gln Cys Val Lys Thr
        195                 200                 205

Ser Phe Leu Glu Ala Pro Asp Pro Tyr Ala Ser Leu Leu Pro Thr Arg
    210                 215                 220

Ser Asp Tyr His Ile Asp Asn Val Leu Asp Pro Gln Gln Ile Leu Gly
225                 230                 235                 240

Asp Glu Ile Tyr Ala Pro Met Phe Gly Thr Glu Thr Phe Pro Ala Thr
                245                 250                 255

Ser Pro Ser Arg Thr Thr Ser Arg Phe Asp Pro Glu His Glu Gln Val
            260                 265                 270

Ala Glu Asp His Asp Ser Phe Met Ala Glu Gly Ile Asn Gly Gly Ala
        275                 280                 285
```

```
Ser Gln Val Gln Ser Trp Gln Phe Met Asp Glu Glu Leu Ser Asn Cys
    290                 295                 300

Val His Gln Ser Leu Asn Ser Ser Asp Cys Val Ser Gln Thr Phe Val
305                 310                 315                 320

Lys Ala Ala Ala Gly Arg Val Ser Cys Asn Ala Arg Lys Gly Arg Ala
                325                 330                 335

Gln Arg Leu Gly His Ile Gln Glu Arg Gln Arg Asn Val Lys Met Leu
            340                 345                 350

Ser Phe Asp Pro Arg Asn Asp Asp Val His Tyr Gln Ser Val Ile Ser
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asp Asn Leu
545                 550                 555                 560

Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635
```

<210> SEQ ID NO 176
<211> LENGTH: 1917
<212> TYPE: DNA
<213> ORGANISM: Thlaspi arvense

<400> SEQUENCE: 176

```
atgatggatg gaatggttac tgaacaaaac agaatatctg ttccggagaa tctgaaaaaa     60

cagctcgcag tttcagttcg aagaattcaa tggagttacg caatcttctg gtctatttct    120

gcttctcagc ctggagtgtt agaatgggga gatggatact ataatggaga tatcaaaacg    180
```

```
aggaagacga ttctagcatc ggagatcaaa gctgatcagc ttggtttacg aaggagcgag    240
caacttaggg agctttacga gtctctttct gtcgctgaat cttcttcctc cggcgtcgcc    300
gccggatctc aggtcactag acgagcttct gccgccgcac tctcgccgga agatctcgcc    360
gacacaaagt ggtactactt ggtttgtatg tctttcgtct tcaacatcgg tgaaggaatg    420
cctggacgaa cgtttgcgaa cagtgaaccg atatggttgt gcaacgctca caccgcagat    480
agtaaagtct ttagccgctc tcttctggca aaaagtgctt cggttgtgac agtgatttgc    540
ttcccgtttc ttggaggagt cgttgagatc ggtactacag aacatatcat agaggacatg    600
aatgtaatac aatgcgtgaa gacatcattc ctcgaagctc cagatccata cgcttcactg    660
ttaccaacaa gatccgatta tcacatcgac aacgttctcg atccgcaaca gatcctaggt    720
gacgagattt acgcgcctat gtttggtact gagacttttc cggcgacttc tcctagcaga    780
actaccagca ggttcgatcc tgaacacgag caagtagcag aagatcatga ctcgttcatg    840
gccgaaggaa tcaatggagg agcttctcag gttcaaagct ggcagttcat ggacgaagag    900
cttagtaact gcgttcacca atcgcttaat tccagtgatt gcgtctctca aacgtttgtt    960
aaagcagcgg ctggacgagt ttcttgcaac gcaagaaaag gaagggctca aaggttaggg   1020
catattcaag agcggcagag aaatgtgaaa atgttgtctt ttgatccaag aaacgatgac   1080
gttcattacc aaagtgtgat ctccacaatt tttaagacca accatcagtt aattctcgga   1140
ccgcagttcc ggaattgcga taagcggtca agcttcacga ggtggaagaa attatcgtca   1200
tcatcatctg gaaccgcgtc aatcgtatca ccgtcacaag gaatgttaaa gaagattctt   1260
ttcgaggttc ctcgagtgca ccagaaagag aagttgttgt tggattcacc agggatcggg   1320
gatgaaacca cgaaccacgc ggttttagag aagaaacggc gtgagaaatt gaacgaacgg   1380
ttcatgatct tgagatcaat cattccatca atcaataaga tcgataaagt atcaattctt   1440
gacgatacga tagagtatct tcaagaactg gaaagacgtg ttcaagaact agaatcttgc   1500
agagaatcaa ccgatacaga aacacgtggg acaatgacag tgaagaggaa gaaatctcac   1560
gacgcagggg aaagaacttc agccaactgc acaaacaatg aaaccggaaa cgggaagaga   1620
gttcaggttg gagaaaccga gccggcagag accgattata ccggtttaac tgataattta   1680
aggatcggtt cgtttggtaa tgaggtcgtt attgagctta gatgtgcttg gagagaagga   1740
gtattgcttg agataatgga tgtcattagt gatctcaact tagattctca ttcggtacaa   1800
tcctcgacag gagatggttt actctgctta accgtcaact gcaagcacaa gggttcaaaa   1860
atgacgacaa caggaatgat caaagaggca cttcaaaagg ttgcatggat ctgttga      1917
```

<210> SEQ ID NO 177
<211> LENGTH: 638
<212> TYPE: PRT
<213> ORGANISM: Thlaspi arvense

<400> SEQUENCE: 177

```
Met Met Asp Gly Met Val Thr Glu Gln Asn Arg Ile Ser Val Pro Glu
1               5                   10                  15

Asn Leu Lys Lys Gln Leu Ala Val Ser Val Arg Arg Ile Gln Trp Ser
            20                  25                  30

Tyr Ala Ile Phe Trp Ser Ile Ser Ala Ser Gln Pro Gly Val Leu Glu
        35                  40                  45

Trp Gly Asp Gly Tyr Tyr Asn Gly Asp Ile Lys Thr Arg Lys Thr Ile
    50                  55                  60
```

-continued

```
Leu Ala Ser Glu Ile Lys Ala Asp Gln Leu Gly Leu Arg Arg Ser Glu
65                  70                  75                  80

Gln Leu Arg Glu Leu Tyr Glu Ser Leu Ser Val Ala Glu Ser Ser Ser
                85                  90                  95

Ser Gly Val Ala Ala Gly Ser Gln Val Thr Arg Arg Ala Ser Ala Ala
            100                 105                 110

Ala Leu Ser Pro Glu Asp Leu Ala Asp Thr Lys Trp Tyr Tyr Leu Val
        115                 120                 125

Cys Met Ser Phe Val Phe Asn Ile Gly Glu Gly Met Pro Gly Arg Thr
    130                 135                 140

Phe Ala Asn Ser Glu Pro Ile Trp Leu Cys Asn Ala His Thr Ala Asp
145                 150                 155                 160

Ser Lys Val Phe Ser Arg Ser Leu Leu Ala Lys Ser Ala Ser Val Val
                165                 170                 175

Thr Val Ile Cys Phe Pro Phe Leu Gly Gly Val Val Glu Ile Gly Thr
            180                 185                 190

Thr Glu His Ile Ile Glu Asp Met Asn Val Ile Gln Cys Val Lys Thr
        195                 200                 205

Ser Phe Leu Glu Ala Pro Asp Pro Tyr Ala Ser Leu Leu Pro Thr Arg
    210                 215                 220

Ser Asp Tyr His Ile Asp Asn Val Leu Asp Pro Gln Gln Ile Leu Gly
225                 230                 235                 240

Asp Glu Ile Tyr Ala Pro Met Phe Gly Thr Glu Thr Phe Pro Ala Thr
                245                 250                 255

Ser Pro Ser Arg Thr Thr Ser Arg Phe Asp Pro Glu His Glu Gln Val
            260                 265                 270

Ala Glu Asp His Asp Ser Phe Met Ala Glu Gly Ile Asn Gly Gly Ala
        275                 280                 285

Ser Gln Val Gln Ser Trp Gln Phe Met Asp Glu Glu Leu Ser Asn Cys
    290                 295                 300

Val His Gln Ser Leu Asn Ser Ser Asp Cys Val Ser Gln Thr Phe Val
305                 310                 315                 320

Lys Ala Ala Ala Gly Arg Val Ser Cys Asn Ala Arg Lys Gly Arg Ala
                325                 330                 335

Gln Arg Leu Gly His Ile Gln Glu Arg Gln Arg Asn Val Lys Met Leu
            340                 345                 350

Ser Phe Asp Pro Arg Asn Asp Asp Val His Tyr Gln Ser Val Ile Ser
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
```

```
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asp Asn Leu
545                 550                 555                 560

Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635


<210> SEQ ID NO 178
<211> LENGTH: 1917
<212> TYPE: DNA
<213> ORGANISM: Thlaspi arvense

<400> SEQUENCE: 178

atgatggatg gaatggttac tgaacaaaac agaatatctg ttccggagaa tctgaaaaaa      60

cagctcgcag tttcagttcg aagaattcaa tggagttacg caatcttctg gtctatttct     120

gcttctcagc ctggagtgtt agaatgggga gatggatact ataatggaga tatcaaaacg     180

aggaagacga ttctagcatc ggagatcaaa gctgatcagc ttggtttacg aaggagcgag     240

caacttaggg agctttacga gtctctttct gtcgctgaat cttcttcctc cggcgtcgcc     300

gccggatctc aggtcactag acgagcttct gccgccgcac tctcgccgga agatctcgcc     360

gacacagagt ggtactactt ggtttgtatg tctttcgtct tcaacatcgg tgaaggaatg     420

cctggacgaa cgtttgcgaa cagtgaaccg atatggttgt gcaacgctca caccgcagat     480

agtaaagtct ttagccgctc tcttctggca aaaagtgctt cggttgtgac agtgatttgc     540

ttcccgtttc ttggaggagt cgttgagatc ggtactacag aacatatcat agaggacatg     600

aatgtaatac aatgcgtgaa gacatcattc ctcgaagctc cagatccata cgcttcactg     660

ttaccaacaa gatccgatta tcacatcgac aacgttctcg atccgcaaca gatcctaggt     720

gacgagattt acgcgcctat gtttggtact gagacttttc cggcgacttc tcctagcaga     780

actaccagca ggttcgatcc tgaacacgag caagtagcag aagatcatga ctcgttcatg     840

gccgaaggaa tcaatggagg agcttctcag gttcaaagct ggcagttcat ggacgaagag     900

cttagtaact gcgttcacca atcgcttaat tccagtgatt gcgtctctca aacgtttgtt     960

aaagcagcgg ctggacgagt ttcttgcaac gcaagaaaag gaagggctca aaggttaggg    1020

catattcaag agcggcagag aaatgtgaaa atgttgtctt ttgatccaag aaacgatgac    1080

gttcattacc aaagtgtgat ctccacaatt tttaagacca accatcagtt aattctcgga    1140

ccgcagttcc ggaattgcga taagcggtca agcttcacga ggtggaagaa attatcgtca    1200

tcatcatctg gaaccgcgtc aatcgtatca ccgtcacaag gaatgttaaa gaagattctt    1260
```

```
ttcgaggttc ctcgagtgca ccagaaagag aagttgttgt tggattcacc agggatcggg   1320

gatgaaacca cgaaccacgc ggttttagag aagaaacggc gtgagaaatt gaacgaacgg   1380

ttcatgatct tgagatcaat cattccatca atcaataaga tcgataaagt atcaattctt   1440

gacgatacga tagagtatct tcaagaactg gaaagacgtg ttcaagaact agaatcttgc   1500

agagaatcaa ccgatacaga aacacgtggg acaatgacag tgaagaggaa gaaatctcac   1560

gacgcagggg aaagaacttc agccaactgc acaaacaatg aaaccggaaa cgggaagaga   1620

gttcaggttg gagaaaccga gccggcagag accgattata ccggtttaac taataattta   1680

aggatcggtt cgtttggtaa tgaggtcgtt attgagctta gatgtgcttg gagagaagga   1740

gtattgcttg agataatgga tgtcattagt gatctcaact tagattctca ttcggtacaa   1800

tcctcgacag gagatggttt actctgctta accgtcaact gcaagcacaa gggttcaaaa   1860

atgacgacaa caggaatgat caaagaggca cttcaaaagg ttgcatggat ctgttga      1917
```

<210> SEQ ID NO 179
<211> LENGTH: 638
<212> TYPE: PRT
<213> ORGANISM: Thlaspi arvense

<400> SEQUENCE: 179

```
Met Met Asp Gly Met Val Thr Glu Gln Asn Arg Ile Ser Val Pro Glu
1               5                   10                  15

Asn Leu Lys Lys Gln Leu Ala Val Ser Val Arg Arg Ile Gln Trp Ser
            20                  25                  30

Tyr Ala Ile Phe Trp Ser Ile Ser Ala Ser Gln Pro Gly Val Leu Glu
        35                  40                  45

Trp Gly Asp Gly Tyr Tyr Asn Gly Asp Ile Lys Thr Arg Lys Thr Ile
    50                  55                  60

Leu Ala Ser Glu Ile Lys Ala Asp Gln Leu Gly Leu Arg Arg Ser Glu
65                  70                  75                  80

Gln Leu Arg Glu Leu Tyr Glu Ser Leu Ser Val Ala Glu Ser Ser Ser
                85                  90                  95

Ser Gly Val Ala Ala Gly Ser Gln Val Thr Arg Arg Ala Ser Ala Ala
            100                 105                 110

Ala Leu Ser Pro Glu Asp Leu Ala Asp Thr Glu Trp Tyr Tyr Leu Val
        115                 120                 125

Cys Met Ser Phe Val Phe Asn Ile Gly Glu Gly Met Pro Gly Arg Thr
    130                 135                 140

Phe Ala Asn Ser Glu Pro Ile Trp Leu Cys Asn Ala His Thr Ala Asp
145                 150                 155                 160

Ser Lys Val Phe Ser Arg Ser Leu Leu Ala Lys Ser Ala Ser Val Val
                165                 170                 175

Thr Val Ile Cys Phe Pro Phe Leu Gly Gly Val Val Glu Ile Gly Thr
            180                 185                 190

Thr Glu His Ile Ile Glu Asp Met Asn Val Ile Gln Cys Val Lys Thr
        195                 200                 205

Ser Phe Leu Glu Ala Pro Asp Pro Tyr Ala Ser Leu Leu Pro Thr Arg
    210                 215                 220

Ser Asp Tyr His Ile Asp Asn Val Leu Asp Pro Gln Gln Ile Leu Gly
225                 230                 235                 240

Asp Glu Ile Tyr Ala Pro Met Phe Gly Thr Glu Thr Phe Pro Ala Thr
                245                 250                 255

Ser Pro Ser Arg Thr Thr Ser Arg Phe Asp Pro Glu His Glu Gln Val
```

```
            260                 265                 270

Ala Glu Asp His Asp Ser Phe Met Ala Glu Gly Ile Asn Gly Gly Ala
        275                 280                 285

Ser Gln Val Gln Ser Trp Gln Phe Met Asp Glu Glu Leu Ser Asn Cys
    290                 295                 300

Val His Gln Ser Leu Asn Ser Ser Asp Cys Val Ser Gln Thr Phe Val
305                 310                 315                 320

Lys Ala Ala Ala Gly Arg Val Ser Cys Asn Ala Arg Lys Gly Arg Ala
                325                 330                 335

Gln Arg Leu Gly His Ile Gln Glu Arg Gln Arg Asn Val Lys Met Leu
            340                 345                 350

Ser Phe Asp Pro Arg Asn Asp Asp Val His Tyr Gln Ser Val Ile Ser
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asn Asn Leu
545                 550                 555                 560

Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635
```

<210> SEQ ID NO 180
<211> LENGTH: 1041
<212> TYPE: DNA
<213> ORGANISM: Thlaspi arvense

<400> SEQUENCE: 180

```
atgacaatct tggatcagac cgttgtaaca accggatcga agaaggcttg tgtcatcggt      60
ggcacaggaa acttagcttc tactctcatc aagcatttgc ttcaaagtgg ctacaaagtt     120
aacactacag ttagagatcc agagaatgag aagaaaatgg ctcacttaag ggtacttcaa     180
gaacttgggg acctcaagat cttcaaggcg gaatttactg atgaagagag tttcgattca     240
ccagtttcgg gctgtgatta cgttttccat gtcgcaacgc ctatcaactt tacatctgaa     300
gatcccgaga aagacatgat caagccaagg atacaaggag tgaccaatgt gttgaaatct     360
tgcttaaaat cgaaatcagt caagcgtgtg atctacactt cttcagctgc tgcggtttcc     420
atcaacaatc tttctggacc tggacttgtg atgaacgaag aaaactggac tgaccttgat     480
tatctcacaa aggagaagcc gtttaactgg ggctacccag tgtcaaagat actagcagaa     540
aaggcagctt gtaaatttgc ggaagagaac aagatcgatc tagttaccgt gattccggca     600
ctcatatccg gaaaatctct cctctcggat cctcctccga gcagctcatt tctctctatg     660
tctttaatca ccgggaatga aatgtatctg aaaggtctca aggaaatgca gaagcaatct     720
ggctccatct cgttcagcca cgtgaaggat ttggctcgtg cccatttgtt tcttgcggag     780
aaagaaactg cgtctggtcg ttacatttgc tgtacttaca acacaagtgt tccggagatt     840
gcagattttc tcaggcagag atatcctaag tacaatgtgc tgtctgaatt cgaagagtgc     900
ttatcaagtg cgaagctgac gctatcttcg gaaaaactca tcaatgaagg ctttcgattc     960
gaatatggga ttaatgagat ctatgatgag atgatagagc acttcgagtc caaaggatta    1020
atcaaagcta aagaatcttg a                                              1041
```

```
<210> SEQ ID NO 181
<211> LENGTH: 346
<212> TYPE: PRT
<213> ORGANISM: Thlaspi arvense

<400> SEQUENCE: 181

Met Thr Ile Leu Asp Gln Thr Val Val Thr Thr Gly Ser Lys Lys Ala
1               5                   10                  15

Cys Val Ile Gly Gly Thr Gly Asn Leu Ala Ser Thr Leu Ile Lys His
            20                  25                  30

Leu Leu Gln Ser Gly Tyr Lys Val Asn Thr Thr Val Arg Asp Pro Glu
        35                  40                  45

Asn Glu Lys Lys Met Ala His Leu Arg Val Leu Gln Glu Leu Gly Asp
    50                  55                  60

Leu Lys Ile Phe Lys Ala Glu Phe Thr Asp Glu Glu Ser Phe Asp Ser
65                  70                  75                  80

Pro Val Ser Gly Cys Asp Tyr Val Phe His Val Ala Thr Pro Ile Asn
                85                  90                  95

Phe Thr Ser Glu Asp Pro Glu Lys Asp Met Ile Lys Pro Arg Ile Gln
            100                 105                 110

Gly Val Thr Asn Val Leu Lys Ser Cys Leu Lys Ser Lys Ser Val Lys
        115                 120                 125

Arg Val Ile Tyr Thr Ser Ser Ala Ala Ala Val Ser Ile Asn Asn Leu
    130                 135                 140

Ser Gly Pro Gly Leu Val Met Asn Glu Glu Asn Trp Thr Asp Leu Asp
145                 150                 155                 160

Tyr Leu Thr Lys Glu Lys Pro Phe Asn Trp Gly Tyr Pro Val Ser Lys
                165                 170                 175

Ile Leu Ala Glu Lys Ala Ala Cys Lys Phe Ala Glu Glu Asn Lys Ile
            180                 185                 190
```

```
Asp Leu Val Thr Val Ile Pro Ala Leu Ile Ser Gly Lys Ser Leu Leu
        195                 200                 205

Ser Asp Pro Pro Pro Ser Ser Ser Phe Leu Ser Met Ser Leu Ile Thr
    210                 215                 220

Gly Asn Glu Met Tyr Leu Lys Gly Leu Lys Glu Met Gln Lys Gln Ser
225                 230                 235                 240

Gly Ser Ile Ser Phe Ser His Val Lys Asp Leu Ala Arg Ala His Leu
                245                 250                 255

Phe Leu Ala Glu Lys Glu Thr Ala Ser Gly Arg Tyr Ile Cys Cys Thr
            260                 265                 270

Tyr Asn Thr Ser Val Pro Glu Ile Ala Asp Phe Leu Arg Gln Arg Tyr
        275                 280                 285

Pro Lys Tyr Asn Val Leu Ser Glu Phe Glu Glu Cys Leu Ser Ser Ala
    290                 295                 300

Lys Leu Thr Leu Ser Ser Glu Lys Leu Ile Asn Glu Gly Phe Arg Phe
305                 310                 315                 320

Glu Tyr Gly Ile Asn Glu Ile Tyr Asp Glu Met Ile Glu His Phe Glu
                325                 330                 335

Ser Lys Gly Leu Ile Lys Ala Lys Glu Ser
            340                 345
```

<210> SEQ ID NO 182
<211> LENGTH: 1188
<212> TYPE: DNA
<213> ORGANISM: Thlaspi arvense

<400> SEQUENCE: 182

```
atggtgatgg gtacacaacc gtcgttggaa gagatcagaa aggcacagag agcggatggc      60
cccgcaggca tcttggggat aggcacggcc aaccctgcga accatgtgat ccaggcagag     120
tatccggact actacttccg catcaccaac agtgagcaca tgactgacct caaggagaag     180
ttcaagcgca tgtgcgacaa gtcgatgata cggaaacggc acatgcacct gacggaggag     240
ttcctgaagg agaatccgga catgtgcgcc tacatggctc cttctcttga tgtgaggcag     300
gacatcgtgg tggtcgaggt ccctaagcta gggaaagagg cggcagtgaa ggccatcaag     360
gagtggggtc agcccaagtc caagatcacc cacgtcgtct tctgcactac atccggagtt     420
gacatgcctg gtgctgacta ccagctcacc aagctcctcg gtcttcgccc ttccgtcaag     480
cgtctcatga tgtaccagca aggttgctac gccggcggca ctgtcctccg actcgccaag     540
gacctcgctg agaataaccg tggtgctcgt gtccttgtcg tctgctccga gatcacagcc     600
gtcaccttcc gtggcccctc tgacacacac ctcgactccc tcgttggtca ggctctcttc     660
agtgacggtg ctgccgcgct cattgttggt gcggaccctg atgcctccgt gggagagaag     720
cctatcttcg agatggtgtc tgctgcacag accatcctcc cagactcgga cggagccata     780
gatggacact tgagggaagt tggctcacc ttccatctcc tcaaggacgt ccctgggctc     840
atctcgaaga acatagagaa gagtctagaa gaagcgttta aaccgctcgg gataagtgac     900
tggaactctc tcttttggat agctcaccct gaaggtcctg cgatcctgga ccaggttgag     960
ttaaagctag gactcaagga agagaagatg agggccacgc gtcacgtgct gagcgagtac    1020
ggaaacatgt cgagcgcgtg cgttctcttc attatggacg agatgaggag gaagtccaag    1080
gaggatggtg tggccacgac aggagaaggg ttggagtggg gtgtcttgtt tggtttcgga    1140
ccaggtctca ccgtagagac agtcgtcttg cacagcgtcc ctgtttga                 1188
```

<210> SEQ ID NO 183
<211> LENGTH: 395
<212> TYPE: PRT
<213> ORGANISM: Thlaspi arvense

<400> SEQUENCE: 183

```
Met Val Met Gly Thr Gln Pro Ser Leu Glu Glu Ile Arg Lys Ala Gln
1               5                   10                  15

Arg Ala Asp Gly Pro Ala Gly Ile Leu Gly Ile Gly Thr Ala Asn Pro
            20                  25                  30

Ala Asn His Val Ile Gln Ala Glu Tyr Pro Asp Tyr Tyr Phe Arg Ile
        35                  40                  45

Thr Asn Ser Glu His Met Thr Asp Leu Lys Glu Lys Phe Lys Arg Met
    50                  55                  60

Cys Asp Lys Ser Met Ile Arg Lys Arg His Met His Leu Thr Glu Glu
65                  70                  75                  80

Phe Leu Lys Glu Asn Pro Asp Met Cys Ala Tyr Met Ala Pro Ser Leu
                85                  90                  95

Asp Val Arg Gln Asp Ile Val Val Val Glu Val Pro Lys Leu Gly Lys
            100                 105                 110

Glu Ala Ala Val Lys Ala Ile Lys Glu Trp Gly Gln Pro Lys Ser Lys
        115                 120                 125

Ile Thr His Val Val Phe Cys Thr Thr Ser Gly Val Asp Met Pro Gly
    130                 135                 140

Ala Asp Tyr Gln Leu Thr Lys Leu Leu Gly Leu Arg Pro Ser Val Lys
145                 150                 155                 160

Arg Leu Met Met Tyr Gln Gln Gly Cys Tyr Ala Gly Gly Thr Val Leu
                165                 170                 175

Arg Leu Ala Lys Asp Leu Ala Glu Asn Asn Arg Gly Ala Arg Val Leu
            180                 185                 190

Val Val Cys Ser Glu Ile Thr Ala Val Thr Phe Arg Gly Pro Ser Asp
        195                 200                 205

Thr His Leu Asp Ser Leu Val Gly Gln Ala Leu Phe Ser Asp Gly Ala
    210                 215                 220

Ala Ala Leu Ile Val Gly Ala Asp Pro Asp Ala Ser Val Gly Glu Lys
225                 230                 235                 240

Pro Ile Phe Glu Met Val Ser Ala Ala Gln Thr Ile Leu Pro Asp Ser
                245                 250                 255

Asp Gly Ala Ile Asp Gly His Leu Arg Glu Val Gly Leu Thr Phe His
            260                 265                 270

Leu Leu Lys Asp Val Pro Gly Leu Ile Ser Lys Asn Ile Glu Lys Ser
        275                 280                 285

Leu Glu Glu Ala Phe Lys Pro Leu Gly Ile Ser Asp Trp Asn Ser Leu
    290                 295                 300

Phe Trp Ile Ala His Pro Glu Gly Pro Ala Ile Leu Asp Gln Val Glu
305                 310                 315                 320

Leu Lys Leu Gly Leu Lys Glu Glu Lys Met Arg Ala Thr Arg His Val
                325                 330                 335

Leu Ser Glu Tyr Gly Asn Met Ser Ser Ala Cys Val Leu Phe Ile Met
            340                 345                 350
```

-continued

```
Asp Glu Met Arg Arg Lys Ser Lys Glu Asp Gly Val Ala Thr Thr Gly
        355                 360                 365

Glu Gly Leu Glu Trp Gly Val Leu Phe Gly Phe Gly Pro Gly Leu Thr
    370                 375                 380

Val Glu Thr Val Val Leu His Ser Val Pro Val
385                 390                 395
```

LOW FIBER PENNYCRESS MEAL, SEEDS, AND METHODS OF MAKING

CROSS-REFERENCE TO RELATED APPLICATIONS

This is a Division of U.S. Non-Provisional patent application Ser. No. 16/893,636, filed Jun. 5, 2020 and now U.S. Pat. No. 11,224,237, which is Division of U.S. Non-Provisional patent application Ser. No. 16/131,633, filed Sep. 14, 2018 and now U.S. Pat. No. 10,709,151, which claims the benefit of U.S. Provisional Patent Application Ser. No. 62/559,122, filed Sep. 15, 2017, all of which are incorporated herein by reference in its entirety.

STATEMENT REGARDING FEDERAL FUNDING

This invention was made with government support under Grant Number 2014-67009-22305 and 2018-67009-27374 awarded by the National Institute of Food and Agriculture, USDA. The government has certain rights in the invention.

INCORPORATION OF SEQUENCE LISTING

The sequence listing contained in the file named "2021_12_10_ULMASOV_P13415US04_ST25.txt" contains 183 sequences, is contemporaneously filed with this specification by electronic submission (using United States Patent Office EFS-Web filing system), and is incorporated herein by reference in its entirety.

BACKGROUND

Different plants have seed contents that make them desirable for feed compositions. Examples are soybean, canola, rapeseed and sunflower. After crushing the seeds and recovering the oil, the resulting meal has a protein content making the meal useful as a feed ingredient for ruminants, monogastrics, poultry, and aquaculture. Nevertheless, there remains a desire for improved plant seeds that can provide additional sources of nutrition to animals.

Field Pennycress *Thlaspi arvense* L. (common names: fanweed, stinkweed, field pennycress), hereafter referred to as Pennycress or pennycress, is a winter cover crop that helps to protect soil from erosion, prevent the loss of farm-field nitrogen into water systems, and retain nutrients and residues to improve soil productivity. While it is well established that cover crops provide agronomic and ecological benefits to agriculture and environment, only 5% of farmers today are using them. One reason is economics—it requires on average ~$30-40/acre to grow a cover crop on the land that is otherwise idle between two seasons of cash crops such as corn and soy. In the last 5 years, it has been recognized that pennycress could be used as a novel cover crop, because in addition to providing cover crop benefits, it is an oilseed with its oil being useful as a biofuel. Extensive testing indicates that it can be interseeded over standing corn in early fall and harvested in spring prior to soybean planting (in appropriate climates). As such, its growth and development requires minimal incremental inputs (e.g., no/minimum tillage, no/low nitrogen, insecticides or herbicides). Pennycress also does not directly compete with existing crops when intercropped for energy production, and the recovered oil and meal can provide an additional source of income for farmers.

Pennycress is a winter annual belonging to the Brassicaceae (mustard) family. It's related to cultivated crops, rapeseed and canola, which are also members of the Brassicaceae family. Pennycress seeds are smaller than canola, but they are also high in oil content. They typically contain 36% oil, which is roughly twice the level found in soybean, and the oil has a very low saturated fat content (~4%). Pennycress represents a clear opportunity for sustainable optimization of agricultural systems. For example, in the US Midwest, ~35M acres that remain idle could be planted with pennycress after a corn crop is harvested and before the next soybean crop is planted. Pennycress can serve as an important winter cover crop working within the no/low-till corn and soybean rotation to guard against soil erosion and improve overall field soil nitrogen and pest management.

Pennycress has an oil content that makes it highly desirable as a biofuel, and potentially as a food oil. Once the oil is obtained from pennycress, either from mechanical expeller pressing or hexane extraction, the resulting meal has a high protein level with a favorable amino acid profile that could provide nutritional benefits to animals. However, studies of pennycress processing have consistently demonstrated that the meal produced has a high level of non-digestible fiber, and as a result, not enough metabolizable energy to be competitive with high-value products like soybean and canola meals as an animal feed.

SUMMARY

Compositions comprising non-defatted pennycress seed meal comprising an acid detergent fiber (ADF) content of 5% to 20% by dry weight are provided herein.

Compositions comprising defatted pennycress seed meal comprising an acid detergent fiber (ADF) content of 7% to 25% by dry weight are provided herein.

Pennycress seed meals comprising an acid detergent fiber (ADF) content of 5% to 20% by dry weight, wherein the seed meal is non-defatted, are provided herein.

Pennycress seed meals comprising an acid detergent fiber (ADF) content of 7% to 25% by dry weight, wherein the seed meal is defatted, are provided herein.

Pennycress seed cakes comprising an acid detergent fiber (ADF) content of 7% to 25% by dry weight are provided herein.

In one embodiment, this disclosure provides a low fiber pennycress meal composition.

Seed lots comprising a population of pennycress seeds that comprise an acid detergent fiber (ADF) content of 5% to 20% by dry weight are provided herein.

Methods of making non-defatted pennycress seed meal comprising an acid detergent fiber (ADF) content of 5% to 20% by dry weight, comprising the step of grinding, macerating, extruding, and/or crushing the aforementioned seed lots, thereby obtaining the non-defatted seed meal, are provided herein.

Methods of making defatted pennycress seed meal comprising an acid detergent fiber (ADF) content of 7% to 25% by dry weight, comprising the step of solvent extracting the, separating the extracted seed meal from the solvent, thereby obtaining the defatted seed meal, are provided herein.

Methods of making pennycress seed cake comprising an acid detergent fiber (ADF) content of 7% to 25% by dry weight, comprising the step of crushing or expelling the seed of any of the aforementioned seed lots, thereby obtaining a seed cake, are provided herein.

Methods of making a pennycress seed lot comprising the steps of: (a) introducing at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof; (b) selecting germplasm that is homozygous for said loss-of-function mutation; and, (c) harvesting seed from the homozygous germplasm, thereby obtaining a seed lot, wherein said seed lot comprises an acid detergent fiber (ADF) content of 5% to 20% by dry weight, are provided herein.

Method of making a pennycress seed lot comprising the steps of: (a) introducing at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof into a pennycress plant genome; (b) selecting a transgenic plant line that comprises said transgene and (c) harvesting seed from the transgenic plant line, thereby obtaining a seed lot, wherein said seed lot comprises an acid detergent fiber (ADF) content of 5% to 20% by dry weight, are provided herein.

In one embodiment, this disclosure provides a method for producing low fiber pennycress seeds and meal. The method comprises genetically modifying pennycress seed (e.g., using gene editing or transgenic approach) to modify expression of one or more genes involved in seed coat development. Genetically altered seed lots with improved composition, such as lower fiber content, increased oil content, and increased protein content, all in comparison to control seed lots that lack the genetic alteration can be obtained by these methods.

BRIEF DESCRIPTION OF THE DRAWINGS

The accompanying drawings, which are incorporated in and form a part of the specification, illustrate the embodiments of the present disclosure and together with the description, serve to explain the principles of the disclosure. In the drawings:

FIG. 1 A, B, C illustrate mutant pennycress seeds with varying seed color. Dark seeds in the center are representative of a wild-type genetic background. The seeds of two pennycress seed isolates (Y1126 and Y1067), along with 7 pennycress M3-generation EMS mutants in the Spring 32 background are shown. All mutant seeds exhibit light-colored seed coats compared to the dark color of typical wild-type pennycress seeds (wild-type Spring 32 seeds shown as an example). Examples of dark and light-colored seed and meal (non-defatted) are also shown. Panel A: Spectrum of seed coat color ranging from dark to light in wild type and mutant pennycress seeds. Panel B: Pennycress meal produced from wild type (Beecher). Panel C: Pennycress meal produced from one of the light-colored seed lines (Y1126).

FIG. 2A, B illustrates pARV8 (SS51_Tt10), *Agrobacterium* CRISPR-Cas9 vector and its gene editing sgRNA cassette, for targeting pennycress homolog of *Transparent testa* 10 (Tt10) gene. Panel A: Plasmid map of pARV8 (SS51_Tt10). Panel B: sgRNA cluster in pARV8, targeting nucleotides 341-360 and 382-401 of SEQ ID NO: 33.

FIG. 5A illustrates a gRNA cassette stuffer, designed for insertion into the AarI-digested plant genome editing vector (such as pARV187 or pARV191) for targeting pennycress Tt1 gene, nucleotides 59-81 and 307-329 of SEQ ID NO: 27; FIG. 5B: gRNA cassette stuffer for targeting pennycress Tt2 gene, nucleotides 177-199 and 240-262 of SEQ ID NO: 1; FIG. 5C: gRNA cassette stuffer for targeting pennycress Tt8 gene, nucleotides 261-283 and 153-175 of SEQ ID NO: 69; FIG. 5D: gRNA cassette stuffer for targeting pennycress Tt8 gene, nucleotides 145-167 and 274-296 of SEQ ID NO: 69; FIG. 5E: gRNA cassette stuffer for targeting pennycress Tt10 gene, nucleotides 304-326 and 415-437 of SEQ ID NO: 33; FIG. 5F: gRNA cassette stuffer for targeting pennycress Tt12 gene, nucleotides 399-421 and 450-472 of SEQ ID NO: 36; FIG. 5G: gRNA cassette stuffer for targeting pennycress Tt15 gene, nucleotides 255-277 and 281-303 of SEQ ID NO: 42.

DETAILED DESCRIPTION

Figure 3:
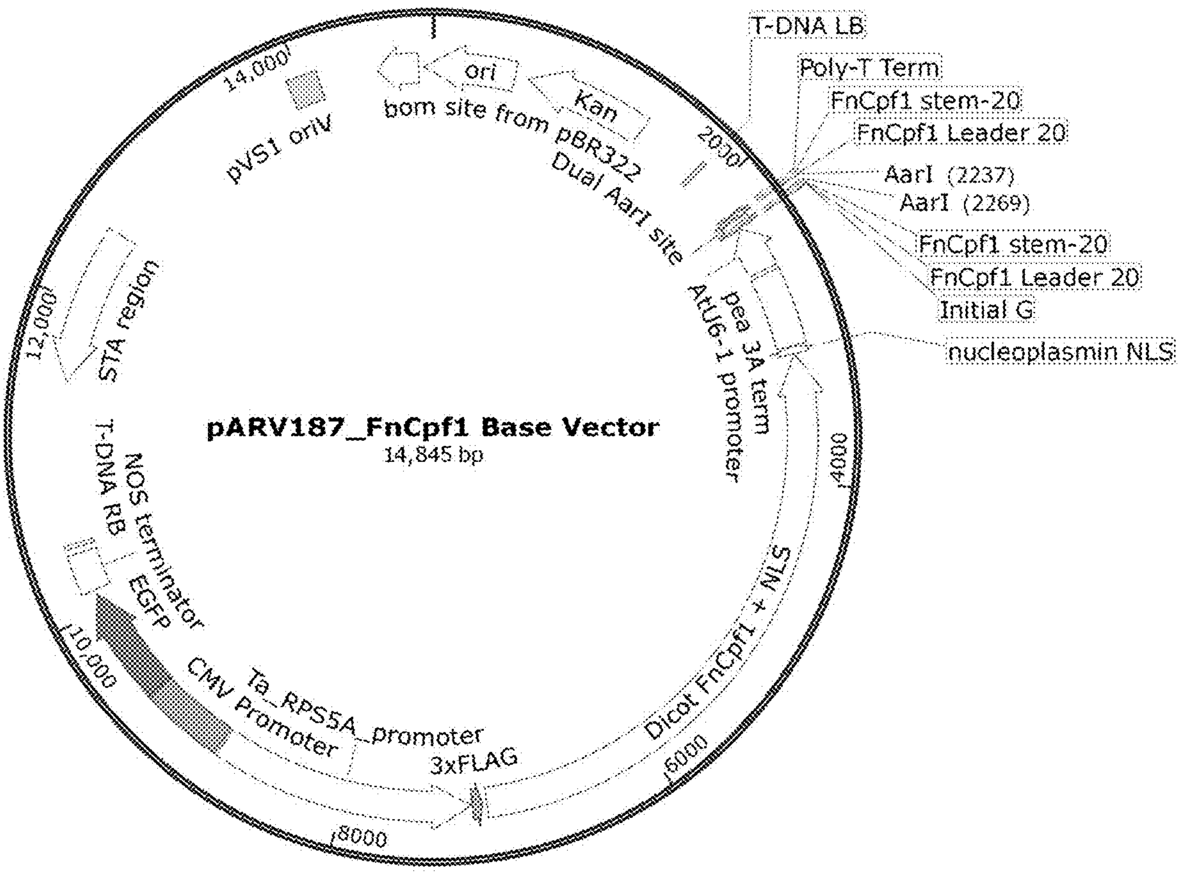
FIG. 3 illustrates pARV187, *Agrobacterium* CRISPR-FnCpf1 base vector for editing plant genome. gRNA cassette stuffers are inserted at the dual AarI site, replacing a small fragment of the vector with synthetic gRNA cassette.

The term "and/or" where used herein is to be taken as specific disclosure of each of the two specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the terms "include," "includes," and "including" are to be construed as at least having the features to which they refer while not excluding any additional unspecified features.

Where a term is provided in the singular, other embodiments described by the plural of that term are also provided.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

Pennycress has value in both its oil and the resulting meal following the removal of oil. The meal is used for animal feed and is typically valued for its energy, protein and sometimes fiber. Fiber is usually delivered by forage elements (not protein supplements) and only a modest amount is desired. Fiber is measured by multiple measures including Crude Fiber (CF), Acid detergent Fiber (ADF) and Neutral detergent fiber (NDF). ADF is a useful determinant in estimating the energy available to animals. In certain embodiments, ADF can be measured gravimetrically using Association of Official Analytical Chemists (AOAC) Official Method 973.18 (1996): "Fiber (Acid Detergent) and Lignin in Animal Feed". In certain embodiments, modifications of this method can include use of Sea Sand for filter aid as needed. NDF can be determined as disclosed in JAOAC 56, 1352-1356, 1973. In certain embodiments, fiber (ADF and/or NDF), protein, and/or oil content can be determined by Near-infrared (NIR) spectroscopy.

Defatted-pennycress seed meal having less fiber than defatted control pennycress seed meal obtained from wild type pennycress seed is provided herein. In certain embodiments, the ADF content of defatted pennycress seed meal and compositions comprising the same that are provided herein is reduced from about 1.25-, 1.5-, 2-, or 3-fold to about 4-, 5-, 6-, or 7-fold in comparison to control defatted pennycress seed meal and compositions comprising the same obtained from control wild-type pennycress seeds. Typically, the level of acid detergent fiber (ADF) in wild-type pennycress seed varies from about 25 to about 31% by dry weight. Defatted-pennycress meal is a product obtained from high-pressure crushing of seed, via mechanical pressing and/or expanding/extrusion, followed by a solvent extraction process, which removes oil from the whole seed. Solvents used in such extractions include, but are not limited to, hexane or mixed hexanes. The meal is the material that remains after most of the oil has been removed. During a typical oilseed processing procedure, extraction of the oil leads to concentration of fiber as a result of oil mass removal. The typical range of ADF in meal made from wild-type pennycress seed is 35-45%. To be useful as a high protein animal feed, and competitive with other protein feedstuffs, the level of ADF level in meal should be less than 20% by dry weight, less than 15% by dry weight, or less than 10% by dry weight of the meal. In certain embodiments, defatted pennycress seed meal having an ADF content of less than 25% by dry weight, less than 20% by dry weight, less than 15% by dry weight, less than 10% by dry weight, or less than 7% by dry weight of meal is provided herein. In certain embodiments, defatted pennycress seed meal having an ADF content of about 5%, 8%, or 10% to 15%, 18%, 20%, or 25% by dry weight is provided herein. Compositions comprising such defatted pennycress seed meal are also provided herein.

Non-defatted pennycress seed meal having less fiber than non-defatted control pennycress seed meal obtained from wild type pennycress seed is provided herein. In certain embodiments, the ADF content of non-defatted pennycress seed meal and compositions comprising the same that are provided herein is reduced from about 1.25-, 1.5-, 2-, or 3-fold to about 4-, 5-, 6-, or 7-fold in comparison to control non-defatted pennycress seed meal and compositions comprising the same obtained from control wild-type pennycress seeds. In certain embodiments, the non-defatted pennycress seed meal is obtained from pennycress seeds that have been crushed, ground, macerated, expelled, extruded, expanded, or any combination thereof. Typically, the level of acid detergent fiber (ADF) in wild-type pennycress seed and non-defatted seed meal obtained therefrom varies from about 20% to about 38% by dry weight. To be useful as a high protein animal feed, and competitive with other protein feedstuffs, the level of ADF level in non-defatted meal should be less than 20% by dry weight, less than 15% by dry weight, or less than 10% by dry weight of the meal. In certain embodiments, non-defatted pennycress seed meal having an ADF content of less than 20% by dry weight, less than 15% by dry weight, less than 10% by dry weight, or less than 7% by dry weight of the meal is provided herein. In certain embodiments, non-defatted pennycress seed meal having an ADF content of about 5%, 8%, or 10% to 15%, 18%, or 20% by dry weight is provided herein. Compositions comprising such non-defatted pennycress seed meal are also provided herein.

In certain embodiments, pennycress seed lots comprising a population of seed having reduced fiber content, reduced fiber content and increased protein content, reduced fiber content and increased oil content, or reduced fiber content and increased protein and oil content, all in comparison to fiber, protein, and oil content of the control seed lots of wild-type pennycress seed, are provided. In certain embodiments, the seed lots will comprise loss-of-function (LOF) mutations in one or more genes, coding sequences, and/or proteins that result in reduced fiber content, reduced fiber content and increased protein content, reduced fiber content and increased oil content, or reduced fiber content, increased protein, and increased oil content. Such LOF mutations include, but are not limited to, INDELS (insertions, deletions, and/or substitutions or any combination thereof), translocations, inversions, duplications, or any combination thereof in a promoter, a 5' untranslated region, coding region, an intron of a gene, and/or a 3' UTR of a gene. Such Indels can introduce one or more mutations including, but not limited to, frameshift mutations, missense mutations, pre-mature translation termination codons, splice donor and/or acceptor mutations, regulatory mutations, and the like that result in an LOF mutation. In certain embodiments, the LOF mutation will result in: (a) a reduction in the enzymatic or other biochemical activity associated with the encoded polypeptide in the plant comprising the LOF mutation in comparison to a wild-type control plant; or (b) both a reduction in the enzymatic or other biochemical activity and a reduction in the amount of a transcript (e.g., mRNA) in the plant comprising the LOF mutation in comparison to a wild-type control plant. Such reductions in activity or activity and transcript levels can, in certain embodiments, comprise a reduction of at least 50%, 60%, 70%, 75%, 80%, 85%, 90%, 95%, 98%, 99%, or 100% of activity or activity and transcript levels in the LOF mutant in comparison to the activity or transcript levels in a wild-type control plant. In certain embodiments, reductions in activity, specific activity, and/or transcript levels are provided by at least one LOF mutation in an endogenous wild-type pennycress gene, promoter, terminator, or protein set forth in Table 1. In certain embodiments, such aforementioned reductions in activity, specific activity and/or transcript levels are provided by at least one LOF mutation in an endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, allelic variants thereof, or any combination thereof. In certain embodiments, such aforementioned reductions in activity, specific activity, and/or transcript levels are provided by at least one LOF mutation in an endogenous wild-type pennycress gene, promoter, or terminator comprising a polynucleotide sequence selected from the group consisting of SEQ ID NO: 69, 71, 75, 77, 87, 88, allelic variants thereof, or any combination thereof. In certain embodiments, any of the aforementioned allelic variants of endogenous wild-type pennycress genes can have at least 80, at least 85, at least 90, at least 95, at least 98, or at least 99 percent sequence identity to SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, or 173. In certain embodiments, such aforementioned reductions in activity, specific activity, and/or transcript levels are provided by at least one LOF mutation in an endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, allelic variants thereof, or any combination thereof. In certain embodiments, such aforementioned reductions in activity or activity and transcript levels are provided by at least one LOF mutation in an endogenous wild-type pennycress gene encoding a polypeptide selected from the group consisting of SEQ ID NO: 70, 76, allelic variants thereof, or any combination thereof. In certain embodiments, an endogenous wild-type pennycress gene can encode a polypeptide allelic variant having at least 80, at least 85, at least 90, at least 95, at least 98, or at least 99 percent sequence identity to SEQ ID NO:2, 7, 10, 13, 16, 19, 22, 25, 28, 31, 34, 37, 40, 43, 46, 49, 52, 55, 58, 61, 64, 67, 70, 73, 76, 79, or 172. In certain embodiments, an endogenous wild-type pennycress gene can encode a polypeptide allelic variant having one or more (e.g., 2, 3, 4, 5, 6, 7, 8, 9, or 10) amino acid modifications (e.g., substitutions) relative to SEQ ID NO:2, 7, 10, 13, 16, 19, 22, 25, 28, 31, 34, 37, 40, 43, 46, 49, 52, 55, 58, 61, 64, 67, 70, 73, 76, 79, or 172. In certain embodiments, the seed lots will comprise one or more transgenes that suppress expression of one or more genes, coding sequences, and/or proteins, thus resulting in reduced fiber content, reduced fiber content and increased protein content, reduced fiber content and increased oil content, or reduced fiber content, increased protein content, and increased oil content, all in comparison to control or wild-type pennycress seed lots. Transgenes that can provide for such suppression include, but are not limited to, transgenes that produce artificial miRNAs targeting a given gene or gene transcript for suppression. In certain embodiments, the transgenes that suppress expression will result in: (a) a reduction in the enzymatic or other biochemical activity associated with the encoded polypeptide in the plant comprising the transgene in comparison to a wild-type control plant; or (b) both a reduction in the enzymatic or other biochemical activity and a reduction in the amount of a transcript (e.g., mRNA) in the plant comprising the transgene in comparison to a wild-type control plant. Such reductions in activity and transcript levels can in certain embodiments comprise a reduction of at least 50%, 60%, 70%, 75%, 80%, 85%, 90%, 95%, 98%, 99%, or 100% of activity and/or transcript levels in the transgenic plant in comparison to the activity or transcript levels in a wild-type control plant. In certain embodiments, certain genes, coding sequences, and/or proteins that can be targeted for introduction of LOF mutations or that are targeted for transgene-mediated suppression are provided in the following Table 1 and accompanying Sequence Listing. In certain embodiments, allelic variants of the wild-type genes, coding sequences, and/or proteins provided in Table 1 and the sequence listing are targeted for introduction of LOF mutations or are targeted for transgene-mediated suppression. Allelic variants found in distinct pennycress isolates or varieties that exhibit wild-type seed fiber, protein, and or oil content can be targeted for introduction of LOF mutations or are targeted for transgene-mediated suppression to obtain seed lots having reduced fiber content, reduced fiber content and increased protein content, reduced fiber content and increased oil content, or reduced fiber content, increased protein, and increased oil content, all in comparison to fiber, protein, and oil content of the control seed lots of wild-type pennycress. Such allelic variants can comprise polynucleotide sequences that have at least 80%, 85%, 90%, 95%, 96%, 97%, 98%, or 99% sequence identity across the entire length of the polynucleotide sequences of the wild-type coding regions or wild-type genes of Table 1 and the sequence listing. Such allelic variants can comprise polypeptide sequences that have at least 80%, 85%, 90%, 95%, 96%, 97%, 98%, or 99% sequence identity across the entire length of the polypeptide sequences of the wild-type proteins of Table 1 and the sequence listing. Pennycress seed lots having reduced seed coat fiber, lighter-colored seed coat due to reduced proanthocyanidins content, increased protein content, and/or higher seed oil content as described herein can comprise one or more LOF mutations in one or more genes that encode polypeptides involved in seed coat and embryo formation or can comprise transgenes that suppress expression of those genes. Polypeptides affecting these traits include, without limitation, TRANSPARENT TESTA1 (TT1) through TRANSPARENT TESTA19 (TT19) (e.g., TT1, TT2, TT3, TT4, TT5, TT6, TT7, TT8, TT9, TT10, TT12, TT13, TT15, TT16, TT18, and TT19), TRANSPARENT TESTA GLABRA1 and 2 (TTG1 and TTG2), GLABROUS 2 (GL2), GLABROUS 3 (GL3), ANR-BAN, and AUTOINHIBITED H+-ATPASE 10 (AHA10) disclosed in Table 1. In certain embodiments, pennycress seed lots provided herein can comprise LOF mutations in any of the aforementioned wild-type pennycress genes disclosed in Table 1 or any combination of mutations disclosed in Table 1. Compositions comprising defatted or non-defatted seed meal obtained from any of the aforementioned seed lots, defatted or non-defatted seed meal obtained from any of the aforementioned seed lots, and seed cakes obtained from any of the aforementioned seed lots are also provided herein. Methods of making any of the aforementioned seed lots, compositions, seed meals, or seed cakes are also provided herein. As used herein, the phrase “seed cake” refers to the material obtained after the seeds are crushed, ground, heated, and expeller pressed or extruded/expanded prior to solvent extraction.

In certain embodiments, reductions or increases in various features of seed lots, seed meal compositions, seed meal, or seed cake are in comparison to a control or wild-type seed lots, seed meal compositions, seed meal, or seed cake. Such controls include, but are not limited to, seed lots, seed meal compositions, seed meal, or seed cake obtained from control plants that lack the LOF mutations or transgene-mediated gene suppression. In certain embodiments, control plants that lack the LOF mutations or transgene-mediated gene suppression will be otherwise isogenic to the plants that contain the LOF mutations or transgene-mediated gene suppression.

In certain embodiments, the controls will comprise seed lots, seed meal compositions, seed meal, or seed cake obtained from plants that lack the LOF mutations or transgene-mediated gene suppression and that were grown in parallel with the plants having the LOF mutations or transgene-mediated gene suppression. Such features that can be compared to wild-type or control plants include, but are not limited to, ADF content, NDF fiber content, protein content, oil content, protein activity and/or transcript levels, and the like.

TABLE 1

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 1 | TT2 CDS | WT Coding region | R2R3 MYB domain transcription factor, a key determinant in proanthocyanidin accumulation | MYB123, TRANSPARENT TESTA 2 (TT2) |
| 2 | TT2 ORF | WT Protein | | |
| 3 | TT2 Ta locus | WT Gene | | |
| 4 | TT2 CDS-Mut | Mutant Coding region | Modified TT2 gene isolated from an EMS-mutagenized population, GAACCATTG<u>G</u>AACTCAAAC (nt 321-339 of SEQ ID NO: 1) → GAACCATTG<u>A</u>AACTCAAAC (nt 321-339 of SEQ ID NO: 4) | tt2-1, tt2-2, BC38, E5-547 |
| 5 | TT2 Mut P1 | Mutant Protein | Truncated protein, due to Trp (W) codon -> Stop mutation | |
| 6 | ATS-KAN4 CDS | WT Coding region | Member of the KANADI family of transcription factors, involved in integument formation during ovule development and expressed at the boundary between the inner and outer integuments. Essential for directing laminar growth of the inner integument | ABERRANT TESTA SHAPE, ATS, KAN4, KANADI 4 |
| 7 | ATS-KAN4 ORF | WT Protein | | |
| 8 | ATS-KAN4 Ta locus | WT Gene | | |
| 9 | BAN-ANR CDS | WT Coding region | Negative regulator of flavonoid biosynthesis, putative oxidoreductase. Mutants accumulate flavonoid pigments in seed coat. Putative ternary complex composed of TT2, TT8 and TTG1 is believed to be required for correct expression of BAN in seed endothelium | BAN, BANYULS, NAD(P)-binding Rossmann-fold superfamily protein |
| 10 | BAN-ANR ORF | WT Protein | | |
| 11 | BAN-ANR Ta locus | WT Gene | | |
| 12 | DTX35 CDS | WT Coding region | Encodes a multidrug and toxin efflux family transporter. Involved in flavonoid metabolism, affecting root growth, seed development and germination, pollen development, release and viability | Detoxifying Efflux Carrier 35, FFT, FLOWER FLAVONOID TRANSPORTER |
| 13 | DTX35 ORF | WT Protein | | |
| 14 | DTX35 Ta locus | WT Gene | | |
| 15 | GL2 CDS | WT Coding region | Glabra 2, a homeodomain protein affects epidermal cell identity including trichomes, root hairs, and seed coat. Abundantly expressed during early seed development and in atrichoblasts. Directly regulated by WER | Glabra 2, HD-ZIP IV homeobox-leucine zipper protein with lipid-binding START domain |
| 16 | GL2 ORF | WT Protein | | |
| 17 | GL2 Ta locus | WT Gene | | |
| 18 | MUM4_like 1 CDS | WT Coding region | Encodes a putative NDP-L-rhamnose synthase, an enzyme required for the synthesis of the pectin rhamnogalacturonan I, major component of plant mucilage. Involved in seed coat mucilage cell development. Required for complete mucilage synthesis, cytoplasmic rearrangement and seed coat development | MUCILAGE-MODIFIED 4, RHAMNOSE BIOSYNTHESIS 2, RHM2, ATRHM2 |
| 19 | MUM4_like 1 ORF | WT Protein | | |
| 20 | MUM4_like 1 Ta locus | WT Gene | | |
| 21 | MUM4_like 2 CDS | WT Coding region | | |
| 22 | MUM4_like 2 ORF | WT Protein | | |
| 23 | MUM4_like 2 Ta locus | WT Gene | | |
| 24 | MYB61 CDS | WT Coding region | Putative transcription factor. Mutants are deficient in mucilage extrusion from the seeds during imbibition, | MYB DOMAIN PROTEIN 61, ATMYB61 |
| 25 | MYB61 ORF | WT Protein | | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 26 | MYB61 Ta locus | WT Gene | resulting in reduced deposition of mucilage during development of the seed coat epidermis in myb61 mutants | |
| 27 | TT1_like1 CDS | WT Coding region | Encodes a zinc finger protein; involved in photomorphogenesis, flavonoid biosynthesis, flower and seed development | WIP DOMAIN PROTEIN 1, WIP1 |
| 28 | TT1_like1 ORF | WT Protein | | |
| 29 | TT1_like1 Ta locus | WT Gene | | |
| 30 | TT1_like2 CDS | WT Coding region | | |
| 31 | TT1_like2 ORF | WT Protein | | |
| 32 | TT1_like2 Ta locus | WT Gene | | |
| 33 | TT10 CDS | WT Coding region | Protein similar to laccase-like polyphenol oxidases, with conserved copper binding domains. Involved in lignin and flavonoids biosynthesis. Expressed in developing testa, colocalizing with flavonoid end products proanthocyanidins and flavonols. Mutants exhibit delay in developmentally determined browning of the testa, characterized by the pale brown color of seed coat | ATLAC15, ATTT10, LAC15 (LACCASE-LIKE 15), TRANSPARENT TESTA 10 (TT10) |
| 34 | TT10 ORF | WT Protein | | |
| 35 | TT10 Ta locus | WT Gene | | |
| 36 | TT12 CDS | WT Coding region | Proton antiporter, involved in the transportation of proanthocyanidin precursors into the vacuole. Loss-of-function mutation has strong reduction of proanthocyanidin deposition in vacuoles and reduced dormancy. Expressed in the endothelium of ovules and in developing seeds | TRANSPARENT TESTA 12 (TT12), ATTT12, MATE efflux family protein |
| 37 | TT12 ORF | WT Protein | | |
| 38 | TT12 Ta locus | WT Gene | | |
| 39 | TT13 CDS | WT Coding region | Proton pump from the $H^+$-ATPase family, involved in proanthocyanidin biosynthesis. Mutations disturb vacuolar biogenesis and acidification process. The acidification of the vacuole provides energy for import of proanthocyanidins into the vacuole | AHA10 (AUTOINHIBITED H(+)-ATPASE ISOFORM 10), TRANSPARENT TESTA 13 (TT13) |
| 40 | TT13 ORF | WT Protein | | |
| 41 | TT13 Ta locus | WT Gene | | |
| 42 | TT15 CDS | WT Coding region | Encodes a UDP-glucose:sterol-glucosyltransferase. Mutants produce pale greenish-brown seeds with slightly reduced dormancy | TRANSPARENT TESTA 15 (TT15), TRANSPARENT TESTA GLABROUS 15 (TTG15), UGT80B1, UDP-Glycosyltransferase superfamily protein |
| 43 | TT15 ORF | WT Protein | | |
| 44 | TT15 Ta locus | WT Gene | | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 45<br>46<br>47 | TT16 CDS<br>TT16 ORF<br>TT16 Ta locus | WT Coding region<br>WT Protein<br>WT Gene | MADS-box protein regulating proanthocyanidin biosynthesis and cell shape in the inner-most cell layer of the seed coat. Required for determining the identity of the endothelial layer within the ovule. Paralogous to GOA. Plays a maternal role in fertilization and seed development | ABS, AGAMOUS-LIKE 32 (AGL32), ARABIDOPSIS BSISTER, TRANSPARENT TESTA16 (TT16) |
| 48<br>49<br>50 | TT18 CDS<br>TT18 ORF<br>TT18 Ta locus | WT Coding region<br>WT Protein<br>WT Gene | Encodes leucoanthocyanidin dioxygenase, which is involved in proanthocyanin biosynthesis. Mutant analysis suggests that this gene is also involved in vacuole formation | ANS, ANTHOCYANIDIN SYNTHASE, LDOX, LEUCOANTHOCYANIDIN DIOXYGENASE, TANNIN DEFICIENT SEED 4 (TDS4), TT18 |
| 51<br>52<br>53 | TT19 CDS<br>TT19 ORF<br>TT19 Ta locus | WT Coding region<br>WT Protein<br>WT Gene | Encodes glutathione transferase belonging to the phi class of GSTs. Mutants display no pigments in the leaves or stems. Likely to function as a carrier to transport anthocyanin from the cytosol to tonoplasts | GLUTATHIONE S-TRANSFERASE PHI 12, ATGSTF12,GLUTATHIONE S-TRANSFERASE 26 (GST26), GLUTATHIONE S-TRANSFERASE PHI 12, GSTF12, TRANSPARENT TESTA 19 (TT19) |
| 54<br>55<br>56 | TT3 CDS<br>TT3 ORF<br>TT3 Ta locus | WT Coding region<br>WT Protein<br>WT Gene | Dihydroflavonol reductase. Catalyzes conversion of dihydroquercetin to leucocyanidin in the biosynthesis of anthocyanins | DFR, DIHYDROFLAVONOL 4-REDUCTASE, M318, TRANSPARENT TESTA 3, (TT3) |
| 57<br>58<br>59 | TT4 CDS<br>TT4 ORF<br>TT4 Ta locus | WT Coding region<br>WT Protein<br>WT Gene | Encodes chalcone synthase (CHS), a key enzyme in biosynthesis of flavonoids. Required for accumulation of purple anthocyanins in leaves, stems and seed coat. Also involved in regulation of auxin transport and root gravitropism | ATCHS, CHALCONE SYNTHASE, CHS, TRANSPARENT TESTA 4 (TT4) |
| 60<br>61<br>62 | TT5 CDS<br>TT5 ORF<br>TT5 Ta locus | WT Coding region<br>WT Protein<br>WT Gene | Another key enzyme in biosynthesis of flavonoids. Catalyzes the conversion of chalcones into flavanones. Required for the accumulation of purple anthocyanins leaves, stems and seed coat. Co-expressed with CHS | A11, ATCHI, CFI, CHALCONE FLAVANONE ISOMERASE, CHALCONE ISOMERASE, CHI, TRANSPARENT TESTA 5 (TT5) |
| 63<br>64<br>65 | TT6 CDS<br>TT6 ORF<br>TT6 Ta locus | WT Coding region<br>WT Protein<br>WT Gene | Encodes flavanone 3-hydroxylase, regulating flavonoid biosynthesis. Coordinately expressed with chalcone synthase and chalcone isomerases | F3'H, F3H, FLAVANONE 3-HYDROXYLASE, TRANSPARENT TESTA 6 (TT6) |
| 66<br>67<br>68 | TT7 CDS<br>TT7 ORF<br>TT7 Ta locus | WT Coding region<br>WT Protein<br>WT Gene | Required for flavonoid 3'-hydroxylase activity. Enzyme abundance relative to CHS determines Quercetin/Kaempferol metabolite ratio | F3'H CYP75B1, CYTOCHROME P450 75B1, D501, TRANSPARENT TESTA 7 (TT7) |
| 69<br>70<br>71 | TT8 CDS<br>TT8 ORF<br>TT8 Ta locus | WT Coding region<br>WT Protein<br>WT Gene | TT8 is a transcription factor acting in concert with TT1, PAP1 and TTG1 on regulation of flavonoid pathways, namely proanthocyanidin and anthocyanin biosynthesis. Affects | ATTT8, BHLH42, TRANSPARENT TESTA 8, (TT8) |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| | | | dihydroflavonol 4-reductase gene expression. It is believed that a ternary complex composed of TT2, TT8 and TTG1 is required for correct expression of BAN in seed endothelium. Interacts with JAZ proteins to regulate anthocyanin accumulation | |
| 72<br>73<br>74 | TT9 CDS<br>TT9 ORF<br>TT9 Ta locus | WT Coding region<br>WT Protein<br>WT Gene | Encodes a peripheral membrane protein localized at the Golgi apparatus. Involved in membrane trafficking, vacuole development and in flavonoid accumulation in the seed coat. Mutant seed color is pale brown | GFS9, GREEN FLUORESCENT SEED 9, TRANSPARENT TESTA 9, TT9 CLEC16A-like protein |
| 75<br>76<br>77 | TTG1 CDS<br>TTG1 ORF<br>TTG1 Ta locus | WT Coding region<br>WT Protein<br>WT Gene | Part of a ternary complex composed of TT2, TT8 and TTG1 necessary for correct expression of BAN in seed endothelium. Required for the accumulation of purple anthocyanins in leaves, stems and seed coat. Controls epidermal cell fate specification. Affects dihydroflavonol 4-reductase gene expression. TTG1 was shown to act non-cell autonomously and to move via plasmodesmata between cells | TTG1, TTG, URM23, ATTTG1, Transducin/WD40-repeat-containing protein |
| 78<br>79<br>80 | TTG2 CDS<br>TTG2 ORF<br>TTG2 Ta locus | WT Coding region<br>WT Protein<br>WT Gene | Belongs to a family of WRKY transcription factors expressed in seed integument and endosperm. Mutants are defective in proanthocyanidin synthesis and seed mucilage deposition. Seeds are yellow colored. Seed size is also affected; seeds are reduced in size but only when the mutant allele is transmitted through the female parent | TRANSPARENT TESTA GLABRA 2 (TTG2), AtWRKY44, DSL1 (DR. STRANGELOVE 1) |
| 81 | TT1 aMIR319a gene | Artificial miRNA | Artificial micro-RNA designed to reduce expression of TT1 in corresponding cell layer of developing seed coat | |
| 82 | TT10 aMIR319a gene | Artificial miRNA | Artificial micro-RNA designed to reduce expression of TT10 in corresponding cell layer of developing seed coat | |
| 83 | TT2 aMIR319a gene | Artificial miRNA | Artificial micro-RNA designed to reduce expression of TT2 in corresponding cell layer of developing seed coat | |
| 84 | TT8 aMIR319a gene | Artificial miRNA | Artificial micro-RNA designed to reduce expression of TT8 in corresponding cell layer of developing seed coat | |
| 85 | TT1 Promoter | Promoter | Genomic region of TT1 locus upstream of TT1 start codon containing TT1 promoter regulatory elements | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 86 | TT1 Terminator | Transcriptional terminator | Genomic region of TT1 locus downstream of TT1 stop codon containing regulatory elements | |
| 87 | TT8 Promoter | Promoter | Genomic region of TT8 locus upstream of TT8 start codon containing TT8 promoter regulatory elements | |
| 88 | TT8 Terminator | Transcriptional terminator | Genomic region of TT8 locus downstream of TT8 stop codon containing regulatory elements | |
| 89 | TT2_CRISPR-SpCAS9_F1 | Oligo-nucleotide | TT2 CDS targeted for cleavage by SpCAS9 enzyme; part of gRNA cassette | |
| 90 | TT2_CRISPR-SpCAS9_R1 | Oligo-nucleotide | TT2 CDS targeted for cleavage by SpCAS9 enzyme; part of gRNA cassette | |
| 91 | TT2_CRISPR-SaCAS9_F2 | Oligo-nucleotide | TT2 CDS targeted for cleavage by SpCAS9 enzyme; part of gRNA cassette | |
| 92 | TT2_CRISPR-SaCAS9_R2 | Oligo-nucleotide | TT2 CDS targeted for cleavage by SpCAS9 enzyme; part of gRNA cassette | |
| 93 | TT2_CRISPR-SaCAS9_F3 | Oligo-nucleotide | TT2 CDS targeted for cleavage by SpCAS9 enzyme; part of gRNA cassette | |
| 94 | TT2_CRISPR-SaCAS9_R3 | Oligo-nucleotide | TT2 CDS targeted for cleavage by SpCAS9 enzyme; part of gRNA cassette | |
| 95 | TT8_CRISPR-SpCAS9_F1 | Oligo-nucleotide | TT8 CDS targeted for cleavage by SpCAS9 enzyme; part of gRNA cassette | |
| 96 | TT8_CRISPR-SpCAS9_R1 | Oligo-nucleotide | TT8 CDS targeted for cleavage by SpCAS9 enzyme; part of gRNA cassette | |
| 97 | TT8_CRISPR-SpCAS9_F2 | Oligo-nucleotide | TT8 CDS targeted for cleavage by SpCAS9 enzyme; part of gRNA cassette | |
| 98 | TT8_CRISPR-SpCAS9_R2 | Oligo-nucleotide | TT8 CDS targeted for cleavage by SpCAS9 enzyme; part of gRNA cassette | |
| 99 | TT8_CRISPR-SpCAS9_F3 | Oligo-nucleotide | TT8 CDS targeted for cleavage by SpCAS9 enzyme; part of gRNA cassette | |
| 100 | TT8_CRISPR-SpCAS9_R3 | Oligo-nucleotide | TT8 CDS targeted for cleavage by SpCAS9 enzyme; part of gRNA cassette | |
| 101 | TT10_CRISPR-SaCAS9_F1 | Oligo-nucleotide | TT10 CDS targeted for cleavage by SpCAS9 enzyme; part of gRNA cassette | |
| 102 | TT10_CRISPR-SaCAS9_R1 | Oligo-nucleotide | TT10 CDS targeted for cleavage by SpCAS9 enzyme; part of gRNA cassette | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 103 | TT10_CRISPR-SaCAS9_F2 | Oligo-nucleotide | TT10 CDS targeted for cleavage by SpCAS9 enzyme; part of gRNA cassette | |
| 104 | TT10_CRISPR-SaCAS9_R2 | Oligo-nucleotide | TT10 CDS targeted for cleavage by SpCAS9 enzyme; part of gRNA cassette | |
| 105 | TT16_CRISPR-SpCAS9_F1 | Oligo-nucleotide | TT16 CDS targeted for cleavage by SpCAS9 enzyme; part of gRNA cassette | |
| 106 | TT16_CRISPR-SpCAS9_R1 | Oligo-nucleotide | TT16 CDS targeted for cleavage by SpCAS9 enzyme; part of gRNA cassette | |
| 107 | TT16_CRISPR-SpCAS9_F2 | Oligo-nucleotide | TT16 CDS targeted for cleavage by SpCAS9 enzyme; part of gRNA cassette | |
| 108 | TT16_CRISPR-SpCAS9_R2 | Oligo-nucleotide | TT16 CDS targeted for cleavage by SpCAS9 enzyme; part of gRNA cassette | |
| 109 | TT8_CRISPR-SpCAS9_F4 | Oligo-nucleotide | TT8 CDS targeted for cleavage by SpCAS9 enzyme; part of gRNA cassette | |
| 110 | TT8_CRISPR-SpCAS9_F5 | Oligo-nucleotide | TT8 CDS targeted for cleavage by SpCAS9 enzyme; part of gRNA cassette | |
| 111 | TT8_CRISPR-SaCAS9_F1 | Oligo-nucleotide | TT8 CDS targeted for cleavage by SaCAS9 enzyme; part of gRNA cassette | |
| 112 | TT8_CRISPR-SaCAS9_F2 | Oligo-nucleotide | TT8 CDS targeted for cleavage by SaCAS9 enzyme; part of gRNA cassette | |
| 113 | TTG1_CRISPR-SpCAS9_F1 | Oligo-nucleotide | TTG1 CDS targeted for cleavage by SpCAS9 enzyme; part of gRNA cassette | |
| 114 | TTG1_CRISPR-SpCAS9_F2 | Oligo-nucleotide | TTG1 CDS targeted for cleavage by SpCAS9 enzyme; part of gRNA cassette | |
| 115 | TTG1_CRISPR-SaCAS9_F1 | Oligo-nucleotide | TTG1 CDS targeted for cleavage by SaCAS9 enzyme; part of gRNA cassette | |
| 116 | TTG1_CRISPR-SaCAS9_F2 | Oligo-nucleotide | TTG1 CDS targeted for cleavage by SaCAS9 enzyme; part of gRNA cassette | |
| 117 | TT4-1 CDS-Mut | Mutant Coding region | GTCTGCTCCGAGATCACAG (nt 580-598 of SEQ ID NO: 57) → GTCTGCTCCAAGATCACAG (nt 580-598 of SEQ ID NO: 117) | tt4-1, A7-95 |
| 118 | TT4 Mut P1 | Mutant Protein | Presumed LOF due to E->K aa change | |
| 119 | TT4-2 CDS-Mut | Mutant Coding region | AAGTGACTGGAACTCTCTC (nt 894-912 of SEQ ID NO: 57) → AAGTGACTGAAACTCTCTC (nt 894-912 of SEQ ID NO: 119) | tt4-2, E5-549 |
| 120 | TT4 Mut P2 | Mutant Protein | Truncated protein, W->Stop change | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 121 | TT6-1 CDS-Mut | Mutant Coding region | GAGACTGTGCAAGATTGGA (nt 364-382 of SEQ ID NO: 63) → GAGACTGTGTAAGATTGGA (nt 364-382 of SEQ ID NO: 121) | tt6-1, AX17 |
| 122 | TT6 Mut P1 | Mutant Protein | Truncated protein, Q->Stop change | |
| 123 | TT6-2 CDS-Mut | Mutant Coding region | TTCAGAATCCGGCGCAGGA (nt 872-890 of SEQ ID: 63) → TTCAGAATCTGGCGCAGGA (nt 872-890 of SEQ ID: 123) | tt6-2, Q36 |
| 124 | TT6 Mut P2 | Mutant Protein | Presumed LOF due to P->L aa change | |
| 125 | TT7-1 CDS-Mut | Mutant Coding region | CCAAATTCAGGAGCCAAAC (nt 304-322 of SEQ ID: 66) → CCAAATTCAAGAGCCAAAC (nt 304-322 of SEQ ID: 125) | tt7-1, A7-3, E5-586, E5-484 P15, E5-484 P5 |
| 126 | TT7-1 Mut P1 | Mutant Protein | Presumed LOF due to G->R aa change | |
| 127 | TT8-1 CDS-Mut | Mutant Coding region | TTTACGGCAGAGAAAGTGA (nt 19-37 of SEQ ID: 69) → TTTACGGCAAAGAAAGTGA (nt 19-37 of SEQ ID: 127) | tt8-1, D3-N10 P5 |
| 128 | TT8 Mut P1 | Mutant Protein | Presumed LOF due to E->K aa change | |
| 129 | TT8-2 CDS-Mut | Mutant Coding region | TCTTACATCCAATCATCAT (nt 940-958 of SEQ ID: 69) → TCTTACATCTAATCATCAT (nt 940-958 of SEQ ID: 129) | tt8-2, D5-191, D3-N25P1, E5-590, A7-191 |
| 130 | TT8 Mut P2 | Mutant Protein | Truncated protein, Q->Stop change | |
| 131 | TT8-3 CDS-Mut | Mutant Coding region | TGCCACATGGAAGGCTGAT (nt 960-978 of SEQ ID: 69) → TGCCACATGAAAGGCTGAT (nt 960-978 of SEQ ID: 131) | tt8-3, I0193, E5-542, E5-548 |
| 132 | TT8 Mut P3 | Mutant Protein | Truncated protein, W->Stop change | |
| 133 | TT8-11 CDS-Mut | Mutant Coding region | GCAATAAAGACGAGGAAGA (nt 172-190 of SEQ ID: 69) → GCAATAAAGAACGAGGAAGA (nt 172-191 of SEQ ID: 133) | tt8-11 |
| 134 | TT8 Mut P4 | Mutant Protein | Frameshift caused by 1bp insertion | |
| 135 | TT8-12 CDS-Mut | Mutant Coding region | GCAATAAAGACGAGGAAGA (nt 172-190 of SEQ ID: 69) → GCAATAAA--CGAGGAAGA (nt 172-188 of SEQ ID: 135) | tt8-12 |
| 136 | TT8 Mut P5 | Mutant Protein | Frameshift caused by 2bp deletion | |
| 137 | TT8-13 CDS-Mut | Mutant Coding region | GCAATAAAGACGAGGAAGA (nt 172-190 of SEQ ID: 69) → GCAATAAAGGACGAGGAAGA (nt 172-191 of SEQ ID: 137) | tt8-13 |
| 138 | TT8 Mut P6 | Mutant Protein | Frameshift caused by 1bp insertion | |
| 139 | TT10-1 CDS-Mut | Mutant Coding region | GACTGTTTGGTGGCATGCG (nt 354-372 of SEQ ID: 33) → GACTGTTTGATGGCATGCG (nt 354-372 of SEQ ID: 139) | tt10-1, E5-539, E5-543 |
| 140 | TT10 Mut P1 | Mutant Protein | Truncated protein, W->Stop change | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 141 | TT10-2 CDS-Mut | Mutant Coding region | TACCGCATT**C**GGATGGTAA (nt 646-664 of SEQ ID: 33) → TACCGCATT**T**GGATGGTAA (nt 646-664 of SEQ ID: 141) | tt10-2, E5-545 |
| 142 | TT10 Mut P2 | Mutant Protein | Presumed LOF due to R->W aa change | |
| 143 | TT10-11 CDS-Mut | Mutant Coding region | GGACCAGTGTTAAGGGCT (nt 154-171 of SEQ ID: 33) → GGACCAGTG**T**TTAAGGGCT (nt 154-172 of SEQ ID: 143) | tt10-11 |
| 144 | TT10 Mut P3 | Mutant Protein | Frameshift caused by 1bp insertion | |
| 145 | TT10-12 CDS-Mut | Mutant Coding region | GGACCAGTGTTAAGGGCT (nt 154-171 of SEQ ID: 33) → GGACCAGTG**A**TTAAGGGCT (nt 154-172 of SEQ ID: 145) | tt10-12 |
| 146 | TT10 Mut P4 | Mutant Protein | Frameshift caused by 1bp insertion | |
| 147 | TT10-13 CDS-Mut | Mutant Coding region | TCCTGGACCAGTGTTAAGG (nt 150-168 of SEQ ID: 33) → TCCTGG-------TTAAGG (nt 150-161 of SEQ ID: 147) | tt10-13 |
| 148 | TT10 Mut P5 | Mutant Protein | Frameshift caused by 7bp deletion | |
| 149 | TT12-1 CDS-Mut | Mutant Coding region | AACCCTTTGGCTTACATGTC (nt 604-623 of SEQ ID: 36) → AACCCTTT----TACATGTC (nt 604-619 of SEQ ID: 149) | tt12-1, A7-261 |
| 150 | TT12 Mut P1 | Mutant Protein | Frameshift caused by 4bp deletion | |
| 151 | TT12-2 CDS-Mut | Mutant Coding region | ATTCTCTCT**G**GTGTTGCCA (nt 1237-1255 of SEQ ID: 36) → ATTCTCTCT**A**GTGTTGCCA (nt 1237-1255 of SEQ ID: 151) | tt12-2, J22 |
| 152 | TT12 Mut P2 | Mutant Protein | Presumed LOF due to G→S aa change | |
| 153 | TT13-1 CDS-Mut | Mutant Coding region | GCTCTTAAC**C**TTGGAGTTT (nt 895-913 of SEQ ID: 39) → GCTCTTAAC**T**TTGGAGTTT (nt 895-913 of SEQ ID: 153) | tt13-1, aha10-1, J22 |
| 154 | TT13 Mut P1 | Mutant Protein | Truncated protein, L->F change | |
| 155 | TT13-2 CDS-Mut | Mutant Coding region | ACAGGAAGG**C**GACTTGGGA (nt 958-976 of SEQ ID: 39) → ACAGGAAGG**T**GACTTGGGA (nt 958-976 of SEQ ID: 155) | tt13-2, P32 |
| 156 | TT13 Mut P2 | Mutant Protein | Truncated protein, R->Stop change | |
| 157 | TT13-3 CDS-Mut | Mutant Coding region | GGAATGACC**G**GAGATGGTG (nt 1144-1162 of SEQ ID: 39) → GGAATGACC**A**GAGATGGTG (nt 1144-1162 of SEQ ID: 157) | tt13-3, E5-540 |
| 158 | TT13 Mut P3 | Mutant Protein | Truncated protein, G->R change | |
| 159 | TT16-1 CDS-Mut | Mutant Coding region | TACTTGAAGACCAGTGGAAT (nt 211-230 of SEQ ID: 45) → TACTTGAAGAC**C**CAGTGGAAT (nt 211-231 of SEQ ID: 159) | tt16-1 |
| 160 | TT16 Mut P1 | Mutant Protein | Frameshift caused by 1bp insertion | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 161 | TT16-2 CDS-Mut | Mutant Coding region | TACTTGAAGACCAGTGGAAT (nt 211-230 of SEQ ID: 45) → TACTTGAAGAC**G**CAGTGGAAT (nt 211-231 of SEQ ID: 161) | tt16-2 |
| 162 | TT16 Mut P2 | Mutant Protein | Frameshift caused by 1bp insertion | |
| 163 | TT16-3 CDS-Mut | Mutant Coding region | TACTTGAAGACCAGTGGAAT (nt 211-230 of SEQ ID: 45) → TACTTGAAGAC**T**CAGTGGAAT (nt 211-231 of SEQ ID: 163) | tt16-3 |
| 164 | TT16 Mut P3 | Mutant Protein | Frameshift caused by 1bp insertion | |
| 165 | TTG1 CDS-Mut | Mutant Coding region | GATCTCCTCGCTTCCTCCGGCGATTTCCT (nt 286-314 of SEQ ID: 75) → GATC---------------------TCCT (nt 286-293 of SEQ ID: 165) | Y1067, Y1126 |
| 166 | TTG1 Mut P1 | Mutant Protein | LOF caused by 21bp/7aa deletion | |
| 167 | TTG1-1 CDS-Mut | Mutant Coding region | TCGCTTCCT**C**CGGCGATTT (nt 293-311 of SEQ ID: 75) → TCGCTTCCT**TC**GGCGATTT (nt 293-311 of SEQ ID: 167) | ttg1-1, E5-544 |
| 168 | TTG1 Mut P2 | Mutant Protein | Presumed LOF due to S->F aa change | |
| 169 | TTG1-2 CDS-Mut | Mutant Coding region | TCGCTTGGG**G**AGAAGCTAG (nt 542-560 of SEQ ID: 75) → TCGCTTGGG**A**AGAAGCTAG (nt 542-560 of SEQ ID: 169) | ttg1-2, A7-187 |
| 170 | TTG1 Mut P3 | Mutant Protein | Presumed LOF due to G->E aa change | |
| 171 | GL3 CDS | WT Coding region | Transcription activator of bHLH superfamily involved in cell fate specification. In association with TTG1, promotes trichome formation. Together with MYB75/PAP1, plays a role in the activation of anthocyanin biosynthesis. Activates the transcription of GL2. | GL3, MYC6.2 basic helix-loop-helix protein |
| 172 | GL3 ORF | WT Protein | | |
| 173 | GL3 Ta locus | WT Gene | | |
| 174 | GL3-1 CDS-Mut | Mutant Coding region | CAACTTAGG**G**AGCTTTACG (nt 241-259 of SEQ ID: 171) → CAACTTAGG**A**AGCTTTACG (nt 241-259 of SEQ ID: 174) | gl3-1, E5-541, E5-559 |
| 175 | GL3 Mut P1 | Mutant Protein | Presumed LOF due to E->K aa change | |
| 176 | GL3-2 CDS-Mut | Mutant Coding region | GCCGACACA**G**AGTGGTACT (nt 358-376 of SEQ ID: 171) → GCCGACACA**A**AGTGGTACT (nt 358-376 of SEQ ID: 176) | gl3-2, A7-92, E5-444 |
| 177 | GL3 Mut P2 | Mutant Protein | Presumed LOF due to E->K aa change | |
| 178 | GL3-3 CDS-Mut | Mutant Coding region | GGTTTAACT**G**ATAATTTAA (nt 1663-1681 of SEQ ID: 171) → GGTTTAACT**A**ATAATTTAA (nt 1663-1681 of SEQ ID: 178) | gl3-3, A7-229, E5-582 |
| 179 | GL3 Mut P3 | Mutant Protein | Presumed LOF due to D->N aa change | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 180 | BAN-1 CDS-Mut | Mutant Coding region | ATCAAGCCA**G**GGATACAAG (nt 319-337 of SEQ ID: 9) → ATCAAGCCA**A**GGATACAAG (nt 319-337 of SEQ ID: 9 and SEQ ID: 180) | ban-1, BJ8, BJ8D |
| 181 | BAN Mut P1 | Mutant Protein | Presumed LOF due to G->R aa change | |
| 182 | TT4-3 CDS-Mut | Mutant Coding region | CTCACCCTG**G**AGGTCCTGC (nt 923-941 of SEQ ID: 57) → CTCACCCTG**A**AGGTCCTGC (nt 923-941 of SEQ ID: 182) | tt4-3, A7-229, E5-582 |
| 183 | TT4-3 Mut P1 | Mutant Protein | Presumed LOF due to G->R aa change | |

In certain embodiments, pennycress plants having reduced seed coat fiber, lighter-colored seed coat, and/or higher seed oil content as described herein can be from the Y1067, Y1126, BC38, BJ8, P32, J22, Q36, BD24, AX17, E5-444, E5-540, E5-541, E5-542, E5-543, E5-544, E5-545, E5-547, E5-549, E5-582, E5-586, D3-N10 P5, D5-191, A7-95, A7-187, or A7-261 variant lines provided herein, or can be progeny derived from those lines.

A representative wild-type (WT) pennycress TT2 coding sequence is as shown in sequence listing (SEQ ID NO:1). In certain embodiments, a WT pennycress TT2 coding sequence can have a sequence that deviates from the coding sequence set forth above (e.g., SEQ ID NO:1), and is referred to as an allelic variant sequence. In certain embodiments, a TT2 coding sequence allelic variant can have at least 80, at least 85, at least 90, at least 95, at least 98, or at least 99 percent sequence identity to SEQ ID NO:1. A representative wild-type pennycress TT2 polypeptide is shown in sequence listing (SEQ ID NO:2). In certain embodiments, a WT pennycress TT2 polypeptide can have a sequence that deviates from the polypeptide sequence set forth above (SEQ ID NO:2) and is referred to as an allelic variant sequence.

In certain embodiments, a WT pennycress TT2 polypeptide can have a sequence that deviates from the polypeptide sequence set forth above (SEQ ID NO:2), referred to herein as an allelic variant sequence, provided the polypeptide maintains its wild-type function. For example, a TT2 polypeptide can have at least 80, at least 85, at least 90, at least 95, at least 98, or at least 99) percent sequence identity to SEQ ID NO:2. A TT2 polypeptide of an allelic variant can have one or more (e.g., 2, 3, 4, 5, 6, 7, 8, 9, or 10) amino acid modifications (e.g., substitutions) relative to SEQ ID NO:2.

In certain embodiments, pennycress seed lots having reduced seed coat fiber, lighter-colored seed coat due to reduced proanthocyanidins content, and/or higher seed oil content as described herein can include at least one loss-of-function modification in a TT2 gene (e.g., in a TT2 coding sequence, in a TT2 regulatory sequence including the promoter, 5' UTR, intron, 3' UTR, or in any combination thereof) or a transgene that suppresses expression of the TT2 gene. As used herein, a loss-of-function mutation in a TT2 gene can be any modification that is effective to reduce TT2 polypeptide expression or TT2 polypeptide function. In certain embodiments, reduced TT2 polypeptide expression and/or TT2 polypeptide function can be eliminated or reduced in comparison to a wild-type plant. Examples of genetic modifications that can provide for a loss-of-function mutation include, without limitation, deletions, insertions, substitutions, translocations, inversions, duplications, or any combination thereof.

In certain embodiments, pennycress seed lots having reduced seed coat fiber, lighter-colored seed coat, and/or higher seed oil and/or protein content as described herein can include a substitution (e.g., a single base-pair substitution) relative to the WT pennycress TT2 coding sequence. In certain embodiments, a modified TT2 coding sequence can include a single base-pair substitution of the cytosine (G) at nucleotide residue 330 in a WT pennycress TT2 coding sequence (e.g., SEQ ID NO:1 or an allelic variant thereof). The G at nucleotide residue 330 can be substituted with any appropriate nucleotide (e.g., thymine (T), adenine (A), or cytosine (C)). For example, a single base-pair substitution can be a G to A substitution at nucleotide residue 330 in a WT pennycress TT2 coding sequence thereby producing a premature stop codon. A representative modified pennycress TT2 coding sequence having a loss-of-function single base pair substitution is presented in SEQ ID NO:4.

A modified pennycress TT2 coding sequence having a loss-of-function single base pair substitution (e.g., SEQ ID NO:4) can encode a modified TT2 polypeptide (e.g., a modified TT2 polypeptide having reduced TT2 polypeptide expression and/or reduced TT2 polypeptide function). For example, a modified pennycress TT2 coding sequence having a single base-pair substitution (e.g., SEQ ID NO:4) can encode a modified TT2 polypeptide. In certain embodiments, a modified TT2 polypeptide can include a truncation resulting from the introduction of a stop codon at codon position 110 within the TT2 open reading frame (e.g., SEQ ID NO:4). A representative truncated pennycress TT2 polypeptide is presented in SEQ ID NO:5. Representative pennycress varieties having a mutation in the TT2 gene include the tt2-1, tt2-2, BC38, and E5-547 varieties.

Figure 4:
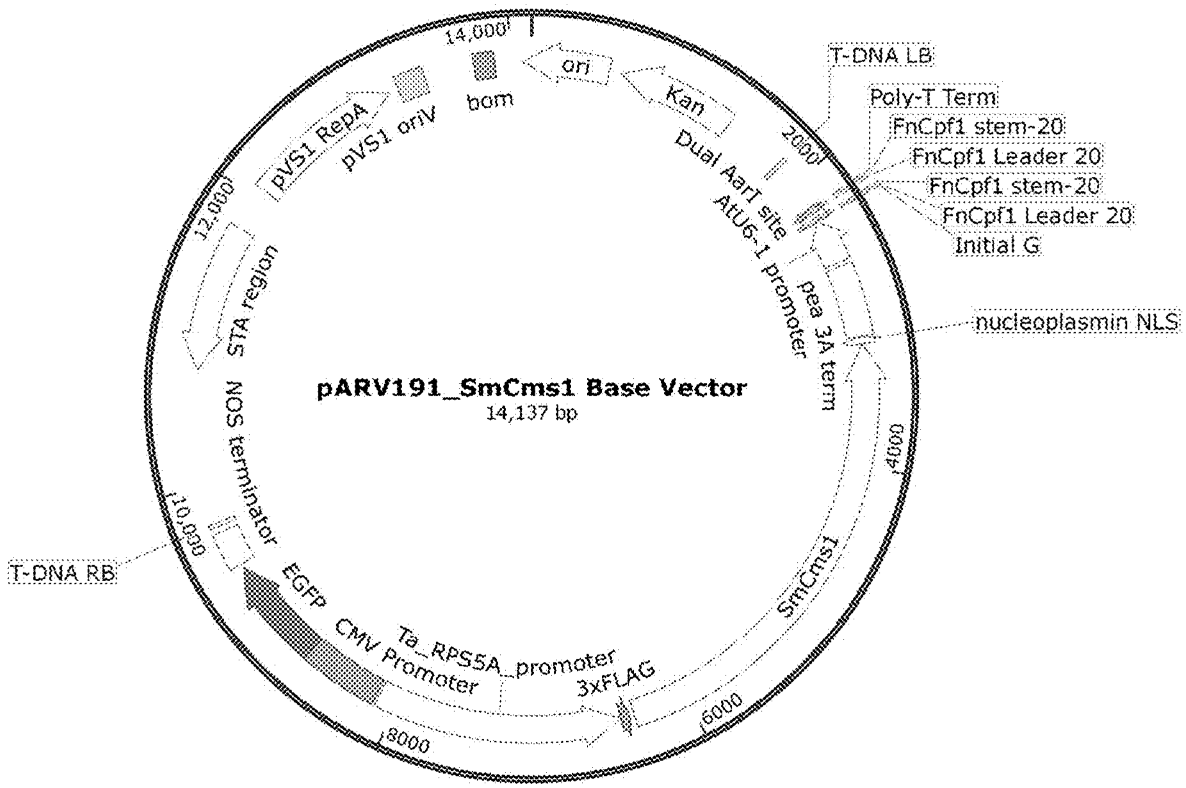
FIG. 4 illustrates pARV191, *Agrobacterium* CRISPR-SmCsm1 base vector for editing plant genome. gRNA cassette stuffers are inserted at the dual AarI site, replacing a small fragment of the vector with synthetic gRNA cassette.
Figure 5:
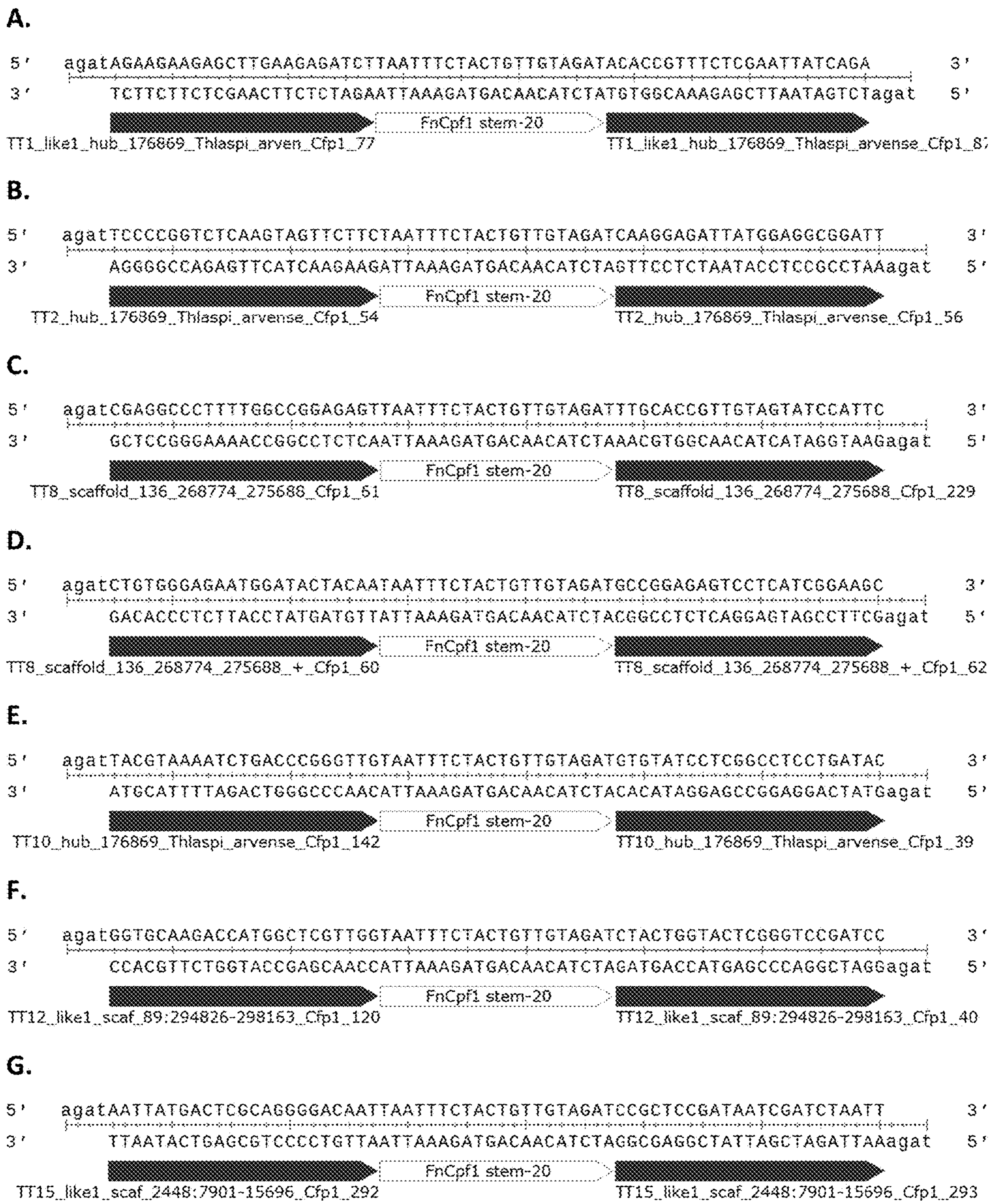
FIGS. 5 A, B, C, D, E, F, G, gRNA cassettes targeting pennycress *Transparent testa* (Tt) genes.
Figure 6:
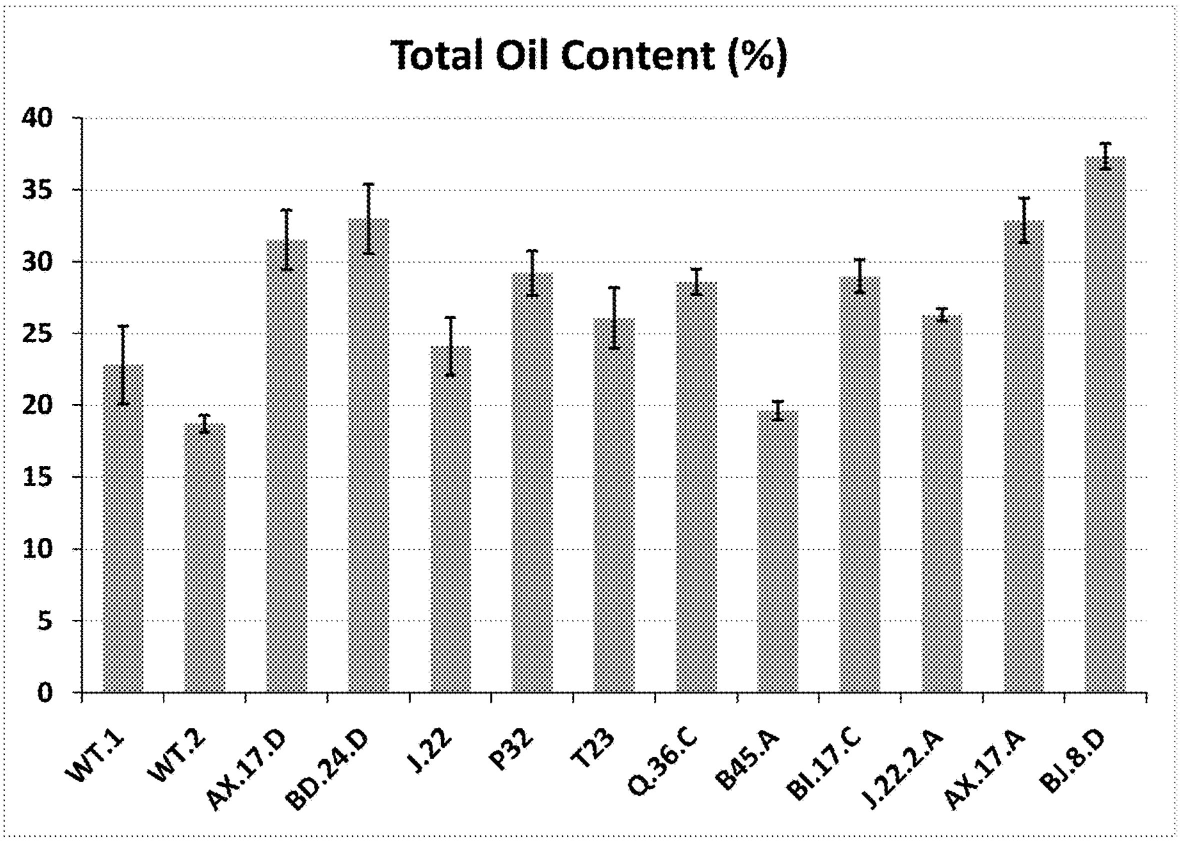
FIG. 6 illustrates total oil content in seeds of selected yellow-seeded pennycress mutants measured using GC-chromatography analysis.

A representative WT pennycress TRANSPARENT TESTA8 (TT8) coding region is presented in SEQ ID NO:69. Two protospacer locations and adjacent protospacer-adjacent motif (PAM) sites that can be targeted by, for example, CRISPR-SpCAS9 correspond to nucleotides 164-183 and 287-306 (protospacers) or 184-186 and 284-286 (PAM sites). In another embodiment, two separate examples of alternative protospacer locations and adjacent proto-spacer-adjacent motifs (PAM) sites are provided in FIGS. 3-5. In each case, two protospacer locations can be targeted by, for example, CRISPR-FnCpf1, CRISPR-SmCsm1 or a similar enzyme, correspond to nucleotides 175-153 and 261-283 (protospacers) or 179-176 and 257-260 (PAM sites); and nucleotides 145-167 and 274-296 (protospacers) or 141-144 and 270-273 (PAM sites), all of SEQ ID NO:69.

In certain embodiments, a WT pennycress TT8 coding sequence can have a sequence that deviates from the coding sequence set forth above (e.g., SEQ ID NO:69), and is referred to as an allelic variant sequence. In certain embodiments, a TT8 coding sequence allelic variant can have at least 80, at least 85, at least 90, at least 95, at least 98, or at least 99 percent sequence identity to SEQ ID NO:69. A representative WT pennycress TT8 polypeptide is presented in SEQ ID NO:70.

In certain embodiments, a WT pennycress TT8 polypeptide can have a sequence that deviates from the polypeptide sequence set forth above (SEQ ID NO:70) and is referred to as an allelic variant sequence. For example, a TT8 polypeptide can have at least 80, at least 85, at least 90, at least 95, at least 98, or at least 99 percent sequence identity to SEQ ID NO:70. A TT8 polypeptide can have one or more (e.g., 2, 3, 4, 5, 6, 7, 8, 9, or 10) amino acid modifications (e.g., substitutions) relative to SEQ ID NO:70.

In certain embodiments, pennycress seed lots having reduced fiber content as described herein can include a loss-of-function modification in a TT8 gene (e.g., in a TT8 coding sequence) or a transgene that suppresses expression of the TT8 gene. As used herein, a loss-of-function mutation in a TT8 gene can be any modification that is effective to reduce TT8 polypeptide expression or TT8 polypeptide function. In certain embodiments, reduced TT8 polypeptide expression and/or TT8 polypeptide function can be eliminated or reduced. Examples of genetic modifications include, without limitation, deletions, insertions, substitutions, translocations, inversions, duplications, and any combination thereof. Representative TT8 gene mutations include the mutations shown in SEQ ID NO:127, 129, 131, 133, 135, and 137 that result in the TT8 mutant polypeptides of SEQ ID NO:128, 130, 132, 134, 136, and 138, respectively. Representative pennycress varieties with TT8 gene mutations include the tt4-2 tt8-1, tt8-2, tt8-3, tt8-11, tt8-12, tt8-12, tt8-13, I0193, E5-542, E5-548, D5-191, D3-N25P1, E5-590, A7-191, and D3-N10 P5 varieties.

In certain embodiments, a WT pennycress TT1 coding sequence can have a sequence that deviates from the coding sequence set forth above (e.g., SEQ ID NO:27 or 30), and is referred to as an allelic variant sequence. In certain embodiments, a TT1 coding sequence allelic variant can have at least 80, at least 85, at least 90, at least 95, at least 98, or at least 99 percent sequence identity to SEQ ID NO:27 or 30. In certain embodiments, a WT pennycress TT1 polypeptide can have a sequence that deviates from the polypeptide sequence set forth above (SEQ ID NO:28 or 31), and is referred to as an allelic variant sequence. For example, a TT1 polypeptide allelic variant can have at least 80, at least 85, at least 90, at least 95, at least 98, or at least 99 percent sequence identity to SEQ ID NO:28 or 31. A TT1 polypeptide allelic variant can have one or more (e.g., 2, 3, 4, 5, 6, 7, 8, 9, or 10) amino acid modifications (e.g., substitutions) relative to SEQ ID NO:28 or 31.

In certain embodiments, pennycress seed lots having reduced fiber as described herein can include a loss-of-function modification in a TT1 encoding gene or a transgene that suppresses expression of the TT1 gene. As used herein, a loss-of-function mutation in a TT1 gene can be any modification that is effective to reduce TT1 polypeptide expression or TT1 polypeptide function. In certain embodiments, reduced TT1 polypeptide expression and/or TT1 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT1 encoding gene, a promoter thereof, or a terminator, thereof, or a transgene that suppresses expression of the TT1 gene. As used herein, a loss-of-function mutation in a TT1 gene can be any modification that is effective to reduce TT1 polypeptide expression or TT1 polypeptide function. In certain embodiments, reduced TT1 polypeptide expression and/or TT1 polypeptide function can be eliminated or reduced. Examples of genetic modifications include, without limitation, deletions, insertions, substitutions, translocations, inversions, duplications, and any combination thereof.

In certain embodiments, a WT pennycress TT4 coding sequence can have a sequence that deviates from the coding sequence set forth above (e.g., SEQ ID NO:57), and is referred to as an allelic variant sequence. In certain embodiments, a TT4 coding sequence allelic variant can have at least 80, at least 85, at least 90, at least 95, at least 98, or at least 99 percent sequence identity to SEQ ID NO:57. In certain embodiments, a WT pennycress TT4 polypeptide can have a sequence that deviates from the polypeptide sequence set forth above (SEQ ID NO:58), and is referred to as an allelic variant sequence. For example, a TT4 polypeptide allelic variant can have at least 80, at least 85, at least 90, at least 95, at least 98, or at least 99 percent sequence identity to SEQ ID NO:58. A TT4 polypeptide allelic variant can have one or more (e.g., 2, 3, 4, 5, 6, 7, 8, 9, or 10) amino acid modifications (e.g., substitutions) relative to SEQ ID NO:58.

In certain embodiments, pennycress seed lots having reduced fiber as described herein can include a loss-of-function modification in a TT4 encoding gene or a transgene that suppresses expression of the TT4 gene. As used herein, a loss-of-function mutation in a TT4 gene can be any modification that is effective to reduce TT4 polypeptide expression or TT4 polypeptide function. In certain embodiments, reduced TT4 polypeptide expression and/or TT4 polypeptide function can be eliminated or reduced. Examples of genetic modifications include, without limitation, deletions, insertions, substitutions, translocations, inversions, duplications, and any combination thereof. Representative TT4 gene mutations include the mutation shown in SEQ ID NO:119 that results in the truncated TT4 mutant polypeptide of SEQ ID NO:120. Representative TT4 gene mutations also include the mutations shown in SEQ ID NO:117 and 182 that result in the TT4 mutant polypeptides of SEQ ID NO: 118 and 183, respectively. Representative pennycress varieties with TT4 gene mutations include the tt4-1, tt4-2, tt4-3, A7-229, E5-582 and E5-549 varieties.

In certain embodiments, a WT pennycress TT5, TT9, TT15, TT18, or TT19 coding sequence can have a sequence that deviates from the coding sequence set forth above (e.g., SEQ ID NO:60, 72, 42, 48, or 51, respectively), and is referred to as an allelic variant sequence. In certain embodiments, a TT5, TT9, TT15, TT18, or TT19 coding sequence allelic variant can have at least 80, at least 85, at least 90, at least 95, at least 98, or at least 99 percent sequence identity to SEQ ID NO:60, 72, 42, 48, or 51, respectively. In certain embodiments, a WT pennycress TT5, TT9, TT15, TT18, or TT19 polypeptide can have a sequence that deviates from the polypeptide sequence set forth above (SEQ ID NO:61, 73, 43, 49, or 52, respectively), and is referred to as an allelic variant sequence. For example, a TT5, TT9, TT15, TT18, or TT19 polypeptide allelic variant can have at least 80, at least 85, at least 90, at least 95, at least 98, or at least 99 percent sequence identity to SEQ ID NO:61, 73, 43, 49, or 52, respectively. A TT5, TT9, TT15, TT18, or TT19 polypeptide allelic variant can have one or more (e.g., 2, 3, 4, 5, 6, 7, 8, 9, or 10) amino acid modifications (e.g., substitutions) relative to SEQ ID NO:61, 73, 43, 49, or 52, respectively.

In certain embodiments, pennycress seed lots having reduced fiber as described herein can include a loss-of-function modification in a TT5, TT9, TT15, TT18, or TT19 encoding gene or a transgene that suppresses expression of the TT5, TT9, TT15, TT18, or TT19 gene. As used herein, a loss-of-function mutation in a TT5 gene can be any modification that is effective to reduce TT5, TT9, TT15, TT18, or TT19 polypeptide expression or TT5, TT9, TT15, TT18, or TT19 polypeptide function. In certain embodiments, TT5, TT9, TT15, TT18, or TT19 polypeptide expression and/or TT5, TT9, TT15, TT18, or TT19 polypeptide function can be eliminated or reduced. Examples of genetic modifications include, without limitation, deletions, insertions, substitutions, translocations, inversions, duplications, and any combination thereof.

In certain embodiments, a WT pennycress TT6 coding sequence can have a sequence that deviates from the coding sequence set forth above (e.g., SEQ ID NO:63), and is referred to as an allelic variant sequence. In certain embodiments, a TT6 coding sequence allelic variant can have at least 80, at least 85, at least 90, at least 95, at least 98, or at least 99 percent sequence identity to SEQ ID NO:63. In certain embodiments, a WT pennycress TT6 polypeptide can have a sequence that deviates from the polypeptide sequence set forth above (SEQ ID NO:64), and is referred to as an allelic variant sequence. For example, a TT6 polypeptide allelic variant can have at least 80, at least 85, at least 90, at least 95, at least 98, or at least 99 percent sequence identity to SEQ ID NO:64. A TT6 polypeptide allelic variant can have one or more (e.g., 2, 3, 4, 5, 6, 7, 8, 9, or 10) amino acid modifications (e.g., substitutions) relative to SEQ ID NO:64.

In certain embodiments, pennycress seed lots having reduced fiber as described herein can include a loss-of-function modification in a TT6 encoding gene or a transgene that suppresses expression of the TT6 gene. As used herein, a loss-of-function mutation in a TT6 gene can be any modification that is effective to reduce TT6 polypeptide expression or TT6 polypeptide function. In certain embodiments, reduced TT6 polypeptide expression and/or TT6 polypeptide function can be eliminated or reduced. Examples of genetic modifications include, without limitation, deletions, insertions, substitutions, translocations, inversions, duplications, and any combination thereof. Representative TT6 gene mutations include the mutation shown in SEQ ID NO:121 that results in the TT6 mutant polypeptide of SEQ ID NO:122. Representative pennycress varieties with TT6 gene mutations mutants include the tt6-1 and AX17 varieties. Representative TT6 gene mutations also include the mutation shown in SEQ ID NO:123 that results in the TT6 mutant polypeptide of SEQ ID NO:124. Representative pennycress varieties with TT6 gene mutations mutants also include the tt6-1, tt6-2 and Q36 varieties.

In certain embodiments, a WT pennycress TT7 coding sequence can have a sequence that deviates from the coding sequence set forth above (e.g., SEQ ID NO:66), and is referred to as an allelic variant sequence. In certain embodiments, a TT7 coding sequence allelic variant can have at least 80, at least 85, at least 90, at least 95, at least 98, or at least 99 percent sequence identity to SEQ ID NO:66. In certain embodiments, a WT pennycress TT7 polypeptide can have a sequence that deviates from the polypeptide sequence set forth above (SEQ ID NO:67), and is referred to as an allelic variant sequence. For example, a TT7 polypeptide allelic variant can have at least 80, at least 85, at least 90, at least 95, at least 98, or at least 99 percent sequence identity to SEQ ID NO:67. A TT7 polypeptide allelic variant can have one or more (e.g., 2, 3, 4, 5, 6, 7, 8, 9, or 10) amino acid modifications (e.g., substitutions) relative to SEQ ID NO:67.

In certain embodiments, pennycress seed lots having reduced fiber as described herein can include a loss-of-function modification in a TT7 encoding gene or a transgene that suppresses expression of the TT7 gene. As used herein, a loss-of-function mutation in a TT7 gene can be any modification that is effective to reduce TT7 polypeptide expression or TT7 polypeptide function. In certain embodiments, reduced TT7 polypeptide expression and/or TT7 polypeptide function can be eliminated or reduced. Examples of genetic modifications include, without limitation, deletions, insertions, substitutions, translocations, inversions, duplications, and any combination thereof. Representative TT7 gene mutations include the mutation shown in SEQ ID NO:125 that results in the TT7 mutant polypeptide of SEQ ID NO:126. Representative pennycress varieties with TT7 gene mutations include the tt7-1, A7-3, E5-586, E5-484 P15, and E5-484 P5 varieties.

In certain embodiments, a WT pennycress TTG1 coding sequence can have a sequence that deviates from the coding sequence set forth above (e.g., SEQ ID NO:75), and is referred to as an allelic variant sequence. In certain embodiments, a TTG1 coding sequence allelic variant can have at least 80, at least 85, at least 90, at least 95, at least 98, or at least 99 percent sequence identity to SEQ ID NO:75. In certain embodiments, a WT pennycress TTG1 polypeptide can have a sequence that deviates from the polypeptide sequence set forth above (SEQ ID NO:76), and is referred to as an allelic variant sequence. For example, a TTG1 polypeptide allelic variant can have at least 80, at least 85, at least 90, at least 95, at least 98, or at least 99 percent sequence identity to SEQ ID NO:28 or 31. A TTG1 polypeptide allelic variant can have one or more (e.g., 2, 3, 4, 5, 6, 7, 8, 9, or 10) amino acid modifications (e.g., substitutions) relative to SEQ ID NO:76.

In certain embodiments, pennycress seed lots having reduced fiber as described herein can include a loss-of-function (LOF) modification in a TTG1 encoding gene or a transgene that suppresses expression of the TTG1 gene. As used herein, a loss-of-function mutation in a TTG1 gene can be any modification that is effective to reduce TTG1 polypeptide expression or TTG1 polypeptide function. In certain embodiments, reduced TTG1 polypeptide expression and/or TTG1 polypeptide function can be eliminated or reduced. Examples of genetic modifications include, without limitation, deletions, insertions, substitutions, translocations, inversions, duplications, and any combination thereof. In certain embodiments, a LOF mutation in a TTG1 gene can comprise a 21 bp deletion in the TTG1 coding sequence as shown in SEQ ID NO:165. In other embodiments, a LOF mutation in a TTG1 gene can comprise ttg1-1 and ttg1-2 mutant alleles having single nucleotide substitutions that result in the substitution of a conserved amino acid residue in the TTG protein (SEQ ID NOs:167-170). Representative TTG1 gene mutations thus include the mutations shown in SEQ ID NO:165, 167, and 169 that result in the TTG1 mutant polypeptides of SEQ ID NO:166, 1268, and 170, respectively. Representative pennycress varieties with TTG1 gene mutations include the Y1067, Y1126, ttg1-1, E5-544, ttg1-2, and A7-187 varieties.

In certain embodiments, a WT pennycress TT10 coding sequence can have a sequence that deviates from the coding sequence set forth above (e.g., SEQ ID NO:33), and is referred to as an allelic variant sequence. In certain embodiments, a TT10 coding sequence allelic variant can have at least 80, at least 85, at least 90, at least 95, at least 98, or at least 99 percent sequence identity to SEQ ID NO:33. In certain embodiments, a WT pennycress TT10 polypeptide can have a sequence that deviates from the polypeptide sequence set forth above (SEQ ID NO:34), and is referred to as an allelic variant sequence. For example, a TT10 polypeptide allelic variant can have at least 80, at least 85, at least 90, at least 95, at least 98, or at least 99 percent sequence identity to SEQ ID NO:34. A TT10 polypeptide allelic variant can have one or more (e.g., 2, 3, 4, 5, 6, 7, 8, 9, or 10) amino acid modifications (e.g., substitutions) relative to SEQ ID NO:34.

In certain embodiments, pennycress seed lots having reduced fiber as described herein can include a loss-of-function modification in a TT10 encoding gene or a transgene that suppresses expression of the TT10 gene. As used herein, a loss-of-function mutation in a TT10 gene can be any modification that is effective to reduce TT10 polypeptide expression or TT10 polypeptide function. In certain embodiments, reduced TT10 polypeptide expression and/or TT10 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT10 encoding gene or a transgene that suppresses expression of the TT10 gene. As used herein, a loss-of-function mutation in a TT10 gene can be any modification that is effective to reduce TT10 polypeptide expression or TT10 polypeptide function. In certain embodiments, reduced TT10 polypeptide expression and/or TT10 polypeptide function can be eliminated or reduced. Examples of genetic modifications include, without limitation, deletions, insertions, substitutions, translocations, inversions, duplications, and any combination thereof. Representative TT10 gene mutations include the mutations shown in SEQ ID NO:139, 141, 143, 145, or 147 that result in the TT10 mutant polypeptides of SEQ ID NO: 140, 142, 144, 146, or 148, respectively. Representative pennycress varieties with TT10 gene mutations include the tt10-1, tt10-2, tt10-1, tt10-12, tt10-13, E5-539, E5-543, and E5-545 varieties.

In certain embodiments, a WT pennycress TT12 coding sequence can have a sequence that deviates from the coding sequence set forth above (e.g., SEQ ID NO:36), and is referred to as an allelic variant sequence. In certain embodiments, a TT12 coding sequence allelic variant can have at least 80, at least 85, at least 90, at least 95, at least 98, or at least 99 percent sequence identity to SEQ ID NO:36. In certain embodiments, a WT pennycress TT12 polypeptide can have a sequence that deviates from the polypeptide sequence set forth above (SEQ ID NO:37), and is referred to as an allelic variant sequence. For example, a TT12 polypeptide allelic variant can have at least 80, at least 85, at least 90, at least 95, at least 98, or at least 99 percent sequence identity to SEQ ID NO:37. A TT12 polypeptide allelic variant can have one or more (e.g., 2, 3, 4, 5, 6, 7, 8, 9, or 10) amino acid modifications (e.g., substitutions) relative to SEQ ID NO:37.

In certain embodiments, pennycress seed lots having reduced fiber as described herein can include a loss-of-function modification in a TT12 encoding gene or a transgene that suppresses expression of the TT12 gene. As used herein, a loss-of-function mutation in a TT12 gene can be any modification that is effective to reduce TT12 polypeptide expression or TT12 polypeptide function. In certain embodiments, reduced TT12 polypeptide expression and/or TT12 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT12 encoding gene or a transgene that suppresses expression of the TT12 gene. As used herein, a loss-of-function mutation in a TT12 gene can be any modification that is effective to reduce TT12 polypeptide expression or TT12 polypeptide function. In certain embodiments, reduced TT12 polypeptide expression and/or TT12 polypeptide function can be eliminated or reduced. Examples of genetic modifications include, without limitation, deletions, insertions, substitutions, translocations, inversions, duplications, and any combination thereof. Representative TT12 gene mutations include the mutations shown in SEQ ID NO:149 or 151 that result in the TT12 mutant polypeptides of SEQ ID NO:150 or 152, respectively. Representative pennycress varieties with TT12 gene mutations include the tt12-1, tt12-2, A7-261, and J22 varieties.

In certain embodiments, a WT pennycress TT13 coding sequence can have a sequence that deviates from the coding sequence set forth above (e.g., SEQ ID NO:39), and is referred to as an allelic variant sequence. In certain embodiments, a TT13 coding sequence allelic variant can have at least 80, at least 85, at least 90, at least 95, at least 98, or at least 99 percent sequence identity to SEQ ID NO:39. In certain embodiments, a WT pennycress TT13 polypeptide can have a sequence that deviates from the polypeptide sequence set forth above (SEQ ID NO:40), and is referred to as an allelic variant sequence. For example, a TT13 polypeptide allelic variant can have at least 80, at least 85, at least 90, at least 95, at least 98, or at least 99 percent sequence identity to SEQ ID NO:40. A TT13 polypeptide allelic variant can have one or more (e.g., 2, 3, 4, 5, 6, 7, 8, 9, or 10) amino acid modifications (e.g., substitutions) relative to SEQ ID NO:40.

In certain embodiments, pennycress seed lots having reduced fiber as described herein can include a loss-of-function modification in a TT13 encoding gene or a transgene that suppresses expression of the TT13 gene. As used herein, a loss-of-function mutation in a TT13 gene can be any modification that is effective to reduce TT13 polypeptide expression or TT13 polypeptide function. In certain embodiments, reduced TT13 polypeptide expression and/or TT13 polypeptide function can be eliminated or reduced. Examples of genetic modifications include, without limitation, deletions, insertions, substitutions, translocations, inversions, duplications, and any combination thereof. Representative TT13 gene mutations include the mutations shown in SEQ ID NO:153, 155, or 157 that result in the TT13 mutant polypeptides of SEQ ID NO:154, 156, or 158, respectively. Representative pennycress varieties with TT13 gene mutations include the tt13-1, tt13-2, tt13-3, aha10-1, J22, and P32 E5-540 varieties.

In certain embodiments, a WT pennycress TT16 coding sequence can have a sequence that deviates from the coding sequence set forth above (e.g., SEQ ID NO:45), and is referred to as an allelic variant sequence. In certain embodiments, a TT16 coding sequence allelic variant can have at least 80, at least 85, at least 90, at least 95, at least 98, or at least 99 percent sequence identity to SEQ ID NO:45. In certain embodiments, a WT pennycress TT16 polypeptide can have a sequence that deviates from the polypeptide sequence set forth above (SEQ ID NO:46), and is referred to as an allelic variant sequence. In certain embodiments, a TT16 polypeptide allelic variant can have at least 80, at least 85, at least 90, at least 95, at least 98, or at least 99 percent sequence identity to SEQ ID NO:46. A TT16 polypeptide allelic variant can have one or more (e.g., 2, 3, 4, 5, 6, 7, 8, 9, or 10) amino acid modifications (e.g., substitutions) relative to SEQ ID NO:46.

In certain embodiments, pennycress seed lots having reduced fiber as described herein can include a loss-of-function modification in a TT16 encoding gene or a transgene that suppresses expression of the TT16 gene. As used herein, a loss-of-function mutation in a TT16 gene can be any modification that is effective to reduce TT16 polypeptide expression or TT16 polypeptide function. In certain embodiments, reduced TT16 polypeptide expression and/or TT16 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT16 encoding gene or a transgene that suppresses expression of the TT16 gene. As used herein, a loss-of-function mutation in a TT16 gene can be any modification that is effective to reduce TT16 polypeptide expression or TT16 polypeptide function. In certain embodiments, reduced TT16 polypeptide expression and/or TT16 polypeptide function can be eliminated or reduced. Examples of genetic modifications include, without limitation, deletions, insertions, substitutions, translocations, inversions, duplications, and any combination thereof. Representative TT16 gene mutations include the mutations shown in SEQ ID NO:159, 161, or 163 that result in the TT16 mutant polypeptides of SEQ ID NO:160, 162, or 164, respectively. Representative pennycress varieties with TT16 gene mutations include the tt16-1, tt16-2, and tt16-3 varieties.

In certain embodiments, a genome editing system such as a CRISPR-Cas9 system can be used to introduce one or more loss-of-function mutations into genes such as the TRANSPARENT TESTA (TT) and related genes provided herewith in Table 1 and the sequence listing that are associated with agronomically-relevant seed traits including reduced seed coat fiber, lighter-colored seed coat due to reduced proanthocyanidins content, increased protein content, and/or higher seed oil content. For example, a CRISPR-Cas9 vector can include at least one guide sequence specific to a pennycress TT2 sequence (see, e.g., SEQ ID NO:1) and/or at least one guide sequence specific to a pennycress TT8 sequence (see, e.g., SEQ ID NO:5). A Cas9 enzyme will bind to and cleave within the gene when the target site is followed by a PAM sequence. For example, the canonical SpCAS9 PAM site is the sequence 5'-NGG-3', where N is any nucleotide followed by two guanine (G) nucleotides. The Cas9 component of a CRISPR-Cas9 system designed to introduce one or more loss-of-function modifications described herein can be any appropriate Cas9. In certain embodiments, the Cas9 of a CRISPR-Cas9 system described herein can be a *Streptococcus pyogenes* Cas9 (SpCas9). One example of an SpCas9 is described in (Fauser et al., 2014).

In certain embodiments, a WT pennycress GL3 coding sequence can have a sequence that deviates from the coding sequence set forth above (e.g., SEQ ID NO:171), and is referred to as an allelic variant sequence. In certain embodiments, a GL3 coding sequence allelic variants can have at least 80, at least 85, at least 90, at least 95, at least 98, or at least 99 percent sequence identity to SEQ ID NO:171. In certain embodiments, a WT pennycress GL3 polypeptide can have a sequence that deviates from the polypeptide sequence set forth above (SEQ ID NO:172), and is referred to as an allelic variant sequence. For example, a GL3 polypeptide allelic variant can have at least 80, at least 85, at least 90, at least 95, at least 98, or at least 99 percent sequence identity to SEQ ID NO:160. A GL3 polypeptide allelic variant can have one or more (e.g., 2, 3, 4, 5, 6, 7, 8, 9, or 10) amino acid modifications (e.g., substitutions) relative to SEQ ID NO:172.

In certain embodiments, pennycress seed lots having reduced fiber as described herein can include a loss-of-function modification in a GL3 encoding gene or a transgene that suppresses expression of the GL3 gene. As used herein, a loss-of-function mutation in a GL3 gene can be any modification that is effective to reduce GL3 polypeptide expression or GL3 polypeptide function. In certain embodiments, GL3 polypeptide expression and/or GL3 polypeptide function can be eliminated or reduced. Examples of genetic modifications include, without limitation, deletions, insertions, substitutions, translocations, inversions, duplications, and any combination thereof. In certain embodiments, the GL3 mutation can comprise the coding sequence mutations of SEQ ID NO:174, 176, 178 and/or the protein sequence mutation of SEQ ID NO:175, 177, 180. Representative pennycress varieties with GL3 gene mutations include the g13-1, g13-2, g13-3, E5-541, E5-559, A7-92, E5-444, A7-229, and E5-582 varieties.

In certain embodiments, a WT pennycress BAN-ANR (or BAN) coding sequence can have a sequence that deviates from the coding sequence set forth above (e.g., SEQ ID NO:9), and is referred to as an allelic variant sequence. In certain embodiments, a BAN coding sequence allelic variant can have at least 80, at least 85, at least 90, at least 95, at least 98, or at least 99 percent sequence identity to SEQ ID NO:9. In certain embodiments, a WT pennycress BAN polypeptide can have a sequence that deviates from the polypeptide sequence set forth above (SEQ ID NO:10), and is referred to as an allelic variant sequence. For example, a BAN polypeptide allelic variant can have at least 80, at least 85, at least 90, at least 95, at least 98, or at least 99 percent sequence identity to SEQ ID NO:10. A BAN polypeptide allelic variant can have one or more (e.g., 2, 3, 4, 5, 6, 7, 8, 9, or 10) amino acid modifications (e.g., substitutions) relative to SEQ ID NO:10.

In certain embodiments, pennycress seed lots having reduced fiber as described herein can include a loss-of-function modification in a BAN encoding gene or a transgene that suppresses expression of the BAN gene. As used herein, a loss-of-function mutation in a BAN gene can be any modification that is effective to reduce BAN polypeptide expression and/or BAN polypeptide function. In certain embodiments, BAN polypeptide expression and/or BAN polypeptide function can be eliminated or reduced. Examples of genetic modifications include, without limitation, deletions, insertions, substitutions, translocations, inversions, duplications, and any combination thereof. In certain embodiments, the BAN mutation can comprise the coding sequence mutation of SEQ ID NO:180 and/or the protein sequence mutation of SEQ ID NO:181. Representative pennycress varieties with BAN gene mutations include the ban-1, BJ8, and BJ8D varieties.

In certain embodiments, pennycress seeds or seed lots having reduced fiber, as well as pennycress seed meal obtained therefrom (including both defatted and non-defatted seed meal), as described herein can include a loss-of-function mutation in more than one of the genes or coding sequences set forth in Table 1. In certain embodiments, pennycress seeds or seed lots having reduced fiber can have a LOF mutation in the gene(s) and/or coding sequences of any combination of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and/or any allelic variants thereof. In certain embodiments, pennycress seed meal, including de-fatted and non-defatted forms) and having reduced fiber can comprise a detectable amount of any combination of nucleic acids having a LOF mutation in the gene(s) and/or coding sequences of any combination of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and/or any allelic variants thereof.

The LOF mutations in any of the genes or coding sequences of Table 1 can be introduced by a variety of methods. Methods for introduction of the LOF mutations include, but are not limited to, traditional mutagenesis (e.g., with EMS or other mutagens), TILLING, meganucleases, zinc finger nucleases, transcription activator-like effector nucleases, clustered regularly interspaced short palindromic repeat (CRISPR)-associated nuclease (e.g., *S. pyogenes* Cas9 and its variants, *S. aureus* Cas9 and its variants, eSpCas9, Cpf1, Cms1 and their variants) targetrons, and the like. Various tools that can be used to introduce mutations into genes have been disclosed in Guha et al. Comput Struct Biotechnol J. 2017; 15: 146-160. Methods for modifying genomes by use of Cpf1 or Csm1 nucleases are disclosed in US Patent Application Publication 20180148735, which is incorporated herein by reference in its entirety, and can be adapted for introduction of the LOF mutations disclosed herein. Methods for modifying genomes by use of CRISPR/CAS systems are disclosed in US Patent Application Publication 20180179547, which is incorporated herein by reference in its entirety, and can be adapted for introduction of the LOF mutations disclosed herein. The genome editing reagents described herein can be introduced into a pennycress plant by any appropriate method. In certain embodiments, nucleic acids encoding the genome editing reagents can be introduced into a plant cell using *Agrobacterium* or *Ensifer* mediated transformation, particle bombardment, liposome delivery, nanoparticle delivery, electroporation, polyethylene glycol (PEG) transformation, or any other method suitable for introducing a nucleic acid into a plant cell. In certain embodiments, the Site-Specific Nuclease (SSN) or other expressed gene editing reagents can be delivered as RNAs or as proteins to a plant cell and the RT, if one is used, can be delivered as DNA.

The disclosure will be further described in the following examples, which do not limit the scope of the disclosure described in the claims.

EXAMPLES

Example 1: Meal Made from Wild Type Pennycress Plants is High in Fiber, but Low in Metabolizable Energy Higher dietary fiber results in lower net energy for swine (Kil et al., 2013) and poultry (Meloche et al., 2013). It was also reported that hemicellulose displayed the strongest correlation with apparent metabolizable energy (AMEn), followed by neutral detergent fiber (NDF), total dietary fiber (TDF), and crude fiber (CF) in broilers fed corn co-products (Rochelle et al., 2011). Thus, a reduction in fiber will result in increased available energy to pigs and poultry.

When comparing mechanically expeller-pressed meals made from two USDA-developed pennycress varieties (Beecher and Ruby II) to mechanically expeller-pressed canola meal, the various fiber fractions when analyzed as crude fiber (CF), acid detergent fiber (ADF), neutral detergent fiber (NDF) and total dietary fiber (TDF) were 1.5-2 times the levels in canola meal (Table 2). Similar levels were observed when comparing different lots of pennycress meal with canola meal (Table 3). Analysis conducted by Arvegenix at University of Georgia showed similar results (Table 4).

TABLE 2

Nutrient composition of mechanically expeller-pressed canola and pennycress meals produced at Dairyland by Arvegenix in August 2015. All numbers are in percent dry weight (% DW).

| Meal Constituent | Expeller-Pressed Canola Meal | Pennycress Meal (Beecher) | Pennycress Meal (Ruby II) |
|---|---|---|---|
| Crude Protein | 38.7 | 31.3 | 31.1 |
| Either extract | 11.2 | 10.1 | 10.6 |
| Crude fiber | 10.9 | 27.1 | 27.9 |
| ADF | 18.1 | 35.6 | 33.8 |
| NDF | 22.7 | 40.5 | 36.8 |
| Total Dietary Fiber | 29.5 | 43.3 | 37.8 |

TABLE 3

Lot variation in proximate values in mechanically expeller-pressed pennycress meal, composite mechanically expeller-pressed pennycress meal blend (all produced by Arvegenix), and commercially available mechanically expeller-pressed canola (ME Canola). All numbers represent the average of duplicate analytical runs for mean and standard error measured in percent dry weight (% DW).

| | Meal Constituent Processing Date(s) | | | | | |
|---|---|---|---|---|---|---|
| | Lot 1 22 Jul. 2015 | Lot 2 23 Jul. 2015 | Lot 3 23 Jul. 2015 | Lot 4 23 Jul. 2015 | Blend* 22-27 Jul. 2015 | ME Canola N/A |
| Moisture (% FW) | 2.12 ± 0.08 | 6.10 ± 0.1 | 5.20 ± 0.01 | 4.06 ± 0.08 | 3.36 ± 0.05 | 4.41 ± 0.13 |
| Ash Content | 7.32 ± 0.06 | 7.24 ± 0.1 | 7.13 ± 0.01 | 7.17 ± 0.02 | 5.62 ± 2.38 | 6.88 ± 0.02 |
| Carbohydrates | 51.4 ± 0.07 | 50.9 ± 0.7 | 50.9 ± 0.14 | 49.7 ± 0.07 | 49.8 ± 2.26 | 40.7 ± 1.3 |
| Crude Fat | 8.99 ± 0.03 | 10.3 ± 0.01 | 10.6 ± 0.14 | 11.1 ± 0.01 | 11.6 ± 0.01 | 13.5 ± 1.5 |
| Crude Protein | 32.2 ± 0.1 | 31.6 ± 0.7 | 31.4 ± 0.1 | 32.0 ± 0.01 | 33.1 ± 0.1 | 38.9 ± 0.2 |
| Crude Fiber | 28.7 ± 1.2 | 29.5 ± 2.1 | 30.3 ± 0.2 | 28.0 ± 0.1 | 26.4 ± 0.6 | 10.9 ± 0.5 |
| Acid Detergent Fiber | 37.9 ± 0.5 | 38.7 ± 0.1 | 36.7 ± 2.8 | 36.8 ± 0.5 | 32.1 ± 0.8 | 18.25 ± 0.1 |
| Neutral Detergent Fiber | 39.8 ± 0.6 | 39.9 ± 0.1 | 39.5 ± 0.8 | 38.5 ± 0.6 | 34.8 ± 2.0 | 23.3 ± 0.2 |
| Total Dietary Fiber | 41.6 ± 1.2 | 41.2 ± 1.2 | 41.0 ± 1.0 | 39.0 ± 0.1 | 42.2 ± 7.4 | 29.7 ± 1.3 |

*The Blend sample, consisting of Lots 1-4 (~66% by weight) and Lot 5 (~33% by weight), was blended and analyzed for nutrition studies.

TABLE 4

Proximate compositions (% as is) for canola meal (CM) and pennycress meal samples.

| | CM [1] | PM [2] |
|---|---|---|
| Crude Protein | 36.7 | 32.0 |
| Fat | 11.4 | 8.61 |
| Crude Fiber | 9.27 | 19.9 |
| ADF [3] | 18.3 | 39.6 |
| NDF [4] | 22.7 | 43.0 |
| Ash | 6.51 | 7.57 |
| Dry Matter | 94.1 | 94.4 |

Total Metabolizable Energy (TMEn) corrected for nitrogen was measured in mechanically expeller-pressed pennycress meal and canola meal. TMEn was found to be 18.2% or 18.9% less in the pennycress meal as compared to the canola meal when fed to chickens due to the higher fiber content (Table 5) and Metabolizable Energy (ME) was 16% less in pennycress meal as compared to the canola meal when fed to pigs due to the higher fiber content (Table 6).

TABLE 5

Total metabolizable energy corrected for nitrogen (TMEn) for mechanically expeller-pressed canola and pennycress meal when fed to chickens.

| | Mech Pennycress Meal (Beecher) | Mech Canola Meal | Difference, % |
|---|---|---|---|
| Energy | Parsons 2015 | Parsons 2006 | |
| TMEn (kcal/g DM) | 2.455 | 3 | −18.17 |

TABLE 6

Concentration of digestible energy (DE) and metabolizable energy (ME) in pennycress expeller and canola expellers when fed to pigs (data[1] produced at University of Illinois).

| | Ingredients | | | |
|---|---|---|---|---|
| Item | Pennycress expellers | Canola expellers | SEM | P - value |
| DE, kcal/kg | 3,191 | 3,582 | 92.18 | 0.009 |
| DE, kcal/kg of DM | 3,536 | 3,833 | 99.43 | 0.053 |
| ME, kcal/kg | 2,652 | 3,269 | 143.98 | 0.009 |
| ME, kcal/kg of DM | 2,938 | 3,499 | 158.17 | 0.025 |

[1]Data are means of 8 observations per treatment. SEM abbreviation stands for standard error of the mean. DM abbreviation is for Dry Matter.

In summary, Beecher and Ruby II varieties of pennycress meal contain between 1.5× to 2× the fiber content as compared to similarly processed canola meal resulting in 18-19% less energy when fed to chickens and pigs. Reduction in the fiber content of pennycress to levels of those in canola should result in a significant increase in value and energy to poultry and pigs.

Example 2: Selection of Mutant Pennycress Plants Low in Fiber, High in Oil and Protein from Cultivated Isolates About 850 wildtype pennycress seed samples exhibited a dark-brown seed coat were collected. These wildtype samples were then cultivated as independent lines for over two seasons in over 10,000 unique and managed plots. Upon careful analysis of the harvests from these dark type plantings, a few individual seeds which were yellow in color were identified in only two of the 850 cultivated lines (Table 2) and selected for further propagation and breeding. Certain selected pennycress variant lines Y1067 and Y1126 were isolated from a cultivated field in Grantfork Ill. Certain selected pennycress Y1126 lines were isolated from a cultivated field in Macomb Ill. in 2015. As no yellow pennycress seeds were reported to date, initially, the isolates were first assumed to be weed seeds from a species other than pennycress. However, upon careful evaluations of plants grown from these seeds in the greenhouse, they were positively identified as pennycress using visual (plant morphology) and molecular (PCR/sequencing) inspections. The selected Y1067 and Y1126 lines were then carefully grown as single seed isolates to produce progeny lines which consisted of 100% yellow seeds. The yellow seed coat trait in the selected Y1067 and Y1126 lines has now been confirmed to be stable for several generations in both greenhouse and field environments.

Seeds from the yellow-seeded lines (Y1067 and Y1126) were carefully bulked up and sent to an analytical lab (Dairyland Laboratories) for analysis. Upon removal of the oil using standard defatting procedure, a small amount of yellow pennycress meal was produced and determined to have an ADF level (adjusted for oil content) of 15.5% and 11.5% vs. 27.5% in wild type, demonstrating 43-58% reduction in ADF fiber. Other measurements of fiber content such as NDF and CF were also significantly (29-55%) lower in the yellow-seeded lines relative to wild type, while the protein level was significantly (~50%) higher. The composition of yellow and dark brown seeds is listed in Table 7. The yellow Y1067 and Y1126 lines have since been crossed with "regular" dark brown-seeded pennycress and demonstrated a non-reciprocal pattern of inheritance indicating that yellow seed coat is a maternally inherited trait.

TABLE 7

The composition of meal (adjusted for oil content) made from yellow and dark brown seeds (Dairyland Laboratories, Arcadia, Wisconsin).

| Pennycress line | Seed coat color | % moisture | ADF fiber | NDF fiber | Crude fiber | Protein |
|---|---|---|---|---|---|---|
| Y1067 | yellow | 6.63 | 15.5 | 22.3 | 15.5 | 32.4 |
| Y1126 | yellow | 6.38 | 11.5 | 15.2 | 9.9 | 31.9 |
| 1063 | dark brown | 7.39 | 27.2 | 30.6 | 22.6 | 21.3 |
| 1067 | dark brown | 7.29 | 26.6 | 29.8 | 19.9 | 19.8 |
| 1126 | dark brown | 6.43 | 28.4 | 33.7 | 24.7 | 24.6 |
| 1139 | dark brown | 6.50 | 26.4 | 29.8 | 19.9 | 22.4 |
| 1204 | dark brown | 6.58 | 26.3 | 28.9 | 18.7 | 20.9 |
| 1228 | dark brown | 6.30 | 28.8 | 33.8 | 25.4 | 22.1 |
| 1326 | dark brown | 6.47 | 29.2 | 32.6 | 23.4 | 21.7 |
| 2032 | dark brown | 6.16 | 24.7 | 28.8 | 17.6 | 22.1 |
| 2084 | dark brown | 6.89 | 26.0 | 29.0 | 19.4 | 22.2 |
| 2116 | dark brown | 7.16 | 30.4 | 36.2 | 24.4 | 20.1 |
| 2133 | dark brown | 6.64 | 29.6 | 34.4 | 25.0 | 21.5 |
| 2206 | dark brown | 6.69 | 25.5 | 29.4 | 18.1 | 20.7 |
| 2229 | dark brown | 6.61 | 27.1 | 32.5 | 23.0 | 21.9 |
| 2253 | dark brown | 6.42 | 24.0 | 28.3 | 17.8 | 22.5 |
| 2288 | dark brown | 6.28 | 26.6 | 33.0 | 25.5 | N/A |
| 2329 | dark brown | 6.57 | 26.6 | 31.9 | 18.8 | 20.8 |
| 2369 | dark brown | 6.05 | 23.1 | 26.7 | 17.9 | 23.2 |
| 2458 | dark brown | 6.39 | 25.4 | 29.8 | 18.8 | 22.2 |
| 2460 | dark brown | 6.49 | 30.6 | 36.3 | 26.7 | 21.2 |
| 2369 | light brown | 6.50 | 36.9 | 45.8 | 32.1 | 19.1 |
| Average | yellow | 6.51 | 13.5 | 18.7 | 12.7 | 32.2 |
| Average | dark brown | 6.59 | 27.5 | 32.1 | 22.0 | 21.6 |
| % change | yellow | Y1067 | −43% | −30% | −29% | 50% |
| % change | yellow | Y1126 | −58% | −53% | −55% | 48% |

Example 3: Identification of Mutated Gene in Pennycress Plants Low in Fiber, High in Oil and Protein from Cultivated Isolates In order to determine molecular nature of the mutations responsible for the low fiber, high oil/high protein phenotype in Y1067 and Y1126 lines, a combination of a genetic method called bulk segregant analysis (Michelmore et. al., 1991) and a next generation sequencing (NGS) method was used. In brief, for each of the yellow-seeded lines, a genetically close black-seeded relative line was identified and 200 individuals from each population were grown. They were harvested in bulk and used for DNA isolation that was subsequently used for preparation of NGS libraries and sequencing using standard Illumina technology. It was determined that Y1067 and Y1126 lines carry the same 21 bp deletion in TTG1 gene (Seq ID No. 165) by analyzing the sequencing data through comparative bioinformatics techniques. Comparative bioinformatics tools that were used in part to analyze the data are disclosed in Magwene et. al., 2011. This mutation results in a deletion of 7 amino acids in the conserved area of TTG1 protein, likely leading to a complete loss of function. The definitive nature of this 21 bp deletion was confirmed in heterologous (black ♀×yellow ♂) crosses, where only the progeny of F2 segregants carrying the described deletion displayed the yellow-seeded phenotype.

Example 4: Generation and Characterization of EMS-Mutagenized Light-Colored Seed Coat Mutant Lines BC38, BJ8, P32, J22, Q36, BD24, AX17, E5-444, E5-540, E5-541, E5-542, E5-543, E5-545, E5-547, E5-549, E5-582, E5-586, D3-N10 P5, D5-191, A7-95, A7-187 and A7-261

In addition to mutants carrying domestication enabling traits selected from natural isolates, light colored pennycress mutants were isolated from a mutant population created using chemical mutagen (EMS) using the protocol described in the Materials and Methods section below.

To identify useful domestication genes in pennycress plants, pennycress seeds were mutagenized with several different mutagens, including ethyl methanesulfonate (EMS), fast neutrons (FN) and gamma rays (γ rays). Treatment of dry plant seeds with mutagens results in the generation of distinct sets of mutations in a variety of cells in the seed. The fate of many of these cells can be followed when a mutation in one of these cells results in a visible phenotype creating a marked plant sector.

Pennycress plants exhibiting domestication enabling traits such as reduced seed coat fiber, lighter-colored seed coat due to reduced proanthocyanidins content, and/or higher seed oil content were analyzed and loss of function mutations in domestication genes were identified.

Materials and Methods

Solutions:

| | | |
|---|---|---|
| A) | 0.2M sodium phosphate monobasic ($NaH_2PO_4*H_2O$) | 6.9 g/250 mL |
| B) | 0.2M sodium phosphate dibasic ($NaH_2PO_4$ anhydrous) | 7.1 g/250 mL |

For 50 mL of 0.1 M sodium phosphate buffer at pH 7:

| | |
|---|---|
| 9.75 mL | A |
| 15.25 mL | B |
| 25.0 mL | $dH_2O$ |

0.2% EMS in buffer:

20 mL 0.1M Sodium Phosphate Buffer, pH 7

40 μL EMS liquid (Sigma #M0880-5G)

0.1 M sodium thiosulfate at pH 7.3:

12.4 g sodium thiosulfate in 500 mL

Primary Seed Surface Sterilization

Wild-type pennycress (*Thlaspi arvense*) seeds (Spring 32 ecotype) were surface sterilized for 10 minutes in a 30% bleach, 0.05% SDS solution before being rinsed 3× with sterile water. Sterilized seeds were immediately subjected to EMS treatment.

Ethyl Methane Sulfonate (EMS) Treatment of Pennycress Seeds

Sterilized pennycress seeds (41 g) were agitated in distilled water overnight. Four 250 mL Erlenmeyer flasks with 10 g seed each, and 1 g in a separate small flask as a control, were agitated. The water was decanted.

25 mLs of 0.2% EMS in 0.1M sodium phosphate buffer (pH 7) was added. The control received only phosphate buffer with no EMS. The flasks were shaken in fume hood for 18 hours. The EMS solution was decanted off into an EMS waste bottle.

To rinse the seeds, 25 ml of $dH_2O$ was added to each flask, and the flasks were shaken for 20 minutes. The rinse water was decanted into the EMS waste bottle.

To deactivate the EMS, seeds were washed for 20 minutes in 0.1M sodium thiosulfate (pH 7.3), rinsed 4 with dH2O for 15 minutes, suspended in 0.1% agarose, and germinated directly in autoclaved Reddiearth soil at a density of approximately 10 seeds per 4-inch pot.

Plant Growth Conditions

EMS-treated pennycress seeds were germinated and grown in an environmental growth chamber at 21° C., 16:8 6400K fluorescent light/dark, 50% humidity. Approximately 14 days after planting, plants were thinned and transplanted to a density of 4 plants per 4-inch pot. These $M_1$-generation plants showed telltale chlorotic leaf sectors that are indicative of a successful mutagenesis.

After dry down, these $M_1$-generation plants were catalogued and harvested. The $M_2$- and $M_3$-generation seeds were surface sterilized, planted and grown according to the protocols previously described.

Identification and Characterization of Light-Colored Seed Coat Mutant Lines

Light-colored seed coat mutants in the $M_3$-generation were identified as those having mature seed coats of a lighter color relative to that of wild type. Seeds ($M_3$-generation) from putative $M_2$-generation mutants were planted and grown in potting soil-containing 4-inch pots in a growth chamber and the seed coat color phenotype re-assessed upon plant senescence.

Near infrared (NIR) spectroscopic analysis was used to determine the fiber content of selected seed lines to compare the obtained values to the range of fiber in control dark brown seeds. The results are presented in Table 8 of Example 5 (five light-colored lines mentioned above vs. almost one hundred control dark brown seed lines). These results indicate that ADF and NDF fiber levels in certain selected light-colored seed lines are significantly lower and are outside of the corresponding ranges found in control dark-colored seeds, while oil and protein levels are often higher and are also outside of their corresponding ranges found in dark-colored control seeds.

EMS mutagenesis typically introduces single-nucleotide transition mutations (e.g. G to A, or C to T) into plant genomes. To identify the causative mutations in selected light seed colored plants, DNA was extracted from mutant and wild-type leaf tissue and used for NGS and comparative bioinformatics analysis as described in Example 3. Underlying gene and protein mutations were identified (Table 1, SEQ ID NO: 117-132, 139-142, 149-158, 167-170 and 174-181) and confirmed using standard Sanger sequencing and genetic segregation analyses.

Example 5: Generation of Transgenic Pennycress Lines Harboring the CRISPR-Cas9 or CRISPR-Cpf1 or CRISPR-Cms1 Constructs Materials and Methods Construction of the *Thlaspi arvense* (Pennycress) TT1, TT2, TT8, TT10, and TT16 Gene-Specific CRISPR Genome-Editing Vectors.

The constructs and cloning procedures for generation of the *Thlaspi arvense* (pennycress) TT2-, TT8-, TT10-, and TT16-specific CRISPR-SpCas9, CRISPR-SaCas9, CRISPR-Cpf1 and CRISPR-Cms1 constructs are described in Fauser et. al., 2014, Steinert et. al., 2015 and Begemann et. al., 2017.

The plant selectable markers (formerly NPT) in the original pDe-SpCas9 and pDe-SaCas9 binary vectors were swapped for hygromycin resistance (Hygromycin phosphotransferase (HPT) gene.

Complementary oligo pairs described in Table 1 (Seq ID NO: 89-116) were synthesized, annealed to create the 20-mer protospacers specific to the designated pennycress genes and used for construction of gene-editing binary vectors as described (Fauser et. al., 2014, Steinert et. al., 2015 and Begemann et. al., 2017).

Vector Transformation into *Agrobacterium*

The pDe-SpCas9_Hyg and pDe-SaCas9_Hyg and related vectors containing the CRISPR nuclease and guide RNA cassettes with the corresponding sequence-specific protospacers were transformed into *Agrobacterium tumefaciens* strain GV3101 using the freeze/thaw method (Holsters et al, 1978).

The transformation product was plated on 1% agar Luria Broth (LB) plates with gentamycin (50 μg/ml) rifampicin (50 μg/ml) and spectinomycin (75 μg/ml). Single colonies were selected after two days of growth at 28° C.

Plant Transformation—Pennycress Floral Dip

DAY ONE: 5 mL of LB+5 uL with appropriate antibiotics (Rifampin (50), Spectinomycin (75), and/or Gentamycin (50)) were inoculated with *Agrobacterium*. The cultures were allowed to grow, with shaking, overnight at 28° C.

DAY TWO (early morning): 25 mL of Luria Broth+25 uL appropriate antibiotics (Rifampin (50), Spectinomycin (75), and/or Gentamycin (50)) were inoculated with the initial culture from day one. The cultures were allowed to grow, with shaking, overnight at 28° C.

DAY TWO (late afternoon): 250 mL of Luria Broth+250 uL appropriate antibiotic (Rifampin (50), Spectinomycin (75), and/or Gentamycin (50)) were inoculated with 25 mL culture. The cultures were allowed to grow, with shaking, overnight at 28° C.

DAY THREE: When the culture had grown to an $OD_{600}$ of ~1.0, the culture was decanted into large centrifuge tubes and spun at 3,500 RPM at room temperature for 10 minutes to pellet cells. The supernatant was decanted off. The pelleted cells were resuspended in a solution of 5% sucrose and 0.02% Silwet L-77. The suspension was poured into clean beakers and placed in a vacuum chamber.

Newly flowering inflorescences of pennycress were fully submerged into the beakers and subjected to a negative vacuum pressure of 25-30 PSI for 10 minutes.

After pennycress plants were dipped, they were covered loosely with Saran wrap to maintain humidity and kept in the dark overnight before being uncovered and placed back in the environmental growth chamber.

Screening Transgenic Plants and Growth Condition

Pennycress seeds were surface sterilized by first rinsing in 70% ethanol then incubating 10 minutes in a 30% bleach, 0.05% SDS solution before being rinsed two times with sterile water and plated on selective plates (0.8% agar/one half-strength Murashige and Skoog salts with hygromycin B selection (40 U/ml) or glufosinate (18 μg/ml). Plates were wrapped in parafilm and kept in an environmental growth chamber at 21° C., 16:8 day/night for 8 days until antibiotic or herbicide selection was apparent.

Surviving hygromycin or glufosinate-resistant $T_1$-generation seedlings were transplanted into autoclaved Reddiearth soil mix and grown in an environmental growth chamber set to 16-hour days/8-hour nights at 21° C. and 50% humidity. $T_2$-generation seeds were planted, and ~1.5 mg of leaf tissue from each $T_2$-generation plant was harvested with a 3-mm hole punch, then processed using the Thermo Scientific™ Phire™ Plant Direct PCR Kit as per manufacturer's instructions. Subsequently, PCR reactions for genotyping (20 μl volume) were performed.

Gene editing using Cas9, Cpf1 and Cms1 nucleases typically introduces a double-stranded break into a targeted genome area in close proximity to the nuclease's PAM site. During non-homologous end-joining process (NHEJ), these double-stranded breaks are repaired, often resulting in introduction of indel-type mutations into targeted genomes. To identify plants with small indels in genes of interest, standard Sanger sequencing or T7 endonuclease assay (Guschin et. al., 2010) were employed. Sequence analysis revealed that multiple guide RNAs/CRISPR nuclease combinations were effective in generating loss-of-function (LOF) mutations in targeted genes, as described in Table 1 (Seq ID Nos. 133-138, 143-148, 159-164). Plants carrying LOF mutations were grown to homozygosity, and the phenotypes were confirmed using visual and analytical assessments.

Example 6. Selected Yellow-Seeded Pennycress Mutants Demonstrate Significant Reductions in Fiber and Fiber Components Homozygous light seed coat-colored mutants obtained from screening EMS populations or from gene editing were bulked up in the greenhouse or in the fields and their fiber composition was assessed using standard methods below at Dairyland Laboratories (Arcadia, Wis.).

ADF (Acid Detergent Fiber)

Fiber (Acid Detergent) and Lignin in Animal Feed: AOAC Official Method 973.18 (1996) (Modification includes use of Sea Sand for filter aid as needed).

Crude Fiber

Fiber (Crude) in Animal Feed and Pet Food (Fritted Glass Crucible Method): AOAC Official Method 978.10 ch4 p 28 (1979) (Modification includes use of Sea Sand for filter aid as needed).

Lignin

Fiber (Acid Detergent) and Lignin in Animal Feed: AOAC Official Method 973.18 (1996) (Modification includes use of Sea Sand for filter aid as needed, use of Whatman GF/C filter paper to collect residue, and holding crucibles in beakers to cover fiber with 72% sulfuric acid for full time required).

NDF (Neutral Detergent Fiber)

Amylase-Treated Neutral Detergent Fiber in Feeds AOAC Official Method 2002.04 2005 (Modification includes use of Sea Sand for filter aid and Whatman GF/C filter paper for residue collection).

The results presented in Table 8 indicate that majority of the light-colored mutants have 35-60% less fiber and its components relative to WT plants (MN106 and Beecher).

TABLE 8

Composition of sixteen selected light-colored pennycress mutants vs. two wild type pennycress accessions measured using wet chemistry methods at Dairyland Laboratories (Arcadia, Wisconsin). The numbers represent percent of dry matter (% DM).

| No. | Name/ID | Mutated Gene/Allele | Seed Coat | Moisture | Crude Protein | ADF | aNDF | Crude fiber |
|---|---|---|---|---|---|---|---|---|
| 1 | Y1126 | ttg1 | light | 7.6 | 28.1 | 13.9 | 16.6 | 9.6 |
| 2 | E5-543 | tt10-1 | light | 7.4 | 26.5 | 15.3 | 19.7 | 14.4 |
| 3 | E5-542 | tt8 | light | 7.5 | 30.6 | 9.1 | 17.5 | 13.8 |
| 4 | E5-547 | tt2-1 | light | 6.7 | 28.1 | 12.8 | 17.2 | 12.1 |
| 5 | A7-63 | N/A | light | 6.9 | 28.7 | 14.6 | 20.5 | 11.8 |
| 6 | A7-187 | ttg1-2 | light | 7.5 | 29.2 | 12.9 | 17.8 | 13.1 |
| 7 | E5-559 | gl3-1 | light | 7.0 | 26.3 | 21.8 | 32.5 | 22.5 |
| 8 | E5-539 | tt10-1 | light | 7.5 | 27.3 | 13.9 | 17.6 | 12.0 |
| 9 | A7-261 | tt12-1 | light | 6.6 | 27.2 | 14.9 | 19.5 | 13.6 |
| 10 | E5-549 | tt4-2 | light | 7.4 | 26.5 | 16.2 | 22.3 | 12.7 |
| 11 | E5-444 | gl3-2 | light | 7.8 | 27.7 | 14.6 | 17.5 | 10.8 |
| 12 | D5-191 | tt8-2 | light | 6.5 | 26.6 | 13.3 | 17.9 | 13.0 |
| 13 | E5-586 | tt7-1 | light | 7.4 | 27.9 | 12.6 | 17.2 | 11.3 |
| 14 | E5-542 | tt8-3 | light | 6.9 | 26.0 | 13.5 | 19.9 | 16.2 |
| 15 | E5-541 | gl3-1 | light | 6.8 | 27.2 | 15.1 | 19.2 | 13.2 |
| 16 | E5-545 | tt10-2 | light | 6.7 | 24.5 | 14.8 | 18.5 | 12.9 |
| 17 | MN106 | WT | dark | 6.7 | 25.2 | 22.7 | 25.8 | 16.1 |
| 18 | Beecher | WT | dark | 6.5 | 25.6 | 21.1 | 23.9 | 15.4 |
| 19 | MIN of | light-colored | % of DM | 6.5 | 24.5 | 9.1 | 16.6 | 9.6 |
| 20 | MAX of | light-colored | % of DM | 7.8 | 30.6 | 21.8 | 32.5 | 22.5 |
| 21 | MIN of | light-colored | % of WT | 97% | 97% | 40% | 64% | 60% |

Example 7. Selected Yellow-Seeded Pennycress Mutants Demonstrate Significant Increases in Protein and Oil Composition

TABLE 9

Composition of five selected light-colored pennycress mutants vs. 95 wild type pennycress accessions harvested at various locations across USA and measured using NIR spectroscopy analysis.

| No. | Accession | Color | % Moisture | % Erucic Acid | % Total Oil | Sinigrin μmol/g | % ADF Fiber | % NDF Fiber | % Protein |
|---|---|---|---|---|---|---|---|---|---|
| 1 | Y1067 | Yellow | 7.2 | 25.1 | 37.6 | 149.1 | 15.5 | 16.2 | 32.5 |
| 2 | Y1126 | Yellow | 8.3 | 31.1 | 43.3 | 49.9 | 11.5 | 14.9 | 31.8 |
| 3 | P32 | Light brown | 6.0 | 39.5 | 36.4 | 180.2 | 13.5 | 18.0 | 29.1 |
| 4 | Q36.C | Brown | 6.1 | 22.8 | 33.0 | 196.2 | 19.7 | 24.1 | 25.0 |
| 5 | BJ.8 | Tan | 7.0 | 39.0 | 49.0 | 107.4 | 10.0 | 13.1 | 33.6 |
| 6 | 1126 | Dark brown | 10.2 | 33.7 | 30.8 | 59.2 | 27.6 | 31.2 | 22.2 |
| 7 | Spring32 (WT) | Dark brown | 8.6 | 34.8 | 30.6 | 116.0 | 27.6 | 32.2 | 22.0 |
| 8 | 1069 | Dark brown | 8.8 | 32.9 | 29.4 | 103.4 | 37.8 | 35.1 | 22.6 |
| 9 | 1096 | Dark brown | 8.4 | 31.3 | 26.0 | 128.7 | 32.9 | 34.2 | 20.1 |
| 10 | 2139 | Dark brown | 8.7 | 29.6 | 23.1 | 147.0 | 29.0 | 33.9 | 20.4 |
| 11 | 2057 | Dark brown | 8.2 | 31.0 | 23.7 | 157.6 | 31.5 | 33.8 | 18.7 |
| 12 | 1126 | Dark brown | 7.8 | 29.2 | 30.6 | 117.4 | 34.7 | 31.1 | 20.8 |
| 13 | 2066 | Dark brown | 8.7 | 36.8 | 35.2 | 83.0 | 26.2 | 29.1 | 22.4 |
| 14 | 2142 | Dark brown | 8.9 | 32.6 | 32.5 | 85.5 | 29.8 | 32.7 | 20.4 |
| 15 | 2170 | Dark brown | 8.8 | 31.8 | 29.4 | 118.4 | 30.6 | 31.3 | 22.3 |
| 16 | 2055 | Dark brown | 8.7 | 30.8 | 27.6 | 87.1 | 36.1 | 34.0 | 21.1 |
| 17 | 2065 | Dark brown | 9.0 | 27.8 | 29.7 | 127.6 | 30.0 | 33.9 | 19.7 |
| 18 | 2110 | Dark brown | 9.0 | 27.3 | 31.4 | 85.3 | 35.4 | 33.1 | 20.5 |
| 19 | 2154 | Dark brown | 8.7 | 32.0 | 34.6 | 58.1 | 33.2 | 32.2 | 20.1 |
| 20 | 2195 | Dark brown | 8.6 | 32.3 | 34.3 | 61.6 | 29.2 | 32.5 | 19.1 |
| 21 | 1311 | Dark brown | 8.3 | 34.8 | 30.1 | 126.6 | 26.7 | 28.4 | 25.0 |
| 22 | 2003 | Dark brown | 8.3 | 33.4 | 25.4 | 79.5 | 29.6 | 29.6 | 20.7 |
| 23 | 1065 | Dark brown | 8.7 | 34.2 | 29.6 | 112.5 | 29.2 | 31.7 | 23.5 |
| 24 | 2045 | Dark brown | 8.8 | 33.9 | 25.3 | 122.0 | 33.0 | 31.9 | 22.4 |
| 25 | 2128 | Dark brown | 8.5 | 34.6 | 29.5 | 129.3 | 23.4 | 27.2 | 25.2 |
| 26 | 2182 | Dark brown | 8.4 | 32.7 | 33.7 | 81.6 | 28.2 | 29.6 | 22.2 |
| 27 | 2030 | Dark brown | 7.7 | 31.3 | 33.2 | 105.8 | 24.0 | 27.7 | 20.3 |
| 28 | 2034 | Dark brown | 8.1 | 32.4 | 29.6 | 116.9 | 26.6 | 30.0 | 22.9 |
| 29 | 2072 | Dark brown | 8.2 | 30.2 | 27.8 | 97.3 | 30.8 | 31.0 | 21.3 |
| 30 | 2145 | Dark brown | 8.2 | 33.1 | 29.7 | 119.0 | 23.3 | 28.6 | 24.1 |
| 31 | 1027 | Dark brown | 8.0 | 29.4 | 30.6 | 110.6 | 30.5 | 29.1 | 23.4 |
| 32 | 1323 | Dark brown | 8.5 | 31.2 | 28.2 | 115.3 | 33.0 | 32.2 | 23.3 |
| 33 | 1340 | Dark brown | 8.0 | 32.3 | 29.2 | 129.8 | 28.5 | 29.4 | 22.9 |
| 34 | 2129 | Dark brown | 8.0 | 33.1 | 29.6 | 109.4 | 21.5 | 27.4 | 24.1 |
| 35 | 2167 | Dark brown | 8.5 | 28.6 | 34.8 | 71.8 | 34.4 | 31.7 | 21.5 |
| 36 | 2171 | Dark brown | 8.0 | 33.4 | 28.6 | 108.1 | 24.5 | 28.5 | 20.7 |
| 37 | 1054 | Dark brown | 8.3 | 34.0 | 29.0 | 128.4 | 29.4 | 31.3 | 22.2 |
| 38 | 1092 | Dark brown | 8.3 | 36.6 | 29.8 | 131.6 | 27.2 | 30.1 | 22.6 |
| 39 | 2196 | Dark brown | 9.2 | 32.4 | 32.5 | 113.1 | 22.7 | 30.7 | 21.2 |
| 40 | 2183 | Dark brown | 8.1 | 33.4 | 28.0 | 111.7 | 27.0 | 30.0 | 21.2 |
| 41 | 2020 | Dark brown | 8.5 | 32.5 | 31.9 | 128.1 | 22.5 | 29.0 | 21.4 |
| 42 | 2123 | Dark brown | 8.5 | 34.9 | 30.9 | 122.3 | 22.7 | 27.1 | 25.3 |
| 43 | 1296 | Dark brown | 8.0 | 36.2 | 30.6 | 113.3 | 25.9 | 28.3 | 23.7 |
| 44 | 2062 | Dark brown | 8.8 | 31.6 | 26.7 | 117.5 | 29.5 | 31.7 | 22.2 |
| 45 | 1167 | Dark brown | 8.0 | 34.0 | 28.3 | 121.0 | 31.7 | 30.4 | 22.3 |
| 46 | 1359 | Dark brown | 7.7 | 33.4 | 29.4 | 125.9 | 25.2 | 27.2 | 22.9 |
| 47 | 1265 | Dark brown | 8.4 | 34.6 | 32.2 | 78.0 | 29.6 | 30.7 | 22.8 |
| 48 | 1331 | Dark brown | 8.0 | 37.6 | 29.0 | 112.3 | 27.0 | 28.3 | 23.1 |
| 49 | 2002 | Dark brown | 7.9 | 33.1 | 27.4 | 59.8 | 28.6 | 30.0 | 20.6 |
| 50 | 2009 | Dark brown | 7.4 | 35.9 | 32.3 | 67.1 | 26.7 | 26.9 | 22.7 |
| 51 | 2079 | Dark brown | 8.0 | 37.5 | 29.3 | 126.2 | 21.0 | 28.3 | 22.5 |
| 52 | 2092 | Dark brown | 9.1 | 32.3 | 33.4 | 89.7 | 27.6 | 33.4 | 21.0 |
| 53 | 2107 | Dark brown | 8.8 | 35.8 | 29.7 | 103.4 | 21.3 | 28.8 | 21.5 |
| 54 | 2113 | Dark brown | 8.8 | 31.9 | 33.7 | 83.4 | 28.5 | 30.3 | 23.0 |
| 55 | 2117 | Dark brown | 8.2 | 30.8 | 26.6 | 99.0 | 23.7 | 29.5 | 20.9 |
| 56 | 2132 | Dark brown | 8.0 | 36.1 | 29.2 | 121.4 | 25.1 | 27.9 | 23.4 |
| 57 | 2137 | Dark brown | 7.9 | 32.9 | 28.8 | 115.6 | 27.7 | 28.8 | 22.2 |
| 58 | 2140 | Dark brown | 8.7 | 32.0 | 27.5 | 103.9 | 24.7 | 31.2 | 20.7 |
| 59 | 2008 | Dark brown | 7.7 | 35.0 | 29.7 | 75.5 | 23.8 | 26.3 | 22.1 |
| 60 | 2102 | Dark brown | 7.9 | 18.3 | 24.0 | 193.8 | 35.2 | 32.3 | 16.4 |
| 61 | 2021 | Dark brown | 9.0 | 30.5 | 28.1 | 127.7 | 26.4 | 33.3 | 19.7 |
| 62 | 2114 | Dark brown | 9.4 | 30.6 | 30.1 | 114.7 | 27.1 | 32.2 | 20.3 |
| 63 | 1022 | Dark brown | 8.7 | 33.8 | 28.4 | 137.0 | 26.6 | 30.8 | 22.3 |
| 64 | 2051 | Dark brown | 9.4 | 34.8 | 31.7 | 73.9 | 30.1 | 32.7 | 21.3 |
| 65 | 2073 | Dark brown | 9.8 | 33.5 | 27.6 | 132.3 | 27.3 | 34.0 | 20.2 |
| 66 | 2078 | Dark brown | 7.6 | 37.1 | 29.2 | 74.5 | 22.3 | 27.4 | 22.0 |
| 67 | 2209 | Dark brown | 8.1 | 31.0 | 28.4 | 104.2 | 27.3 | 29.2 | 22.1 |
| 68 | 2210 | Dark brown | 8.6 | 32.5 | 33.4 | 86.3 | 24.9 | 29.4 | 20.5 |

TABLE 9-continued

Composition of five selected light-colored pennycress mutants vs. 95 wild type pennycress accessions harvested at various locations across USA and measured using NIR spectroscopy analysis.

| | | | | | | | | | |
|---|---|---|---|---|---|---|---|---|---|
| 69 | 1332 | Dark brown | 7.9 | 36.5 | 30.1 | 113.4 | 24.1 | 26.9 | 23.8 |
| 70 | 2095 | Dark brown | 8.6 | 31.0 | 27.4 | 114.6 | 30.7 | 31.2 | 22.8 |
| 71 | 2143 | Dark brown | 9.0 | 29.1 | 33.1 | 97.8 | 23.7 | 32.3 | 21.5 |
| 72 | 2156 | Dark brown | 8.1 | 35.5 | 28.5 | 144.4 | 22.1 | 28.7 | 23.7 |
| 73 | 1235 | Dark brown | 8.1 | 32.7 | 27.8 | 148.3 | 27.4 | 28.4 | 23.0 |
| 74 | 2058 | Dark brown | 8.2 | 31.1 | 26.1 | 142.6 | 26.3 | 28.8 | 23.4 |
| 75 | 2151 | Dark brown | 8.7 | 29.5 | 33.2 | 68.4 | 37.3 | 34.1 | 20.4 |
| 76 | 1002 | Dark brown | 8.1 | 29.2 | 26.8 | 141.7 | 28.7 | 31.1 | 22.1 |
| 77 | 1218 | Dark brown | 8.0 | 23.9 | 26.6 | 120.2 | 37.9 | 34.9 | 18.3 |
| 78 | 1345 | Dark brown | 8.0 | 36.1 | 32.5 | 99.1 | 27.4 | 27.9 | 24.5 |
| 79 | 1366 | Dark brown | 8.0 | 36.5 | 31.3 | 115.1 | 26.9 | 28.2 | 22.4 |
| 80 | 2185 | Dark brown | 9.1 | 32.9 | 31.7 | 97.0 | 28.1 | 32.4 | 21.5 |
| 81 | 2221 | Dark brown | 7.7 | 35.8 | 29.9 | 123.2 | 23.3 | 26.9 | 23.2 |
| 82 | 2332 | Dark brown | 8.2 | 30.6 | 28.7 | 70.4 | 34.0 | 31.9 | 20.9 |
| 83 | 1149 | Dark brown | 8.2 | 31.7 | 29.8 | 114.2 | 30.5 | 31.0 | 23.1 |
| 84 | 1001 | Dark brown | 7.7 | 30.4 | 30.7 | 124.6 | 29.6 | 28.2 | 23.7 |
| 85 | 1082 | Dark brown | 8.1 | 30.8 | 30.7 | 85.6 | 33.3 | 30.2 | 22.4 |
| 86 | 2286 | Dark brown | 8.5 | 34.2 | 34.3 | 74.7 | 27.2 | 30.7 | 22.8 |
| 87 | 2298 | Dark brown | 8.0 | 33.6 | 27.5 | 106.8 | 25.2 | 30.6 | 20.8 |
| 88 | 2304 | Dark brown | 7.6 | 33.5 | 29.7 | 108.0 | 23.8 | 26.9 | 23.0 |
| 89 | 2308 | Dark brown | 8.7 | 36.0 | 29.0 | 113.9 | 27.0 | 30.0 | 22.8 |
| 90 | 2318 | Dark brown | 9.2 | 31.4 | 32.5 | 90.6 | 28.8 | 32.3 | 21.5 |
| 91 | 2319 | Dark brown | 9.0 | 27.4 | 32.2 | 71.6 | 31.1 | 35.1 | 20.2 |
| 92 | 2332 | Dark brown | 8.8 | 25.0 | 22.9 | 169.3 | 26.7 | 31.5 | 17.0 |
| 93 | 2338 | Dark brown | 8.0 | 24.5 | 24.1 | 145.7 | 20.8 | 30.9 | 15.3 |
| 94 | 2346 | Dark brown | 8.3 | 31.7 | 27.6 | 140.9 | 27.6 | 30.4 | 22.8 |
| 95 | 2347 | Dark brown | 8.8 | 31.0 | 34.4 | 78.9 | 27.8 | 30.5 | 22.9 |
| 96 | 2349 | Dark brown | 9.6 | 31.2 | 32.3 | 88.0 | 26.6 | 32.2 | 21.7 |
| 97 | 2354 | Dark brown | 8.3 | 28.9 | 27.2 | 84.5 | 30.4 | 30.1 | 21.7 |
| 98 | 2359 | Dark brown | 7.6 | 29.3 | 27.7 | 101.4 | 28.2 | 30.2 | 20.3 |
| 99 | 2362 | Dark brown | 8.7 | 30.5 | 28.6 | 86.7 | 30.1 | 31.3 | 22.7 |
| 100 | 2364 | Dark brown | 9.2 | 31.4 | 32.2 | 89.6 | 28.9 | 34.4 | 21.6 |

| | Color | % Moisture | % Erucic Acid | % Total Oil | Sinigrin μmol/g | % ADF Fiber | % NDF Fiber | % Protein |
|---|---|---|---|---|---|---|---|---|
| Minimum | Light | 6.0 | 22.8 | 33.0 | 49.9 | 10.0 | 13.1 | 25.0 |
| Minimum | Dark | 7.4 | 18.3 | 22.9 | 58.1 | 20.8 | 26.3 | 15.3 |
| Maximum | Light | 8.3 | 39.5 | 49 | 196.2 | 19.7 | 24.1 | 33.6 |
| Maximum | Dark | 10.2 | 37.6 | 35.2 | 193.8 | 37.9 | 35.1 | 25.3 |

Example 8. Composition and Performance of Pennycress Meal Produced from Y1126 Yellow-Seeded Mutant is Superior Relative to Meal Made from Black-Seeded Pennycress and is Similar to Canola Meal Approximately 13 lbs each of cleaned Y1126 yellow-seeded mutant and regular black-seeded pennycress seed were processed into oil and hexane-extracted meal at the Texas A&M Engineering Experiment Station's Process Engineering Research & Development Center (College Station, Tex.). The material was conditioned using a single deck of the French cooker for approximately 5 minutes at 100° F.±10° F. Conditioned seed was processed using a Ferrel Ross flaking rolls to yield flakes with a thickness of approximately 0.012 inches or thinner.

The flakes were loaded into a cooker with the objective of inactivating lipases, myrosinases, and other hydrolytic enzymes to facilitate pre-pressing. Maximum steam was used to get the flakes to 190° F. without lingering to avoid activation of such enzymes. This was achieved in 10-15 minutes. The press (Rosedowns Mini 200) was fed from a Wenger metered feeder with flake at a rate of 3.5-4 pounds per minute. The press operated best at 50-55 Hz, which corresponds to 38-40 RPM.

The presscake was extracted in stainless batch cans using commercial hexane at a temperature of 110-140° F.±10° F. Solvent was added and drained sequentially in 6 rounds of incubation, each of which was approximately 12 minutes. To remove residual hexane and yield desolventized meal, a batch-type desolventizer/toaster (DT) was heated, which showed a product temperature of 150-175° F. under vacuum. Crude oil was made by desolventizing using a Precision Scientific Evaporator. The hexane extracted meal was air dried overnight.

Samples of the hexane extracted meal were sent to Dairyland and DairyOne Laboratories for analysis. A sample of commercial canola meal was acquired from a feed plant in Wisconsin, which was also sent to DairyOne for comparison.

TABLE 10

The meal produced from Y1126 yellow-seeded pennycress mutant is significantly more valuable (lower in fiber, higher in protein and available energy and nutrients) than regular pennycress meal and is closer in composition and predicted performance to canola meal.

| | Meal Component | Type | Unit | Desired Change | Pennycress | Yellow seed (Y1126) | Canola |
|---|---|---|---|---|---|---|---|
| CP | Crude Protein | Protein | % Dry Matter | Increased | 31.9 | 40.5 | 41.4 |
| RUP | Rumen Undegraded Protein | Protein | % CP | No change | 41.45 | 42 | 55 |
| Fat | Oil | Oil | % Dry Matter | No change | 1.17 | 1.69 | 3.6 |
| ADF | Acid Detergent Fiber | Fiber | % Dry Matter | Reduce | 41.7 | 20.6 | 22.9 |
| NDF | Neutral Detergent Fiber | Fiber | % Dry Matter | Reduce | 45.5 | 27.2 | 34.3 |
| Lignin | indigestible cell wall material | Fiber | % Dry Matter | Reduce | 24.3 | 7.7 | 10 |
| Starch | Starch | Starch | % Dry Matter | No change | 0.5 | 0.5 | 0.3 |
| Sugar | Sugar | Sugar | % Dry Matter | No change | 6.5 | 9.5 | 8 |
| IVTD 24 | 24 hour In Vitro Total Digestibility | Energy | % Dry Matter | Increase | 65 | 89 | 82 |
| TDN | Total Digestible Nutrients | Energy | % Dry Matter | Increase | 53 | 68.5 | 67 |
| ME, 1X | Calculated Metabolizable Energy, 1 X maintenance | Energy | Mcal/lb | Increase | 0.93 | 1.33 | 1.33 |
| NEL, 1X | Calculated Net Energy Lactation, 1X maintenance | Energy | Mcal/lb | Increase | 1.08 | 1.52 | 1.55 |
| NEG, 1X | Calculated Net Energy Gain, 1X maintenance | Energy | Mcal/lb | Increase | 0.32 | 0.91 | 0.93 |
| NEM, 1X | Calculated Net Energy Maintenance, 1X maintenance | Energy | Mcal/lb | Increase | 0.86 | 1.5 | 1.52 |

Samples of the meal made from Y1126 yellow-seeded mutant, regular black-seeded pennycress and commercial canola meal were sent to the University of Illinois (Urbana-Champaign, Ill.) for Total Metabolizable Energy corrected for nitrogen (TMEn) and digestible amino acid analysis. The University of Illinois utilized the cecectomized rooster assay to measure TMEn and the digestibility of amino acids.

TABLE 11

Y1126 yellow-seed mutant had increased TMEn as compared to the black-seeded pennycress and was comparable to canola.

| Feed | Dry Matter (DM) % | TMEn Kcal/g DM |
|---|---|---|
| Pennycress | 97.0 | 1.68 |
| Yellow Seed (Y1126) | 97.6 | 2.02 |
| Canola | 89.1 | 2.14 |

TABLE 12

Y1126 yellow-seeded mutant has increased true amino acid digestibility as compared to the black-seeded pennycress and was as digestible or more so than canola.

| No. | Amino Acid | Unit | Canola | Yellow Seed Y1126 | Pennycress |
|---|---|---|---|---|---|
| 1 | ASP | % | 77.6 | 84.8 | 79.6 |
| 2 | THR | % | 77.0 | 79.2 | 73.6 |
| 3 | SER | % | 76.7 | 81.8 | 81.8 |
| 4 | GLU | % | 87.5 | 90.0 | 82.6 |
| 5 | PRO | % | 76.0 | 82.2 | 66.0 |
| 6 | ALA | % | 76.9 | 82.4 | 76.1 |
| 7 | CYS | % | 76.6 | 71.0 | 63.7 |
| 8 | VAL | % | 75.5 | 81.3 | 72.9 |
| 9 | MET | % | 85.9 | 84.9 | 75.8 |
| 10 | ILE | % | 77.2 | 82.2 | 75.7 |
| 11 | LEU | % | 81.5 | 86.1 | 79.1 |
| 12 | TYR | % | 77.1 | 83.8 | 78.2 |
| 13 | PHE | % | 81.6 | 87.1 | 80.4 |

TABLE 12-continued

Y1126 yellow-seeded mutant has increased true amino acid digestibility as compared to the black-seeded pennycress and was as digestible or more so than canola.

| No. | Amino Acid | Unit | Canola | Yellow Seed Y1126 | Pennycress |
|---|---|---|---|---|---|
| 14 | LYS | % | 73.5 | 76.7 | 68.9 |
| 15 | HIS | % | 83.4 | 86.6 | 70.1 |
| 16 | ARG | % | 87.0 | 93.0 | 83.6 |
| 17 | TRP | % | 95.4 | 93.2 | 89.2 |

REFERENCES

Kil, D. J., B. G. Kim, and H. H. Stein. (2013). Feed energy evaluation for growing pigs. Asian-Austrs. J. Animal. Sci. 26(9):1205-1217.

Meloche, K. J., B. J. Kerr, G. C. Shurson, and W. A. Dozier, III. (2013). Apparent metabolizable energy and prediction equations for reduced-oil corn distillers fried grains with solubles in broiler chicks. Poultry Science 92(12):3176-3183.

Rochelle, S. J., B. J. Kerr, and W. A. Dozier III. (2011). Energy determination of corn co-products fed to broiler chicks from 15 to 24 days of age and use of composition analysis to predict nitrogen-corrected apparent metabolizable energy. Poultry Science 90:1999-2007.

Slominski B A, Simbaya J, Campbell L D, Rakow G, Guenter W (1999) Nutritive value for broilers of meals derived from newly developed varieties of yellow-seeded canola. Anim Feed Sci Technol 78:249-262.

Chauhan, Y. S. and Kumar, K. (1987). Genetics of seed colour in mustard (*Brassica juncea* L. Czern and Coss), Cruciferae Newsletter 12, 22-23.

Appelhagen I, Lu G H, Huep G, Schmelzer E, Weisshaar B, Sagasser M. (2011) TRANSPARENT TESTA1 interacts with R2R3-MYB factors and affects early and late steps of flavonoid biosynthesis in the endothelium of *Arabidopsis thaliana* seeds. *Plant J.* 67:406-419.

Appelhagen I, Thiedig K, Nordholt N, Schmidt N, Huep G, Sagasser M, Weisshaar B. (2014) Update on *Transparent testa* mutants from *Arabidopsis thaliana*: characterisation of new alleles from an isogenic collection. *Planta* 240: 955-970.

Baudry A, Heim M A, Dubreucq B, Caboche M, Weisshaar B, Lepiniec L. (2004) TT2, TT8, and TTG1 synergistically specify the expression of BANYULS and proanthocyanidin biosynthesis in *Arabidopsis thaliana. Plant J.* 39:366-380.

Begemann M B, Gray B N, January E, Gordon G C, He Y, Liu H, Wu X, Brutnell T P, Mockler T C, Oufattole M. (2017) Precise insertion and guided editing of higher plant genomes using Cpf1 CRISPR nucleases. *Scientific reports* 7:11606.

Begemann M B, Gray B N, January E, Singer A, Kesler D C, He Y, Liu H, Guo H, Jordan A, Brutnell T P, Mockler T C. (2017) Characterization and Validation of a Novel Group of Type V, Class 2 Nucleases for in vivo Genome Editing. *bioRxiv.* 2017:192799.

Chen M, Wang Z, Zhu Y, Li Z, Hussain N, Xuan L, Guo W, Zhang G, Jiang L. (2012) The effect of TRANSPARENT TESTA2 on seed fatty acid biosynthesis and tolerance to environmental stresses during young seedling establishment in *Arabidopsis. Plant Physiol.* 160:1023-1036.

Chen M, Xuan L, Wang Z, Zhou L, Li Z, Du X, Ali E, Zhang G, Jiang L. (2014) TRANSPARENT TESTA8 inhibits seed fatty acid accumulation by targeting several seed development regulators in *Arabidopsis. Plant Physiol* 165:905-916.

Debeaujon I, Peeters A J, Leon-Kloosterziel K M, Koornneef M. (2001) The TRANSPARENT TESTAJ2 gene of *Arabidopsis* encodes a multidrug secondary transporter-like protein required for flavonoid sequestration in vacuoles of the seed coat endothelium. *Plant Cell* 13:853-871.

Fauser F, Schiml S, Puchta H (2014) Both CRISPR/Cas-based nucleases and nickases can be used efficiently for genome engineering in *Arabidopsis thaliana. Plant J* 79: 348-359.

Guschin D Y, Waite A J, Katibah G E, Miller J C, Holmes M C, Rebar E J. (2010) A rapid and general assay for monitoring endogenous gene modification. In: *Engineered zinc finger proteins:* 247-256. Humana Press, Totowa, N.J.

Holsters, M., De Waele, D., Depicker, A., Messens, E., Van Montagu, M., & Schell, J. (1978). Transfection and transformation of *Agrobacterium tumefaciens. Molecular and General Genetics* (MGG), 163(2), 181-187.

Li X, Chen L, Hong M, Zhang Y, Zu F, Wen J, Yi B, Ma C, Shen J, Tu J, Fu T. (2012) A large insertion in bHLH transcription factor BrTT8 resulting in yellow seed coat in *Brassica rapa. PLoS One* 7:e44145.

Lian J, Lu X, Yin N, Ma L, Lu J, Liu X, Li J, Lu J, Lei B, Wang R, Chai Y. (2017) Silencing of BnTT1 family genes affects seed flavonoid biosynthesis and alters seed fatty acid composition in *Brassica napus. Plant Sci.* 254:32-47.

Liang M, Davis E, Gardner D, Cai X, Wu Y. (2006) Involvement of AtLAC15 in lignin synthesis in seeds and in root elongation of *Arabidopsis. Planta* 224:1185-1196.

Michelmore R W, Paran I, Kesseli R V. (1991) Identification of markers linked to disease-resistance genes by bulked segregant analysis: a rapid method to detect markers in specific genomic regions by using segregating populations. *Proceedings of the National Academy of Sciences* 88: 9828-9832.

Magwene P M, Willis J H, Kelly J K. (2011) The statistics of bulk segregant analysis using next generation sequencing. *PLoS computational biology* 7:11.

Nesi N, Debeaujon I, Jond C, Pelletier G, Caboche M, Lepiniec L. (2000) The TT8 gene encodes a basic helix-loop-helix domain protein required for expression of DFR and BAN genes in *Arabidopsis siliques. Plant Cell* 12:1863-1878.

Nesi N, Debeaujon I, Jond C, Stewart A J, Jenkins G I, Caboche M, Lepiniec L. (2002) The TRANSPARENT TESTAJ6 locus encodes the *ARABIDOPSIS* BSISTER MADS domain protein and is required for proper development and pigmentation of the seed coat. *Plant Cell* 14:2463-2479.

Nesi N, Jond C, Debeaujon I, Caboche M, Lepiniec L. (2001) The *Arabidopsis* TT2 gene encodes an R2R3 MYB domain protein that acts as a key determinant for proanthocyanidin accumulation in developing seed. *Plant Cell* 13:2099-2114.

Pourcel L, Routaboul J M, Kerhoas L, Caboche M, Lepiniec L, Debeaujon I. (2005) TRANSPARENT TESTA10 encodes a laccase-like enzyme involved in oxidative polymerization of flavonoids in *Arabidopsis* seed coat. *Plant Cell* 17:2966-2980.

Sagasser M, Lu G H, Hahlbrock K, Weisshaar B. (2002) *A. thaliana* TRANSPARENT TESTA 1 is involved in seed coat development and defines the WIP subfamily of plant zinc finger proteins. *Genes Dev* 16:138-149.

Steinert J, Schiml S, Fauser F, Puchta H (2015) Highly efficient heritable plant genome engineering using Cas9 orthologues from *Streptococcus thermophilus* and *Staphylococcus aureus. Plant J* 84:1295-305.

Zhang J, Lu Y, Yuan Y, Zhang X, Geng J, Chen Y, Cloutier S, McVetty P B, Li G. (2008) Map-based cloning and characterization of a gene controlling hairiness and seed coat color traits in *Brassica rapa. Plant Mol Biol.* 69:553-563.

Other Embodiments

It is to be understood that while certain embodiments have been described in conjunction with the detailed description thereof, the foregoing description is intended to illustrate and not limit the scope of the disclosure. Other aspects, advantages, and modifications are within the scope of the following embodiments and claims.

Embodiment 1. A composition comprising non-defatted pennycress seed meal comprising an acid detergent fiber (ADF) content of 5%, 8%, or 10% to 15%, 18%, or 20% by dry weight.

Embodiment 2. The composition of embodiment 1, wherein said composition has a protein content of 28%, 30%, 32%, or 34% to 38% or 40% by dry weight.

Embodiment 3. The composition of embodiment 1, wherein said composition has an oil content of 30%, 32%, or 34% to 40%, 42%, 46%, 48%, or 50% by dry weight.

Embodiment 4. The composition of embodiment 1, wherein said composition has a neutral detergent fiber (NDF) content of 10%, 12%, 14%, or 16% to 20%, 22%, 24%, or 25% by dry weight.

Embodiment 5. The composition of embodiment 1, wherein said composition has a protein content of 28%, 30%, 32%, or 34% to 38% or 40% by dry weight and an oil content of 30% to 50% by dry weight.

Embodiment 6. A composition comprising defatted pennycress seed meal comprising an acid detergent fiber (ADF) content of 7%, 8%, 10%, or 12% to 20%, 22%, 24%, or 25% by dry weight.

Embodiment 7. The composition of embodiment 6, wherein said composition has a protein content of 30%, 35%, 40%, or 45% to 55%, 60%, 65%, or 70% by dry weight.

Embodiment 8. The composition of embodiment 6, wherein said composition has an oil content of 0%, 2%, or 4% to 8%, 10%, or 12% by dry weight.

Embodiment 9. The composition of embodiment 6, wherein said composition has a neutral detergent fiber (NDF) content of 10%, 12%, or 15% to 20%, 25%, 28%, or 30% by dry weight.

Embodiment 10. The composition of embodiment 6, wherein said composition has a protein content of 30%, 35%, 40%, or 45% to 55%, 60%, 65%, or 70% by dry weight and an oil content of 0%, 2%, or 4% to 8%, 10%, or 12% by dry weight.

Embodiment 11. The composition of embodiment 6, wherein said composition has a protein content of 30%, 35%, 40%, or 45% to 55%, 60%, 65%, or 70% by dry weight and a neutral detergent fiber (NDF) content of 10%, 12%, or 15% to 20%, 25%, 28%, or 30% by dry weight.

Embodiment 12. The composition of any one of embodiments 1-11, wherein said composition further comprises a preservative, a dust preventing agent, a bulking agent, a flowing agent, or any combination thereof.

Embodiment 13. The composition of any one of embodiments 1-12, wherein said pennycress seed meal is obtained from pennycress seeds that have been crushed, ground, macerated, expelled, extruded, expanded, or any combination thereof.

Embodiment 14. The composition of any one of embodiments 1-13, wherein said pennycress seed meal is obtained from a population of pennycress seeds comprising seeds having at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 15. The composition of any one of embodiments 1-14, wherein said pennycress seed meal is obtained from a population of pennycress seeds comprising seeds having at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 16. The composition of any one of embodiments 1-15, wherein said composition comprises a detectable amount of a polynucleotide comprising at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 17. The composition of any one of embodiments 1-16, wherein said pennycress seed meal comprises: (i) pennycress variety Y1067, Y1126, BC38, BJ8, P32, J22, Q36, BD24, AX17, E5-444, E5-540, E5-541, E5-542, E5-543, E5-544, E5-545, E5-547, E5-549, E5-582, E5-586, D3-N10 P5, D5-191, A7-95, A7-187 or A7-261 seed meal; (ii) seed meal of hybrids of the varieties; (iii) seed meal from progeny of the varieties; (iv) seed meal from seed comprising germplasm from the varieties that provides seed comprising an acid detergent fiber (ADF) content of 5% to 20% by dry weight; or (v) seed meal of any combination of said varieties, hybrid varieties, progeny of said varieties, or seed comprising the germplasm.

Embodiment 18. The composition of any one of embodiments 1-17, wherein said pennycress seed meal comprises seed meal obtained from the seed lot of anyone of embodiments 43 to 62, or any combination thereof.

Embodiment 19. The composition of any one of embodiments 1 to 18, wherein the composition exhibits a lighter-color in comparison to a control composition comprising wild-type pennycress seed meal.

Embodiment 20. Pennycress seed meal comprising an acid detergent fiber (ADF) content of 5%, 8%, or 10% to 15%, 18%, or 20% by dry weight, wherein the seed meal is non-defatted.

Embodiment 21. The seed meal of embodiment 20, wherein said seed meal has a protein content of 28%, 30%, 32%, or 34% to 38% or 40% by dry weight.

Embodiment 22. The seed meal of embodiment 21, wherein said seed meal has an oil content of 30%, 32%, or 34% to 40%, 42%, 46%, 48%, or 50% by dry weight.

Embodiment 23. The seed meal of embodiment 21, wherein said seed meal has a neutral detergent fiber (NDF) content of 10%, 12%, 14%, or 16% to 20%, 22%, 24%, or 25% by dry weight.

Embodiment 24. The seed meal of embodiment 21, wherein said seed meal has a protein content of 28%, 30%, 32%, or 34% to 38% or 40% by dry weight and an oil content of 30%, 32%, or 34% to 40%, 42%, 46%, 48%, or 50% by dry weight.

Embodiment 25. Pennycress seed meal comprising an acid detergent fiber (ADF) content of 7%, 8%, 10%, or 12% to 20%, 22%, 24%, or 25% by dry weight, wherein the seed meal is defatted.

Embodiment 26. The seed meal of embodiment 25, wherein said seed meal has a protein content of 30%, 35%, 40%, or 45% to 55%, 60%, 65%, or 70% by dry weight. Embodiment 27. The seed meal of embodiment 25, wherein said seed meal has an oil content of 0%, 2%, or 4% to 8%, 10%, or 12% by dry weight.

Embodiment 27. The seed meal of embodiment 25, wherein said seed meal has a neutral detergent fiber (NDF) content of 10%, 12%, or 15% to 20%, 25%, 28%, or 30% by dry weight.

Embodiment 28. The seed meal of embodiment 25, wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 29. The pennycress seed meal of any one of embodiments 20-28, wherein the meal comprises ground and/or macerated seed of the seed lot of any one of embodiments 43 to 62.

Embodiment 30. The pennycress seed meal of any one of embodiments 20-29, wherein said meal comprises a detectable amount of a polynucleotide comprising at least one loss-of-function mutation in at least one endogenous wild-type pennycress gene comprising a polynucleotide sequence selected from the group consisting of SEQ ID NO:1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 31. The pennycress seed meal of any one of embodiments 20-30, wherein said meal comprises ground and/or macerated seed of a population of pennycress seeds comprising seeds having at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 32. The pennycress seed meal of any one of embodiments 20-31, wherein said meal comprises ground and/or macerated seed of a population of pennycress seeds comprising seeds having at least one loss-of-function mutation in at least one endogenous pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172 and allelic variants thereof.

Embodiment 33. The pennycress seed meal of any one of embodiments 20-32, wherein said meal comprises ground and/or macerated seed of a population of pennycress seeds comprising seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 34. The pennycress seed meal of any one of embodiments 20-33, wherein the meal exhibits a lighter-color in comparison to a control pennycress seed meal prepared from wild-type pennycress seed.

Embodiment 35. Pennycress seed cake comprising an acid detergent fiber (ADF) content of 7%, 8%, 10%, or 12% to 20%, 22%, 24%, or 25% by dry weight.

Embodiment 36. The seed cake of embodiment 35, wherein said seed meal has a protein content of 30%, 35%, 40%, or 45% to 55%, 60%, 65%, or 70% by dry weight.

Embodiment 37. The seed cake of embodiment 35, wherein said seed meal has an oil content of 0%, 2%, or 4% to 8%, 10%, or 12% by dry weight.

Embodiment 38. The seed cake of embodiment 35, wherein said seed meal has a neutral detergent fiber (NDF) content of 10%, 12%, or 15% to 20%, 25%, 28%, or 30% by dry weight.

Embodiment 39. The seed cake of embodiment 35, wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 40. The pennycress seed cake of any one of embodiments 35 to 39, wherein the cake comprises crushed or expelled seed of the seed lot of any one of embodiments 43 to 62.

Embodiment 41. The pennycress seed cake of any one of embodiments 35 to 40, wherein the cake comprises a detectable amount of a polynucleotide comprising at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 42. The pennycress seed meal or pennycress seed meal cake of any one of embodiments 36 to 41, wherein the cake exhibits a lighter-color in comparison to a control pennycress seed meal cake prepared from wild-type pennycress seed.

Embodiment 43. A seed lot comprising a population of pennycress seeds that comprise an acid detergent fiber (ADF) content of 5%, 8%, or 10% to 15%, 18%, or 20% by dry weight.

Embodiment 44. The seed lot of embodiment 43, wherein said seed has a protein content of 28%, 30%, 32%, or 34% to 38% or 40% by dry weight.

Embodiment 45. The seed lot of embodiment 43, wherein said seed has an oil content of 30%, 32%, or 34% to 40%, 42%, 46%, 48%, or 50% by dry weight.

Embodiment 46. The seed lot embodiment 43, wherein said seed has a neutral detergent fiber (NDF) content of 10%, 12%, 14%, or 16% to 20%, 22%, 24%, or 25% by dry weight.

Embodiment 47. The seed lot of embodiment 43, wherein said seed has a protein content of 28%, 30%, 32%, or 34% to 38% or 40% by dry weight and an oil content of 30%, 32%, or 34% to 40%, 42%, 46%, 48%, or 50% by dry weight.

Embodiment 48. The seed lot of any one of embodiments 43 to 47, wherein the population comprises at least 10, 20, 50, 100, 500, or 1,000 seeds comprising said ADF content.

Embodiment 49. The seed lot of any one of embodiments 43 to 48, wherein at least 95% of the pennycress seeds in the seed lot are seeds comprising said ADF content and said protein content.

Embodiment 50. The seed lot of any one of embodiments 43 to 49, wherein less than 5% of the seeds in said seed lot have an ADF content of greater than 20% by dry weight.

Embodiment 51. The seed lot of any one of embodiments 43 to 50, wherein said seeds further comprise an agriculturally acceptable excipient or adjuvant.

Embodiment 52. The seed lot of any one of embodiments 43 to 51, wherein said seeds further comprise a fungicide, a safener, or any combination thereof.

Embodiment 53. The seed lot of any one of embodiments 43 to 52, wherein said population of pennycress seeds comprise seeds having at least one loss-of-function mutation in at least one endogenous pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof or comprise seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 54. The seed lot of any one of embodiments 43 to 53, wherein said population of pennycress seeds comprise seeds having at least one loss-of-function mutation in an endogenous wild-type pennycress gene that encodes SEQ ID NO:2, 70, 76, or an allelic variant thereof.

Embodiment 55. The seed lot of embodiment 54, wherein the loss-of-function mutation in the gene encoding SEQ ID NO:2, 70, 76, or the allelic variant thereof comprises an insertion, deletion, or substitution of one or more nucleotides.

Embodiment 56. The seed lot of embodiment 54, wherein the loss-of-function mutation in the gene encoding SEQ ID NO:2 or the allelic variant thereof comprises a mutation that introduces a pre-mature stop codon or frameshift mutation at codon positions 1-108 of SEQ ID NO:1 or an allelic variant thereof, wherein the loss-of-function mutation in the gene encoding SEQ ID NO:70 or the allelic variant thereof comprises a mutation set forth in SEQ ID NO:127, 129, 131, 133, 135, or 137, or wherein the loss-of-function mutation in the gene encoding SEQ ID NO:76 or the allelic variant thereof comprises a mutation set forth in SEQ ID NO:165, 167, or 170.

Embodiment 57. The seed lot of any one of embodiments 54-56, wherein the loss-of-function mutation in the gene encoding SEQ ID NO:2 or the allelic variant thereof comprises a substitution of a guanine residue at nucleotide 491 of SEQ ID NO:1 with an adenine residue or a substitution of a guanine residue a nucleotide equivalent to nucleotide 491 of SEQ ID NO:1 in the allelic variant thereof with an adenine residue.

Embodiment 58. The seed lot of any one of embodiments 43 to 57, wherein said population of pennycress seeds comprise seeds having at least one loss-of-function mutation in at least one endogenous wild-type pennycress gene comprising a polynucleotide sequence selected from the group consisting of SEQ ID NO:1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 59. The seed lot of any one of embodiments 43 to 58, wherein said population of pennycress seeds comprising seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 60. The seed lot of any one of embodiments 43 to 59, wherein said population of pennycress seeds comprise: (i) pennycress variety Y1067, Y1126, BC38, BJ8, P32, J22, Q36, BD24, AX17, AX17, E5-444, E5-540, E5-541, E5-542, E5-543, E5-544, E5-545, E5-547, E5-549, E5-582, E5-586, D3-N10 P5, D5-191, A7-95, A7-187 or A7-261 seed; (ii) hybrid seed of said varieties; (iii) seed from progeny of said varieties; (iv) seed comprising germplasm from said varieties that provides seed having an acid detergent fiber (ADF) content of 10% to 20% by dry weight; or (v) any combination of said seed, hybrid seed, seed from progeny of said varieties, or seed comprising said germplasm.

Embodiment 61. The seed lot of any one of embodiments 43 to 60, wherein the seeds in the population exhibit a lighter-colored seed coat in comparison to a wild-type pennycress seed.

Embodiment 62. A method of making non-defatted pennycress seed meal comprising an acid detergent fiber (ADF) content of 5%, 8%, or 10% to 15%, 18%, or 20% by dry weight, comprising the step of grinding, macerating, extruding, and/or crushing the seed lot of any one of embodiments 43 to 62, thereby obtaining the non-defatted seed meal.

Embodiment 63. The method of embodiment 62, wherein the seed meal has a protein content of 28%, 30%, 32%, or 34% to 38% or 40% by dry weight, or the combination thereof.

Embodiment 64. The method of embodiment 62, wherein said seed meal has an oil content of 30%, 32%, or 34% to 40%, 42%, 46%, 48%, or 50% by dry weight.

Embodiment 65. The method of embodiment 62, wherein said seed meal has a neutral detergent fiber (NDF) content of 10%, 12%, 14%, or 16% to 20%, 22%, 24%, or 25% by dry weight.

Embodiment 66. The method of embodiment 62, wherein said seed meal has a protein content of 28%, 30%, 32%, or 34% to 38% or 40% by dry weight and an oil content of 30%, 32%, or 34% to 40%, 42%, 46%, 48%, or 50% by dry weight.

Embodiment 67. A method of making defatted pennycress seed meal comprising an acid detergent fiber (ADF) content of 7%, 8%, 10%, or 12% to 20%, 22%, 24%, or 25% by dry weight, comprising the step of solvent extracting the seed lot of any one of embodiments 43 to 62, separating the extracted seed meal from the solvent, thereby obtaining the defatted seed meal.

Embodiment 68. The method of embodiment 67, wherein the seed meal has a protein content of 30%, 35%, 40%, or 45% to 55%, 60%, 65%, or 70% by dry weight.

Embodiment 69. The method of embodiment 67, wherein said seed meal has an oil content of 0%, 2%, or 4% to 8%, 10%, or 12% by dry weight.

Embodiment 70. The method of embodiment 67, wherein said seed meal has a neutral detergent fiber (NDF) content of 10% to 30% by dry weight.

Embodiment 71. The method of embodiment 67 wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 72. The method of any one of embodiments 67 to 71, wherein the solvent is hexane or mixed hexanes.

Embodiment 73. A method of making pennycress seed cake comprising an acid detergent fiber (ADF) content of 7%, 8%, 10%, or 12% to 20%, 22%, 24%, or 25% by dry weight, comprising the step of crushing or expelling the seed of the seed lot any one of embodiments 43 to 62, thereby obtaining a seed cake.

Embodiment 74. The method of embodiment 73, wherein the seed cake has a protein content of 30%, 35%, 40%, or 45% to 55%, 60%, 65%, or 70% by dry weight.

Embodiment 75. The method of embodiment 74, wherein the seed cake has an oil content of 0%, 2%, or 4% to 8%, 10%, or 12% by dry weight.

Embodiment 76. A method of making a pennycress seed lot comprising the steps of:

(a) introducing at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof;

(b) selecting germplasm that is homozygous for said loss-of-function mutation; and, (c) harvesting seed from the homozygous germplasm, thereby obtaining a seed lot, wherein said seed lot comprises an acid detergent fiber (ADF) content of 5%, 8%, or 10% to 15%, 18%, or 20% by dry weight.

Embodiment 77. The method of embodiment 76, wherein said seed lot comprise the seed lot of any one of embodiments 43 to 61.

Embodiment 78. A method of making a pennycress seed lot comprising the steps of:

(a) introducing at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof into a pennycress plant genome;

(b) selecting a transgenic plant line that comprises said transgene; and, (c) harvesting seed from the transgenic plant line, thereby obtaining a seed lot, wherein said seed lot comprises an acid detergent fiber (ADF) content of 5%, 8%, or 10% to 15%, 18%, or 20% by dry weight.

Embodiment 79. The method of embodiment 78, wherein said harvested seed comprise a seed lot of any one of embodiments 43 to 61.

What is claimed is:

1. Pennycress seed meal comprising an acid detergent fiber (ADF) content of 7% to 25% by dry weight, wherein the seed meal is defatted, and wherein said meal comprises a detectable amount of a polynucleotide comprising: (i) at least one loss-of-function mutation in an endogenous wild-type pennycress gene comprising the polynucleotide sequence of SEQ ID NO: 3 or SEQ ID NO: 38; or (ii) at least one loss-of-function mutation in an allelic variant of the endogenous wild-type pennycress gene having at least 95% sequence identity to SEQ ID NO: 3 or SEQ ID NO: 38.

2. The seed meal of claim 1, wherein said seed meal has a protein content of 30% to 70% by dry weight, an oil content of 0% to 12% by dry weight, and/or a neutral detergent fiber (NDF) content of 10% to 30% by dry weight.

3. The seed meal of claim 1, wherein said meal comprises an acid detergent fiber (ADF) content of 8% to 20% by dry weight and a detectable amount of the polynucleotide comprising: (i) the at least one loss-of-function mutation in the endogenous wild-type pennycress gene comprising the polynucleotide sequence of SEQ ID NO: 3 or SEQ ID NO: 38; or (ii) the at least one loss-of-function mutation in an allelic variant of the endogenous wild-type pennycress gene, wherein the allelic variant has at least 99% sequence identity to SEQ ID NO: 3 or SEQ ID NO: 38.

4. The pennycress seed meal of claim 1, wherein the meal exhibits a lighter-color in comparison to a control pennycress seed meal prepared from wild-type pennycress seed.

5. A composition comprising the defatted pennycress seed meal of claim 1.

6. Pennycress seed meal comprising an acid detergent fiber (ADF) content of 5% to 20% by dry weight, wherein the seed meal is non-defatted, and wherein said meal comprises a detectable amount of a polynucleotide comprising: (i) at least one loss-of-function mutation in an endogenous wild-type pennycress gene comprising the polynucleotide sequence of SEQ ID NO: 3 or SEQ ID NO: 38; or (ii) at least one loss-of-function mutation in an allelic variant of the endogenous wild-type pennycress gene having at least 95% sequence identity to SEQ ID NO: 3 or SEQ ID NO: 38.

7. The seed meal of claim 6, wherein said meal comprises an acid detergent fiber (ADF) content of 8% to 20% by dry weight and a detectable amount of the polynucleotide comprising: (i) the at least one loss-of-function mutation in the endogenous wild-type pennycress gene comprising the polynucleotide sequence of SEQ ID NO: 3 or SEQ ID NO: 38; or (ii) the at least one loss-of-function mutation in an allelic variant of the endogenous wild-type pennycress gene, wherein the allelic variant has at least 99% sequence identity to SEQ ID NO: 3 or SEQ ID NO: 38.

8. The seed meal of claim 6, wherein said seed meal has a protein content of 28% to 40% by dry weight, an oil content of 30% to 50% by dry weight, and/or a neutral detergent fiber (NDF) content of 10% to 25% by dry weight.

9. The seed meal of claim 6, wherein the meal exhibits a lighter-color in comparison to a control pennycress seed meal prepared from wild-type pennycress seed.

10. A composition comprising the non-defatted seed meal of claim 6.

11. A seed lot comprising a population of pennycress seeds that comprise an acid detergent fiber (ADF) content of 5% to 20% by dry weight, wherein the population comprises at least 10 seeds comprising said ADF content and wherein said population of pennycress seeds comprise: (i) seeds having at least one loss-of-function mutation in an endogenous wild-type pennycress gene encoding a polypeptide having an amino acid sequence of SEQ ID NO: 2; (ii) seeds having at least one loss-of-function mutation in an allelic variant of the endogenous wild-type pennycress gene encoding a polypeptide comprising an amino acid sequence with at least 95% sequence identity to SEQ ID NO: 2 or SEQ ID NO: 37; (iii) seeds having at least one transgene that suppresses expression of an endogenous wild-type pennycress gene encoding a polypeptide having the amino acid sequence of SEQ ID NO: 2; or (iv) seeds having at least one transgene that suppresses expression of an allelic variant of the endogenous wild-type pennycress gene encoding a polypeptide comprising an amino acid sequence with at least 95% sequence identity to SEQ ID NO: 2 or SEQ ID NO: 37.

12. The seed lot of claim 11, wherein said seeds have a protein content of 28% to 40% by dry weight, an oil content of 30% to 50% by dry weight, and/or a neutral detergent fiber (NDF) content of 10% to 25% by dry weight.

13. The seed lot of claim 11, wherein the population comprises at least 500 seeds comprising said ADF content.

14. The seed lot of claim 11, wherein at least 95% of the pennycress seeds in the seed lot are seeds comprising said ADF content.

15. The seed lot of claim 11, wherein said seeds further comprise an agriculturally acceptable excipient or adjuvant.

16. The seed lot of claim 11, wherein said seeds further comprise a fungicide, a safener, or any combination thereof.

17. The seed lot of claim 11, wherein the population of pennycress seeds comprise: (i) seeds having at least one loss-of-function mutation in the allelic variant of the endogenous wild-type pennycress gene, wherein the allelic variant encodes a polypeptide comprising an amino acid sequence with at least 99% sequence identity to SEQ ID NO: 2 or SEQ ID NO: 37; or (ii) seeds having at least one transgene that suppresses expression of the allelic variant of the endogenous wild-type pennycress gene, wherein the allelic variant encodes a polypeptide comprising an amino acid sequence with at least 99% sequence identity to SEQ ID NO: 2 or SEQ ID NO: 37.

18. The seed lot of claim 11, wherein the seeds in the population exhibit a lighter-colored seed coat in comparison to a wild-type pennycress seed.

19. A method of making defatted pennycress seed meal comprising an acid detergent fiber (ADF) content of 7% to 25% by dry weight, comprising solvent extracting the seed lot of claim 11 and separating the extracted seed meal from the solvent, thereby obtaining the defatted pennycress seed meal.

20. A method of making a composition comprising non-defatted pennycress seed meal comprising an acid detergent fiber (ADF) content of 7% to 25% by dry weight, wherein the method comprises the step of grinding, macerating, extruding, expanding, and/or crushing the seed lot of claim 11 to obtain said composition, and wherein said composition further comprises a preservative, a dust preventing agent, a bulking agent, a flowing agent, or any combination thereof, thereby obtaining the non-defatted pennycress seed meal composition.

21. A population of pennycress plants grown from the seed lot of claim 11, wherein the population of pennycress plants comprise the at least one loss-of-function mutation or the at least one transgene.

* * * * *